US009600645B2

(12) United States Patent
Fadell et al.

(10) Patent No.: US 9,600,645 B2
(45) Date of Patent: Mar. 21, 2017

(54) SMART INVITATION HANDLING AT A SMART-HOME

(71) Applicant: Google Inc., Mountain View, CA (US)

(72) Inventors: Anthony Michael Fadell, Woodside, CA (US); Matthew Lee Rogers, Los Gatos, CA (US); Yoky Matsuoka, Los Altos Hills, CA (US); David Sloo, Menlo Park, CA (US); Shigefumi Honjo, Santa Cruz, CA (US); Scott A. McGaraghan, Menlo Park, CA (US); Michael Plitkins, Piedmont, CA (US); Maxime Veron, San Jose, CA (US); Isabel Guenette, Palo Alto, CA (US)

(73) Assignee: GOOGLE INC., Mountain View, CA (US)

(*) Notice: Subject to any disclaimer, the term of this patent is extended or adjusted under 35 U.S.C. 154(b) by 94 days.

(21) Appl. No.: 14/587,694

(22) Filed: Dec. 31, 2014

(65) Prior Publication Data

US 2015/0109104 A1 Apr. 23, 2015

Related U.S. Application Data

(63) Continuation-in-part of application No. 14/489,162, filed on Sep. 17, 2014, which is a continuation-in-part
(Continued)

(51) Int. Cl.
*G06F 21/31* (2013.01)
*H04L 29/08* (2006.01)
(Continued)

(52) U.S. Cl.
CPC .............. *G06F 21/31* (2013.01); *G06F 21/44* (2013.01); *G07C 9/00031* (2013.01);
(Continued)

(58) Field of Classification Search
CPC ..... G06F 21/31; G06F 21/44; G07C 9/00031; G07C 9/00142; G07C 9/00174
See application file for complete search history.

(56) References Cited

U.S. PATENT DOCUMENTS 4,804,945 A 2/1989 Millet
4,959,713 A 9/1990 Morotomi et al.
(Continued)

FOREIGN PATENT DOCUMENTS

CN 2779766 5/2006
KR 10-2009-0050500 5/2009
(Continued)

*Primary Examiner* — Andrew Bee
(74) *Attorney, Agent, or Firm* — Van Court & Aldridge LLP

(57) ABSTRACT

This patent specification relates to apparatus, systems, methods, and related computer program products for providing home security/smart home objectives. More particularly, this patent specification relates to a plurality of devices, including intelligent, multi-sensing, network-connected devices, that communicate with each other and/or with a central server or a cloud-computing system to provide any of a variety of useful home security/smart home objectives.

30 Claims, 45 Drawing Sheets

Related U.S. Application Data of application No. 13/830,795, filed on Mar. 14, 2013, now Pat. No. 9,208,676, application No. 14/587,694, filed on Dec. 31, 2014, which is a continuation-in-part of application No. PCT/US2013/061021, filed on Sep. 20, 2013.

(60) Provisional application No. 61/704,437, filed on Sep. 21, 2012.

(51) Int. Cl.
| | |
|---|---|
| *G06F 21/44* | (2013.01) |
| *G07C 9/00* | (2006.01) |
| *G08B 27/00* | (2006.01) |
| *G08B 3/10* | (2006.01) |
| *G08B 19/00* | (2006.01) |
| *G08B 25/00* | (2006.01) |

(52) U.S. Cl.
CPC ..... *G07C 9/00142* (2013.01); *G07C 9/00174* (2013.01); *G08B 3/10* (2013.01); *G08B 19/005* (2013.01); *G08B 25/008* (2013.01); *G08B 27/003* (2013.01); *G08B 27/005* (2013.01); *H04L 67/12* (2013.01); *G08B 25/002* (2013.01)

(56) References Cited

U.S. PATENT DOCUMENTS

| | | | |
|---|---|---|---|
| 5,541,585 | A | 7/1996 | Duhame et al. |
| 5,576,690 | A | 11/1996 | Waugh et al. |
| 5,754,952 | A | 5/1998 | Hodges et al. |
| 5,774,039 | A | 6/1998 | Housley |
| 5,933,086 | A * | 8/1999 | Tischendorf ........ E05B 47/0012 340/12.22 |
| 5,979,750 | A | 11/1999 | Kindell |
| 6,081,705 | A | 6/2000 | Houde et al. |
| 6,236,303 | B1 | 5/2001 | Wagner et al. |
| 6,243,793 | B1 | 6/2001 | Aucsmith et al. |
| 6,404,337 | B1 | 6/2002 | Van Till et al. |
| 6,535,131 | B1 | 3/2003 | Bar-Shalom et al. |
| 6,611,537 | B1 | 8/2003 | Edens et al. |
| 6,967,575 | B1 | 11/2005 | Dohrmann et al. |
| 6,990,379 | B2 | 1/2006 | Gonzales et al. |
| 6,993,123 | B1 | 1/2006 | Allen et al. |
| 7,061,393 | B2 | 6/2006 | Buckingham et al. |
| 7,246,371 | B2 | 7/2007 | Diacakis et al. |
| 7,526,539 | B1 | 4/2009 | Hsu |
| 7,683,924 | B2 | 3/2010 | Oh et al. |
| 7,733,213 | B2 * | 6/2010 | Levine ..................... G05B 15/02 340/5.28 |
| 7,792,920 | B2 | 9/2010 | Istvan et al. |
| 7,895,257 | B2 | 2/2011 | Helal et al. |
| 8,339,363 | B2 | 12/2012 | Krum et al. |
| 8,375,118 | B2 | 2/2013 | Hao et al. |
| 8,552,983 | B2 | 10/2013 | Chiu |
| 8,635,307 | B2 | 1/2014 | Parks et al. |
| 8,688,829 | B2 | 4/2014 | Lee et al. |
| 8,780,201 | B1 | 7/2014 | Scalisi et al. |
| 8,872,915 | B1 | 10/2014 | Scalisi et al. |
| 8,949,434 | B2 | 2/2015 | Vellanki et al. |
| 9,014,829 | B2 | 4/2015 | Chemel et al. |
| 9,068,846 | B1 | 6/2015 | Boerger |
| 9,326,407 | B1 | 4/2016 | Musolin |
| 2002/0014953 | A1 | 2/2002 | Stephens et al. |
| 2003/0023870 | A1 | 1/2003 | Geros |
| 2003/0037009 | A1 | 2/2003 | Tobin et al. |
| 2003/0043047 | A1 | 3/2003 | Braun |
| 2003/0050732 | A1 | 3/2003 | Rivalto |
| 2003/0121968 | A1 * | 7/2003 | Miller ..................... G07F 17/12 235/375 |
| 2004/0170262 | A1 | 9/2004 | Ohno |
| 2004/0181570 | A1 | 9/2004 | Kaneko |
| 2004/0229569 | A1 | 11/2004 | Franz |
| 2004/0257336 | A1 | 12/2004 | Hershkovitz et al. |
| 2005/0035848 | A1 | 2/2005 | Syed et al. |
| 2005/0071879 | A1 | 3/2005 | Haldavnekar et al. |
| 2005/0078854 | A1 | 4/2005 | Shikano et al. |
| 2005/0156728 | A1 | 7/2005 | Nanba |
| 2005/0285734 | A1 | 12/2005 | Sheynman et al. |
| 2005/0285934 | A1 | 12/2005 | Carter |
| 2006/0090079 | A1 | 4/2006 | Oh et al. |
| 2006/0256074 | A1 | 11/2006 | Krum et al. |
| 2007/0008099 | A1 | 1/2007 | Kimmel et al. |
| 2007/0052536 | A1 | 3/2007 | Hawkes et al. |
| 2007/0192486 | A1 | 8/2007 | Wilson et al. |
| 2007/0193834 | A1 | 8/2007 | Pai et al. |
| 2007/0200759 | A1 | 8/2007 | Heidari-Bateni et al. |
| 2007/0216764 | A1 * | 9/2007 | Kwak ..................... H04L 12/64 348/14.06 |
| 2007/0266077 | A1 | 11/2007 | Wengrovitz |
| 2008/0015740 | A1 | 1/2008 | Osann |
| 2008/0196083 | A1 | 8/2008 | Parks et al. |
| 2008/0252459 | A1 | 10/2008 | Butler et al. |
| 2009/0044760 | A1 | 2/2009 | Kodat |
| 2009/0072988 | A1 | 3/2009 | Haywood |
| 2009/0132093 | A1 | 5/2009 | Arneson et al. |
| 2009/0141117 | A1 | 6/2009 | Elberbaum |
| 2010/0097225 | A1 | 4/2010 | Petricoin, Jr. |
| 2010/0097239 | A1 | 4/2010 | Campbell et al. |
| 2010/0195810 | A1 | 8/2010 | Mota et al. |
| 2010/0211489 | A1 * | 8/2010 | Zhang .................... G06Q 30/02 705/34 |
| 2010/0262467 | A1 | 10/2010 | Barnhill, Jr. et al. |
| 2010/0264209 | A1 * | 10/2010 | Tessier ..................... G06K 7/08 235/380 |
| 2011/0074570 | A1 | 3/2011 | Feldstein et al. |
| 2011/0115906 | A1 | 5/2011 | Su et al. |
| 2011/0127340 | A1 | 6/2011 | Aiken |
| 2011/0202178 | A1 | 8/2011 | Zhen et al. |
| 2012/0001755 | A1 | 1/2012 | Conrady |
| 2012/0044049 | A1 | 2/2012 | Vig et al. |
| 2012/0044050 | A1 * | 2/2012 | Vig ..................... G07C 9/00158 340/5.82 |
| 2012/0182382 | A1 | 7/2012 | Serramalera |
| 2012/0215617 | A1 | 8/2012 | Shah et al. |
| 2012/0221713 | A1 | 8/2012 | Shin |
| 2013/0008787 | A1 | 1/2013 | Mammoto et al. |
| 2013/0038800 | A1 | 2/2013 | Yoo |
| 2013/0057695 | A1 | 3/2013 | Huisking |
| 2013/0107732 | A1 | 5/2013 | Rocamora et al. |
| 2013/0223279 | A1 | 8/2013 | Tinnakornsrisuphap et al. |
| 2013/0241727 | A1 | 9/2013 | Coulombe |
| 2014/0097953 | A1 | 4/2014 | Jelveh et al. |
| 2014/0207721 | A1 | 7/2014 | Filson et al. |
| 2014/0210590 | A1 * | 7/2014 | Castro ................ G07C 9/00563 340/5.52 |
| 2014/0222502 | A1 | 8/2014 | Urban |
| 2014/0225729 | A1 | 8/2014 | Scannell |
| 2014/0266669 | A1 | 9/2014 | Fadell et al. |
| 2015/0029335 | A1 | 1/2015 | Kasmir et al. |
| 2015/0049191 | A1 | 2/2015 | Scalisi et al. |
| 2015/0100333 | A1 * | 4/2015 | Fitzgerald .............. G06Q 50/22 705/2 |
| 2015/0112885 | A1 * | 4/2015 | Fadell ..................... G08B 27/00 705/330 |
| 2015/0127712 | A1 * | 5/2015 | Fadell .................. G06Q 10/083 709/202 |
| 2015/0147968 | A1 | 5/2015 | Friedman et al. |
| 2015/0186840 | A1 | 7/2015 | Torres et al. |
| 2015/0310381 | A1 | 10/2015 | Lyman et al. |
| 2015/0341603 | A1 | 11/2015 | Kasmir et al. |
| 2015/0363989 | A1 | 12/2015 | Scalisi |
| 2016/0033966 | A1 | 2/2016 | Farris et al. |
| 2016/0105644 | A1 | 4/2016 | Smith et al. |

(56) References Cited

U.S. PATENT DOCUMENTS

2016/0125676 A1    5/2016   Pouille
2016/0203370 A1    7/2016   Child et al.

FOREIGN PATENT DOCUMENTS

| KR | 10-2009-0061189 | 6/2009 |
| KR | 10-1380608 | 4/2014 |
| WO | 2014047501 A1 | 3/2014 |

\* cited by examiner

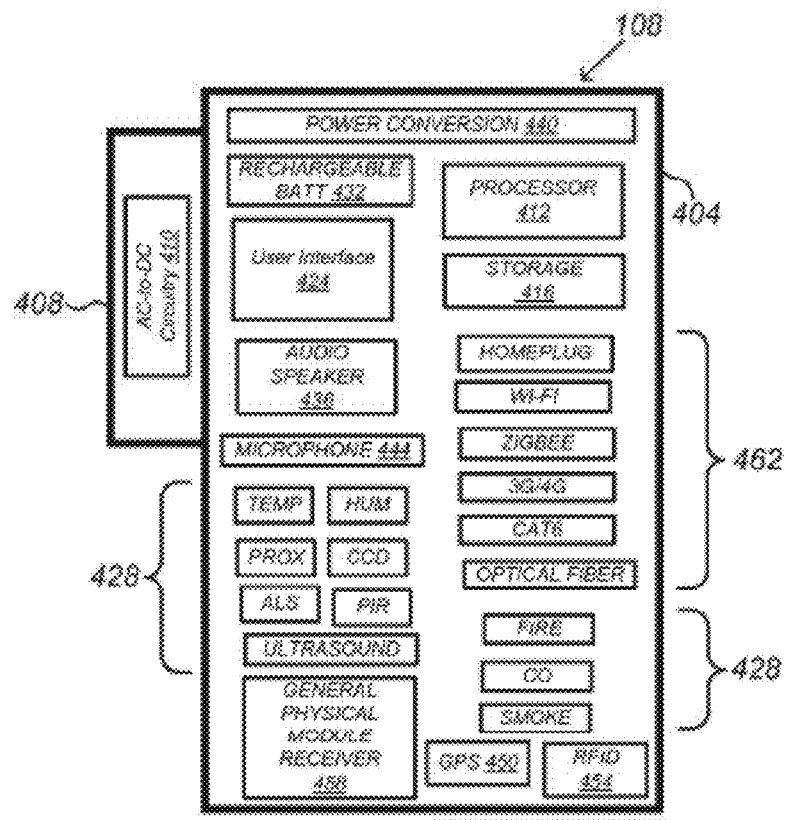
FIG. 4A
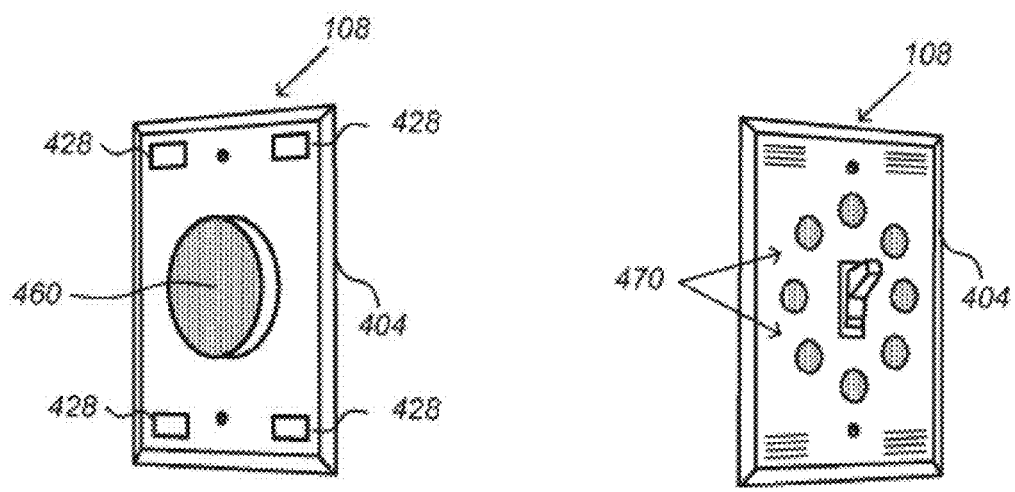
FIG. 4B
FIG. 4C

DETERMINING, AT A SERVER, ENVIRONMENT STATUS DATA OF AT LEAST ONE SMART ENVIRONMENT BASED ON SENSOR DATA COLLECTED FROM AT LEAST ONE SMART DEVICE LOCATED IN THE AT LEAST ONE SMART ENVIRONMENT
2102

EXPOSING, BY THE SERVER, AT LEAST ONE APPLICATION PROGRAM INTERFACE FOR ACCESS BY A DELIVERY COMPUTING SYSTEM OF A DELIVERY SERVICE-PROVIDER ENTITY TO IDENTIFY AT LEAST A PORTION OF THE DETERMINED ENVIRONMENT STATUS DATA FOR THE PURPOSE OF ENHANCING THE DELIVERY OF A PACKAGE BY THE DELIVERY SERVICE-PROVIDER ENTITY TO THE AT LEAST ONE SMART ENVIRONMENT
2104

2100
FIG. 21

OBTAINING, AT A DELIVERY COMPUTING SYSTEM OF A DELIVERY SERVICE-PROVIDER ENTITY, DELIVERER DATA FROM A PERSONAL DEVICE OF A PARTICULAR DELIVERER OF THE DELIVERY SERVICE-PROVIDER ENTITY, WHEREIN THE DELIVERER DATA IS ASSOCIATED WITH THE DELIVERY OF A PACKAGE
2702

↓

OBTAINING, AT THE DELIVERY COMPUTING SYSTEM OF THE DELIVERY SERVICE-PROVIDER ENTITY, DELIVERY DATA FROM AT LEAST ONE SMART DEVICE OF A SMART ENVIRONMENT, WHEREIN THE DELIVERY DATA IS ASSOCIATED WITH THE DELIVERY OF THE PACKAGE
2704

↓

ANALYZING, WITH THE DELIVERY COMPUTING SYSTEM OF THE DELIVERY SERVICE-PROVIDER ENTITY, AT LEAST A PORTION OF THE OBTAINED DELIVERER DATA IN COMBINATION WITH AT LEAST A PORTION OF THE OBTAINED DELIVERY DATA FOR THE PURPOSE OF TRACKING THE DELIVERY OF THE PACKAGE
2706

2700
FIG. 27

DETECTING VISITOR INFORMATION ASSOCIATED WITH A VISITOR AT A SMART ENVIRONMENT USING A FIRST SMART DEVICE OF THE SMART ENVIRONMENT
3202

↓

ANALYZING THE DETECTED VISITOR INFORMATION USING A COMPUTING SYSTEM THAT IS COMMUNICATIVELY COUPLED TO THE FIRST SMART DEVICE
3204

↓

BASED ON THE ANALYZING, PROVIDING FEEDBACK FROM THE COMPUTING SYSTEM TO THE VISITOR VIA A SECOND SMART DEVICE OF THE SMART ENVIRONMENT, WHEREIN THE FEEDBACK INCLUDES AT LEAST ONE OF A PRE-RECORDED SYSTEM MESSAGE FROM THE COMPUTING SYSTEM TO THE VISITOR AND A USER MESSAGE FROM A USER OF THE SMART ENVIRONMENT TO THE VISITOR
3206

3200
FIG. 32

DETECTING VISITOR INFORMATION ASSOCIATED WITH A VISITOR AT A SMART ENVIRONMENT USING A FIRST SMART DEVICE OF THE SMART ENVIRONMENT
4202

ANALYZING THE DETECTED VISITOR INFORMATION USING A COMPUTING SYSTEM THAT IS COMMUNICATIVELY COUPLED TO THE FIRST SMART DEVICE
4204

BASED ON THE ANALYZING, PROVIDING FEEDBACK FROM THE COMPUTING SYSTEM TO THE VISITOR VIA A SECOND SMART DEVICE OF THE SMART ENVIRONMENT, WHEREIN THE FEEDBACK INCLUDES A STATUS MESSAGE INDICATIVE OF AN OCCUPANT OF THE SMART ENVIRONMENT BEING NOTIFIED OF THE VISITOR'S PRESENCE AT THE SMART ENVIRONMENT
4206

4200
FIG. 42

SMART INVITATION HANDLING AT A SMART-HOME

CROSS-REFERENCE TO RELATED APPLICATIONS

This application claims the benefit of priority of U.S. Nonprovisional patent application Ser. No. 14/489,162, filed Sep. 17, 2014, P.C.T. Patent Application No. PCT/US2013/061021, filed Sep. 20, 2013, U.S. Nonprovisional patent application Ser. No. 13/830,795, filed Mar. 14, 2013, and U.S. Provisional Patent Application No. 61/704,437, filed Sep. 21, 2012, each of which is herein incorporated by reference in its entirety for all purposes.

FIELD

This patent specification relates to apparatus, systems, methods, and related computer program products for providing home security/smart home objectives. More particularly, this patent specification relates to a plurality of devices, including intelligent, multi-sensing, network-connected devices, that communicate with each other and/or with a central server or a cloud-computing system to provide any of a variety of useful home security/smart home objectives.

BACKGROUND

Some homes today are equipped with smart home networks to provide automated control of devices, appliances and systems, such as heating, ventilation, and air conditioning ("HVAC") systems, lighting systems, home theater and entertainment systems, as well as security systems. Smart home networks may include control panels that a person may use to input settings, preferences, and scheduling information that the smart home network uses to provide automated control of the various devices, appliances, and systems in the home.

BRIEF SUMMARY

Various techniques for providing home security/smart home objectives are disclosed herein. Embodiments described herein are representative examples of devices, methods, systems, services, and/or computer program products that can be used in conjunction with an extensible devices and services platform that, while being particularly applicable and advantageous for providing security objectives in the smart home context, is generally applicable to any type of enclosure or group of enclosures (e.g., offices, factories, retail stores), vessels (e.g., automobiles, aircraft), or other resource-consuming physical systems that will be occupied by humans or with which humans will physically or logically interact. Thus, although particular examples are set forth in the context of a smart home, it is to be appreciated that the scope of applicability of the described extensible devices and services platform is not so limited.

For example, a method of handling a visitor at a smart environment that includes at least one smart device may include acquiring, at a computing system, unique invitation identification information, defining, at the computing system, a mode setting that is associated with the acquired unique invitation identification information and the smart environment, wherein the defined mode setting includes at least one platform action, after the defining, receiving, at the computing system from the smart environment, invitation identification data detected by the at least one smart device from the visitor, wherein the received invitation identification data includes the unique invitation identification information, analyzing, using the computing system, the unique invitation identification information of the received invitation identification data from the smart environment to identify the defined mode setting associated with the unique invitation identification information and the smart environment, and automatically carrying out, using the computing system, the at least one platform action of the identified defined mode setting based on the analyzing. As another example, a system for handling a visitor at a smart environment may include a plurality of smart devices at the smart environment and a computing system operative to acquire unique invitation identification information, define a mode setting that is associated with the acquired unique invitation identification information and the smart environment and that includes at least one platform action, after the mode setting is defined, receive invitation identification data from at least one sensing component of a first smart device of the plurality of smart devices that is operative to detect the invitation identification data from the visitor, wherein the received invitation identification data includes the unique invitation identification information, analyze the unique invitation identification information of the received invitation identification data from the smart environment to identify the defined mode setting associated with the unique invitation identification information and the smart environment, and automatically carry out the at least one platform action of the identified defined mode setting based on the analysis by adjusting a functionality of a second smart device of the plurality of smart devices at the smart environment. As another example, a system for handling invitations to an environment may include a plurality of smart devices at the environment and a computing system operative to acquire unique invitation identification information, share a smart invitation comprising the acquired unique invitation identification information with an invitee, define a mode setting that is associated with the acquired unique invitation identification information and with the environment, wherein the defined mode setting includes at least one platform action, receive visitor presence data from at least one smart device of the plurality of smart devices, wherein the received visitor presence data is indicative of the unique invitation identification information of the smart invitation being detected at the environment, and carry out the at least one platform action when the visitor presence data is received. As another example, a non-transitory computer readable medium may include computer readable instructions recorded thereon for acquiring, at a computing system, unique invitation identification information, defining, at the computing system, a mode setting that is associated with the acquired unique invitation identification information and a smart environment, wherein the defined mode setting includes at least one platform action, after the defining, receiving, at the computing system from the smart environment, invitation identification data detected by at least one smart device from a visitor, wherein the received invitation identification data includes the unique invitation identification information, analyzing, using the computing system, the unique invitation identification information of the received invitation identification data from the smart environment to identify the defined mode setting associated with the unique invitation identification information and the smart environment, and, automatically carrying out, using the computing system, the at least one platform action of the identified defined mode setting based on the analyzing.

For a more complete understanding of the nature and advantages of embodiments of the present disclosure, reference should be made to the ensuing detailed description and accompanying drawings. Other aspects, objects and advantages of the present disclosure will be apparent from the drawings and detailed description that follows. However, the scope of the present disclosure will be fully apparent from the recitations of the claims.

BRIEF DESCRIPTION OF THE DRAWINGS

FIG. 4A is a simplified block diagram illustrating components of a wall switch according to at least one embodiment.

FIGS. 4B-C illustrate example modular head units for the wall switch of FIG. 4A, according to at least one embodiment.

FIG. 21 provides an example process for enhancing delivery of a package, according to at least one embodiment.

FIG. 27 provides an example process for tracking delivery of a package, according to at least one embodiment.

FIG. 32 provides an example process for handling a visitor at a smart environment, according to at least one embodiment.

FIG. 42 provides an example process for handling a visitor at a smart environment, according to at least one embodiment.

DETAILED DESCRIPTION

Embodiments of the present disclosure generally relate to a plurality of devices, including intelligent, multi-sensing, network-connected devices, that communicate with each other and/or with a central server or a cloud-computing system to provide any of a variety of home security/smart home objectives.

Figure 1:
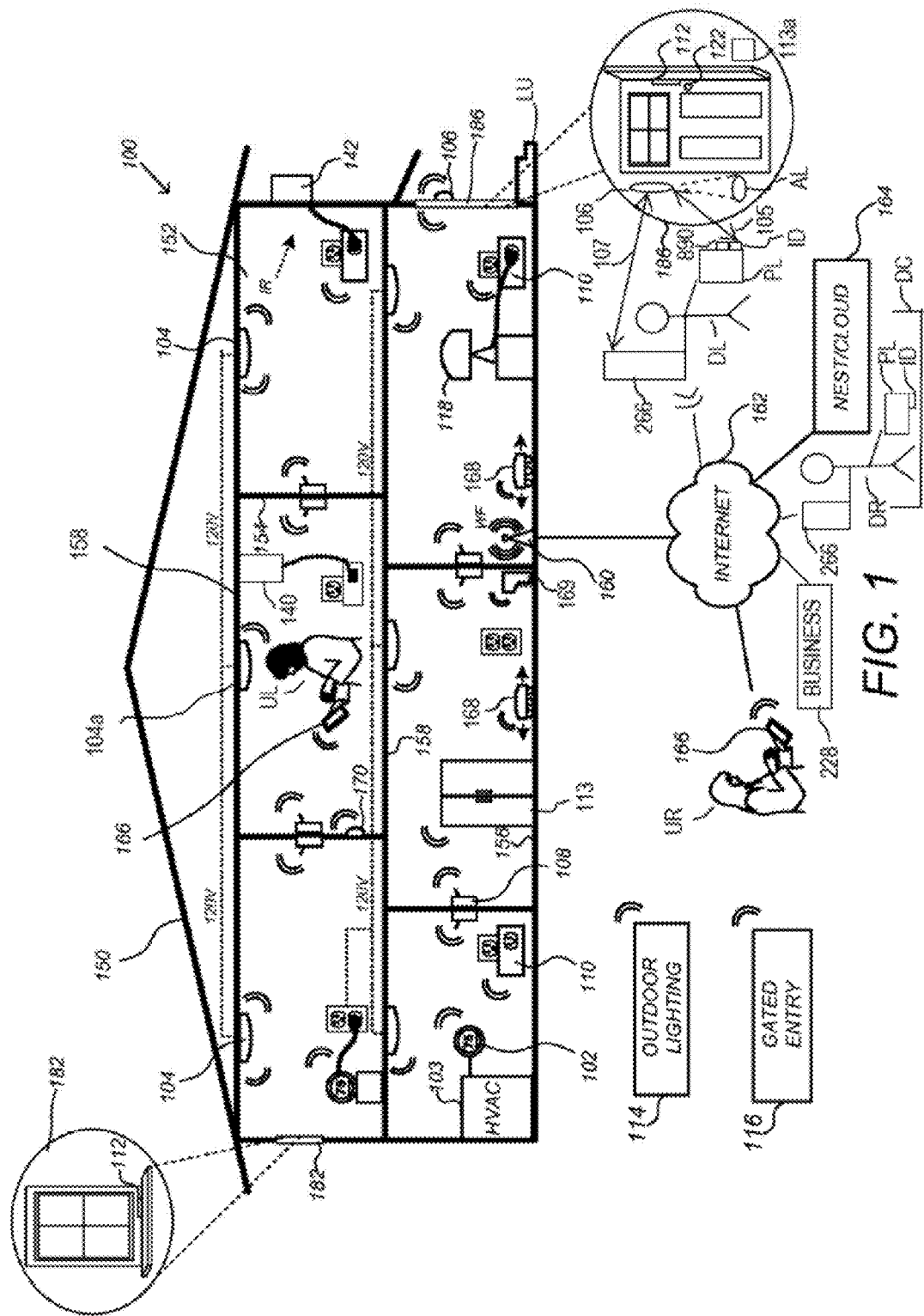
FIG. 1 illustrates an example of a smart-home environment within which one or more of the devices, methods, systems, services, and/or computer program products described further herein will be applicable, according to at least one embodiment.

Various aspects and possible implementations of providing home security/smart home objectives are disclosed herein. Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It should be appreciated that the smart-home environment 100 includes areas outside the home, such as curtilage, the yard, and other nearby land. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150. For example, a device controlling an outdoor lighting system 114 or gated entry system 116 can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful home security and/or smart home objectives. The smart-home environment 100 may include one or more intelligent, multi-sensing, network-connected thermostats 102 (herein after referred to as "smart thermostats 102"), one or more intelligent, network-connected, multi-sensing hazard detection units 104 (herein after referred to as "smart hazard detectors 104"), and one or more intelligent, multi-sensing, network-connected entryway interface devices 106 (herein after referred to as "smart doorbells 106"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide).

The smart doorbell 106 may control doorbell functionality, detect a person's approach to or departure from a location (e.g., an outer door), and announce a person's approach or departure via audio or visual means, or control settings on a security system (e.g., to activate or deactivate a security system when occupants go and come).

In some embodiments, the smart-home environment 100 of FIG. 1 further includes one or more intelligent, multi-sensing, network-connected wall switches 108 (herein after referred to as "smart wall switches 108"), along with one or more intelligent, multi-sensing, network-connected wall plug interfaces 110 (herein after referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home). In the illustrated example, one of the smart wall plugs 110 controls supply of power to a lamp 118, while another smart wall plug may control supply of power to a through-wall air conditioning unit 142 or any other suitable component of environment 100.

In some embodiments, the smart-home environment 100 of FIG. 1 further includes one or more intelligent, multi-sensing, network-connected entry detectors 112 (herein after referred to as "smart entry detector 112"). The illustrated smart entry detectors 112 are located at windows 182, doors 186, and other entry points of the smart-home environment 100 for detecting when a window, door, or other entry point is opened, broken, or otherwise breached. According to embodiments, the smart entry detectors 112 may include first and second parts. The first part is attached to a fixed part of the house structure, such as the windowsill, door sill, outer frame, side jamb, head jamb, etc. A second part is attached to part of the window or door that moves when opening and closing, such as the upper or lower sash, top or bottom rail, side stile, latch, handle, etc. The first and second parts of the smart entry detectors 112 are in close proximity when the window or door is closed, and the first and second parts move apart from one another when the window or door opens. The smart entry detectors 112 generate a corresponding signal when a window or door is opened or closed, etc. It should be appreciated that, according to some embodiments, the smart entry detectors 112 can be any type of window, door, entryway alarm sensor known in the art for detecting when a window, door, or other entry point is opened, broken, or otherwise breached, and that the known alarm sensors become smart when connected to the central server or cloud-computing system 164. According to embodiments, the alarm system of the home will not arm unless all smart entry detectors 112 of the home indicate that all doors, windows, and other entryways are closed and/or that all smart entry detectors 112 are "armed".

Still further, in some embodiments, the smart-home environment 100 of FIG. 1 includes one or more intelligent, multi-sensing, network-connected appliances 113 (herein after referred to as "smart appliances 113"), such as refrigerators, stoves and/or ovens, televisions, washers, dryers, indoor or outdoor lighting, stereos, intercom systems, gated entries, garage-door openers, floor fans, ceiling fans, wall air conditioners, pool heaters, irrigation systems, security systems, safes, and so forth. According to embodiments, the network-connected appliances 113 are made compatible with the smart-home environment by cooperating with the respective manufacturers of the appliances. For example, the appliances can be space heaters, window air conditioning units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include one or more of a variety of non-communicating legacy appliances 140, such as old conventional washer/dryers, refrigerators, and the like, which can be controlled, albeit coarsely (ON/OFF), by virtue of the smart wall plugs 110. The smart-home environment 100 can further include one or more of a variety of at least partially communicating legacy appliances 142, such as infrared ("IR") controlled wall air conditioners or other IR-controlled devices, which can be controlled by IR signals provided by the smart hazard detectors 104 or the smart wall switches 108.

Figure 14:
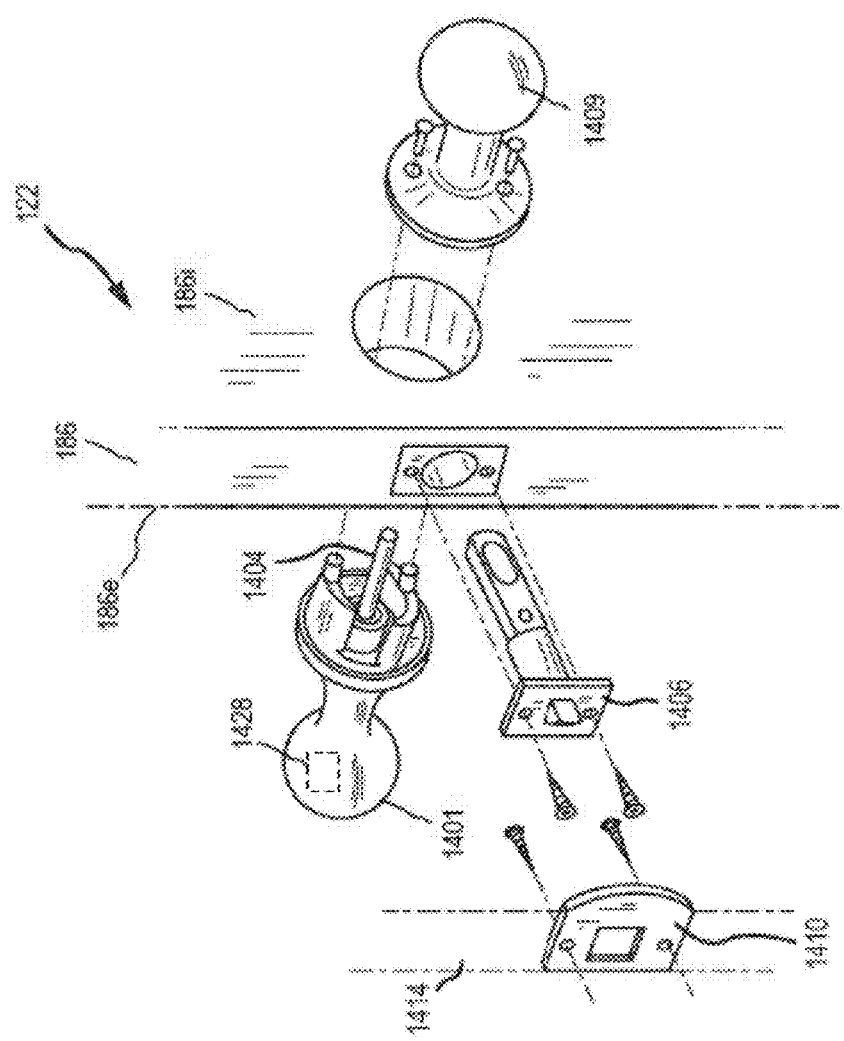
FIG. 14 is a schematic diagram illustrating an intelligent, multi-sensing, network-connected doorknob, according to at least one embodiment.

In some embodiments, the smart-home environment 100 of FIG. 1 further includes one or more intelligent, multi-sensing, network-connected doorknobs 122 (herein after referred to as "smart doorknob 122"). The illustrated smart doorknobs 122 are located on external doors 186 of the smart-home environment 100. However, it should be appreciated that smart doorknobs 122 can be provided on all doors of the smart-home environment 100. As illustrated in FIG. 14, the smart doorknob includes a remote controlled electronic lock that locks a spindle 1404. This locks the door because it prevents the spindle from disengaging a latch 1406 of the doorknob from a strike plate 1410 of a door stop 1414. Accordingly, the smart doorknob is able to automatically unlock the door 186, without the user having to touch the doorknob. For example, the smart doorbell 106 can recognize a registered occupant approaching the door and instruct the smart doorknob to automatically unlock. It should also be appreciated that occupants can use a registered mobile device 166 to remotely unlock the door. For example, if when inside the home, the occupant receives notice from the smart doorbell 106 that a trusted neighbor is approaching the door, the occupant can use the mobile device 166 to unlock the door so the neighbor can let himself or herself in. Alternatively, the occupant can speak an audible command instructing the smart doorknob 122 to unlock. According to some embodiments, the smart doorknob 122 includes a remote controlled electronic motor that turns the spindle 1404 to disengage the latch 1406 of the doorknob from the strike plate 1410 of the door stop 1414. Accordingly, the smart doorknob is able to automatically open the door 186, without the user having to touch the doorknob.

According to embodiments, the smart thermostats 102, the smart hazard detectors 104, the smart doorbells 106, the smart wall switches 108, the smart wall plugs 110, the smart entry detectors 112, the smart appliances 113, the smart doorknobs 122, the keypads, and other devices (collectively referred herein to as "the network-connected smart devices") of the smart-home environment 100 are connected to each other and to the central server or cloud-computing system 164 to accomplish home security and/or smart home objectives for the smart home environment. In addition to containing processing and sensing capabilities, each of the network-connected smart devices is capable of data communications and information sharing with any other of the network-connected smart devices, as well as to any central server or cloud-computing system 164 or any other device that is network-connected anywhere in the world to accomplish home security and/or smart home objectives. The required data communications can be carried out using any of a variety of custom or standard wireless protocols (Wi-Fi, ZigBee, 6LoWPAN, 3G/4G, etc.) and/or any of a variety of custom or standard wired protocols (CAT6 Ethernet, Home-Plug, etc.). In some cases, backup means of wireless communication (e.g., 3G/4G) is provided in the event the primary means of communication (e.g., Wi-Fi) becomes disabled, such as due to power outage.

According to embodiments, all or some of the network-connected smart devices can serve as wireless or wired repeaters. For example, a first one of the network-connected smart devices can communicate with a second one of the network-connected smart devices via a wireless router 160. The network-connected smart devices can further communicate with each other via a connection to a network, such as the Internet 162. Through the Internet 162, the network-connected smart devices can communicate with a central server or a cloud-computing system 164. The central server or cloud-computing system 164 can be associated with a manufacturer, support entity, or service provider, such as a home-security provider, associated with the network-connected smart devices. For one embodiment, a user may be able to contact local law enforcement and other emergency or security personnel as well as contact customer support using one of the network-connected smart devices itself rather than needing to use other communication means such as a telephone or Internet-connected computer. Further, software updates and security alerts can be automatically sent from the central server or cloud-computing system 164 to the network-connected smart devices (e.g., when available, when purchased, at routine intervals, when emergency news needs to be broadcasted throughout the home, when the security system needs to be armed, and when the smart-home environment needs to be put on lock down). In some embodiments, certain functionalities and capabilities of environment 100 may be enabled without active access to the Internet or remote servers or data sources. Instead, in some embodiments, the various smart devices of environment 100 (e.g., devices 102/104/106/108/110/112/113/114/116/122/ 166/168/170) may be enabled to communicate with one another without active communication with Internet 162 and system 164, and data of those devices may be analyzed, for example, in combination with rules-based inference engines and/or artificial intelligence and/or any suitable smart environment data and/or any suitable rules or settings or inferences or modes that may be associated with environment 100, locally at environment 100 by any suitable computing system (e.g., at a dedicated central processing unit device or computing system of environment 100 or at one or more processors of the various smart devices of environment 100) to dictate the functionality of environment 100.

According to embodiments, the network-connected smart devices combine to create a mesh network of spokesman and low-power nodes in the smart-home environment 100, where some of the network-connected smart devices are "spokesman" nodes and others are "low-powered" nodes. Spokesman nodes are sometimes referred to herein as "smart" nodes. It should be appreciated that non-smart devices may perform as lower-powered nodes. The spokesman and low-powered nodes are communicatively interconnected and operate to accomplish a common objective or to achieve a common goal in the smart-home environment. In some embodiments, some or all of the spokesman and low-powered nodes perform one or more functions in a coordinated manner to accomplish the common objective. Example functions and objectives include, but are not limited to, triggering an alarm for the objective of securing the home, adjusting a thermostat setting for the objective of making the home comfortable, and turning on and off lights for the objective of securing the home or for use by occupants. Other example objectives and functions are provided throughout this document. Some of the network-connected smart devices in the smart-home environment 100 are battery powered, while others have a regular and reliable power source, such as by connecting to wiring (e.g., to 120V line voltage wires) behind the walls 154 of the smart-home environment 100. The network-connected smart devices that have a regular and reliable power source are referred to as "spokesman" nodes. These nodes are equipped with the capability of using any wireless protocol or manner to facilitate bidirectional communication with any of a variety of the other devices in the smart-home environment 100 as well as with the central server or cloud-computing system 164. On the other hand, the network-connected smart devices that are battery powered are referred to as "low-power" nodes. These nodes tend to be smaller than spokesman nodes and communicate using wireless protocol that requires very little power, such as Zigbee, 6LoWPAN, etc. Further, some, but not all, low-power nodes are incapable of bidirectional communication. These low-power nodes send messages, but they are unable to "listen". Thus, other network-connected smart devices in the smart-home environment 100, such as the spokesman nodes, cannot send information to these low-power nodes.

As described, the network-connected smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., network-connected smart device to network-connected smart device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the network-connected smart devices in the smart-home environment, make inferences based on the data, and send commands back to individual one(s) of the network-connected smart devices to accomplish some of the home-security objectives descried herein. For example, in the event the home-security system is armed and one of the nodes, either low- or high-power, detects movement, then the node can send a corresponding message through the mesh network to the central server or cloud-computing system 164, which processes the message and determines the appropriate response, such as contacting authorities and/or the home owner as well as instructing the network-connected smart devices to enter an alarm mode, which may involve activating lights, sounding audible alarms, etc.

As described, the spokesman nodes and some of the low-powered nodes are capable of "listening". Accordingly, users, other devices, and the central server or cloud-computing system 164 can communicate controls to the low-powered nodes. For example, as discussed below, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164. In some embodiments, the low-powered nodes and the spokesman nodes are the same type of device (e.g., hazard detector, thermostat, wall plug, etc.). In some embodiments, the low-powered and spokesman nodes are identical. For example, in some embodiments, all of the low-powered and spokesman nodes have the same stock-keeping unit (SKU) and/or are capable of performing any role, such as performing the role of low-powered and/or spokesman node.

Examples of spokesman nodes include smart doorbells 106, smart thermostats 102, smart wall switches 108, smart wall plugs 110, keypads, doorknobs 122, etc. These devices 102, 106, 108, 110, and 122 are often located near and connected to a reliable power source, and therefore can include more power-consuming components, such as one or more communication chips capable of bidirectional communication in any variety of protocols.

An example of a low-powered node is a battery-operated version of the smart entry detector 112. These smart entry detectors 112 are often located in an area without access to constant and reliable power, such as in a window or door frame. According to embodiments, the smart entry detector 112 includes a low-power wireless communication chip (e.g., ZigBee chip) that sends instantaneous messages coincident with movement of the door or window or with detection of a nearby person, animal or object. In some embodiments, the low-power wireless communication chip regularly sends messages regarding the position (open, closed, partially open, etc.) of the relevant door or window. These messages may be sent wirelessly, using the mesh network, from node to node (i.e., network-connected smart device to network-connected smart device) within the smart-home environment 100 as well as over the Internet 162 to the central server or cloud-computing system 164.

Another example of a low-power node is a smart nightlight 170. According to embodiments, the nightlight 170 houses a light source having variable intensity. Further, according to embodiments, the color of the light emitted from the nightlight 170 is changeable. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and/or when its occupancy sensor detects a person's presence or movement. The smart nightlight 170, according to embodiments, is configured to adjust the color and intensity of the light source. For example, the smart nightlight 170 adjusts the intensity of the light source in a manner where intensity is inversely proportional to the amount of natural light detected in the environment. According to embodiments, the smart nightlight 170 includes a low-power wireless communication chip (e.g., ZigBee chip)

that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., network-connected smart device to network-connected smart device) within the smart-home environment 100 as well as over the Internet 162 to the central server or cloud-computing system 164.

Yet another example of a low-powered node is a battery-operated version of the smart hazard detector 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104, according to some embodiments, include a low-power wireless communication chip (e.g., ZigBee chip) that regularly sends messages that correspond to each of the respective sensors to the other network-connected smart devices and the central server or cloud-computing system 164, such as by using the mesh network as described above.

According to embodiments, the network-connected devices (a.k.a. the low- and high-power nodes) of the smart-home environment 100 are capable of enhancing home security. For example, as discussed, all or some of the network-connected smart devices are equipped with motion sensing, heat sensing, pressure sensing, noise sensing, or other types of sensing capabilities that combine with rules-based inference engines and/or artificial intelligence of the central server or cloud-computing system 164 to detect the presence, movement, and/or identity of people, animals, and objects and trigger various alarms in the event a person, animal, or object is in the wrong place at the wrong time anywhere inside or in the curtilage of the smart-home environment 100.

By virtue of network connectivity, a user can remotely interact with one or more of the network-connected smart devices. For example, a user can communicate with one or more of the network-connected smart devices using a computer (e.g., a desktop computer, laptop computer, or tablet) or other portable electronic device (e.g., a smartphone) 166. A webpage or app can be configured to receive communications from the user and control the one or more of the network-connected smart devices based on the communications and/or to present information about the device's operation to the user. For example, the user can view, arm, or disarm the security system of the home. The user can be in the structure during this remote communication or outside the structure.

As discussed, users can control one or more of the network-connected smart devices in the smart-home environment 100 using a network-connected computer or portable electronic device 166. In some examples, some or all of the occupants (e.g., individuals who live in the home) can register their mobile device 166 with the smart-home environment 100. Such registration can be made at a central server to authenticate the occupant and/or the mobile device 166 as being associated with the smart-home environment 100, and to give permission to the occupant to use the mobile device 166 to control the network-connected smart devices and the security system of the smart-home environment 100. An occupant can use their registered mobile device 166 to remotely control the network-connected smart devices and security system of the smart-home environment 100, such as when the occupant is at work or on vacation. The occupant may also use their registered mobile device 166 to control the network-connected smart devices when the occupant is actually located inside the smart-home environment 100, such as when the occupant is sitting on a couch inside the home or in a bedroom preparing for sleep.

It should be appreciated that instead of or in addition to registering mobile devices 166, the smart-home environment 100 makes inferences about which individuals live in the home and are therefore occupants and which mobile devices 166 are associated with those individuals. As such, the smart-home environment "learns" who is an occupant and permits the mobile devices 166 associated with those individuals to control the network-connected smart devices of the smart-home environment 100. As described herein, various types of notices and other information are provided to occupants via messages sent to the occupants' mobile devices 166 and other electronic devices. It should be appreciated that these messages can be sent via email, short message service (SMS), multimedia messaging service (MMS), unstructured supplementary service data (USSD), as well as any other type of messaging services and/or communication protocols known in the art, including any type of push notification service.

In some instances, guests desire to control the smart devices. For example, the smart-home environment may receive communication from an unregistered mobile device of an individual inside of the home, where said individual is not recognized as an occupant of the home. Further, for example, smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls won't permit the guest to adjust the heat-pump lockout temperature.

A use case example of this is when a guest in a smart home, the guest could walk up to the thermostat and turn the dial manually, but the guest may not want to walk the house "hunting" for the thermostat, especially at night while the home is dark and others are sleeping. Further, the guest may not want to go through the hassle of downloading the necessary application to their device for remotely controlling the thermostat. In fact, the guest may not have access to the home owner's login credentials, etc., and therefore cannot remotely control the thermostat via such an application. Accordingly, according to at least some embodiments, the guest can open a mobile browser on their mobile device, type a keyword, such as "NEST" into the URL field and tap "Go" or "Search", etc. In response the device presents with guest with a user interface, such as Thermozilla UI, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST" is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface, such as Thermozilla UI, for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with or whose fingerprint or signature is not recognized by the smart home "walks up" to a smart device, the smart devices provides the guest with the guest layer of controls, rather than full controls.

As described below, the smart thermostat and other smart devices "learn" by observing occupant behavior. For example, the smart thermostat learns occupants preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes users as guests or as someone belonging to a particular class having limited control and access (e.g., a child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevents water from exceeding a designated temperature that is considered safe.

According to embodiments, the network-connected smart devices of the smart-home environment 100 are modular and can be incorporated into older and new houses. For example, the devices are designed around a modular platform consisting of two basic components: a head unit and a backplate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

According to embodiments, some of these modular smart devices have security-enhancing features that trigger a notification or an alarm in the event the head is removed from the docking station. For example, as discussed, some smart devices are capable of detecting motion and function as "tripwires" in the security system. Others provide live video feeds and function as security cameras. In the event an intruder attempts to disable a network-connected smart device and therefore avert detection by removing the smart device's head unit from its docking station, an alarm or alert notification is triggered. For example, the smart device sends a message indicating head unit removal to the central server or cloud-computing system 164. Responsive to receiving a message indicating head unit removal, the central server or cloud-computing system 164, according to embodiments, sends a message to the home owner's or other occupants' mobile device(s) 166, indicating the removal and asking whether the removal is authorized. If no response after a timeout period or if the response indicates that removal was not authorized, then the central server or cloud-computing system 164 triggers the alarm. In other embodiments, such as when the alarm is armed (i.e., in security mode), the alarm is triggered immediately upon removal of the head unit. The alarm may be local on the head unit itself and therefore an alert sound is broadcasted from the head unit, or may be centralized and controlled by the central server or cloud-computing system 164 and the other network-connected smart devices are instructed to broadcast an alert sound. In still other embodiments, upon removal, the head unit asks the person to verbally identify themselves and, if the voice is not recognized, then the alarm is triggered.

The smart-home environment 100 may also include communication with devices outside of the smart-home environment 100 but within a proximate geographical range of the home, such as within the home's curtilage. For example, the smart-home environment 100 may include an outdoor lighting system 114 that communicates information through the mesh network or directly to the central server or cloud-computing system 164 regarding detected movement and/or presence of people, animals, and any other objects and receives back commands for controlling the lighting accordingly. The central server or cloud-computing system 164 can control the outdoor lighting system 114 based on information received from the other network-connected smart devices in the smart-home environment. For example, in the event any of the network-connected smart devices, such as smart wall plugs 110 located outdoors, detect movement at night time, the central server or cloud-computing system 164 can "turn on" the outdoor lighting system 114 as well as other lights in the smart-home environment 100. This is advantageous over known outdoor-motion detecting lights because the motion-detection capability is not limited to just the motion sensor attached to the light itself, but extends across all the network-connected smart devices in the smart-home environment 100.

The smart-home environment 100 may include a gated entry 116 that communicates information through the mesh network or directly to the central server or cloud-computing system 164 regarding detected movement and/or presence of people, animals, and any other objects and receives back instructions for controlling the gated entry such an opening, closing, locking, unlocking the gate. According to embodiments, an algorithm is provided for considering the geographic location of the smart-home environment 100, such as based on the zone improvement plan ("ZIP") code or geographic coordinates of the home. The geographic information is then used to obtain data helpful for determining optimal times for turning on/off or otherwise adjusting lighting as well as opening, closing, locking, unlocking gates or otherwise securing the smart-home environment 100.

In some embodiments, these low-powered and spokesman nodes (e.g., devices 102, 104, 106, 108, 110, 112, 113, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is arm at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, 113, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency, such as an earthquake, a fire, a detected home invasion, dangerous CO levels, etc. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could automatically determine the routes using uploaded maps, diagrams, architectural drawings of the smart-home environment, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting. It should also be appreciated that all or some of the network-connected smart devices, including the smart hazard detector 104 and the smart thermostat 102, include a light that is activated to help occupants evacuate the home. Additionally, in the event of an emergency, such as earthquake or fire, an audible alarm can be sounded in the home giving information about the event. Also, a message, such as an SMS or MMS message, may be sent to the mobile device of the occupants.

In some embodiments, the mesh network of low-powered and spokesman nodes can be used to provide security lighting in the event an unauthorized occupant is detected in the home. In such cases, all lights in and/or outside of the home may be activated. Turning on all light will alert authorized occupants to the danger and will likely cause the unauthorized occupants to flee.

In some embodiments, the smart home environment 100 may include a home safe for storing valuables, such as jewels, money, rare coins, important documents, etc. In the event an individual tampers with the safe, such as if someone attempts to pick the lock, carry it away, or break it open, the safe automatically sends out wireless alarms, SMS, notifies the authorities, etc. The safe also includes a location tracking device, such as a GPS device, so that in the event it is carried away, it can transmit information about its location. In some embodiments, such a safe may be any suitable type of appliance 113, 140, and/or 142.

Further included and illustrated in the example smart-home environment 100 of FIG. 1 are service robots 168 each configured to carry out, in an autonomous manner, any of a variety of household tasks. For some embodiments, the service robots 168 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 168 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 168 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 168 is configured to move itself into the immediate presence (e.g., within five feet) of a particular occupant who has settled into a particular location in the home (e.g., in the dining room to eat their breakfast and read the news). The localized-thermostat service robot 168 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g., to the living room couch to watch television), the localized-thermostat service robot 168 proceeds to move and park itself next to the couch and keep that particular immediate space at a comfortable temperature.

Technologies by which the localized-thermostat service robot 168 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 168 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 168 can be considered to be facilitating what can be called a "personal safety-area network" for the occupant, with the objective being to ensure there is no excessive carbon monoxide, smoke, fire, etc. in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 168, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 168 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 168 can be advised by other smart-home sensors that the temperature and humidity levels are rising in the kitchen, which is nearby to the occupant's current dining room location, and responsive to this advisory the hazard detector service robot 168 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 168 having respective dedicated ones of such functionalities, by a single service robot 168 having an integration of two or more different ones of such functionalities, and/or any combinations thereof (including the ability for a single service robot 168 to have both "away" and "human facing" functionalities) without departing from the scope of the present teachings. Electrical power can be provided by virtue of rechargeable batteries or other rechargeable methods, with FIG. 1 illustrating an example out-of-the-way docking station 169 to which the service robots 168 will automatically dock and recharge its batteries (if needed) during periods of inactivity. Preferably, each service robot 168 includes wireless communication components that facilitate data communications with one or more of the other wirelessly communicating smart-home sensors of FIG. 1 and/or with one or more other service robots 168 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 168 can be configured to communicate directly with a remote server by virtue of cellular telephone communications, satellite communications, 3G/4G network data communications, or other direct communication method.

Provided according to some embodiments are systems and methods relating to the integration of the service robot(s) 168 with home security sensors and related functionalities of the smart home system. The embodiments are particularly applicable and advantageous when applied for those service robots 168 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii), can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in a TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) will occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious, whereas false home security alarms may have more serious consequences.

Figure 2:
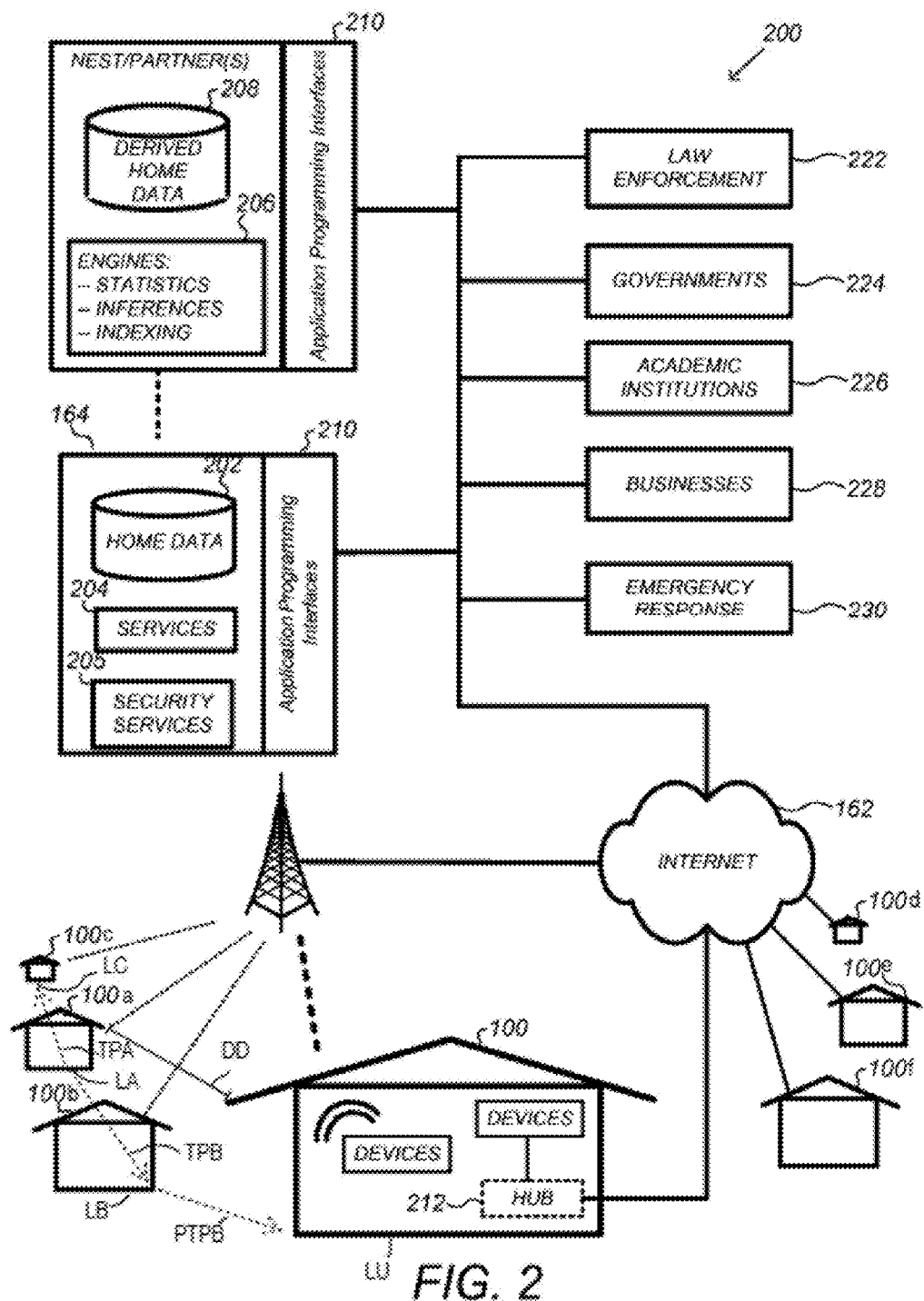
FIG. 2 illustrates a network-level view of an extensible devices and services platform with which the smart-home environment of FIG. 1 can be integrated, according to at least one embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the network-connected smart devices from FIG. 1 can communicate with the remote servers or cloud computing architectures 164. For example, a connection to the Internet 162 can be established either directly (for example, using 3G/4G connectivity to a wireless carrier), through a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the network-connected smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the network-connected devices of one or more smart-home environments, where the network-connected devices can routinely transmit home data or can transmit home data in specific instances (e.g., when a device queries the home data 202). Thus, the devices and services platform 200 routinely collects data from homes across the world. As described, the collected home data 202 includes, for example, security data, such as a map of the home and the respective network-connected smart devices and their capabilities in each room, alarm settings information, contact information for the registered occupants of the home, etc. The collected home data 202 may also include, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204, such as security related services described herein. The services 204 can include software updates, customer support, remote access, remote or distributed control, use suggestions (e.g., based on collected home data 202 to improve performance, reduce utility cost, etc.), and/or sensor data collection/logging, where sensor data and other data from network-connected smart devices of smart-home environments 100 is collected and logged. For example, the data collected and logged may include maps of homes, maps of users' in-home movements from room to room as determined by network-connected smart devices equipped with motion and/or identification technology, time spent in each room, intra-home occupancy maps that indicate which rooms are occupied and by whom at different times (including in real time), fire-detection incidents, false alarms, CO data, temperature data, humidity data, etc. According to embodiments, in the event the data collected from the network-connected smart devices of a smart-home environment 100 indicates that an alarm threshold for a particular home is being approached, the services 204 increases the frequency at which it collects and logs data from network-connected devices in that home. For example, in the event the data collected from network-connected devices indicates activity in a kitchen of a smart-home environment 100 while the occupants are asleep, then, instead of collecting data from the network-connected smart devices of the home in thirty-second intervals, the services 204 collects data in ten-second intervals. According to embodiments, the data collected and logged may be provided to investigators after the occurrence of a crime, fire, etc., so that the data may be used to solve the crime, determine the cause of the fire, etc.

The services 204 can further include, for example, remote access, remote or distributed control, security improvement suggestions (e.g., provide suggestions for enhancing security of a home based on collected home data 202, etc.), software updates, customer support, etc. Data associated with the services 204 can be stored and/or logged at the central server or cloud-computing system 164 and the central server or the cloud-computing system 164 can retrieve and transmit the data at an appropriate time (e.g., at regular intervals, upon receiving request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from network-connected smart devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the network-connected smart device(s) that provided home data used to derive the results, to other network-connected smart devices, to a user mobile device 166, to a server providing a webpage to the user's mobile device 166, or to other non-device entities. For example, patterns and statistics summarizing data received from network-connected smart devices can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of network-connected smart devices on a per-home, per-neighborhood, or per-region basis (for example, demand-response programs for electrical utilities, security related statistics unique to particular neighborhoods can be used to control particular network-connected smart devices, etc.), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about network-connected smart device usage across a population of devices and send the statistics to device users, service providers or other entities (e.g., that have requested or may have provided monetary compensation for the statistics).

In some embodiments, to encourage security-related innovation and research and to increase security-related and other products and services available to users, the devices and services platform 200 exposes a range of application programming interfaces (APIs) 210 to third parties, such as law enforcement agencies 222 (e.g., police or public and/or private security entities), governmental entities 224 (e.g., Health and Safety Agencies, such as the Food and Drug Administration (FDA), the Environmental Protection Agency (EPA), etc.), academic institutions 226 (e.g., university researchers), businesses 228 (e.g., private security businesses or charities or utility companies or companies that may provide device warranties or service to related equipment, targeting advertisers based on home data, etc.), emergency response providers 230, such as fire and ambulance, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and applications may be, for example, designed to help users reduce energy consumption, to preemptively service faulty equipment, to prepare for high service demands, to track past service performance, etc., or to secure their homes by performing any of a variety of beneficial functions or tasks now known or hereinafter developed. Examples include providing users with local crime news, information and statistics, safety tips and check lists, such as tips for installing security lights, door and window locks, etc.

According to some embodiments, third-party applications make inferences from the home data 202 and the derived home data 208, such inferences may include when are occupants home, when are they sleeping, when are they in the den watching television, when they shower. The answers to these questions may help third-parties benefit consumers by providing them with interesting security-related information, products and services, as well as with providing them with targeted advertisements. In one example, a private security company creates an application that makes inferences regarding when people are away from home. The application uses the inferences to schedule private security officers to stop or drive by the home when people will most likely be away from home, the application may also put the user's network-connected smart devices in alarm mode, notify trusted neighbors that the user is away, etc.

In one example, a business 228 may be a shipping company that may create an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company (e.g., as described below with respect to FIG. 19).

In some embodiments, the devices and services platform 200 exposes APIs 210 to third parties, such as businesses 228 in exchange for revenue, such as for a monthly fee, similar to a subscription service. In one example, the business 228 may be a retail store that sells consumer products and building and construction supplies and materials, including the network-connected smart devices described above with reference to FIG. 1. In one example, the retail store 228 agrees to sell network-connected smart devices at discount in exchange for free or discounted access to the APIs 210. The retails store 228 can use the information from the APIs 210 to better target their customers and increase sales. While the provider of the devices and services platform 200 benefits from a proliferation of discounted network-connected smart devices.

Figure 3:
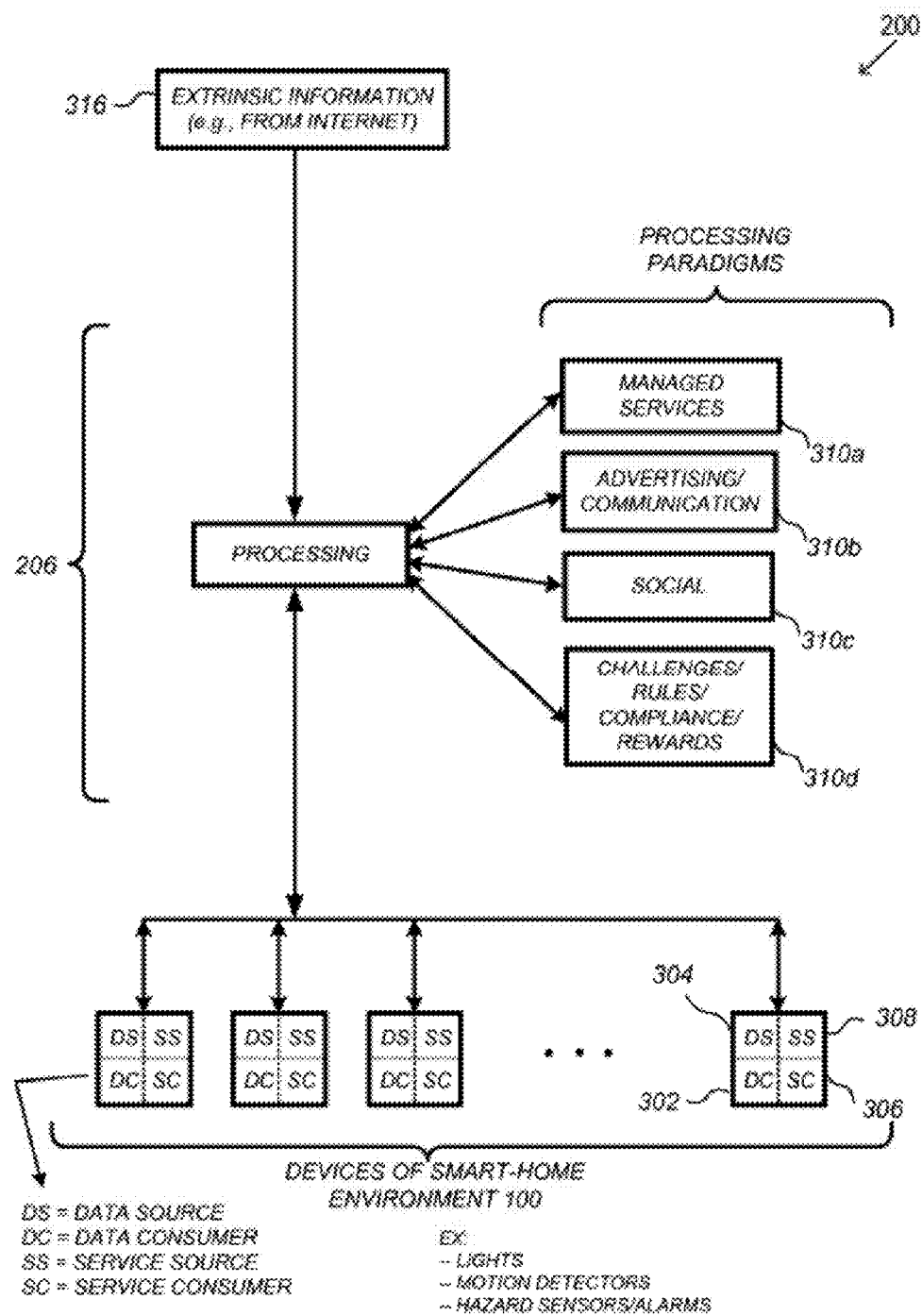
FIG. 3 illustrates an abstracted functional view of the extensible devices and services platform of FIG. 2, with reference to a processing engine as well as devices of the smart-home environment of FIG. 1, according to at least one embodiment.

FIG. 3 illustrates an abstracted functional view of the extensible devices and services platform 200 of FIG. 2, with particular reference to the processing engine 206 as well as devices, such as the network-connected smart devices of the smart-home environment 100 of FIG. 1. Even though network-connected smart devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful home security/smart home objectives. These objectives may be predefined or adaptively identified based on, e.g., usage patterns, device efficiency, and/or user input (e.g., requesting specific functionality, manually inputting specific data).

For example, FIG. 3 shows processing engine 206 as including a number of paradigms 310. Processing engine 206 can include a managed services paradigm 310a that monitors and manages primary or secondary device functions. The device functions can include ensuring proper operation of a network-connected smart device given user inputs, detecting (e.g., and responding to) an intruder that has entered or is attempted to enter a dwelling (e.g., security), implementing or otherwise responding to energy demand response events, detecting a failure of equipment coupled to a network-connected smart device (e.g., a light bulb having burned out, passive IR senor having gone bad, etc.), or alerting a user of a current event or predicted future events.

Processing engine 206 can further include an advertising/communication paradigm 310b that estimates characteristics (e.g., demographic information, time spent doing particular activities like cooking or watching television), desires and/or products of interest of a user based on device usage and/or data received from network-connected smart devices. Services, promotions, products or upgrades can then be offered or automatically provided to the user. Processing engine 206 can further include a social paradigm 310c that uses information from a social network, provides information to a social network (e.g., based on device usage), and/or processes data associated with user and/or device interactions with the social network platform. For example, a user's status as reported to their trusted contacts on the social network could be updated to indicate when they are home or away based on light detection, security system inactivation or device usage detectors. As another example, a user may be able to share device-usage statistics with other users. As yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, improve security in the home (e.g., regularly lock door, install adequate number of motion detectors or outdoor lights, etc.), to live safely (e.g., reducing exposure to toxins or carcinogens), to conserve money and/or equipment life, to improve health, etc. For example, one challenge may involve participants turning down their thermostat by one degree for one week, or achieving a certain "security score" by properly equipping their home with security devices and services and properly using and maintaining those devices. Those that successfully complete the challenge are rewarded, such as by coupons, virtual currency, status, etc. Regarding compliance, an example involves a parent making a safety and security rule that children are not permitted to leave the home alone after a specified curfew, such as 9:00 PM. The network-connected smart devices in the home could track the movement of the various occupants and send alerts to the parent when a child leaves the home alone after the curfew or when the child is away from home after the curfew. Regarding compliance, another example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources (e.g., via the Internet, such as weather forecasts, prices of certain goods/services, neighborhood/home information, etc.) to improve the functioning of one or more processing paradigms. Extrinsic information 316 can be used to interpret data received from a network-connected smart device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns (e.g., voice detection), etc.) whether the occupant is asleep or awake. If a home intruder is detected, the remote security/monitoring service or police department is advised of how many occupants there are in each bedroom, and whether those occupants are still asleep (or immobile), and the real time location of the intruder in the home. Further, video from the home can be broadcasted to video-capable devices of the nearest security personnel and police so that the police can monitor the activity in the home while in route to the home. By way of another example, the same data that is being used for home security can also be "repurposed" by the processing engine 206 in the context of a social paradigm of neighborhood security. Thus, for example, the same data discussed in the example above can be collected and made available for processing (properly anonymized) in which the crime patterns and home safety in a particular ZIP code can be tracked. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

In some embodiments, the devices and services platform 200 provides a home security services 205 into which users can enroll their smart-home environments 100. The security services 205 can be offered on a non-commitment month-to-month basis. It should also be appreciated that the security services 205 can be offered year-to-year or for lifetime. For example, the security services 205 can provide multi-tiered offerings, including offer basic, plus, and premium services. Basic services, for example, include basic intrusion detection and emergency personnel notification. For example, the basic security services 205 monitor incoming data from the network-connected smart devices of the home to determine when a possible intrusion is occurring, as indicated by motion detection outside the home, information from the smart entry detectors indicating that any one of the doors 186 or windows 182 of the home have been opened, etc. Upon detection, the basic security services 205 contact the occupants of the home and/or local law enforcement. Plus security services 205, for example, monitor dangerous conditions in the home including smoke, CO, in addition to home invasion. Premium services 205 include, for example, availing the home to the many benefits of "neighbor security networks" (described below), detecting when individuals in the home are in distress, mimicking user patterns of turning on lights and appliances when the user is on vacation, providing users with security scores and corresponding tips for improving the security of their home, providing live video stream of activity in the home to the user when the user is away and to local law enforcement, etc.

In some embodiments, pricing for the security services or any suitable type of home insurance may vary depending on the security score of the home. As described below, security score is based on information such as having adequate numbers and placement of network-connected smart devices (e.g., hazard detectors, entry detectors, etc.), percentage of smart devices that have WiFi (rather than low-power communication protocols), percentage of smart devices that are wired (rather than battery powered), number of strangers that visit the home, etc. The higher the security score of the home, the more secure the home and the cheaper the security services and/or insurance may be. The devices and services platform 200, according to embodiments, provides suggestions regarding how to improve security scores and, to incent users to improve their home's score, the platform 200 also indicates what discounts the user will receive if the user's home achieves a particular score.

In some embodiments, upon receiving an enrollment request from a user, the devices and services platform 200 assess the capabilities of the network-connected smart devices in the user's home, and determines whether the requested services are appropriate for the user. For example, if the user requests a premium service, such as the capability to broadcast live video stream to law enforcement, but the user only has but a couple of video enabled smart devices and/or a limited WiFi network, then the devices and services platform 200 recommends that the user upgrade the smart devices in the home or select more basic services.

Examples of security-related objectives will now be provided with reference to FIGS. 1-3. In one security-related example, some or all of the network-connected smart devices function as "tripwires" in the security system. In this example, in the event one of the network-connected smart devices detects motion, heat, sound, etc., it sends a corresponding message through the mesh network (e.g., from network-connected smart device to network-connected smart-device) and, in some cases, over the Internet to the central server or cloud-computing system 164, which triggers an alarm if the security system is armed (e.g., the occupants are away or asleep). In this example, a user could enhance the security of the smart-home environment 100 by buying and installing extra network-connected smart devices, such as smart motion detectors 112 and smart nightlights 170.

In another security-related example, some or all of the network-connected smart devices are equipped with identification technology (e.g., face recognition, RFID, ultrasonic sensors) that "fingerprints" or creates a "signature" for the people, animals, and objects. The identification technology can be the same as or similar to the fingerprinting and signature creating techniques described in other sections of this application. In this example, based on information received from the network-connected smart devices, the central server or cloud-computing system 164 stores a list of registered occupants and/or guests of the home. When a person whose fingerprint or signature is not recognized by the central server or cloud-computing system 164 as a registered occupant or guest comes "within range" of, or otherwise interacts with, one of the network-connected smart devices of the home, the central server or cloud-computing system 164 logs that person's presence and, if the security system is armed, activates an alarm indicating the presence of an intruder. Further, the central server or cloud-computing system 164 may reference maps of the smart-home environment and schedules to whether the identified person, animal, or object is permitted to be in a particular area (e.g., room of the house) at a particular time and trigger an alarm accordingly.

In yet another security-related example, occupant-location data (e.g., GPS data, IPS data, etc.) is used to achieve home-security objectives. According to embodiments, the occupants of a home (e.g., the individuals who live in or frequently visit the home) register their respective mobile devices 166 as being associated with the home, and the central server or cloud-computing system 164 tracks the occupants' movement inside and outside of the home based on occupant-location data received from the mobile devices 166. The central server or cloud-computing system 164 uses this tracking information to make inferences regarding the current and future occupancy of the home and/or rooms, and to control the network-connected smart devices inside the home in a corresponding manner. For example, outdoor lights 114 can be turned on when it is determined that an occupant is returning home, or the smart doorknobs 122 can be locked and the security system can be armed when the occupant is leaving home. Also for example, the threshold for notifying authorities of an emergency can be adjusted depending on whether an occupant having a registered mobile device 166 is at home. For example, if the registered occupant is at home when an alarm condition (e.g., fire, distressed person, home invasion) is detected, a message can be sent to the occupant's mobile device 166 requesting confirmation that everything is okay. The authorities will only be notified if the registered occupant responds confirming that there is an emergency or if the registered occupant does not respond within a timeout period. On the other hand, if an alarm condition is detected and there are not registered occupants at home, then the authorities are immediately notified and a concurrent message is sent to the mobile devices 166 of the registered occupants.

In some instances the central server or cloud-computing system 164 receives occupant-location data directly from the mobile devices, whereas in other instances the data is received from an intermediary, such as one of the network-connected smart devices in the home. In instances where occupant-location data is received directly from the mobile device, the central server or cloud-computing system 164 can determine if the occupant is "at home" or "away" based on whether the received occupant-location data corresponds with the location of the home. What's more, in some embodiments, the central server or cloud-computing system 164 can use the occupant-location data received directly from the mobile devices to determine the occupant's actual room-location (e.g., bedroom, kitchen, garage, etc.). To do so, for example, the central server or cloud-computing system 164 cross-references the received occupant-location data (e.g., GPS data, IPS data, etc.) with a map of the home. On the other hand, in instances where occupant-location data is received from network-connected smart devices, the central server or cloud-computing system 164 can infer that the occupant is in the room where the network-connected smart device is located. Network-connected smart devices can detect mobile devices via WiFi, Bluetooth, NFC, etc.

It should also be appreciated that passive RFID tags (rather than or in addition to mobile devices) can be used to determine the room-location of occupants (and pets). For example, an RFID is associated with each of the occupants (and pets) of the house, such as by including the tags in wallets, bracelets, wristbands, mobile devices, collars, etc. The network-connected smart devices in the various rooms detect the RFID tags, and send that information to the central server or cloud-computing system 164.

According to an embodiment, the determined room location of an occupant is used determine which user controls to provide to the occupant's mobile device 166 when the occupant uses the mobile device 166 to control the smart-home environment 100. In other words, a different menu is displayed to the occupant depending on the occupant's location in the home. For example, if the occupant is located in the garage, then the displayed menu gives the occupant the option to turn up or down sensitivity of the smart entry detector 112 of the garage door. Also for example, if the occupant is in the kitchen, then the displayed menu gives the occupant the option to adjust the smoke-detection sensitivity of the smart hazard detector 104 in the kitchen. This might enable the occupant to cook without triggering a smoke alarm condition. Further, for example, if the occupant is located in a bedroom, then the displayed menu may give the occupant the option to lock the smart doorknob 122 and arm the alarm system.

In the event all occupants of the smart-home environment 100 register their mobile device 166 as being associated with the home, the central server and cloud-computing systems 164 can infer that strangers are in the home when unknown mobile devices are detected. For example, if the network-connected smart devices detected two people in the home, and both of those people are associated with registered mobile devices 166, then it can be inferred that no strangers are in the home. However, if three people are detected in the home, but only two people are associated with registered mobile devices 166, then it can be inferred that there is one stranger in the home. A home may be considered less secure when there are unregistered mobile devices in the home and when there are more occupants than registered devices. For example, a home that is undergoing a remodel and that has dozens of unregistered construction workers with unregistered mobile devices coming and going is less secure than a home where all occupants are associated with registered mobile devices and where there are no unregistered mobile devices in the home.

According to some embodiments, occupants can use their registered mobile devices 166 to access the smart-home environment 100. For example, the smart doorknob 122 and the mobile device 166 may be capable of communicating via near field communication (NFC), BLUETOOTH, or some other short-ranger wireless protocol. To gain access to the home (e.g., cause the smart doorknob 122 to unlock), the mobile device 166 of the user may transmit an access code to the smart doorknob 122, which then verifies with the server 164 that the person is a registered occupant.

Turning to another security-related example, the mesh network can be used to track a person's movement as the person transitions from room to room. As such, the central server or cloud-computing system 164 knows which room in the smart-home environment is occupied and by whom (e.g., using identification technology) at all times. For example, the low-powered and spokesman nodes (e.g., network-connected smart devices 102, 104, 106, 108, 110, 112, 122, and 170) detect the person's movement through the smart-home environment 100 and communicate corresponding messages through the mesh network. Using the messages that indicate which rooms are occupied, the central server or cloud-computing system 164 logs the information for later use and/or instructs various smart devices in the home to perform certain operations, such as turn on and off lights, lock the smart doorknobs 122, sound alarms, notify public safety authorities and the home owner, etc. as the person enters and exits rooms.

According to embodiments, the central server or cloud-computing system 164 can review the logged information about the occupants' movement in the home to detect signature patterns of movement unique to the various occupants. These signature patterns help the central server or cloud-computing system 164 detect strangers in the home. For example, if an individual is quickly moving from room-to-room at a time when occupants typically are not at home and according to a pattern that is not associated with any of the occupants, the central server or cloud-computing system 164 may infer that this individual is a burglar moving from room to room searching for valuable items.

In yet another security-related example, some or all of the network-connected smart devices are equipped with WiFi, BLUETOOTH, NFC, and/or other wireless communication capability. Accordingly, in the event one or more burglars enter the home carrying on their person their mobile devices (e.g., smart phones), the network-enabled smart home devices, upon detecting the home-invasion condition, automatically "interrogate" a burglar's mobile device to try and extract as much useful information as possible about the burglar including, but not limited to, the MAC address of their phone, their cell number, and/or anything else that their mobile device will divulge about itself or the burglar. In addition, an alarm message could be sent to the occupant's mobile device 166 and also to a security service (or police, etc.) containing some or all of this information. According to embodiments, the smart-home environment 100 and/or the security service that monitors the smart-home environment can automatically connect with a wireless telephone carrier to determine which mobile devices are currently communicating with the cell tower(s) nearest the burglarized home. The wireless telephone carriers could automatically generate a "suspect list" that would necessarily include the burglar's mobile device.

According to embodiments, the smart-home environment includes a small cellular base station, such as a picocell or microcell. Such cellular base stations provide great LTE, 3G, 4G, etc. data rates in the home and, in some cases, could replace or supplement WiFi. This base station could provide a cellular backup to call emergency personnel such as fire/police in the event of an emergency. Also, referring to the scenario above, in the event a burglar is inside the home, the base station could capture all unique IDs (e.g., mac, imei, serial number) from the burglar's mobile device.

In another security-related example, some or all of the network-connected smart devices are equipped with video cameras. In this case, the network-connected smart devices can transmit video to the central server and cloud-computing system 164, which can make the video available to client devices, such as the user device 166, in the form of a live or prerecorded video stream. An occupant, when away from the home, can use their user device 166 to connect to the central server and cloud-computing system 164 to receive live or prerecorded video of activity occurring in the home. In some embodiments, central server and cloud-computing system 164 automatically provides video from the network-connected smart device that is observing the most activity. For example, if there is an intruder in the house, the central server and cloud-computing system 164 can detect which room is experiencing the most activity (e.g., based on noise and motion), and provide video from that room. It should also be appreciated that the central server and cloud-computing system 164 can provide for display on the user device 166 a grid of cameras in the home to choose from. In this case the central server and cloud-computing system 164 can highlight which camera is observing the most activity, so that the user knows that camera is likely the best one to select. It should also be appreciated that the network-connected smart devices have a microphone and speaker and that two-way voice communication can be established between the network-connected smart device and the user device 166. For example, the two-way voice communication can be over internet protocol. This allows users to see and talk to home occupants when the user is away from home.

According to an embodiment, in moments of distress, the network-connected smart devices can broadcast a live video stream to nearby emergency personnel such as police and fire departments. For example, upon detecting an intruder or some other emergency occurring in the home or upon someone pressing a panic button in the home, live video can be broadcast to nearby emergency personnel, such as police, fire, medical, and other first responders. The video, for example, is transmitted from the room where the most activity is occurring or where the button was pressed. In some cases, the video is transmitted directly to the police car that is responding to the call (e.g., the closest police car). It should be appreciated that, rather than broadcast, the video may be provided via a secure stream using secure sockets layer (SSL). It should also be appreciated that the security score of the home may be adjusted based on whether the home has the requisite SSL certificates in place to support the secure video stream to emergency personnel.

According to an embodiment, the network-connected smart devices function as "nanny cams". In one example, when the nearest network-connected smart device detects that a sleeping child has woken, it will turn on its camera and microphone/speaker. The network-connected smart device will then send a message to the user device 166 of the parent/home occupant, who can accept the message to establish live video of the child and two-way audio communication. It should be appreciated that live two-way video communication can also be established. In the case the network-connected smart device can project a video of the user, include a video screen for display of video of the parent, and/or control a nearby television or monitor to display video of the user. The network-connected smart device can detect when the child goes back to sleep, and can automatically shut down the video and/or audio.

According to embodiments, some or all of the network-connected devices are equipped with pressure sensors, such as digital air pressure sensors, digital barometric pressure sensors, etc. These pressure sensors may be, for example, resonant types that measure changes in air density, thermal types that measure changes in thermal conductivity of air, ionization types that measure changes in the flow of ions in air, and/or force collector types (e.g., bellow, diaphragm, piston, etc.) that measure deflection. One example security-related application for these pressure sensors to detect opening and closing of doors as well as occupant movement in the house by sensing pressure variation patterns associated with such activities. For example, when a door opens or closes, the pressure sensors of the network-connected smart devices would record the associated pressure variation. The central server and cloud-computing system 164, upon reviewing the recorded pressure variation, can determine the activity associated with the pressure variation. For example, pressure variation in a first range may indicate that an adult occupant walked through a doorway while transitioning from one room to another, while pressure in a second range may indicate that a particular door, internal or external, opened or closed.

According to embodiments, the smart-home environment 100 learns over time what activity corresponds with particular pressure variations detected by particular network-connected smart devices in the home. For example, a smart hazard detector 104 located in a foyer near the front door of a home can learn that it is located near an external door. For example, during initial installation, the smart hazard detector 104 can ask the installing user to indicate the room (e.g., kitchen, den, foyer, hallway, etc.) in which it is being installed and whether it is proximate to an external door. Later, when it senses a pressure variation, a message can be sent to an occupant's user device 166 asking, "Was the external door near the foyer just opened? [Yes/No]", "Did an occupant just walk through the foyer? [Yes/No]". After the smart hazard detector 104 "learns" which pressure differentials are associated with which activities, it can contribute to home security. For example, the smart-home environment 100 automatically goes into security mode when it determines that all occupants are in bed for the night or that all occupants are away from the home. When in this security mode, if the smart hazard detector 104 in the foyer senses a pressure differential that indicates the external door has just been opened, it triggers the alarm.

According to embodiments, the occupants of the home can pre-program the smart-home environment 100 to broadcast specific alarms in response to specific detected conditions. For example, in the event of smoke detection, the smart-home environment 100 can broadcast via the network-connected smart devices and/or the home appliances, such as television and stereos, a pre-recorded message from the occupant notifying the occupants of a possible fire and providing emergency exit instructions. In another example, in case of detected home invasion, the smart-home environment 100 can broadcast a message to the intruders, notifying them that their presence has been detected, that the occupants possess and are trained to use firearms to protect their home, that the police have been notified, etc.

According to embodiments, the thresholds for triggering these alarms can be varied based on activities occurring in the home. More particularly, technologies including the sensors of the network-enabled smart devices in combination with rules-based inference engines or artificial intelligence provided by the central server and cloud-computer system 164 are used to vary alarm thresholds based on the occupants' activities. Inferences about the occupants' activities can be learned based on data received over time. For example, if the smart hazard detector 104 located in the kitchen observes increased temperature, humidity, and motion in the kitchen, then an inference can be made that one or more of the occupants are cooking ("cooking inference"). These data inputs can be considered on a sliding scale based on time of day and day of week. For example, only slight increases in temperature and humidity may invoke the cooking inference at 5 pm on weekdays, when history shows that is when the occupants typically cook. However, much larger increases are required to invoke the cooking inference at 10 am on a weekday, when the occupants are typically away at that time. In some embodiments, the smoke-alarm threshold is varied when the cooking inference is made. For example, the smart hazard detector 104 in the kitchen becomes less sensitive when one of the occupants is cooking, whereas the hazard detectors 104 in other rooms remain in normal operation.

In other embodiments, alarm thresholds are varied based on human population in the home. Inferences about human population in the home can be made based on sensed changes in motion, temperature, CO, noise, air pressure differentials, frequency of door openings and closings, etc. According to one example, in the event of detecting a concurrent increase in temperature, motion, noise, and CO, an inference can be made than there is a higher than normal human population in the home ("high population inference"). Certain alarm thresholds may be adjusted when a high population inference is made. For example, the alarm threshold for CO can be increased to account for the high number of CO-emitting humans in the home and to avoid triggering a false CO alarm. In another example, the security system can be disarmed so that guests can freely transition from room to room and in and out of external doors without triggering the alarm. On the other hand, the alarm threshold for smoke detection can be decreased so that the smoke detectors are more sensitive than usual. This is to protect the large number of people in the home from fire. In other examples, the network-connected thermostat may adjust the temperature of the home to a standard temperature that is comfortable for most people. For example, if the occupants like the house to be cool and "teach" the network-connected thermostat to maintain the home at a cooler temperature, then, in the event of a high-occupancy inference, the network-connected thermostat can adjust up to a temperature that is comfortable for most people. Similarly, for example, if the occupants like the house to be warm and "teach" the network-connected thermostat to maintain the home at a warmer temperature, then, in the event of a high-occupancy inference, the network-connected thermostat can adjust down to a temperature that is comfortable for most people.

According to embodiments, alarm thresholds can be varied based on proximity of law enforcement and other emergency personnel. For example, if a law enforcement office is nearby the threshold for the home invasion alarm condition can be increased. This may be applicable in apartments of buildings that have private security, including a doorman.

According to some embodiments, an "occupancy emulator" can be provided to emulate the occupants of a smart-home environment 100 when the occupants are away, such as on vacation. For example, the smart wall switches 108 and/or the smart wall plugs 110 can function as an "occupancy emulator" by learning the occupants' patterns of turning on and off lights, appliances, etc. and mimicking those patterns when the occupants are away.

According to embodiments, the central server or cloud-computing system 164 processes artificial intelligence algorithms capable of making rules-based or learning-based inferences based on sensed patterns of user control of network-connected smart devices, optionally in conjunction with sensed home conditions or other sensed user behaviors. By way of example, for one embodiment, one or more of the smart wall switches 108 is configured to process information acquired by home occupancy sensing devices in conjunction with information from light-switch-control behaviors of the user to produce a result in which the smart wall switches 108 are automatically self-programmed to help the user turn off and on lights according to a preferred schedule, and to mimic the user's patterns when the user is away. This automatic self-programming can also be applied to smart wall plugs 110, which can learn when to turn on and off lamps 118 as well as appliances such as televisions and stereos. Further, it should be appreciated that all network-connected smart devices can automatically self-program.

In one example, the artificial intelligence algorithms can be configured to sense whether there have been a threshold number of days over the past month (or other evaluation period) for which, at roughly the same time of day ("X o'clock"), the user has turned on or off the same or roughly the same set of smart wall switches 108 and/or smart wall plugs 110 to turn on or off the same or roughly the same lights and/or appliances in the home. If such a pattern has been detected, the user can be sent a message on their smartphone 166 allowing them to opt-in to a setting in which one or more the relevant smart wall switches 108 and/or smart wall plugs 110 will be automatically turned on or off so as to turn on or off the relevant lights and/or appliances at about X-o'clock. It should be appreciated that the smart-home environment could learn and emulate other patterns. For example, it could learn when the dog barks, such as when a person is within 100 feet of the home or when an occupant returns home from work at about X o'clock, and then record and play back barking sounds at appropriate times. It should also learn when to open and close the garage door to give the appearance that the occupant is going and coming to and from the home.

By way of example, the opt-in message can say, "When you are not at home, I can emulate your presence by automatically turning on the lights and television in the den at about X o'clock on weekdays for about two hours, and at about Y o'clock on weekends for about three hours. It might better secure your home by deterring home invasions! Would you like me to do this for you? '[YES/NO]'". The user can then opt in to this functionality and/or modify the schedule and opt in to the modified schedule. If the user's schedule changes, the artificial intelligence algorithms can learn the new schedule and make the proper adjustments. Thus, in accordance with the described embodiment, the collection of smart-home sensors is configured to automatically learn selected user behaviors, to emulate the user's patterns when the user is away, and to automatically learn changes in the user's schedule and make corresponding adjustments.

According to some embodiments, security of the smart-home environment can be further enhanced by predicting through inferences when the user intends to leave the home and raising away preparedness measures. To accomplish this, artificial intelligence algorithms are capable of making rules-based or learning-based inferences about when the user intends to leave the home based on sensed patterns of user control of smart-home devices, optionally in conjunction with sensed home conditions or other sensed user behaviors. By way of example, for one embodiment, one or more of the light switches is configured to process information acquired by home occupancy sensing devices in conjunction with information from light switch control behaviors of the user to predict when the user intends to leave the home. More particularly, the artificial intelligence algorithms can be configured to sense whether there have been a threshold number of weekdays over the past month (or other evaluation period) for which, at roughly the same time of day ("X o'clock"), (i) the user has turned off a same or roughly same set of active light switches in the home, including the front door light switch, over a five-minute period (or other pre-departure period), and (ii) this event was followed by an extended period of non-occupancy, such as at least one hour of non-occupancy. If such pattern has been detected, the user can be sent a message on their smartphone allowing them to opt-in to a setting in which, if the light switch near the front door is turned off at about X-o'clock on a weekday, the set of active light switches will be automatically turned off as well. By way of example, the opt-in message can say, "If you turn off the light switch near the front door at about X o'clock on weekdays, I can automatically turn off the rest of the lights for you that you have been turning off manually at about that time. It might save you a few steps! Would you like me to do this for you? '[YES/NO]'" The user can then opt in to this functionality. If the user's schedule changes and they end up not wanting this functionality later on, the artificial intelligence algorithms can readily 'unlearn' it by virtue of detecting a 'punishing' or 'undo' action by the user in which, the next time the user turns off the front door light switch, they simply walk to one of the automatically-turned-on light switches and turn it off within five minutes (or other undo interval). Thus, in accordance with the described embodiment, the collection of smart-home sensors is configured to automatically learn selected user behaviors, to assist the user with certain tasks when selected qualifying behaviors are observed, and to automatically stop providing such assistance when one or more straightforward undo actions are taken by the user. Additionally or alternatively, if such a pattern has been detected, the central server and cloud-computing system 164 makes an inference that the user intends to leave the home soon. Responsive to this inference, the sensitivity of the network-connected smart devices can be increased in anticipation of the user's imminent departure from the home. For example, the threshold for triggering an alarm indicating a home invasion can be reduced. It should be appreciated that the pattern of turning off lights is merely an example, and that other patterns exist on which imminent-departure inferences can be made.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. According to embodiments, the smart alarm clock is capable of monitoring weather and traffic data, and adjust the user's wakeup time to account for delays that could be caused by bad traffic and weather. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time. In some embodiments, the occupant may have the option of setting a specific time at which the user would like to arrive at a particular destination. The user may input information about the destination and its location, such as its address. Artificial intelligence will be used to determine how long it typically takes the occupant to wake up and get ready to leave the home. This information will be considered in combination with traffic on the route to the occupant's specified destination and weather conditions to determine what time to wake the occupant so that the occupant will arrive at the destination at the specified time.

According to embodiments, the network-connected smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest network-connected smart device will be the device that sounds the alarm to wake the occupant in time to arrive at the specified destination, accounting for traffic and weather conditions and how long it typically takes the occupant to get ready in the mornings. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to embodiments, in the event of bad weather, such as rain, snow, sleet, ice, etc., the smart alarm clock can communicate via the central server and/or could computing system 164 with the occupants automobile and thereby instruct the automobile to automatically shift into all-wheel drive when the user starts up the automobile to drive to the destination. It should also be appreciated that, in cold, winter conditions, the smart-home environment can instruct the automobile to "warm up" and defrost while the occupant is getting ready for work or to leave the home.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as be observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices location through the smart-home environment in combination with rules-based inference engines or artificial intelligence provided at the central server or cloud-computing system 164 are used to detector or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

"Mapping" the smart-home environment 100 provides a number of advantages. For example, informed by a map of the smart-home environment 100, the central server and cloud-computing system 164 can determine a distressed occupant's or an intruder's location in the home and notify emergency personnel regard the same. This enables emergency personnel to quickly find distressed people or intruders upon entering the home. In other examples, the central server and cloud-computer system 164 determines an emergency exit route for each room of the home. In the event an alarm is activated (e.g., when one or more of the smart hazard detectors 104 detects smoke and activates an alarm), the central server or cloud-computing system 164 uses occupancy information obtained from the network-connected smart devices in the home to determine which rooms are occupied and then turns on lights (e.g., nightlights 170, wall switches 108, wall plugs 110 that power lamps, etc.) along exit routes from the occupied rooms so as to provide emergency exit lighting. These are just a few example advantages of mapping the home, and it should be appreciated that there are an unlimited number of advantages.

According to embodiments, mapping of the home can be done automatically. For example, a map may be generated based on positional information obtained from the nodes of the mesh network (e.g., positional information from the network-connected smart devices is used to construct a map of the house). According to this example, the individual network-smart devices obtain or determine their location upon being installed or at some other time, and send the location information to the central server or cloud computing system 164 or to a mapping application on the mobile device 166 of a user. For example, when installed, a network-connected smart device can ask the user (by 2D LCD display, 2D/3D holographic projection, voice interaction, etc.) a few simple questions such as, "Where am I" and the user can select "bedroom" or "living room" and so forth. In other examples, a smart device can provide the user with instructions, such as "Press button once if I am in the kitchen, press twice if I am in the den, etc." Also, for example, the smart devices may be capable of determining their GPS coordinates and/or transmitting WiFi location or cellphone tower location information. The central server or cloud computing system 164 or the mapping application on the mobile device 166 uses this information to automatically construct a map of the home. In some examples, a robot 168 (discussed below in detail) 'roams' free in the house and sends mapping information to the application on the mobile device 166 or to the central server or cloud-computing system 164, which uses the mapping information to construct a map of the home. For example, the robot 168 could be put into a 'mapping' mode where it obtains location data as it moves along the walls of each room in the house, and then sends the location data to the application on the mobile device 166 or to the central server or cloud-computing system 164, which uses the mapping information to construct a map of the home.

According to other embodiments, an indoor positioning system (IPS) could be used to map the smart-home environment 100. For example, a user could launch a mapping application on the mobile device 166 that uses IPS to create a map of the home. In this case the user would walk along the walls of the home and the mobile device would collect location information using IPS and/or other indoor localization techniques, and use that information to construct a map of the home or send the collected information to the central server or could-computer system 164, which creates the map. It should be appreciated that instead of or in addition to using IPS and/or other indoor localization techniques, the application on the mobile device 166 could use the mobile device's gyroscope, magnetometer, accelerometer, and altimeter to obtain location information.

According to still other embodiments, RFID tags are used to map the smart-home environment 100. For example, RFID tags are placed throughout the home. Upon placing the tag, the user could scan the tag using the mobile device 166, which would launch an application, instructing the user to input location information. Also for example, instead of instructing the user to input location information, the mobile device could determine its own location (e.g., using any techniques known to those having skill in the art, such as GPS, at the time of the scan) and associate that location information with the tag.

According to embodiments, in the event of an alarm condition, a map of the smart-home environment 100 is sent to emergency responders. For example, upon detecting the emergency event, such as an intruder or a distressed occupant, the central server and cloud-computing services 164 sends a map (e.g., a map created as described above) of the smart-home environment 100, along with an indication of where on the map the emergency event is occurring. This map can be displayed in the vehicles or on mobile devices of emergency responders, so that they can review the map in advance of entering the home. This will enable them to quickly find the appropriate location upon entering the home.

According to embodiments, smart-home environments can be grouped into "neighborhood security networks" and information can be shared among smart-home environments in the same "neighborhood." For example, in the event one smart-home environment experiences a fire, an intrusion, a missing child, a medical emergency or some other type of emergency or notable event, notification is sent to other smart-home environments in the same neighborhood. Such neighborhood security networks enable smart-home environments to communicate with one another in real time, or near real time, about emergencies and other important events happening in the neighborhood. This real time communication enables network-connected smart devices in non-affected smart-home environments to make appropriate security- and safety-related responses that minimize or eliminate impact from the emergency event, such as lock the smart doorknob 122, arming security systems, turning on outdoor and indoor lights to deter home invasion, sounding alarms to wake up and warn sleeping occupants of a nearby fire, etc. In some cases, these responses can even resolve or help resolve emergency events, such as by using identification technology to locate a missing child or turning on outdoor lighting so that law enforcement can locate and apprehend fleeing criminals.

A number of different techniques may be used to create neighborhood security networks. According to some embodiments, the central server or cloud-computing architecture 164 automatically creates the "neighborhoods" based on a combination of "neighborhood criteria information", such as geographic location of the homes, demographic information about occupants of the homes, and "opt-in" information about which types of alerts the homes wish to receive. Geographic location information may include home address, ZIP code, GPS coordinates, Win location information, cellular tower location information etc. Demographic information about the occupants may include age, gender, health, special needs, etc. Opt-in information may include fire alerts, home invasion alerts, missing children alerts, missing pets alerts, missing property alerts, earthquake alerts, etc. According to embodiments, the network-connected smart devices of smart-home environments 100 provide the "neighborhood criteria information" to the central server or cloud-computing architecture 164 upon registration and/or during ongoing use, and the central server or cloud-computing architecture 164 logs and stores the neighborhood criteria information as the home data 202, the derived home data 208, and/or other data.

According to some embodiments, the central server or cloud-computer architecture 164 correlates network-connected smart devices using the geographic location information and therefore creates the "neighborhoods" based on geo-proximity, such that homes in close proximity to one another are grouped into the same neighborhood. It is possible that each smart-home environment has its own neighborhood that includes other homes within a predefined radius. This way, each home is in the middle of its neighborhood and benefits from being surrounded by neighbors, rather than being on the edge of a neighborhood. The geographic reach of the neighborhood may vary based on the type of event or emergency in question. For example, in the event a home experiences a fire, the central server or cloud-computer architecture 164 creates a neighborhood that includes all homes within a one-mile radius, whereas if a child goes missing then the neighborhood can include all homes within a ten-mile radius or all homes in a particular ZIP code, city, county, etc.

According to some embodiments, the central server or cloud-computer architecture 164 creates neighborhoods based on demographic information. For example, in the event a teenage child of one smart-home environment is out past his or her curfew, the created neighborhood consists of nearby homes where teenagers are members of the household. This way, notice that the teenager is out past his or her curfew is sent to the homes of the neighborhood, and the teenager can be located if he or she is out visiting another teenager whose home is in the same "neighborhood". In another example, in the event an occupant of a particular home contracts the flu or some other communicable illness, the created neighborhood consists of nearby homes where small children or elderly adults live. In this example, a notice is sent to the other homes in the neighborhood so that precautionary measure can be taken to help prevent the young children and elderly adults from contracting the illness.

According to embodiments, the central server or cloud-computing architecture 164 automatically identifies smart homes within a radius of the home experiencing the emergency or event and sends an alarm to the identified homes. In such instances, the other homes in the "neighborhood" do not have to sign up for or register to be a part of a safety network, but instead are notified of emergency or event based on their proximity to the location of the emergency or event. This creates robust and evolving neighborhood security watch networks, such that if one person's home is getting broken into, an alarm can be sent to nearby homes, such as by audio announcements via the smart devices located in those homes.

However, it should be appreciated the "neighborhood security networks" can be "opt-in" services and that, in addition to or instead of the central server or cloud-computing architecture 164 selecting which homes to send alerts to, individuals can subscribe to participate in such networks and individuals can specify which homes they want to receive alerts from and the types of alerts to be received. This can include, for example, the homes of family members who live in different cities, such that individuals can receive alerts when their loved ones in other locations are experiencing an emergency or other types of events. In some examples, homes having children can subscribe or "opt in" to be a part of a "neighborhood" that sends alerts when children are missing or out past curfew. Further, homes having elderly people can subscribe or "opt in" to be a part of a "neighborhood" that sends alerts regarding their elderly peers and attempt to form a community that looks out for the security, safety, and health of its members.

According to embodiments, before a smart-home environment 100 is included in a neighborhood security network, an opt-in message is sent to the home owner, such as via the home owner's mobile device 166. The home owner is provided with information about the other homes in the "neighborhood", the basis on which the neighborhood security network was formed (e.g., geographic location, family relationships, demographic information, etc.), the types of information that will be shared with other homes in the neighborhood security network (e.g., occupants away on vacation, potential invasion, missing child, etc.).

As discussed, notification of an emergency or event occurring in one home can trigger responses in other homes in the "neighborhood". For example, in the event of a burglary in one home, the central server or cloud-computing architecture 164 instructs the network-connected smart devices of the other smart-home environments 100 in the neighborhood to turn on outside lights, to lock the smart doorknob 122 and window latches, to arm the security system, etc. Also, for example, in the event smoke is detected in one home in the neighborhood, the central server or cloud-computing architecture 164 can increase the sensitivity of the smoke-detecting components of other smart hazard detectors 104 in the neighborhood. In this example, the neighborhood may include all units in the same apartment or condominium building. Further, for example, in the event a dog goes missing in one home, the network-connected smart devices of other homes in the neighborhood can be tuned to detect motions that indicate a dog. In this example, if a dog is detected by an outdoor network-connected smart device that does not typically detect dogs, then a message can be sent to the home of the missing dog indicating that a stray dog was detected and providing the location of the detection. Further, in some examples, a RFID tag may be provided on the dog's collar, and the network-connected smart device of the other homes in the neighborhood may locate the dog by "reading" the RFID tag and give the location of the dog upon request. RFID tags may be placed on other property, too, such as bicycles such that other property may be located in a similar manner.

According to embodiments, individuals may manually broadcast messages to other homes in the "neighborhood". For example, when a family is leaving for vacation, they can cause the central server and cloud-computing system 164 to send a notification to a network of trusted neighbors. This network can be manually defined or inferred.

According to embodiments, the central server or cloud-computing system 164 may obtain and store identifying information, such as facial recognition data, for the occupants of the smart-home environments 100. In this case, when a "recognized" individual who is an occupant of one of the smart-home environments 100 is approaching an external door, such as the front door, of another smart-home environment, the smart doorbell 106, via the processing capabilities of the central server or cloud-computing system 164, is able to recognize the approaching individual and announce his presence. For example, the approaching individual's name and/or status as being a neighbor may be announced, a video of him approaching may be displayed, and/or his image (such as a photograph taken from his social networking account) may be displayed inside the smart-home environment 100.

Figure 11:
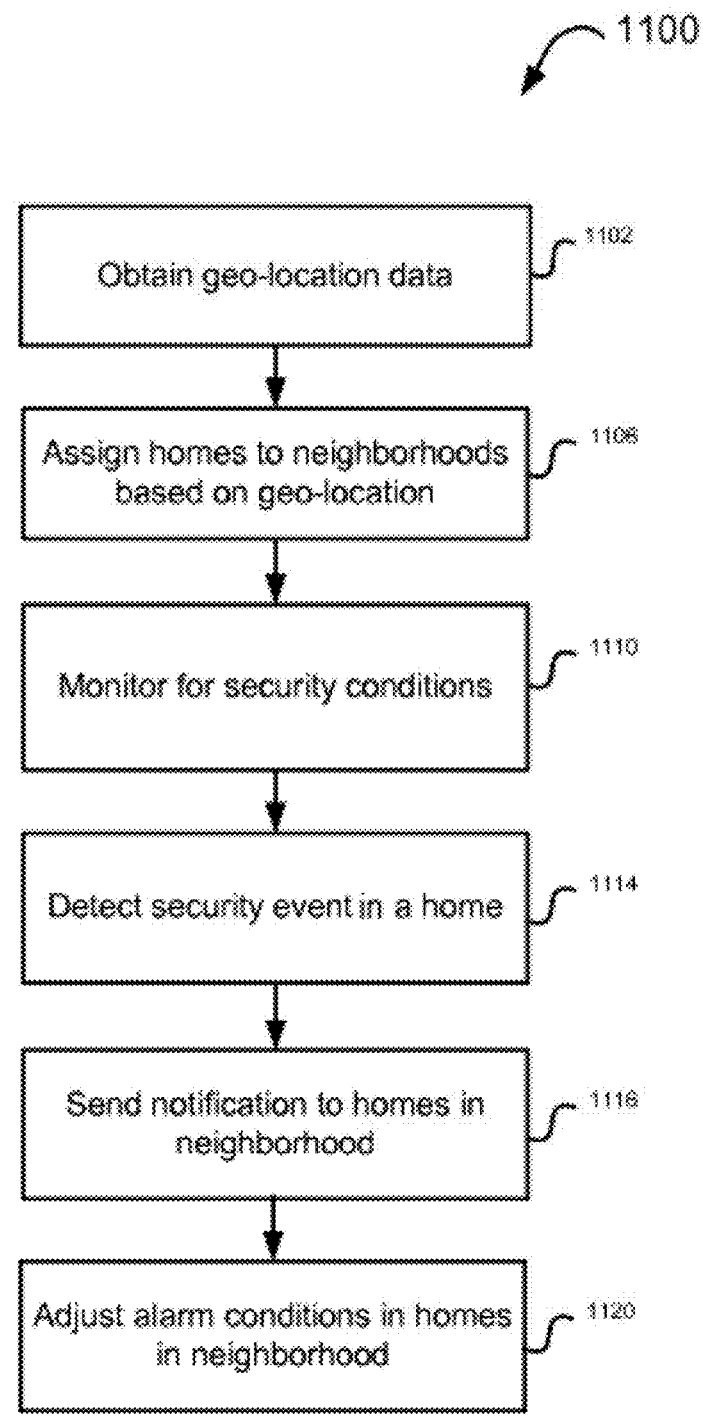
FIG. 11 is a block diagram of an example process for creating neighborhood security networks ("neighborhoods") and sending security-related notifications to homes in the created neighborhoods, according to at least one embodiment.

FIG. 11 provides an example process 1100 for creating neighborhood security networks ("neighborhoods") and sending security-related notifications to homes in the created neighborhoods, according to at least one embodiment. At 1102, the process 1100 generally begins when the central server and cloud-computing system 164 obtains geographic location data for a plurality of smart-home environments. In one example, the geographic location data is obtained from the home data 202. At 1106, the central server and cloud-computing system 164 assigns the smart-home environments into neighborhood security networks based at least in part on the geographic locations of the homes. For example, homes in close proximity are grouped into the same "neighborhood". In some embodiments, when a home is assigned to a neighborhood, an "opt out" or "opt in" message can be sent to the home, giving its occupants the option of not participating in the neighborhood or giving them the option of participating. At 1110, the central server and cloud-computing system 164 monitors for security-related conditions. For example, the central server and cloud-computing system 164 analyzes data received from the network-connected smart devices of a plurality of smart-home environments 100. For example, the security services 205 applies security-related algorithms, logic, and artificial intelligence to review data received from network-connected smart devices to detect security related events, such as home invasions. At 1114, the central server and cloud-computing system 164 detects a security-related condition in one of the smart-home environments. For example, the central server and cloud-computing system 164 may receive data from an entry detector 112 of a smart home environment 100 that a window 182 has been opened while the occupants are asleep and the home's security system is armed. At 1116, the central server and cloud-computing system 164 sends a security-condition notice to network-connected smart devices in other homes in the same neighborhood. For example, if the central server and cloud-computing system 164 infers that the opened window 182 indicates that a home invasion is occurring, it sends a home-invasion alarm to the other houses in the neighborhood. At 1120, responsive to detecting the security-related event in the one of the homes and/or responsive to sending the security-related notifications, the central server and cloud-processing system 164 adjusts one or more alarm conditions in the other homes in the neighborhood and/or invokes precautionary responses in the other homes in the neighborhood. For example, the alarm conditions are adjusted to increase sensitivity for detecting conditions related to the security notification. In one example, the security notification relates to a home invasion in one home in the neighborhood, the central server and cloud-computing system 164 increases the sensitivity of the smart entry detectors 112, turns on the lighting systems 114, and locks the smart doorknobs 122 of other houses in the neighborhood.

Figure 12:
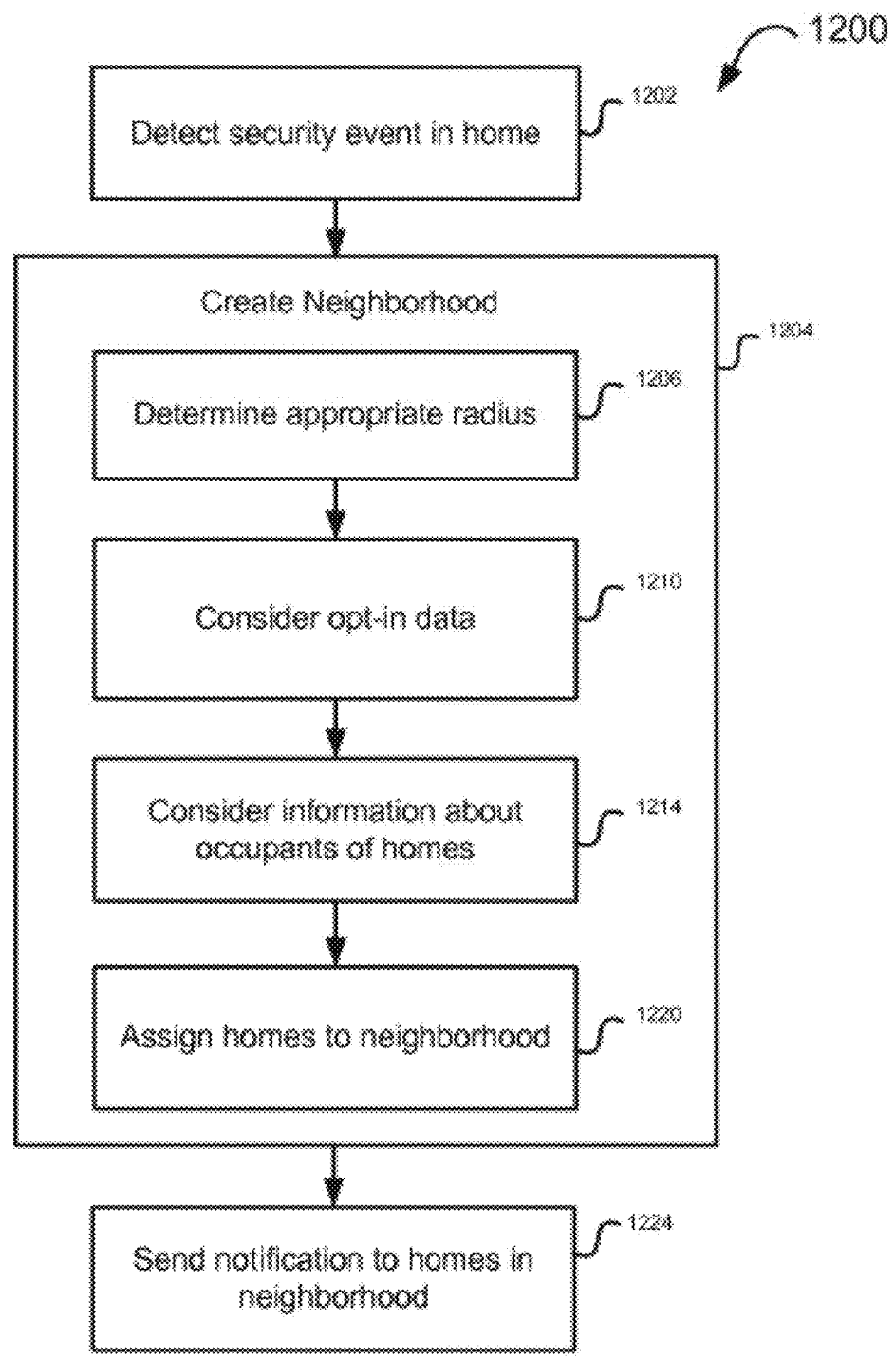
FIG. 12 is a block diagram of another example process for creating neighborhood security networks ("neighborhoods") and sending security-related notifications to homes in the created neighborhoods, according to at least one embodiment.

FIG. 12 provides another example process 1200 for creating neighborhood security networks ("neighborhoods") and sending security-related notifications to homes in the created neighborhoods, according to at least one embodiment. At 1202, the process 1200 generally begins by detecting a security event in a smart-home environment 100. For example, the central server and cloud-computing system 164 could detect a home invasion or fire or that a teenager is out past curfew. In other examples, at 1202, the central server and cloud-computing system 164 may receive notice of a security event (rather than detect) in one of the homes. An example could be receiving notice that a child has gone missing. At 1204, the process 1200 involves creating a neighborhood security network consisting of homes that would benefit from receiving notification of the security event. At 1206, as part of creating the neighborhood, an appropriate radius for the neighborhood is determined based on the detected security event. For example, in the event of a fire, the radius of the neighborhood can be fairly small, such as one mile or less. In this case, homes within a one-mile radius of the fire will be notified. Homes farther than one mile from the fire are not at risk and therefore do not need to be notified. However, in the case of a missing child, the radius of the neighborhood can be much larger. This increases the likelihood that the child will be located. At 1210, opt-in information is considered. As mentioned above, individual homes can opt-in to receive security-condition notifications. Thus, at 1210, the central server and cloud-computing system 164 determines which homes have opted to receive the particular notice. At 1214, information about the occupants of the homes is considered. For example, in the event the notice relates to a teenager who is out past his or her curfew, the central server and cloud-computing system 164 will identify other homes where teenagers live. In other example, if the notice related to a contractible illness that is dangerous for young children and elderly adults, then the central server and cloud-computing system 164 will identify homes where young children and elderly adults live. At 1220, homes are assigned to the neighborhood. For example, at 1220, the central server and cloud-computing system 164 identifies the homes that are within the radius, have opted-in to receive the relevant type of notification, and have occupants who would benefit from receiving the notification. At 1224, the process 1200 involves sending the notification to the homes that were assigned to the neighborhood.

According to embodiments, a security score may be calculated for a smart-home environment. In some examples, a security score for a home is calculated by comparing the security features of the home against a list of security criterions to determine how many of the security criterions are satisfied. Higher scores indicate that a home satisfies a high number of security criterions and is therefore relatively secure, whereas lower scores indicate that the home fails to satisfy many of the criterions. According to embodiments, security scores can be normalized and scaled so that occupants of a home can compare the security of their home to other homes. For example, a score of 0 to 100 can be used, where 0 is the lowest possible score and 100 is the highest possible score. Further, for example, the central server or cloud-computing system 164 may generate a report or log that lists the security criterions and provides an indication of whether the home satisfies each of the criterions. Occupants can review this list to determine which criterions are not satisfied and then make the appropriate improvements to the home so as to increase the home's security score. Additionally, the central server or cloud-computing system 164 can use this log to generate a list of suggestions for improving the home. It can prioritize the list based on which criterions are associated with the most points, indicate which creation can be easily and cheaply satisfied with only minor improvement, and indicate which unsatisfied criterions are typically satisfied in other homes. For example, the central server or cloud-computing system 164 can send the following message to an occupant's electronic device 166: "We notice that you often leave the front door unlocked. Most homes in your neighborhood keep the front door locked at all times. Locking your front door at night is an easy and inexpensive way to improve your home's security and to improve your security score."

Example security criterions for assessing the security of and calculating a security score are discussed below. However, it should be appreciated that any number and combination of security criterions can be used when assessing security and calculating a security score for a home.

One example security criterion is whether the home has a requisite number of network-connected smart devices, such as smart hazard detectors 104, smart entry detectors 112, etc. The requisite number can be determined based on the size of the home, the number of bedrooms in the home, the configuration of the home (single story, two-story), the number of occupants living in the home, the laws, rules, and regulations of the jurisdiction(s) where the home is located, etc. In some cases, this information can be automatically obtained from public real estate databases. For example, the central server and/or cloud-computing services 164 can access a public real estate database(s) to obtain the size, location, configuration, number of bedrooms/bathrooms, etc. The central server and/or cloud-computing services 164 can also access the home data 202 to determine how many network-connected smart devices are located in the home, and compare that number to the requisite number to determine whether the criterion is satisfied.

Another example security criterion is whether the various types of network-connected smart devices are properly located in the home. For example, for this criterion, the central server and/or cloud-computing services 164 can determine whether a smart-entry detector 112 is located at each window 182 and external door 186, whether a smart hazard detector 104 with smoke and motion detecting capabilities is located in all of the appropriate locations, such as one in the kitchen and at least one on each floor of the home, whether the doorbell of the home is a smart doorbell 106 with the security capabilities described herein, whether the wall switches are smart wall switches 108, whether the wall plugs are smart wall plugs 110, etc. The central server and/or cloud-computing services 164 can make these determinations by reviewing the home data 202 to obtain information about the location and capabilities of the various network-connected smart devices in the home and comparing that information against a map of the home. The map can be generated according to the example techniques described herein.

In some embodiments, a security criterion is whether the house has been "mapped". As discussed elsewhere herein, maps of the homes can be created and stored in the home data 202. Mapping improves security not only because it enables the central server and/or cloud-computing services 164 to determine whether the home has an adequate number of appropriate located network-connected smart devices, but it also enables the central server and/or cloud-computing services 164 to pinpoint within the home where a security event is taking place and to provide that information for emergency responders. Another example security criterion is the average amount of time it takes first responders to get to the home after an alarm has been triggered. This information can be averaged based on data from nearby homes. If the response time is fast, then the security score of the home is increased.

Other example security criteria may be related to the capabilities and configurations of the respective network-connected smart devices in the home. For example, the central server and/or cloud-computing services 164 can access and review the home data 202 to determine whether the network-connected smart devices are wired (rather than battery operated), whether the batteries are sufficiently charged, whether they are WiFi enabled and connected to a strong and reliable WiFi network, whether the CO date codes of the smart hazard detectors 104 are up-to-date, whether there is cellular backup in the event WiFi goes down, etc. Another example, criterion is whether the hub spokesman node in the home is wired (rather than battery operated).

In some embodiments, the central server and/or cloud-computing services 164 can review the security logs for the house provided in the home data to assess whether the occupants are keeping the home secure. For example, one security criterion that can be considered during this review is whether a door or window was left unlocked overnight. Another example, criterion is the number of strangers that visit the house on a regular basis. This can be determined, per the discussion above, by detecting strangers based on the number of unregistered mobile device 166 and/or occupants in the home. The more strangers that visit, the less secure the home and the lower the security score. On the other hand, if the home occupants regularly consist of just registered occupants, then the more secure the home and the higher the security score. Another example security criterion is the number of unregistered mobile devices that come into contact with the home on a regular basis. This can be particularly relevant for apartments, condos, and homes in densely populated areas where strangers are frequently nearby. One way the central server and/or cloud-computing services 164 can make this determination is by reviewing the number of unrecognized mac addresses that contact the router of the home's WiFi network. In some examples, for those homes located in apartment and condo buildings and in densely populated areas, the mac addresses of the neighbors' mobile devices can be factored out over time. For example, if the same mac address is seen on a regular basis, then it can be assumed that that device is associated with a neighbor and will not be used to lower the security score of the home.

Other example security criteria involve how readily the occupants, or non-resident individuals who are in a position to confirm whether an alarm condition is false, can be contacted in the event of an alarm condition. Here, for example, the central server and/or cloud-computing services 164 considers whether the occupants of the home have verified their contact information. For example, this may include determining whether and which of the occupants have provided their emergency contact information (e.g., mobile telephone number) to the central server and/or cloud-computing services 164. The security score increases if the occupants have verified their contact information because, in the event of an alarm condition, the occupants can be contacted to verify whether the alarm is false and if not they can help resolve or otherwise address the emergency. The security score increases even more if every occupant of the home verifies their contact information.

Another example security criterion is the quality of "coverage" in the home. For example, the central server and/or cloud-computing services 164 determines whether the home has a comprehensive mesh network of nodes that are capable of sensing conditions at all locations within the home and communicating data regarding the sensed conditions through the mesh network and to the central server and/or cloud-computing services 164. According to one embodiment, to determine whether the home has a comprehensive mesh network, the central server and/or cloud-computing services 164 tracks an occupant's movement through the home to identify "black spots", which are areas in the home where the central server and/or cloud-computing services 164 was unable to detect the occupant. The security score can be adjusted based on the extent of the black spots in the home.

Figure 13:
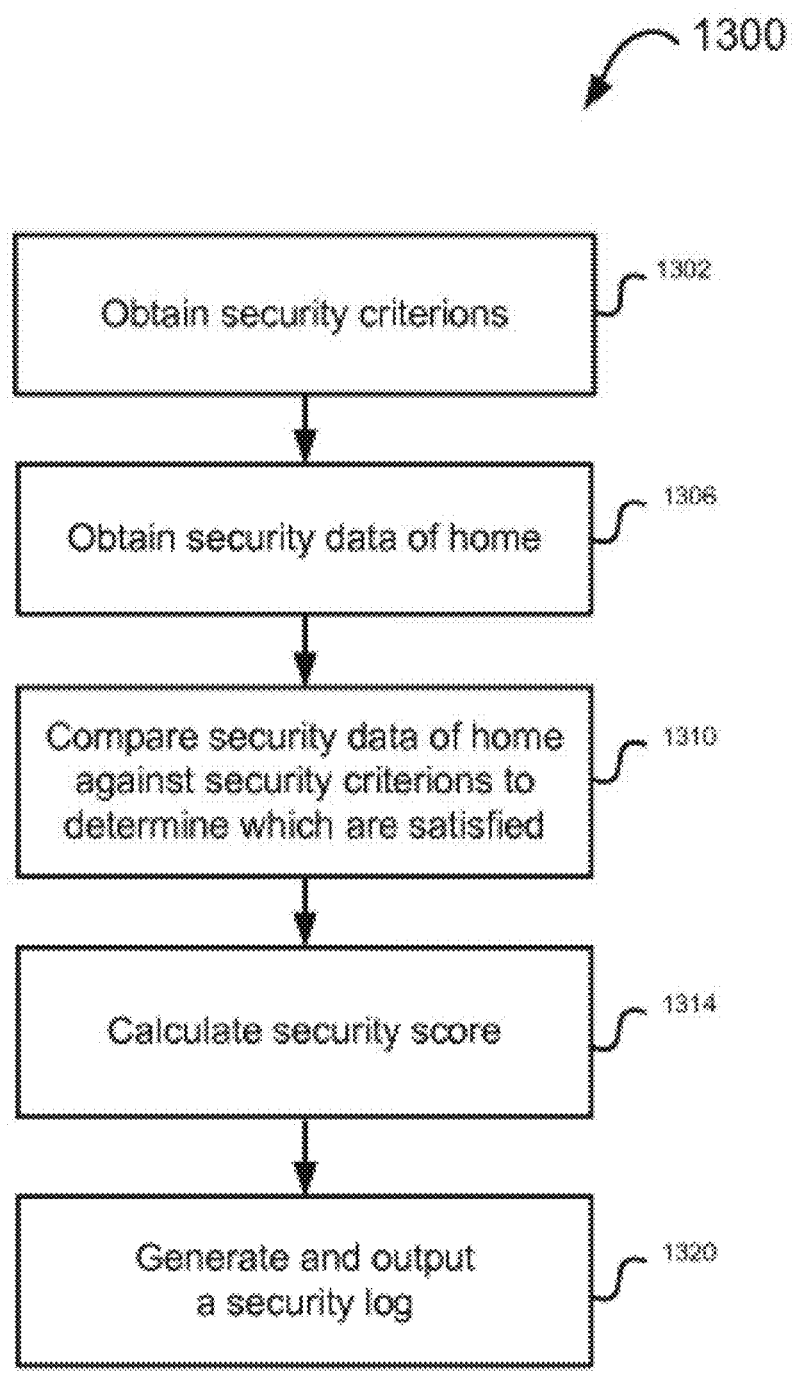
FIG. 13 provides an example process for calculating and reporting a security score for a smart-home environment, according to at least one embodiment.

FIG. 13 provides an example process 1300 for calculating and reporting a security score for a smart-home environment, according to at least one embodiment. At 1302, the process 1300 generally begins by obtaining security criterions. For example, the central server and/or cloud-computing service 164 obtains a list of security criterions from a database. The list of security criterions may include all or some of the example criterions discussed above. As discussed above, security criterions are used to assess the security of the home. For example, when a home satisfies a high number of applicable security criterions that home has a correspondingly high security score, and there is a higher probability that the home is indeed secure. At 1306, the process 1300 involves obtaining security data from the home. For example, the central server and/or cloud-computing service 164 obtain sensor data and other data from and related to the network-connected smart devices of the home. Such data may be included in the home data 202.

At 1310, the process 1300 involves comparing the security data of the home against the obtained security criterions to determine which of the security criterions are satisfied. Here, according to an embodiment, the central server and/or cloud-computing service 164 processes the obtained home data against the list of security criterions to determine which of the security criterions are satisfied. At 1314, the security score is calculated. To do so, for example, the central server and/or cloud-computing service 164 determines a security score for the home based on the number of security criterion that were satisfied. The higher the number of satisfied criterion, the higher the security score. At 1320, a security log is generated. For example, the central server and/or cloud-computing service 164 generates a log that lists each of the security criterions and corresponding indications of whether the respective criterions were satisfied. This log can be outputted, for example, by sending the log to the electronic devices 166 of the occupants. In some embodiments, the log includes a written description for each of the security criterions so that occupants can review the descriptions of the unsatisfied criterions to determine what they can do to improve the security of their home. In some examples, the corresponding indications of whether the respective criterions are satisfied are binary indicators, whereas in other examples the corresponding indications are values indicative of a degree of compliance. For example, if the home has fifty percent of the requisite number of smart hazard devices 104, then the indication corresponding to that criterion can indicate that it is fifty percent satisfied. As discussed above, the security criterions can include a "proper sensor location" criterion, a "low sensor battery" criterion, a "low WiFi signal" criterion, a "door open" criterion, a "door closed" criterion, a "door locked" criterion, a "window open" criterion, and a "window locked" criterion.

According to some embodiments, "pre-alarm condition trend detection and notification" services are provided to warn users of potential dangerous conditions. More particularly, technologies including the sensors of the network-enabled smart devices in combination with rules-based inference engines or artificial intelligence provided by the central server and cloud-computer system 164 are used to make inferences about potential security conditions in the home. This may occur in situations where the sensor data is not "strong" enough to support an actual alarm condition, but it is enough to cause an inference that potentially dangerous activity may be occurring in the home and that it is worth investigating whether such activity is indeed occurring.

For example, as discussed above the central server or cloud-computing system 164 can review the logged information about occupants' movement in the home to detect signature patterns of movement unique to the individual occupants of the home. These signature patterns help the central server or cloud-computing system 164 detect strangers in the home. For example, if an individual is quickly moving from room to room at a time when occupants typically are not at home and in a pattern that is not a signature pattern of any of the occupants, the central server or cloud-computing system 164 may infer that this individual is potentially a robber moving from room to room searching for valuable items. While this inference may not rise to the level of a home-invasion alarm condition, it may be worth investigating. Thus, the central server or cloud-computing system 164 sends a "pre-alarm" alert message to the registered occupants' mobile device 166, informing the occupants of the detected pattern that there may be suspicious activity occurring in the home. The message may include an indication of where in the house suspicious activity is occurring. The message may also request that the occupant verify that this is a false alert or that an actual home-invasion-condition exists.

In another example, the smart doorbell 106 may observe the same car parked on a street out front of the smart-home environment 100 over the course of several days. In particular, the smart doorbell 106, in combination with rules-based inference engines or artificial intelligence provided by the central server and cloud-computer system 164, may infer that the comings and goings of the car are consistent with burglars "casing" the home. Upon making this inference, rather than triggering an alarm condition, the central server and cloud-computer system 164 may send a "pre-alarm" message to the occupants' mobile devices 166 and/or to local law enforcement, alerting them to the potential casing and including a description of the car.

According to other embodiments, the pre-alarm condition trend detection and notification can be applied to detect evaluated levels of potentially dangerous substances (e.g., CO, smoke, etc.) in the smart-home environment 100. For example, an alarm condition may be established based at least in part on a predetermined amount of a substance in an environment. The alarm condition may be stored locally by a smart hazard detector or remotely by the central server and cloud-computer system 164. For example, once the concentration level of CO in the air reaches a certain level, an alarm condition will be triggered. Additionally, a "pre-alarm condition" is established based at least in part on a predetermined trend in the amount of the substance in the environment. For example, the pre-determined trend can be at least a twenty-percent increase in the amount of the substance over at least a two-week period. After establishing the alarm and the pre-alarm conditions, the central server and cloud-computer system 164, the smart hazard detector and/or other smart home devices receives sensor data indicating the amount of the substance in the environment and analyzes the sensor data to detect the presence of either the alarm or pre-alarm condition. Responsive to detecting the pre-alarm condition but not the alarm condition, the central server and cloud-computer system 164, the smart hazard detector and/or other smart home devices provides a notification of the pre-alarm condition. For example, the central server and cloud-computer system 164 may send a message to the mobile device 166 of the occupant stating, "The CO level in your home has increased twenty-percent in the last two weeks. You might consider having an expert inspect your home to determine the cause." Also for example, the smart hazard detector and/or other devices in the home may make a similar audible announcement or display a similar written message.

Additionally, the pre-alarm message may be sent to a repair contractor or a public safety agency, so that they can respond directly. For example, the repair contractor may call the owner to notify the owner of the problem and prepare a plan to repair the problem. According to embodiments, the pre-alarm message giving notification of the pre-alarm condition is sent to a centralized bidding system that solicits bids from repair contractors and selects one of the repair contractors to resolve the problem.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message to an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirmation that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those home to help facilitate early detection and prevention.

According to some embodiments, sound, vibration, and/or motion sensing components of the smart devices are used to detect sound, vibration, and/or motion created by intruders impermissibly entering the home. Based on the detected sound, vibration, and/or motion, the central server or cloud-computing architecture 164 makes inferences about home invasion and provides related services. For example, the central server or cloud-computing architecture 164 can run programs/algorithms that assess detected sounds, vibrations, and movement in view of whether the home occupants are home or away, sleeping or awake, etc.

For example, in the event the central server or cloud-computing architecture 164 detects sounds proximate to windows, doors, and other external entryways while concurrently receiving information that all registered occupants are away from the home or are accounted for and asleep in their respective rooms, the central server or cloud-computing architecture 164 alerts the occupants to the possible invasion and/or deters the intruders by turning on nearby lights, sounding audible warnings, etc. For example, the audible announcement could be an indication that an intrusion is occurring. This will alert the occupants and hopefully scare away the intruder.

According to some embodiments, sound, vibration, and/or motion sensing components of the smart devices are used to detect sound, vibration, and/or motion created when an occupant of the home is under distress, such as when an individual falls and cannot get up. Based on the detected sound, vibration, and/or motion, the central server or cloud-computing architecture 164 makes inferences about the respective occupants of the home and their patterns of movement. These inferences may be enhanced by providing the central server or cloud-computing architecture 164 with age, health, and other information about the individual occupants. For example, the central server or cloud-computing architecture 164 can identify and track the movement through the home of the respective occupants using techniques described herein, such as based on their "signature" or signals emitted from their tracking devices (e.g., mobile phones), and activate a distress alarm when an occupant's movement indicates distress. For example, an elderly occupant may be in distress immediately after making a very swift movement or causes a strong vibration that an elderly person would be incapable of making unless that person were falling. A distress alarm may also be activated when an occupant remains in one position, such as in bed or in a bath, for a period that exceeds a threshold. Further, a distress alarm may be activated upon receiving a verbal command, such as "help", from an occupant.

For example, in the event the central server or cloud-computing architecture 164 detects sounds proximate to windows, doors, and other external entryways while concurrently receiving information that all registered occupants are away from the home or are accounted for and asleep in their respective rooms, the central server or cloud-computing architecture 164 alerts the occupants to the possible invasion and/or deters the intruders by turning on nearby lights, sounding audible warnings, etc.

Turning now to FIGS. 4A-C, illustrations are provided of example embodiments of the smart wall switch 108. According to embodiments, the wall switches 108 enhance the smart-home environment 100 by providing a retrofit wall light switch that, in addition to maintaining the basic character and purpose of a light switch, incorporates a host of sensing, interface, and communications capabilities for enhancing occupant comfort, convenience, and safety.

By virtue of being mounted in place of traditional wall switches, the wall switch 108 has access to plentiful electrical operating power, such as by connecting to wiring (e.g., to 120V "hot" line voltage wires) that is behind the walls 154 of the smart-home environment 100 and that is present at virtually all standard home wall light switches. This essentially unlimited power budget, the near-ubiquity of excellent installation locations throughout the home, and the reasonably ample physical space on its face plate and in its housing to fit the necessary components, combine to enable the wall switch 108 to accommodate a rich and wide variety of sensing, interface, and communications capabilities for the smart-home environment 100, as well as a general platform for the provision of even newer sensing, interface, and communications hardware as it becomes available over the coming decades.

A rich variety of new interactions are made possible between wall switch 108 and other devices of the smart-home environment 100. Occupancy sensing, for example, can be significantly enhanced by virtue of the great locations (usually right next to room doorways) of most wall light switches, allowing for easy tracking of occupants as they transition between rooms, predictive occupancy algorithms, and so forth.

FIGS. 4A-C illustrate example user interfaces and hardware features of the wall switch 108. According to embodiments, at the core of the wall switch 108 is powering circuitry, including a rechargeable battery, for extracting power as needed from the 120V "hot" line voltage wire. The rechargeable battery can either be used as a conventional back-up source or as a reservoir to supply excess DC power if needed for short periods.

As illustrated in FIG. 4A, according to some embodiments, the wall switch 108 is split into two parts: a head unit 404 and a backplate 408. This bifurcation can increase the success and commercial longevity of the wall switches 108 by making them a modular platform consisting of two basic components. According to some embodiments, the backplate 408 is a permanent interface box (sometimes referred to herein as "docking station 408") that serves as a physical connection into the wall and to the 120V line voltage wires or other wiring of the smart-home environment 100, and that contains a AC-to-DC powering circuitry 410. When installed, the docking station 408 may resemble a conventional one-gang or two-gang wall box, except no dangerous high-voltage wires are exposed to the user. According to some embodiments, docking station 408 also includes a cellular wireless interface.

According to some embodiments, the head unit 404 (sometimes referred to herein as "replacement module 404")

actually contains all of the sensors, processors, user interfaces, the rechargeable battery, and so forth. Users can plug and unplug the unit 404 in and out of the docking station 408. Many different commercial and functional possibilities for provisioning, maintenance, and upgrade are possible. For example, after years of using any particular head unit 404, a user will be able to buy a new version of the head unit 404 and simply plug it into the docking station 408. There are also many different versions for the head unit 404, such as an extremely low-cost version that is nothing but a motion occupancy detector and light switch, and then a progression of increasingly-capable versions, up to and including extremely fancy head units 404 with small OLED televisions and high-fidelity mini-speakers. Thus, it should be appreciated that the various versions of the head units 404 can all be interchangeable, with any of them working when placed into any docking station 408. This can advantageously encourage sharing and re-deployment of old head units 404—for example, when an important high-capability head unit 404 (for the kitchen or living room, for example) can be replaced by a great new version of the head unit 404, then the old head unit 404 can be re-deployed in a bedroom or a basement, etc. When first plugged into a docking station 408, the head unit 404 can ask the user (by 2D LCD display, 2D/3D holographic projection, voice interaction, etc.) a few simple questions such as, "Where am I" and the user can select "bedroom" or "living room" and so forth. In other examples, the head unit 404 can provide instructions, such as "Press button once if I am in the kitchen, press twice if I am in the den, etc."

According to some embodiments, the head unit 404 contains a main processor 412, storage 416, display and user interface 424, audio speaker 436, microphone 444, power converter 440, GPS receiver 450, RFID locator 454, and general physical module receiver 458. The head unit 404 further contains wireless and wired networking 462. In view of the ample power availability, a variety of communications capabilities can be provided, including Wi-Fi, ZigBee, 3G/4G wireless, CAT6 wired Ethernet, and even optical fiber from the curb. Furthermore, because the wall switch 108 can be connected to the home 120V system, a HomePlug or other powerline-communications capability can be provided.

Also included are sensors 428 such as temperature, humidity, occupancy, ambient light, fire, smoke, carbon monoxide, active proximity, passive infrared motion, ultrasound, CCD/video camera, etc. A rechargeable battery 432 (or equivalently capable onboard power storage medium) is also included. For example, the battery 432 can be a rechargeable Lithium-Ion battery. In operation, the wall switch 108 charges the battery 432 during time intervals in which the hardware power usage is less than what power stealing can safely provide, and that will discharge to provide the needed extra electrical power during time intervals in which the hardware power usage is greater than what power stealing can safely provide.

The user interface 424 can include one or more visual displays (TFT, OLED, etc.), touchscreen and/or button input capabilities, the audio speaker 436, and so forth. According to the embodiment illustrated in FIG. 4B, the module head unit 404 of smart wall switch 108 has a click-and-rotate annular ring input 460. According to this embodiment, the click-and-rotate annular ring input 460 of the wall switch 108 can be used as a dimming light switch. Further, the click-and-rotate annular ring input 460 can provide menu-driven interfaces for user governance of all its various capabilities. As illustrated in FIG. 4C, an optional 2D image and/or 3D holographic image projector 470, can also be provided so that the effective dimension of the display is not just limited to the physical size of the wall light switch. For example, in smart-home environments 100 that also include smart doorbells 106, the combination of the smart wall switches 108 and the smart doorbells 106 can bring about new features. For example, if a visitor approaches the front door or rings the doorbell 106, the camera in the doorbell 106 can transmit their image to the smart wall switches 108, which can instantly show the image on the dial of the light switch, or project the image in 2D or 3D (holographic) form. Further, for example, the image of the arriving visitor at the front door can be projected only from the smart wall switches 108 of those rooms where occupancy is sensed.

According to one embodiment that is particularly appealing for a lighting control functionality of the described wall switches 108, which are temporarily simply termed 'light switches' for this lighting-control-related embodiment, the light switches in the home, such as the smart-home environment 100, are configured such that at least one of them can be used to control (a) all of the light switches in the home, (b) a single selectable one of the other light switches in the home, and/or (c) one or more selectable groups or sub-groups of the other light switches in the home. This can be particularly convenient, for example, for a light switch that is near the front door (or other entryway commonly used for ingress and egress) of the home. For such an example scenario, an occupant who is the last person to leave the home can simply turn off all lights at once by controlling the single light switch nearest the door. Similarly, a returning occupant can turn on a particular subset of lights (for example, the lights corresponding to a pathway from the front door to the kitchen) all at once by controlling that single light switch. As another advantageous example, a light switch that is in an upstairs master bedroom of the home can be used by the parents to control (a) the lights in all downstairs rooms in the home, (b) the lights leading between the master bedroom and the kitchen, and/or (c) the lights in each of the children's bedrooms.

The above-described provision for mutually controllable or selectively mutually controllable light switches can be extended in other embodiments to similar mutual or selectively mutual control of any population of smart-home controllers that are so amenable. Examples can include mutual or selectively mutual control of irrigation controllers, door opening/closing actuating controllers, entertainment device controllers, computing device controllers, portable plug-in heater controllers, window opening/closing controllers, and so on.

In some embodiments a network-connected smart keypad is provided in the smart home environment 100. According to embodiments, an important underlying functionality of the smart keypad is to control the functionality of security features of the smart-home environment 100. It should be appreciated that the smart keypad is enhanced with a variety of multi-sensing capabilities that, while indeed enhancing home safety and security in many ways, can provide additional functionalities relating to controlling the other smart devices in the home, HVAC control, home energy conservation, intra-home communications, entertainment, etc.

According to embodiments, smart keypad includes powering circuitry, including a rechargeable battery, for extracting power as needed from the 120V "hot" line voltage wire. The rechargeable battery can either be used as a conventional back-up source or as a reservoir to supply excess DC power if needed for short periods.

According to some embodiments, like other smart home devices described herein, the smart keypad is split into two parts: a head unit and a backplate. This bifurcation can increase the success and commercial longevity of the smart keypads by making them a modular platform consisting of two basic components. According to some embodiments, the backplate is a permanent interface box (sometimes referred to herein as "docking station") that serves as a physical connection into the wall and to the 120V line voltage wires or other wiring of the smart-home environment 100, and that contains AC-to-DC powering circuitry. When installed, the docking station may resemble a conventional one-gang or two-gang wall box, except no dangerous high-voltage wires are exposed to the user. According to some embodiments, the docking station also includes a cellular wireless interface.

According to some embodiments, the head unit (sometimes referred to herein as "replacement module") actually contains all of the sensors, processors, user interfaces, the rechargeable battery, and so forth. Users can plug and unplug the unit in and out of the docking station. Many different commercial and functional possibilities for provisioning, maintenance, and upgrade are possible. For example, after years of using any particular head unit, a user will be able to buy a new version of the head unit and simply plug it into the docking station. There are also many different versions for the head unit, such as an extremely low-cost version that is nothing but a user interface, and then a progression of increasingly-capable versions, up to and including extremely fancy head units with small OLED televisions and high-fidelity mini-speakers. Thus, it should be appreciated that the various versions of the head units of the smart keypads and other smart devices can all be interchangeable, with any of them working when placed into any docking station. This can advantageously encourage sharing and re-deployment of old head units—for example, when an important high-capability head unit (for the kitchen or living room, for example) can replaced by a great new version of the head unit, then the old head unit can be re-deployed in a bedroom or a basement, etc. When first plugged into a docking station, the head unit can ask the user (by 2D LCD display, 2D/3D holographic projection, voice interaction, etc.) a few simple questions such as, "Where am I" and the user can select "bedroom" or "living room" and so forth. In other examples, the head unit can provide instructions, such as "Press button once if I am in the kitchen, press twice if I am in the den, etc."

According to some embodiments, the smart keypad contains a main processor, storage, display and user interface, audio speaker, microphone, power converter, GPS receiver, RFID locator, and general physical module receiver. The smart keypad further contains wireless and wired networking. In view of the ample power availability, a variety of communications capabilities can be provided, including Wi-Fi, ZigBee, 3G/4G wireless, CAT6 wired Ethernet, and even optical fiber from the curb. Furthermore, because the smart keypad can be connected to the home 120V system, a HomePlug or other powerline-communications capability can be provided. Accordingly, the smart keypad can be connected to and communicate with the other smart home devices of the smart-home environment 100 and to the central server or cloud-computing system 164.

The smart keypad can include any of the components (e.g., temperature sensor, humidity sensor, occupancy sensor, ambient light sensor, communication equipment, processors, memory, etc.) that are included in any of the other smart home devices (e.g., smart doorbells 106, smart thermostats 102, smart wall switches 108, smart wall plugs 110, etc.) described herein. In some embodiments, the smart keypad is hardwired with a battery backup. In some embodiments, the smart keypad is incorporated into the wall switch 108, whereas in other embodiments the smart keypad can be its own device.

The smart keypad also includes sensors such as temperature, humidity, occupancy, ambient light, fire, smoke, carbon monoxide, active proximity, passive infrared motion, ultrasound, CCD/video camera, etc. As mentioned above, a rechargeable battery is also included (or equivalently capable onboard power storage medium). For example, the battery can be a rechargeable Lithium-Ion battery. In operation, the smart keypad charges the battery during time intervals in which the hardware power usage is less than what power stealing can safely provide, and that will discharge to provide the needed extra electrical power during time intervals in which the hardware power usage is greater than what power stealing can safely provide.

The user interface of the smart keypad can include one or more visual displays (TFT, OLED, etc.), touchscreen and/or button input capabilities, the audio speaker, and so forth. According to embodiments, an optional 2D image and/or 3D holographic image projector can also be provided so that the effective dimension of the display is not just limited to the physical size of the smart keypad. The user interface can be user customized by the home occupants.

The smart keypad can be secured by a user-determined passcode. In some embodiments, the passcode can be a PIN comprising any number and combination of letters and/or numbers. In other embodiments, the passcode can be a phrase. In yet other embodiments, the passcode can be a gesture, which the smart keypad senses using ultrasonic sensors, PIR sensors, etc. In still other embodiments, the passcode is in the form of a unique connect-the-dot pattern, where the user interface displays a plurality of dots (e.g., a grid of dots) and the user moves his or her finger from dot to dot in a unique pattern. Any one of these forms of the passcode, including the gesture and the connect-the-dots pattern, can provide users with a quick and easy way to arm and disarm the alarm system of the home. For example when leaving the home, the user can walk up to the smart keypad and make the unique gesture or input the connect-the-dots pattern to arm the alarm. According to some embodiments, the smart keypad manages a user list, which includes a list of users and corresponding times they can control the keypad to arm/disarm the security system and to control other functions of the smart home. In some cases, the various users may identify themselves to the smart keypad using unique identification numbers and access codes, including the passcodes described above. Further, in some cases, the smart keypad may be capable of recognizing a user based on the user's "digital fingerprint", such as by wirelessly identifying the user's mobile electronic device 166.

According to embodiments, the smart keypad includes a "light your path" feature, whereby the smart keypad activates a light when it senses that a user is approaching in darkness or near darkness. For example, in the event the user approaches the smart keypad in the middle of the night, the smart keypad may activate nearby lights in the home or a light incorporated in the smart keypad itself (e.g., LED) to provide a lighted pathway for the user. In one example, the smart keypad is incorporated in a wall light switch, and the smart keypad activates the light associated with the wall switch when a user is approaching the smart keypad. In some examples, upon detecting an approaching user when the security system is armed, the smart keypad or other devices of the home or the server 164 can send notification to the occupants' mobile devices or other electronic devices. Also, for example, the smart keypad can send a notification message to the occupants' mobile devices any time the alarm system is armed or disarmed by a user.

According to embodiments, the smart keypad is "smash and bash" resistant. For example, in the event the home's alarm system is armed and the smart keypad is smash (e.g., by an intruder attempting to disarm the alarm by bashing the keypad), the alarm remains armed. In some cases, upon being smashed, the smart keypad triggers the alarm and executes pre-configured actions, such as notifying police and/or other emergency personnel.

According to embodiments, the smart keypad or other devices in the home are capable of assigning user-defined gestures to actions or sets of actions. For example, the user may program the smart keypad with a "panic gesture" that causes the smart keypad, other devices in the smart home, or the server 164 to notify authorities, such as by calling or otherwise notifying medical, police, etc. Such a panic gesture may be, for example, the user quickly waving his or her hands in the air. The user may also program the smart keypad or other devices in the home with an audible panic command. For example, when the user yells "help", then medical, police, etc. may be called or otherwise notified. In other examples, the smart keypad can include a panic button that the user can press to call the police, medical, etc.

According to embodiments, the smart keypad or any of the other smart-home devices have the ability to display customer messages, such as via a display on the device itself or by projection. For example, in the event a child is sleeping, the smart doorbell 106 may display, "Baby is sleeping. Do not ring." In other embodiments, the smart keypads and other devices are capable of projecting or displaying messages. For example, when a person is at the front door, the keypads may project a message, such as "Someone's at the door". This would be good for situations where the users have deactivated, or the smart home has automatically deactivated, the doorbell and/or other audible notifications because some or all of the occupants are sleeping. These messages would also be useful for hearing impaired occupants. The smart keypads and other devices could also project or display warning messages, such as "Evacuate" due to possible intruder, fire, CO, etc. The message could be projected in large font on walls, floors, ceilings, etc. And the message could provide additional information. For example, the message could be "Intruder detected in den", "Fire detected in kitchen", etc.

According to embodiments, the smart keypad and the other smart devices are used as a platform for running home applications. For example, the smart keypad has the capability of downloading and/or executing applications that enable users to control their smart homes. For example, the user could install a "thermostat" app that can be accessed and controlled from any of the smart devices in the home, including the smart keypads, to control the home's HVAC. The user could also install a "security" app, for example. It should be appreciated that the number and type of apps that could be download and installed are endless.

Figure 5:
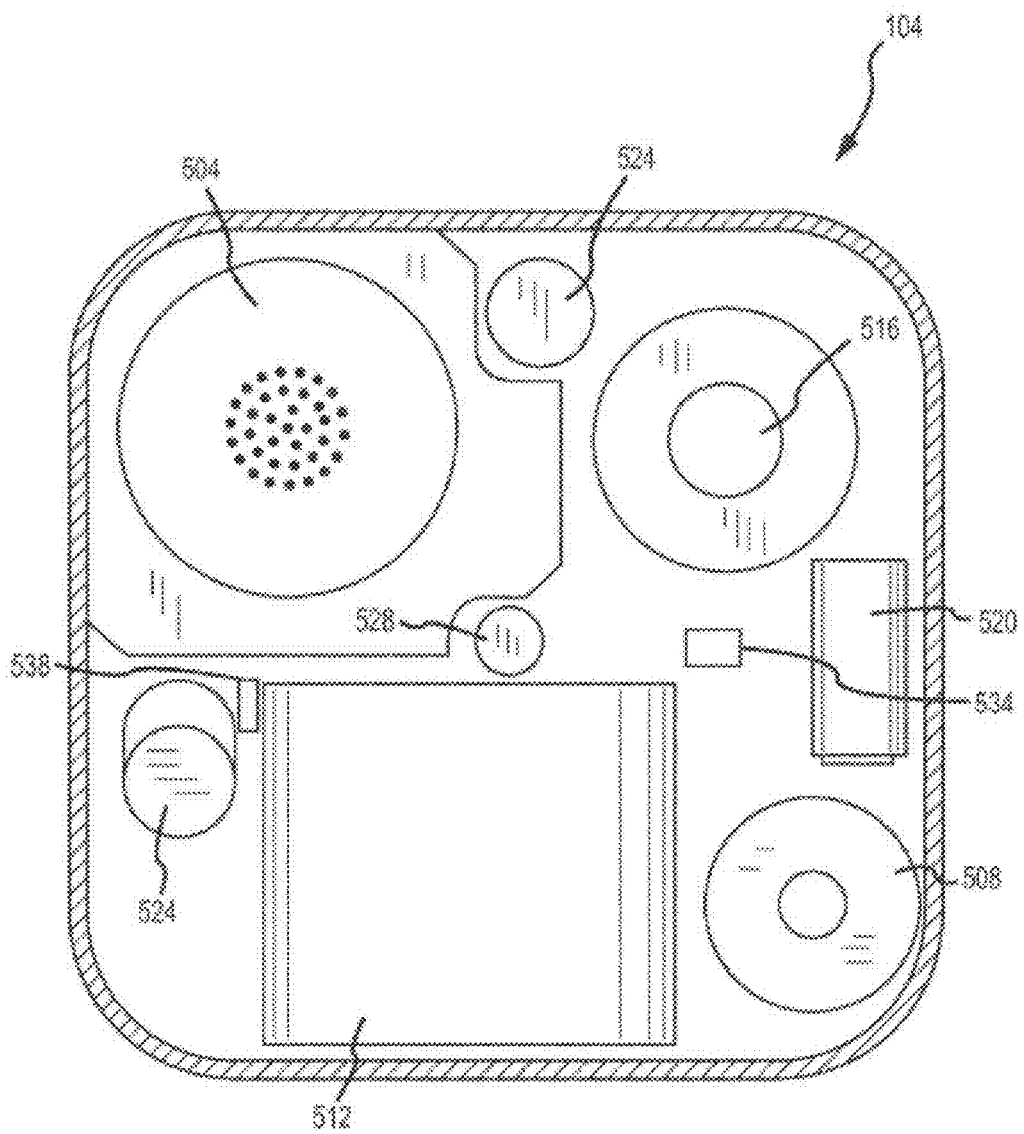
FIG. 5 is a simplified block diagram illustrating components of an intelligent, multi-sensing, network-connected hazard detector, according to at least one embodiment.

Turning now to FIG. 5, an illustration is provided of an example embodiment of the smart hazard detector 104. According to embodiments, an important underlying functionality of each smart hazard detector 104 is for smoke detection, fire detection, and carbon monoxide detection (more generally, "hazard detection") and associated audible alarming, via a speaker 504 and a buzzer 508. However, it should be appreciated that the smart hazard detector 104 is further enhanced with network-connectedness and a variety of multi-sensing capabilities that, while indeed enhancing home safety and security in many ways, can provide additional functionalities relating to HVAC control, home energy conservation, intra-home communications, and entertainment. In some embodiments, the smart hazard detector 104 complies with the standards as required by Underwriter Laboratories (UL) for detecting smoke, heat, and carbon monoxide. For example, the smart hazard detector meets the alarm response time requirements of UL standard 2034, which are as follows: at 70 PPM, the detector 104 must alarm within 60-240 minutes; at 150 PPM, the detector 104 must alarm within 10-50 minutes; and at 400 PPM, the detector 104 must alarm within 4 to 15 minutes.

According to embodiments, the smart hazard detector 104 is a retrofit designed to replace older hazard detectors. Although not shown in the figures, the smart hazard detector 104 may comprise two primary components: a head unit 404 and a backplate or docking station 408. The head unit comprises the sensors, battery, processor, storage, and other components, while the docking station serves as a physical connection into the wall and, if applicable, to the 120V line voltage wires or other wiring of the smart-home environment 100. When installed, the docking station may resemble a conventional backplate for a tradition hazard detector. Users can plug and unplug the head unit in and out of the docking station. Thus, many different commercial and functional possibilities for provisioning, maintenance, and upgrade are possible. For example, after years of using any particular head unit, a user will be able to buy a new version of the head unit and simply plug it into the docking station. There are also many different versions for the head unit 404, such as an extremely low-cost version that is nothing but a smoke detector, and then a progression of increasingly-capable versions, up to and including extremely fancy head units. Thus, it should be appreciated that the various versions of the head units can all be interchangeable, with any of them working when placed into any docking station. This can advantageously encourage sharing and re-deployment of old head units—for example, when an important high-capability head unit (for detecting hazards in the kitchen, for example) can replaced by a newer version, then the old head unit can be re-deployed in a bedroom or a basement, etc. When first plugged into a docking station, the head unit can ask the user (by 2D LCD display, 2D/3D holographic projection, voice interaction, etc.) a few simple questions such as, "Where am I" and the user can select "bedroom" or "living room" and so forth.

There can be substantial overlap between the smart hazard detector 104 and the wall switch 108, as well as the other devices of the smart-home environment 100 with respect to processing, sensing, user interface, and communications capabilities. The smart hazard detector 104 may be a low-power consuming device that is powered by battery 512 and that includes a low-power communication chip (such as a ZigBee chip) and may participate as a low-power node in the mesh network of the smart-home environment 100 by generating and transmitting messages, relay messages from other devices, as well as by "listen" and sometimes making a corresponding response. However, it should be appreciated that instead of or in addition to being battery powered, the smart hazard detector 104 may be powered by AC voltage from the home. In some embodiments, the smart hazard detector 104 includes a WiFi chipset that enable it to communicate its status to other devices in the smart-home environment 100, to user mobile devices 166, to the central server or cloud-computing system 164, as well as to external managed security services. It should be appreciated that smart hazard detector 104 is microprocessor driven and that the WiFi chip may contain extra processing capacity for controlling all or some operations of the smart hazard detector 104. In some embodiments, a separate processor is provided.

According to the illustrated embodiment, the smart hazard detector 104 includes a smoke detector 516, which comprises a smoke photodiode, a detector, and a smoke chamber. The smoke photodiode may be, for example, an IR LED. Alternatively, instead of IR, a visible light LED or a laser may be provided. In some embodiments, the detector may be a photon silicon photomultiplier chip. The smoke photodiode and the detector may be programmed to execute a duty cycle every ten seconds, or so. For example, every ten seconds the photodiode and the detector will do an X-axes microsecond smoke test. The photodiode and the detector also execute self-calibration tests at predetermined intervals.

Further, the smart hazard detector 104 includes a carbon monoxide sensor 520, which can be either an electrochemical sensor or a metal oxide semiconductor. Additionally, the smart hazard detector 104 may include a temperature sensor, a humidity sensor for reducing false alarms associated with showering and cooking, and an ambient light sensor, such as a single pixel that measures the brightness of the room.

The smart hazard detector 104 may be provided with occupancy detecting capabilities. According to an embodiment, one or more ultrasonic sensors 524 are provided for motion detecting. However, it should be appreciated that in addition to or instead of the ultrasonic sensors 524, one or more passive IR (PIR) sensors 528 are provided for occupancy sensing. Having multiple ultrasonic sensor 524 and/or passive IR sensors 528 enhance the occupancy sensing capabilities of the detector. Because they are typically mounted in unobstructed locations, high on walls of often-occupied rooms, smart hazard detectors 104 are particularly well suited for occupancy detection, such as by the use of RFID, ultrasonic sensors, etc. The smart hazard detector 104 may also include a thermopile 534 for flame-heat detection. As it is well known in the art, the thermopile or thermo-camera 534 is a group of thermo couples that take infrared light and correlate that to flame heat. In some instances, this is advantageous because the thermo-camera looks into the room and gives advanced warning of heat. Thus, the thermo-camera 534 is able to "see" heat before the heat actually makes its way to the smart hazard detector 104. In some embodiments, a PIR sensor 528 may be replaced with an optical CCD sensor. In some embodiments, a Fresnel lens may be provided within detector 104 as a true optical imaging lens for light in the visible spectrum. The CCD sensor may provide optical pictures and/or video of individuals and/or objects within the room and within the field of view of the CCD sensor. The lens may also serve as a user-pressable button. In other embodiments, a PIR sensor 528, a Fresnel lens, and/or CCD sensor may be incorporated in any of a variety of different smart-home devices, such as security cameras, doorbells, garage door openers, entertainment devices, and so forth. Essentially, these components may be incorporated into any device where an occupancy detecting function of a PIR sensor and/or CCD sensor might be useful and/or where there is a need for a front selectable button.

According to embodiments, technologies including the sensors of the smart hazard detector 104 in combination with rules-based inference engines or artificial intelligence provided at a central server such as 164 are used to reduce the number of false alarms. For example, inferences about the occupants' activities can be learned based on data received over time. For example, if the smart hazard detector 104 located in the kitchen observes increased temperature, humidity, and motion in the kitchen, then an inference can be made that one or more of the occupants are cooking ("cooking inference"). These data inputs can be considered on a sliding scale based on time of day and day of week. For example, only slight increases temperature and humidity may invoke the cooking inference at 5 pm on weekdays, when history shows that when the occupants typically cook. However, much larger increases are required to invoke the cooking inference at 10 am on a weekday, when the occupants are typically away at that time. In some embodiments, when the cooking inference is made, the smart hazard detector 104 in the kitchen becomes less sensitive, whereas the hazard detectors 104 in other room remain in normal operation.

In some embodiments, the smart hazard detector 104 is equipped with one or more air quality sensors 538. For example, the air quality sensors 538 may "sniff" for volatile organic compounds (VOCs) that may be present in the house. Thus, the smart hazard detector 104 can warn users when there are toxins in the user's home, such as when the user is burning a paraffin wax candle. Paraffin is a by-product of petroleum and has been shown to release an alarming range of (VOCs), such as toluene and benzene. Also, for example, the air quality sensors 538 can "sniff" for gas leaks in the house, such as by detecting methane, which is commonly added to natural gas so as to make natural gas detectable. This "sniffing" capability is not only good for houses, but also for schools and hospitals. Individuals will find peace of mind knowing such detection is in widespread use. Further, as houses get more and more sealed, air quality detection will grow in importance. Further, the air quality sensors 538 can measure levels of particulate, dust, pollen, mold, etc. for detection.

In addition to measuring air quality and detecting harmful VOCs, the smart hazard detector 104 is capable of transmitting this information to the other devices in the home as well as the central server or cloud-computing system 164. For example, in some embodiments, when there are elevated levels of patent harmful gases, particulate, dust, pollen, mold, etc. in the home, the smart hazard detector 104 can transmit this information to the central server or cloud-computing system 164, which communicates with other nodes in the home and just outside of the home, such as the smart doorbell 106, and assess whether the inside air or the outside air is purer. If the outside air is purer, then the central server or cloud-computing system 164 instructs the smart thermostat 102 to open a vent to permit fresh air into the home, otherwise it instructs the thermostat 102 to recirculate air in the home and to not draw in outside air. Furthermore, the central server or cloud-computing system 164, upon receiving the air quality information from the hazard device 104, can send detailed information about the air quality to the mobile device 166 of user. For example, the air quality information may identify the specific types of toxins, particulate, dust, pollen, mold, etc. in the air. This can help the user identify which pollen, etc. the user is allergic to. Further, the central server or cloud-computing system 164 can use the air quality information to provide the user with medication recommendations (e.g., be sure to take you allergy pills today). Furthermore, the central server or cloud-computing system 164 can aggregate data received from multiple homes in various geographic locations and provide, for example, smog alerts, pollen warnings, etc.

According to some embodiments, the smart hazard detector 104 may include a carbon dioxide ($CO_2$) sensor for fire detection, where the detector includes a passive IR detector from lead selenide. Fire produces CO, $CO_2$, and infrared light. The intensity of the infrared light emitted by the flame is pretty constant, until it passes through the layer of $CO_2$ produced by the fire. However, the frequency of light having a wavelength of 4.26μ excites $CO_2$ molecules when the light contacts the $CO_2$. In response, the $CO_2$ absorbs the infrared light having a wavelength of 4.26μ, thereby decreasing the intensity of the light at this wavelength. Thus, to detect fire, a narrow optical bandpass filter is placed in front of the lead selenide IR detector to permit only light having a wavelength 4.26μ to pass through to the lead selenide IR detector. In the event of fire, the lead selenide detects the decrease in intensity of light at a wavelength of 4.26μ and triggers the fire alarm.

According to embodiments, technologies including the sensors of the smart hazard detector 104 in combination with rules-based inference engines or artificial intelligence provided at a central server such as 164 are used to warn occupants of dangerous conditions in the home. For example, an inference can be made that an occupant is burning a candle based of the qualities (e.g., intensity, wavelength, frequency, etc.) of the light and/or the toxins begin released into the air. Further, an inference can be made that the occupant in the room has fallen asleep when the occupant is in the room and has not moved for a predetermined period of time. In situations where a candle is burning and the occupant has fallen asleep, the smart hazard detector 104 in that room will sound an alarm to wake up the occupant. In other example, the smart hazard detector 104 can sound an alarm or send an alert text or email message when it detects dangerous conditions in unoccupied rooms, such as when the stove is left on in the kitchen.

In the event a fire does occur in the home, technologies including the sensors of the hazard detectors 104 in combination with rules-based inference engines or artificial intelligence provided at a central server such as 164 are used to determine the cause. For example, the smart hazard detector 104 can detect that the fire started in the kitchen, and the smart hazard detector 104 can detect an active stove, candle, etc. was left unattended in the kitchen just before the fire started. Additionally, a central server such as 164 can aggregate data from multiple homes that experienced a fire, analyze the data to find patterns and reconstruct what caused the fires, and share this information with fire departments.

In some embodiments, the smart hazard detector 104 is mounted in a location that is out-of-reach of the occupants, such as high on a wall or on a ceiling. Thus, in the event of a false alarm, the occupants cannot reach the smart hazard detector 104 to press a button that deactivates the alarm. Accordingly, embodiments of the smart hazard detector 104 allow for occupants to deactivate the alarm using "silence gestures". For example, the smart hazard detector 104 detects a particular "silence gesture" from one of the occupants and, in response, deactivates the alarm.

According to embodiments, the one or more ultrasonic sensors 524 of the smart hazard detector 104 are used to detect the "silence gesture" of the occupant. In some embodiments, each of the ultrasonic sensors 524 may contain multiple piezos so as to make the sensor "omni-directional" and to make it easier to detect when an occupant is making a silence gesture. Using ultrasonic sensors 524 in battery-powered versions of the smart hazard detector 104 is particularly advantageous because ultrasonic sensors 524 consume very little power. The ultrasonic sensors 524 work by sending out pulses and then calculate the time interval between sending the pulse and receiving the echo to determine the distance to an object. In some embodiments, a single piezo of the ultrasonic sensor sends the pulse and receives the echo. In other embodiments, separate piezos send pulses and receive echoes.

During normal operation, the ultrasonic sensors 524 of the smart hazard detector 104 are merely performing occupancy sensing functions. For example, they are determining whether the room is occupied. When performing this function, the ultrasonic sensors 524 have a ping rate of about one hertz. This low ping rate is designed to preserve battery power, while still effectively perform occupancy detection. However, when one of the other sensors, such as the smoke, fire, or carbon monoxide sensors, activates the alarm, the smart hazard detector 104 increases the ping rate, such as up to twenty hertz. The increased ping rate better enables detection of "silence gestures", which are only made when the alarm is activated. When detecting a "silence gesture", the ultrasonic sensors 524 are "looking for" an object, such as a human hand, to remain within in a predefined distance from the smart hazard detector 104 for a specified period.

Figure 6:
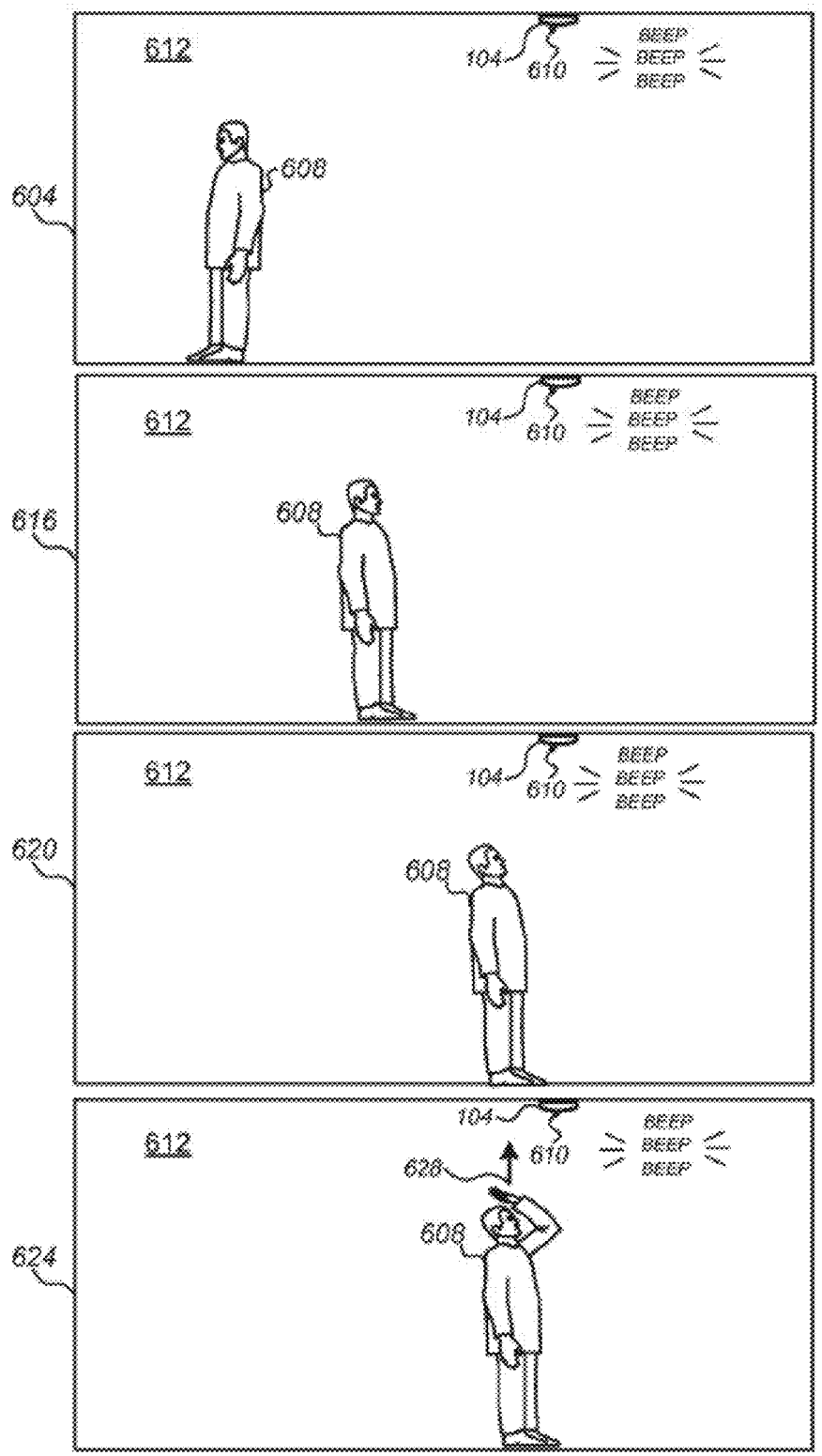
FIGS. 6-7 are schematic diagrams illustrating a silence gesture for remotely deactivating an alarm, according to at least one embodiment.

An example "silence gesture" will be described with references to FIGS. 6 and 7. As shown in FIG. 6 at block 604, an occupant is standing in room 612 while an alarm in hazard detector 104 is active and making a "BEEP" sound. A light 610, such as an LED, is provided on an outer portion of the smart hazard detector 104, such that the occupant 608 can see the light 610 when it is turned on. The operation of the light 610 will be described with reference to FIG. 7. Suffice to say for FIG. 6, the light is turned off in blocks 604 through 624. As shown at block 616, the occupant 608 has walked to a position closer to the smart hazard detector 104, which is mounted out of reach on the ceiling of the room. As shown at block 620, the occupant 608 walked to a position even closer to the smart hazard detector 104, such that the occupant 608 is almost directly under the smart hazard detector 104. As shown at arrow 628 of block 624, the occupant 608, while standing almost directly under the smart hazard detector 104, is beginning to extend an arm upward, toward the smart hazard detector 104.

Figure 7:
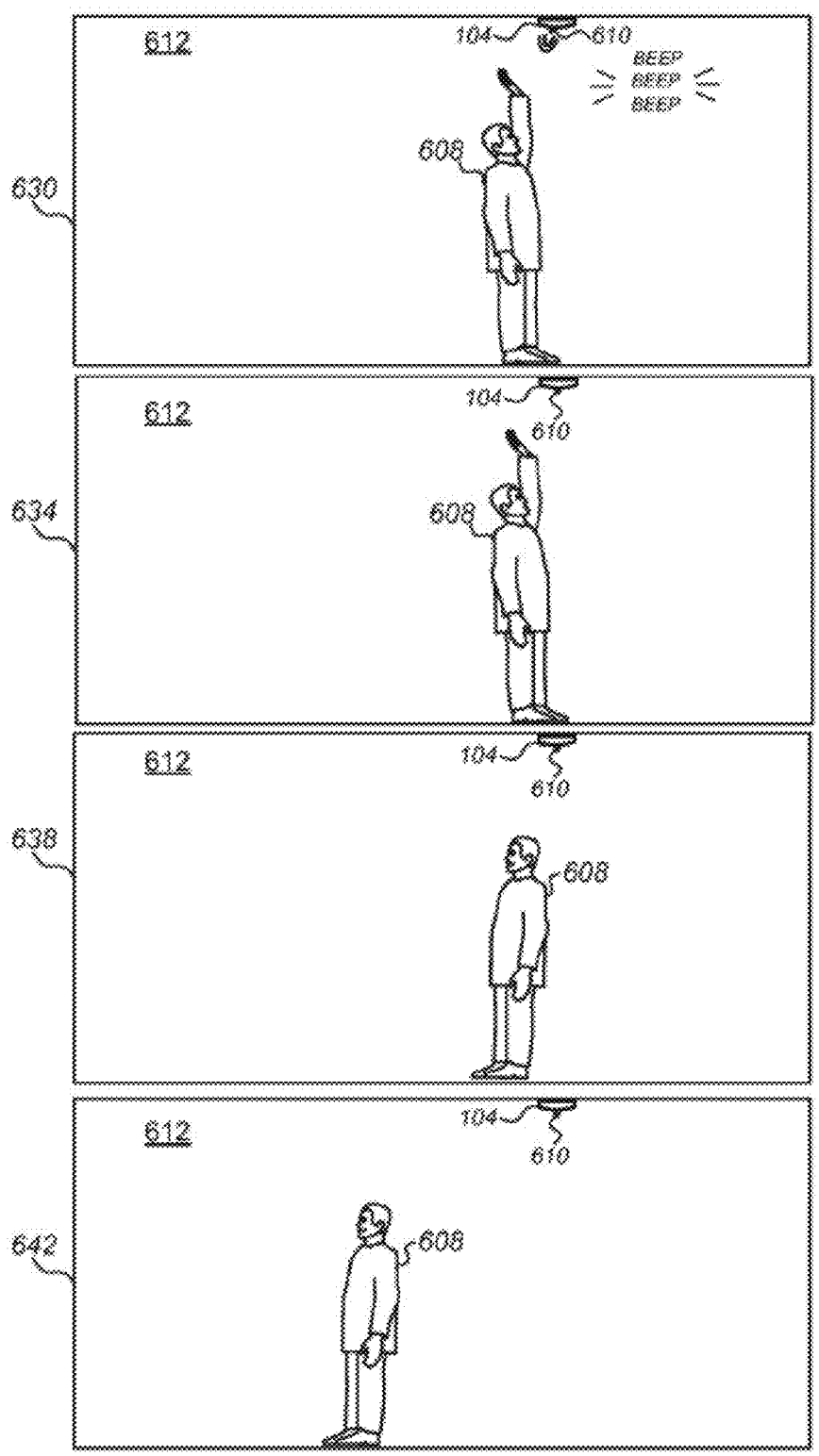

Referring now to block 630 of FIG. 7, the arm of the occupant 608 is extended upward, toward the smart hazard detector 104, while the occupant is standing almost directly under the smart hazard detector 104. After an alarm sounds and the pulse rate increases, the ultrasonic sensor of the smart hazard detector 104 "looks" for a trigger to the "silence gesture" period, which is the amount of time the "silence gesture" must be maintained to deactivate the alarm. According to some embodiments, the trigger is a distance change from a baseline, and to deactivate the alarm the distance change must be maintained for the entire "silence gesture" period (e.g., three seconds). For example, if the baseline is a distance between the sensor and the floor of the room, then the sensor is looking for an object to come in between it and the floor, thereby changing the distance measured by the pulse. In some embodiments, the distance change must be significant enough to ensure that someone is close and likely intends to silence the alarm. For example, if the distance to the floor is ten feet, then the requisite distance change could be eight feet or eighty percent of the original distance. As such, the object would be required to be within two feet of the sensor to trigger the "silence gesture" period, and to deactivate the alarm the object must remain there for the duration of the period. The requisite distance change can be configured based on the height of the ceiling and based on the height of the occupants, among other things.

Referring still to block 630, the light 610 is turned on when the occupant 608 successfully triggers the "silence gesture" period, thereby signaling to the occupant 608 to remain in the position for the requisite period, such as three seconds. Here, the hand of the occupant 608 triggered the "silence gesture" period. A tolerance is built in such that if the occupant 608 slightly moves and loses but quickly regains the signal, the "silence gesture" period will continue without having to start over. As shown in block 634, the occupant kept the hand in within the requisite distance of the sensor for the duration of the "silence gesture" period and, thus the alarm has been deactivated, the "BEEP" has stopped, and the light 610 has turned off. As shown at blocks 638 and 642, the occupant 608 can walk away from the smart hazard detector 104 and resume normal activity.

It should be appreciated that, in the event the smart hazard detector 104 is of a design that receives reliable power from the wiring of the home (rather than being battery powered), a CCD chip could be used to detect the "silence gesture". However, such an arrangement is not suitable for battery-powered hazard detectors 104 because the CCD chips and associated processing consume a large amount of power and would quickly drain the battery. Other possible alternatives to ultrasonic sensors 524 include passive IR sensors, thermopile (e.g., thermo-cameras), laser-distance measuring, laser and a camera combination because a camera looks for dot instead of time of arrival (doppler shift), and a full on camera and image processing system.

According to some embodiments, to enhance the reliability and effectiveness of the silence gesture, the ultrasonic sensor 524 could work in concert with one or more optical sensors to make the sensing even better. For example, when an occupant attempts to silence by placing a hand in field, the optical sensor will sense the presence of the occupant's hand, and thereby trigger the "silence gesture" period. The ultrasonic sensor 524 could also work in concert with the optical sensor after the "silence gesture" period has been triggered, where the ultrasonic sensor detects the occupant's changing hand distance, and the optical sensor detects the occupant's changing hand distance using proximity and heat techniques.

According to some embodiments, the ultrasonic sensor 524 could work in concert with the passive IR sensor. For example, when an occupant attempts to silence by placing a hand in field, the passive IR will sense this, and thereby trigger the "silence gesture" period. The ultrasonic sensor 524 could also work in concert with the thermopile (e.g., thermo-camera), where both distance change and heat are used to detect the silence gesture. For example, the thermo-camera detects when a human hand is nearby and triggers the "silence gesture" period. Further, the ultrasonic sensor 524 could work in concert with the ambient light sensor. For example, when the occupant places a hand in the field and blocks light, then the ambient light sensor know the occupant is nearby and thus triggers the "silence gesture" period.

It should be appreciated that, according to embodiments, similar "gesture" controls can be applied to other smart devices in the home, such as to the smart thermostat, the smart wall switches, etc. For example, there can be gestures for increasing or decreasing temperature controls, for turning on and off lights, HVAC, etc.

Figure 8A:
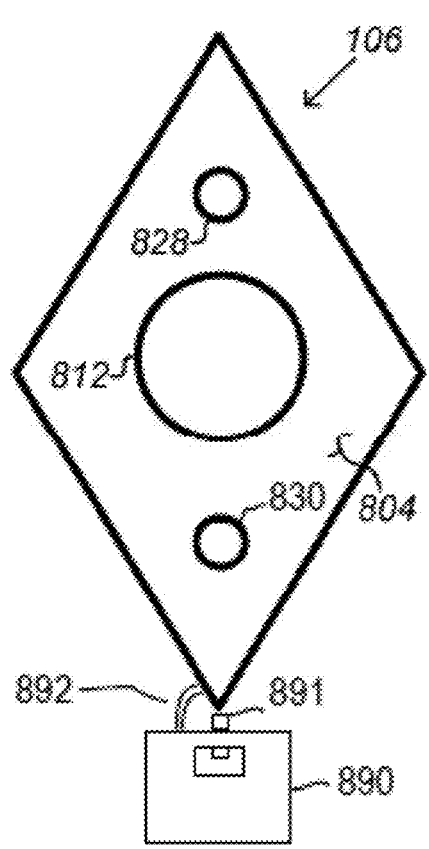
FIGS. 8A-C are simplified block diagrams illustrating components of an intelligent, multi-sensing, network-connected entryway interface device, according to at least one embodiment.
Figure 8B:
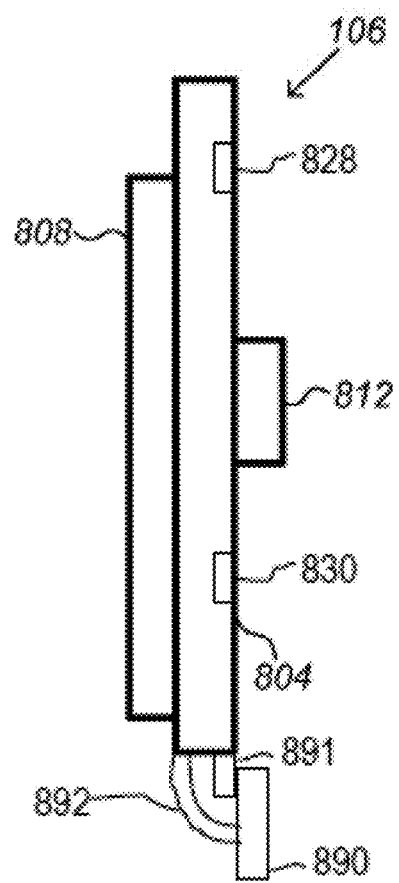
Figure 8C:
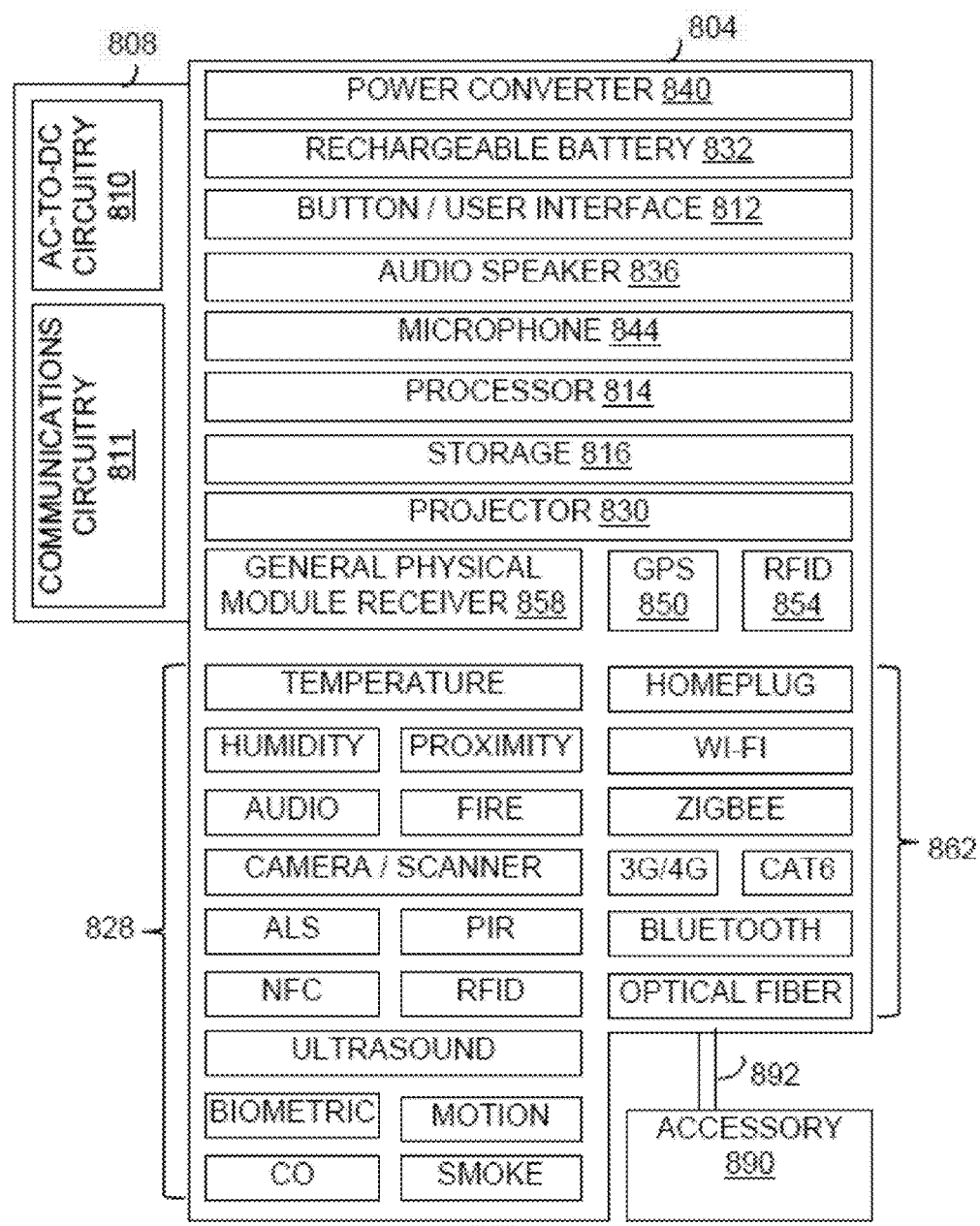

Turning now to FIGS. 8A-8C, illustrations are provided of an example embodiment of a smart doorbell 106. According to embodiments, an important underlying functionality of the smart doorbell 106 is to serve as a home entryway interface unit, providing a doorbell functionality (or other visitor arrival functionality), audio/visual visitor announcement functionality, and like functionalities. Like the smart hazard detector 104 described above with reference to FIGS. 5-7, the smart doorbell 106 is further enhanced with network-connectedness and a variety of multi-sensing capabilities to accommodate additional functionalities, and there can be substantial overlap/integration among the smart doorbell 106, the smart hazard detector 104, the smart wall switch 108, and the smart wall plug 110 that leverages their combined processing, sensing, and communications capabilities, as well as their access to cloud-based control and intelligence.

In some embodiments, the smart doorbell 106 is connected to the wiring of the smart-home environment 100. For example, as is common in many homes, a 24V low voltage wire is provided at the outer entry points of the home, such as at the front, back, and side doors. The smart doorbell 106 can be connected to this 24V low voltage wire to obtain steady and reliable power. However, it should be appreciated that the smart doorbell could include a battery for the purpose of replacing or supplementing power obtained from the home wiring. In some embodiments, the battery could be a rechargeable battery, such as a rechargeable Lithium-Ion battery, for extracting power as needed from the house wiring (e.g., 24V low voltage wire). For example, the smart doorbell 106 could charge the battery during time intervals in which the doorbell's power usage is less than what the 24V low voltage wire can safely provide, and that will discharge to provide the needed extra electrical power during time intervals in which the hardware power usage is greater than what the 24V low voltage wire can safely provide. Thus, the rechargeable battery could be used as a conventional back-up source or as a reservoir to supply excess DC power if needed for short periods.

As illustrated in FIG. 8B, according to some embodiments, the smart doorbell 106 includes two parts: a head unit 804 and a backplate 808, which is also referred to as a docking station 808. This bifurcation can increase the success and commercial longevity of the doorbells 106 by making them a modular platform consisting of two basic components. As with the wall switches 108 and the hazard detectors 104, this bifurcation can increase the success and commercial longevity of the smart doorbells 106 by making them a modular platform. The docking station 808 is a permanent interface box that serves as a physical connection into an area near the entry way, such as a doorframe or outer wall of the home, and to the voltage wires of the home. According to some embodiments, the head unit 804 (sometimes referred to herein as "replacement module 804") actually contains all of the sensors, processors, user interfaces, the rechargeable battery, and so forth. Users can plug and unplug the unit 804 in and out of the docking station 808. Many different commercial and functional possibilities for provisioning, maintenance, and upgrade are possible. For example, after years of using any particular head unit 804, a user will be able to buy a new version of the head unit 804 and simply plug it into the docking station 808. There are also many different versions for the head unit 804, such as low-cost versions with few features, and then a progression of increasingly-capable versions, up to and including extremely fancy head units 804 with a large number of features. Thus, it should be appreciated that the various versions of the head units 804 can all be interchangeable, with any of them working when placed into any docking station 808. This can advantageously encourage sharing and re-deployment of old head units 804—for example, when an important high-capability head unit 804 (for the front door, for example) can be replaced by a great new version of the head unit 804, then the old head unit 804 can be re-deployed to a back or basement door, etc. When first plugged into a docking station 808, the head unit 804 can ask the user (by 2D LCD display, 2D/3D holographic projection, voice interaction, etc.) a few simple questions such as, "Where am I" and the user can select "front door" or "back door" and so forth.

Sensor devices such as temperature, humidity, occupancy, ambient light, fire, smoke, carbon monoxide, active proximity, passive infrared motion, any other suitable motion sensing component, ultrasound, CCD/video camera, bar code scanner, etc., as well as I/O devices such as speakers, user interfaces, 2D/3D projectors, etc., are provided in the head unit 804. The sensors and I/O devices are generally represented at 828.

According to embodiments, technologies including the sensors 828 in combination with rules-based inference engines or artificial intelligence provided at a central server such as 164 are used to detect when packages are delivered to the door of the smart-home environment 100, and to take a variety of automated actions in response. According to some embodiments, the sensors 828 can "see" the uniform of the delivery person approaching the door or the truck of the delivery person, or the sensors can "hear" the truck in combination with a person approaching the door within a period after hearing the truck. Once the person is with a predetermined distance from the door, the smart doorbell 106, using its speaker, asks the person if he or she is a delivery person, to which that person can reply with an audible response or by indicating as such on the user interface of the doorbell. If the person is making a delivery, the doorbell can instruct the person to place the package in a location proximate the doorbell 106 such that its scanner can scan the bar code or other type of identifying tag affixed to or associated with the package being delivered.

According to embodiments, a central server, such as server 164, can use the bar code to obtain information about the package, such as the sender, recipient, a description of the item therein, whether signature is required, etc. Based on this information the rules-based inferences engines or artificial intelligence can make inference regarding which action to take next. For example, if occupants or more particularly if the specified recipient or recipients are in the home and the package is from a sender or contains an item that is of particular interest to the one or more occupants, an announcement can be made in the home, indicating the package is currently being dropped off and providing details about the package. On the other hand, if the sender or item is not of particular interest to one of the occupants based on the occupants past responses to receiving such deliveries, then no announcement will be made and the occupants can discover the package in due course. Similarly, if no occupants are home but an inference is made that the package is of particular interest to one of the occupants, a text message, email, phone call, etc. can be made (e.g., by server 164) to the one or more identified occupants, indicating that the package in being delivered.

According to embodiments, in the event signature is required for the package but none of the occupants are home an inference is made to not disturb the occupants, the smart doorbell can provide authorization to leave the package. For example, the doorbell 106 presents an authorization code (either in plain text, barcode, or encrypted forms) on its user interface and prompts the delivery person to use his or her handheld device to record, scan, photograph, or otherwise acquire the authorization code. Once the authorization code has been acquired by the delivery person, the doorbell 106 can then instruct the delivery person regarding where to leave the package, such as at the front door, around the back of the house in a discrete location, etc.

According to embodiments, technologies including the sensors 828, such as noise, motion, and/or facial recognition detection, in combination with rules-based inference engines or artificial intelligence provided at a central server, such as server 164, are used to detect when one or more unknown individuals are approaching the home. A number of learned inferences can be made in this situation. For example, during late evening hours, an alarm will be sounded in the house, giving notice of the approaching person and/or the doorbell 106 may audibly announce to the individual that he or she is being monitored by a home security system. Further, in the event the person attempts to enter a door, window, or other access point to the home, a message will be sent to local law enforcement. However, during day time hours when one or more occupants are at home, a learned inference can be made to take no action, such as when a meter reader, mail carrier, garbage collector, etc. is approaching the house as per a reasonably predictable and learned schedule.

According to embodiments, the smart doorbell 106 provides a context-based entry keypad. In some examples, the entry keypad can be projected, such as via a 2D/3D holographic projection. In other examples, the entry keypad can be rendered on a display such as a 2D LCD display. Persons standing proximate to the smart doorbell 106 can enter a code into the keypad to obtain access to the smart-home environment 100. According to embodiments, the occupants of the home get context-based keypads and/or access codes. For example, the parents get a more sophisticated keypad that provides a variety of controls, whereas children get a simple keypad into which they can enter their access code. Further, non-occupants get context-based keypads, too. For example, a delivery person gets one keypad, whereas uncategorized individuals get another keypad. According to some embodiments, the keypad can vary based on factors such as time of day, current news (e.g., any recent crime in the neighborhood?), proximity of security guards and other law enforcement personnel, and which, if any, occupants are currently at home. For example, if there is a nearby security guard, then the keypad requests a three-digit access code or no access code at all, rather than the usual ten-digit access code. In another example, if no one is home or if only children or elderly people are at home, then a ten-digit code is required. However, if the parents of the children or the adult children of the elderly are at home then no access code is required or only a three-digit code is required. If the approaching person is identified as a guest, then the keypad prompts the guest to enter the guest access code assigned to him or her. It should also be appreciated that individuals are prompted to input their access code as they leave the home, too. This way the codes of the guests, the occupants, and recognized categories of strangers (e.g., a delivery person) can be used to track the goings and comings of those people. It should be appreciated that this keypad can be provided on any smart device in the home, such as the wall switch 108, the thermostat 102, hazard detector 104, and the wall plug 110.

According to embodiments, when the central server such as server 164, based on information received from the doorbell 106, such as noise and motion data, determines that the street adjacent to the home has a threshold level of traffic, the inferences are made regarding the safety of the children residing at the home. For example, an alarm can be triggered in the home in the event one or more of the children are detected by the occupancy sensing to be outside of the home. This alert enables the parents or other caretakers to quickly take actions to protect the child from the traffic. Further, for example, automatic adjustments are made to audio equipment in the home to account for the increased traffic noise, such as by increasing the volume a proportionate amount.

As discussed, the sensors 828 may include temperature and humidity sensors, the data from which may be used for a number of useful services. For example, the outside humidity and temperature data is considered by the thermostat 102 when controlling the HVAC to best accomplish the occupants' desired comfort preferences. Further, for example, this information may be presented to the occupants through a number of user interfaces, such as a user interface associated with another one of the devices located inside of the home, the television, mobile and other computing devices, or audibly. In some instances, a central server such as server 164 collects this information from a plurality of smart homes across a plurality of geographic locations. This aggregated data may be sold to weather services or may be used to provide weather data to smart home occupants.

According to embodiments, the smart doorbell 106 includes a button 812 that, upon being touched, depressed, or otherwise activated, causes an audible, visual, or otherwise detectable audible notification to be broadcasted within the home or a message to be sent to user interfaces of devices within the home or to a mobile device associated with occupants of the home. Learned inferences can be made regarding the appropriate response to activation of the button 812. For example, the audible notification is only broadcast in occupied rooms, or rooms occupied by one or more occupants who have a relationship with the person at the door, or no alarm is sounded in rooms where occupants, such as small children, are determined to be sleeping. Also, for example, the occupant-selected songs, such as uploaded MP3's, may be broadcast in the home, where different songs may be broadcast for different occupants at home at the time or based on the identity of the person at the door. Further, for example, technologies and sensors at the smart doorbell 106 may identify the person based on facial recognition or based on other characteristics such as the manner in which the person approached the door. For example over time, based on input received from the smart doorbell 106, a central server can build up an address book of profile data about people who approach the door, such as some identifying biometric data. For example, the address book can be built over time using low-resolution data such as ultrasonic, passive IR, etc. to create a unique signature for individuals. This combined data from different domains becomes almost like a fingerprint regarding how that person approaches the house. In some instances, when a "familiar" person approaches the door, the smart doorbell 106 "asks" the person if he is "John Doe", to which the person can verbally or physically respond. Upon obtaining this information John Doe's name or image can be announced or projected on device in the home and/or John Doe will be given certain access rights to the home, such as for example the door will automatically unlock as he approaches. Further, in addition to or instead of identification based on these unique "signatures", individuals may enable their mobile devices to communicate with the smart doorbell 106, such as via BLUETOOTH, NFC, or other wireless protocols. Also, for example, individuals may "swipe" their smart phones in front of the smart doorbell's MD scanner. Upon identifying the individual, the smart doorbell may give the individual certain access right to the home, such as by automatically unlocking the door.

According to embodiments, technologies including the sensors 828 in combination with rules-based inference engines or artificial intelligence provided at a central server, such as server 164, also make learned decisions.

According to embodiments, a home monitoring and control system is provided that may include one or more hazard detectors with wireless capability and occupancy detectors and audio speakers, and a doorbell having a processor and wireless capability. A doorbell-ringing event may trigger the processor to cause the doorbell to wirelessly communicate with one or more of the hazard detectors to cause the audio speakers to alert occupants of a visitor at the door. In some embodiments, each hazard detector can be configured with a do-not-disturb setting such that it will remain silent under one or more pre-determined conditions. According to embodiments, the pre-determined conditions may include one or more of an occupant determined to be sleeping proximate to the hazard detector, room location of hazard detector is unoccupied, hazard detector is located in an occupied bedroom, and hazard detector is located in a kid's bedroom.

Figure 9:
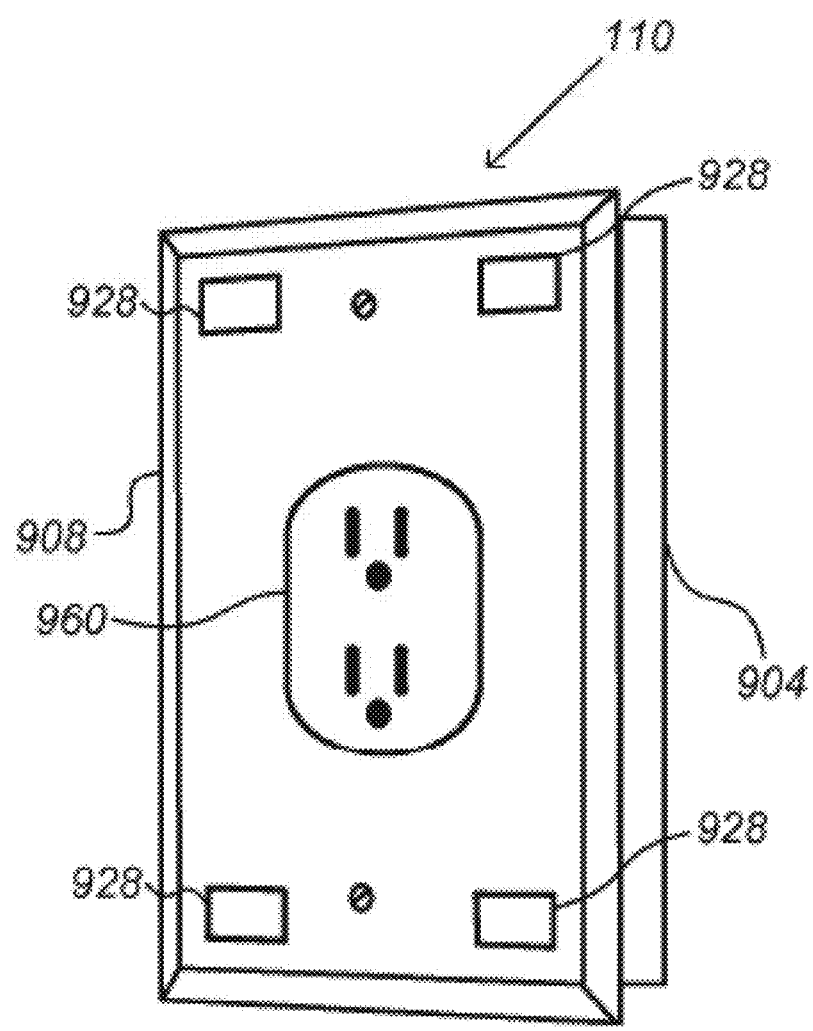
FIG. 9 is a schematic diagram illustrating an intelligent, multi-sensing, network-connected wall plug, according to at least one embodiment.

Turning now to FIG. 9, an illustration is provided of an example embodiment of a smart wall plug 110. According to embodiments, the smart wall plugs 110 enhance the smart-home environment 100 by providing a retrofit wall plug that, in addition to maintaining the basic character and purpose of a wall plug, incorporates a host of sensing and communication capabilities for enhancing occupant comfort, convenience, and safety. Much like the smart wall switches 108, by virtue of being mounting in place of traditional wall plugs, the smart wall plugs 110 have access to plentiful electrical operating power, such as by connecting to wiring (e.g., to 120V "hot" line voltage wires) that is located behind the walls 154 of the smart-home environment 100 and that is present at virtually all standard home wall plugs. This unlimited power budget, the numerous installation locations throughout the home, and the reasonably ample physical space in its housing to fit the necessary components, combine to enable the smart wall plugs 110 to accommodate a rich and wide variety of sensing and communications capabilities for the smart-home environment 100, as well as a general platform for the provision of even newer sensing and communications hardware as it becomes available. In addition to numerous installation locations inside the home, there are numerous outdoor locations outside of the home, too. For example, smart wall plugs may 110 may be mounted on the outside surface of external walls of the smart-home environment, and thereby may connect to the same wiring (e.g., to 120V "hot" line voltage wires) as do the indoor wall plugs.

A rich variety of new interactions are made possible between the smart wall plugs 110 and other devices of the smart-home environment 100. Occupancy, motion, or presence sensing, for example, can be enhanced by virtue of the numerous installation locations of wall plugs inside and outside of the home, albeit some of these locations are hidden behind furniture or in locations where people are unlikely to go. According to embodiments, the smart wall plugs 110 can include all or some of the components that are included in the wall switch 108, as illustrated in FIGS. 4A-C. For example, the smart wall plugs 110 can be comprised of two primary parts: a head unit 908 and a docking station 904, which is a permanent interface box that serves as a physical connection into the wall and to the 120V line voltage wires or other wiring of the smart-home environment 100. This bifurcation can increase the success and commercial longevity of the smart wall plugs 110 by making them a modular platform consisting of two basic components. According to embodiments, the head unit 908 contains the sensors, processors, the I/O devices and receptacles, and so forth. Users can upgrade and/or redistribute wall plug functionality throughout the home by plugging and unplugging head units of varying capabilities in and out of the docking stations in various locations throughout the home. For example, to enhance security of the smart-home environment 100, head units 908 having advanced motion sensing capabilities can be plugged into docking stations located in areas having clear lines of sight to entry points, such as doorways and windows. Further, these head units 908 can be plugged into docking stations location in areas having clear lines of sight in commonly occupied rooms, rather than behind furniture in or unused rooms. As discussed, these head units may be capable of wirelessly communicating detected motion and can therefore serve as a "tripwire" for the home security system, either inside the home or outside the home. For example, smart wall plugs 110 located outside the home, such as on external walls near windows and doors provide outdoor tripwires that alert the central server or cloud-computing system 164 to the presence of intruders before unwelcome entry into the home even occurs. Also, for example, head units having advance communication capabilities are plugged into docking stations associated with high-energy consuming appliances, such as a clothes dryer. As discussed, these head units may be capable of wirelessly communicating with smart meters and corresponding providing power to the clothes dryer at off-peak hours. Because this head unit may be located behind a clothes dryer in a rarely-occupied laundry room, it is unnecessary for this head unit to include advanced occupancy sensors, for example.

According to some embodiments, the head unit 908 includes a standard duplex receptacle 960 having upper and lower outlets, each having three slots. The head unit 908 further contains some or all of a main processor, storage, audio speaker, microphone, power converter. GPS receiver, RFID locator, etc. Additionally, the head unit 908 may include wireless and wired networking. In view of the ample power availability, a variety of communications capabilities can be provided, including Wi-Fi, ZigBee, 3G/4G wireless, CAT6 wired Ethernet, and even optical fiber from the curb. According to embodiments, the smart wall plugs 110 are spokesman nodes in the mesh network described above. For example, the smart wall plugs 110 regularly send out messages regarding what they are sensing and, in addition to sending out their own messages, the smart wall plugs 110 repeat messages from other smart devices in the mesh network, thereby causing the messages to travel from node to node (i.e., smart device to smart device) throughout the smart-home environment 100. As spokesman nodes in the smart-home environment 100, the smart wall plugs 110 are able to "drop down" to low-powered communication protocols to receive messages from low-power nodes, translate the messages to other communication protocols, and send the translated messages to other spokesman nodes and/or the central server or cloud-computing system 164. Thus, the smart-wall plugs 110 enable the low-powered nodes using low-power communication protocols to send messages across the entire smart-home environment 100 as well as over the Internet 162 to the central server or cloud-computing system 164. For example, battery operated smart hazard detectors 104 are able to preserve their limited power resource, yet also communicate with the enteral server or could-computing system 164 in real time or near real time by sending messages in low-power protocols to the wall plugs 110 which repeat the messages in high-power protocols, which are transmitted to the central server or cloud-computing system 164. According to embodiments, the mesh network enables the central server or cloud-computing system 164 to regularly receive data from all of the smart devices in the home, make inferences based on the data, and send commands back to individual one of the smart devices to accomplish some of the smart-home objectives descried herein.

Furthermore, because the smart wall plug 110 can be connected to the home 120V system, a HomePlug or other powerline-communications capability can be provided (See FIGS. 4A-C for example illustrations of such components being provided on a wall switch 108). It should also be appreciated that the smart wall plugs 110 may include sensors 928 such as temperature, humidity, occupancy, ambient light, fire, smoke, carbon monoxide, active proximity, passive infrared motion, ultrasound, CCD/video camera, an ambient light sensor, such as a photoresistor or a single-pixel sensor that measures light in the room, etc.

In some examples, the wall plug 110 may include or be associated with a light source having variable intensity and color, and can therefore function in a manner similar to the smart nightlight 170 described above. In some embodiments, the light source of the wall plug 110 is configured to activate when the ambient light sensor detects that the room is dark and/or when the occupancy sensor detects a person's presence or movement. The color and intensity of the light source can be adjusted based on information received from sensor of the wall plug 110 or from other smart devices in the smart-home environment. For example, in the event the central server or cloud-computing system 164 triggers an alarm indicating unauthorized intrusion (e.g., based on motion detection data received from smart devices in the home), the light source associated with the smart wall plugs 110 can be activated. In this example, the light sources associated with the wall plugs 110 can emit a high-intensity red-colored light to indicate that an emergency is occurring and to cause any intruder to leave the home.

According to embodiments, the smart wall plugs 110 wirelessly communicate with smart meters, which are electrical meters that record consumption of electric energy in time intervals and then transmits that information a local radio receiver, which forward the information to utility companies. Utility companies use this data to charge varying rates. For example, power used midday during peak hours is more expensive than energy used at night during off-peak hours. The smart wall plugs 110 communicate with the smart meter of the home to obtain power-usage data. This data can be forwarded to a central server such as server 164. Rules-based inference engines or artificial intelligence provided at a central server such as 164 to make decisions regarding how to efficiently operate certain appliances in the home, so as to reduce energy costs, yet also satisfy the occupants' preferences. For example, decisions are made regarding use appliances for non-essential tasks at night (e.g., wash dishes at night), and to permit essential tasks when necessary (e.g., allow refrigerator compressor to turn on mid-day).

According to other embodiments, the smart wall plugs 110 wirelessly communicate with a central server such as server 164. Rules-based inference engines or artificial intelligence provided at a central server such as 164 make security-related decisions based on data received from the smart wall plugs 110. For example, decisions are made regarding when to trigger an alarm, when to turn on lights, when to send a warning to the owner's mobile device or to the neighborhood network. Furthermore, the intelligence of the central process can be used for safety. For example, the central server can be programmed with safe operating parameters for each application in the smart home, and can shutoff power to the appropriate wall plug 110 when the corresponding application deviates from its safe operating parameters. Also for example, in the event data from an occupancy sensor on a particular wall plug 110 indicates that a small child is really close to the wall plug, the central server may shut off power to that plug. Further, users can remotely control, such as by use of their mobile device, the outlets in the home. For example, a parent may want to shutoff power to all wall plugs 110 in their child's room, or that are outside of the home and there is some risk that a child may be attracted to the plug.

Figure 10A:
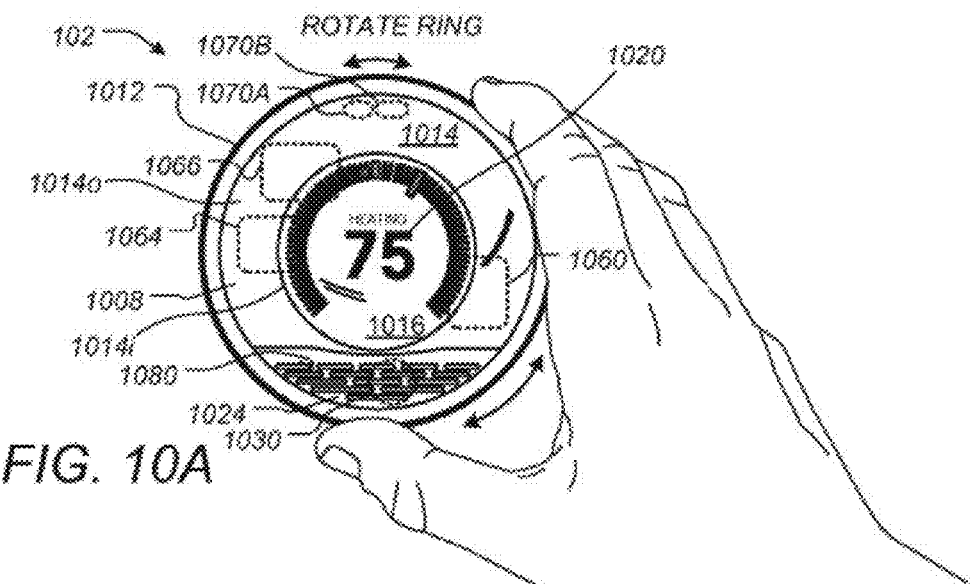
FIGS. 10A-C are schematic diagrams illustrating an intelligent, multi-sensing, network-connected thermostat, according to at least one embodiment.
Figure 10B:
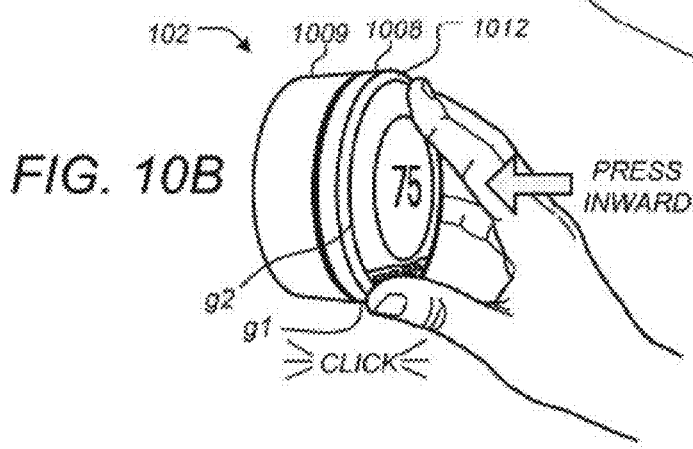

Turning now to FIGS. 10A-B, illustrations of a smart thermostat 102 are provided, according to some embodiments. Unlike many prior art thermostats, smart thermostat 102 preferably has a sleek, simple, uncluttered and elegant design that does not detract from home decoration, and indeed can serve as a visually pleasing centerpiece for the immediate location in which it is installed. Moreover, user interaction with smart thermostat 102 is facilitated and greatly enhanced over known conventional thermostats by the design of smart thermostat 102. The smart thermostat 102 includes control circuitry and is electrically connected to an HVAC system, such as is shown with unit 102 in FIG. 1. Smart thermostat 102 is wall mounted, is circular in shape, and has an outer rotatable ring 1012 for receiving user input. Smart thermostat 102 is circular in shape in that it appears as a generally disk-like circular object when mounted on the wall. Smart thermostat 102 has a large front face lying inside the outer ring 1012. According to some embodiments, smart thermostat 102 is approximately 100 mm in diameter.

The outer rotatable ring 1012 allows the user to make adjustments, such as selecting a new target temperature. For example, by rotating the outer ring 1012 clockwise, the target temperature can be increased, and by rotating the outer ring 1012 counter-clockwise, the target temperature can be decreased. The smart thermostat 102 may be configured to receive a plurality of types of inputs by virtue of the rotatable ring 1012, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 1012 may include a component that may be physically rotated, or, in other embodiments, a static component that may sense a user's virtual rotation of the ring. For some embodiments, the outer rotatable ring 1012 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the smart thermostat 102, or the area may be a different color than neighboring areas.

For preferred embodiments such as those of FIG. 10A in which the outer ring 1012 is a continuous loop without fiducial markers, one or more advantages are brought about. Thus, a user may physically rotate the ring (in embodiments in which the ring is configured to be physically rotatable) regardless of a starting position of the ring. Further, a user may select, e.g., a value of a variable (e.g., select a particular menu, a particular setpoint temperature value, etc.) by rotating the ring multiple times. This feature may be particularly advantageous as the user does not need not to worry about precise rotations in order to select a desired option.

The front face of the smart thermostat 102 comprises a clear cover 1014 that according to some embodiments is polycarbonate, and a metallic portion 1024 preferably having a number of slots formed therein as shown. According to some embodiments, the surface of cover 1014 and metallic portion 1024 form a common outward arc or spherical shape gently arcing outward, and this gentle arcing shape is continued by the outer ring 1012.

Although being formed from a single lens-like piece of material such as polycarbonate, the cover 1014 has two different regions or portions including an outer portion 1014*o* and a central portion 1014*i*. According to some embodiments, the cover 1014 is painted or smoked around the outer portion 1014*o*, but leaves the central portion 1014*i* visibly clear so as to facilitate viewing of an electronic display 1016 disposed thereunderneath. According to some embodiments, the curved cover 1014 acts as a lens that tends to magnify the information being displayed in electronic display 1016 to users. According to some embodiments the central electronic display 1016 is a dot-matrix layout (individually addressable) such that arbitrary shapes can be generated, rather than being a segmented layout. According to some embodiments, a combination of dot-matrix layout and segmented layout is employed. According to some embodiments, central display 1016 is a backlit color liquid crystal display (LCD). An example of information displayed on the electronic display 1016 is illustrated in FIG. 10A, and includes central numerals 1020 that are representative of a current setpoint temperature.

Particular presentations displayed on the electronic display 1016 may depend on detected user input. For example, one of a plurality of variables (e.g., current setpoint temperature versus learning status) or variable values (e.g., 65 degrees versus 75 degrees) may be displayed. The one being displayed may depend on a user's rotation of the outer rotatable ring 1012. Thus, for example, when the device is configured to display a current setpoint temperature, the value being displayed may gradually increase as the user rotates the ring in a clockwise direction. The sign of the change in the displayed temperature may depend on whether the user is rotating the ring in a clockwise or counterclockwise direction. The speed at which the displayed temperature is changing may depend (e.g., in a linear manner) on the speed at which the user is rotating the ring.

As described above, a displayed characteristic may vary depending on received user input. For example, a displayed temperature may increase as a user rotates the outer rotatable ring 1012 clockwise, or a highlighted indicator may progress across a list of displayed options as the user rotates the ring 1012. Further, or additionally, user inputs may cause the appearance of new types of information. For example, if a user is viewing setpoint-temperature options, a dramatic clockwise rotation may cause a flashing red symbol (to convey an anti-environmental message). Thus, a relationship may exist between a single type of user input (e.g., ring rotation) and a change in an active variable (e.g., setpoint temperature changes), and relationships may further exist between the single type of user input and an inactive variable (e.g., an environmental warning flag). The latter relationship may be indirect and depend on a value or change in values of the active variable.

The presentations on the electronic display 1016 may depend on one or more types of user input. For example, the display may change in a first manner (e.g., to show a varying selection option) as a user rotates the outer rotatable ring 1012 and may change in a second manner (e.g., to confirm a selection or default to a menu screen) as the user exerts inwards pressure on the outer rotatable ring 1012.

According to some embodiments, metallic portion 1024 has a number of slot-like openings so as to facilitate the use of a passive infrared motion sensor 1030 mounted therebeneath. The metallic portion 1024 can alternatively be termed a metallic front grille portion. Further description of the metallic portion/front grille portion is provided in the commonly assigned U.S. Ser. No. 13/199,108 (U.S. Pat. No. 8,727,611, issued May 20, 2014). The design of the metallic portion 1024 compliments the sleek, simple, uncluttered and elegant design of smart thermostat 102 while facilitating the integration and operation of sensors located within a housing of the thermostat. In the implementation as illustrated, smart thermostat 102 is enclosed by housing with a forward-facing surface including the cover 1014 and the metallic portion 1024. Some implementations of the housing include a back plate and a head unit. The housing provides an attractive and durable configuration for one or more integrated sensors used by smart thermostat 102 and contained therein. In some implementations, the metallic portion 1024 may be flush-mounted with the cover 1014 on the forward-facing surface of housing. Together the metallic portion 1024 as incorporated in housing does not detract from home or commercial decor, and indeed can serve as a visually pleasing centerpiece for the immediate location in which it is located.

The metallic portion 1024 is designed to conceal sensors from view promoting a visually pleasing quality of the thermostat yet permitting them to receive their respective signals. Openings in the metallic portion 1024 along the forward-facing surface of the housing allow signals to pass through that would otherwise not pass through the cover 1014. For example, glass, polycarbonate or other similar materials used for cover 1014 are capable of transmitting visible light but are highly attenuating to infrared energy having longer wavelengths in the range of 10 microns, which is the radiation band of operation for many passive infrared (PIR) occupancy sensors. Notably, included in the smart thermostat 102, according to some preferred implementations, is an ambient light sensor (not shown) and an active proximity sensor (not shown) positioned near the top of the thermostat just behind the cover 1014. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 1014 are not highly attenuating. In some implementations, the metallic portion 1024 includes openings in accordance with one or more implementations that allow the longer-wavelength infrared radiation to pass through the openings towards a passive infrared (PIR) motion sensor 1030 as illustrated. Because the metallic portion 1024 is mounted over the radiation receiving surface of PIR motion sensor 1030, PIR motion sensor 1030 continues to receive the longer wavelength infrared radiation through the openings and detect occupancy in an enclosure.

Additional implementations of the metallic portion 1024 also facilitate additional sensors to detect other environmental conditions. The metallic portion may at least partly conceal and/or protect one or more such sensors. In some implementations, the metallic portion 1024 helps a temperature sensor situated inside of the thermostat's housing measure the ambient temperature of air. Openings in the metallic portion 1024 promote air flow towards a temperature sensor located below the metallic portion 1024 thus conveying outside temperatures to the interior of the housing. In further implementations, the metallic portion 1024 may be thermally coupled to a temperature sensor promoting a transfer of heat from outside the housing.

The smart thermostat 102 is preferably constructed such that the electronic display 1016 is at a fixed orientation and does not rotate with the outer ring 1012, so that the electronic display 1016 remains easily read by the user. For some embodiments, the cover 1014 and metallic portion 1024 also remain at a fixed orientation and do not rotate with the outer ring 1012. According to one embodiment in which the diameter of the smart thermostat 102 is about 80 mm, the diameter of the electronic display 1016 is about 45 mm. According to some embodiments an LED indicator 1080 is positioned beneath portion 1024 to act as a low-power-consuming indicator of certain status conditions. For, example the LED indicator 1080 can be used to display blinking red when a rechargeable battery of the thermostat is very low and is being recharged. More generally, the LED indicator 1080 can be used for communicating one or more status codes or error codes by virtue of red color, green color, various combinations of red and green, various different blinking rates, and so forth, which can be useful for troubleshooting purposes.

Motion sensing as well as other techniques can be used in the detection and/or prediction of occupancy, as it is described further in the commonly assigned U.S. Ser. No. 12/881,430, supra (U.S. Pat. No. 8,510,255, issued Aug. 13, 2013). According to some embodiments, occupancy information is used in generating an effective and efficient scheduled program. Preferably, an active proximity sensor 1070A is provided to detect an approaching user by infrared light reflection, and an ambient light sensor 1070B is provided to sense visible light. The proximity sensor 1070A can be used to detect proximity in the range of about one meter so that the smart thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The ambient light sensor 1070B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the smart thermostat 102 is controlled by only two types of user input, the first being a rotation of the outer ring 1012 as shown in FIG. 10A (referenced hereafter as a "rotate ring" or "ring rotation" input), and the second being an inward push on an outer cap 1008 (see FIG. 10B) until an audible and/or tactile "click" occurs (referenced hereafter as an "inward click" or simply "click" input). For the embodiment of FIGS. 10A-10B, the outer cap 1008 is an assembly that includes all of the outer ring 1012, cover 1014, electronic display 1016, and metallic portion 1024. When pressed inwardly by the user, the outer cap 1008 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 10A-10B, an inward click can be achieved by direct pressing on the outer ring 1012 itself, or by indirect pressing of the outer ring by virtue of providing inward pressure on the cover 1014, metallic portion 1024, or by various combinations thereof. For other embodiments, the smart thermostat 102 can be mechanically configured such that only the outer ring 1012 travels inwardly for the inward click input, while the cover 1014 and metallic portion 1024 remain motionless. It is to be appreciated that a variety of different selections and combinations of the particular mechanical elements that will travel inwardly to achieve the "inward click" input are within the scope of the present teachings, whether it be the outer ring 1012 itself, some part of the cover 1014, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 1012 has been found particularly advantageous, since the user's fingers do not need to be lifted out of contact with the device, or slid along its surface, in order to go between ring rotations and inward clicks. Moreover, by virtue of the strategic placement of the electronic display 1016 centrally inside the rotatable ring 1012, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra (U.S. Patent Application Publication No. 2012/0130546), U.S. Ser. No. 29/386,021, supra (U.S. Design patent No. D660, 732, issued May 29, 2012), and U.S. Ser. No. 13/199,108 (U.S. Pat. No. 8,727,611, issued May 20, 2014).

Figure 10C:
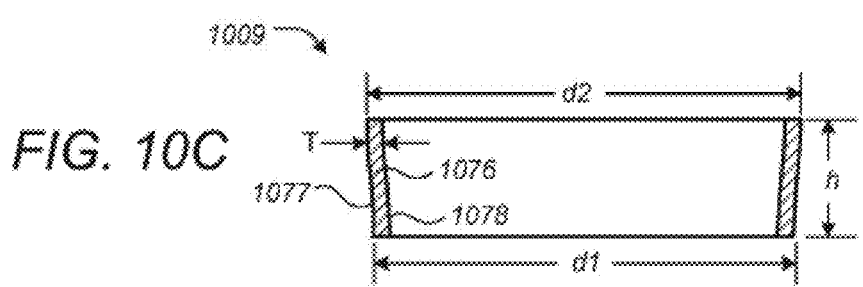

FIG. 10C illustrates a cross-sectional view of a shell portion 1009 of a frame of the thermostat of FIGS. 10A-B, which has been found to provide a particularly pleasing and adaptable visual appearance of the overall smart thermostat 102 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 1009 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and textures even when viewed from many different angles. The shell portion 1009 has the shape of a frustum that is gently curved when viewed in cross-section, and comprises a sidewall 1076 that is made of a clear solid material, such as polycarbonate plastic. The sidewall 1076 is backpainted with a substantially flat silver- or nickel-colored paint, the paint being applied to an inside surface 1078 of the sidewall 1076 but not to an outside surface 1077 thereof. The outside surface 1077 is smooth and glossy but is not painted. The sidewall 1076 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 10C. The outer ring 1012 of outer cap 1008 is preferably constructed to match the diameter d2 where disposed near the second end of the shell portion 1009 across a modestly sized gap g1 therefrom, and then to gently arc back inwardly to meet the cover 1014 across a small gap g2. It is to be appreciated, of course, that FIG. 10C only illustrates the outer shell portion 1009 of the smart thermostat 102, and that there are many electronic components internal thereto that are omitted from FIG. 10C for clarity of presentation, such electronic components being described further hereinbelow and/or in other ones of the commonly assigned incorporated applications, such as U.S. Ser. No. 13/199,108 (U.S. Pat. No. 8,727,611, issued May 20, 2014).

According to some embodiments, the smart thermostat 102 includes a processing system 1060, display driver 1064 and a wireless communications system 1066. The processing system 1060 may be disposed within a housing of smart thermostat 102, coupled to one or more temperature sensors of smart thermostat 102 and/or coupled to rotatable ring 1012. The processing system 1060 may be configured to dynamically identify user input via rotatable ring 1012, dynamically identifying a variable value (e.g., a setpoint temperature value), and/or dynamically identify an HVAC-control-related property. The processing system 1060 may be configured and programmed to provide an interactive thermostat menuing system on display area 1016 responsive to an inward pressing of rotatable ring 1012 (e.g., such as for asking questions or otherwise obtaining data from users during interactive information-exchange sessions, as described in commonly-assigned U.S. patent application Ser. No. 13/440,910 (now U.S. Patent Application Publication No. 2013/0268125), which is hereby incorporated by reference herein in its entirety) and/or to provide user navigation within the interactive thermostat menuing system based on rotation of rotatable ring 1012 and inward pressing of rotatable ring 1012 (e.g., such as is described in relation to FIG. 5). The processing system 1060 may be adapted to cause the display driver 1064 and display area 1016 to display information to the user and/or to receive user input via the rotatable ring 1012.

For example, an active variable (e.g., variable-value selection, setpoint selection, ZIP-code selection) may be determined based on a default state, smart logic or previously received user input. A relationship between the variable and user input may be identified. The relationship may be, e.g., linear or non-linear, continuous or discrete, and/or saturating or non-saturating. Such relationships may be pre-defined and stored within the thermostat. User input may be detected. Analysis of the user input may include, e.g., identifying: a type of user input (tapping versus rotation), a degree of input (e.g., a degree of rotation); a final input position (e.g., a final angular position of the rotatable ring); an input location (e.g., a position of a tapping); and/or a speed of input (e.g., a speed of rotation). Using the relationship, the processing system 1060 may then determine a display indicator, such as a digital numerical value representative of an identified value of a variable (e.g., a setpoint temperature). The display indicator may be displayed on display area 1016. For example, a digital numerical value representative of a setpoint temperature to be displayed may be determined based on a prior setpoint value and a saturating and continuous relationship between rotation input and the temperature. The displayed value may be, e.g., numeric, textual or graphical.

The processing system 1060 may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value.

The processing system 1060, according to some embodiments, is capable of carrying out the governance of the operation of smart thermostat 102 including the user interface features described herein. The processing system 1060 is further programmed and configured to carry out other operations as described further hereinbelow and/or in other ones of the commonly assigned incorporated applications. For example, processing system 1060 is further programmed and configured to maintain and update a thermodynamic model for the enclosure in which the HVAC system is installed, such as described in U.S. Ser. No. 12/881,463 (U.S. Pat. No. 8,606,374, issued Dec. 10, 2013). According to some embodiments, the wireless communications system 1066 is used to communicate with devices such as personal computers and/or other thermostats or HVAC system components, which can be peer-to-peer communications, communications through one or more servers located on a private network, and/or communications through a cloud-based service.

It should be appreciated that the smart thermostat 102 could be equipped with a tactile mechanical feedback feature for providing software-triggered mechanical feedback to encourage energy efficient user behavior. For example, in the event a user attempts to input an ill-advised temperature setting (e.g., a setting that consumes a large amount of energy), the tactile mechanical feedback features provide the user with negative mechanical feedback, such as by vibrating, making the ring hard or impossible to turn.

Further, it should be appreciated that any of the smart devices described herein, such as the smart hazard detector, the smart thermostat, the smart wall switch, the smart doorbell, etc., could have means for self-generating power and optionally storing the generated power in a local battery. For example, in some embodiments, the smart devices include a Peltier Junction for generating power. In these embodiments, for example, the Peltier Junction generates electricity from heat differentials created between the smart device and its mounting location, such as when the smart device gets hot from use. In other embodiments, the smart devices are equipped with generators, such as piezoelectric devices that generate electricity when the device is physically used, such as when a user turns the ring on the smart thermostat. While piezoelectric devices are used in this example, it should be appreciated that any generator devices known to those having skill in the art could be used.

Figure 15:
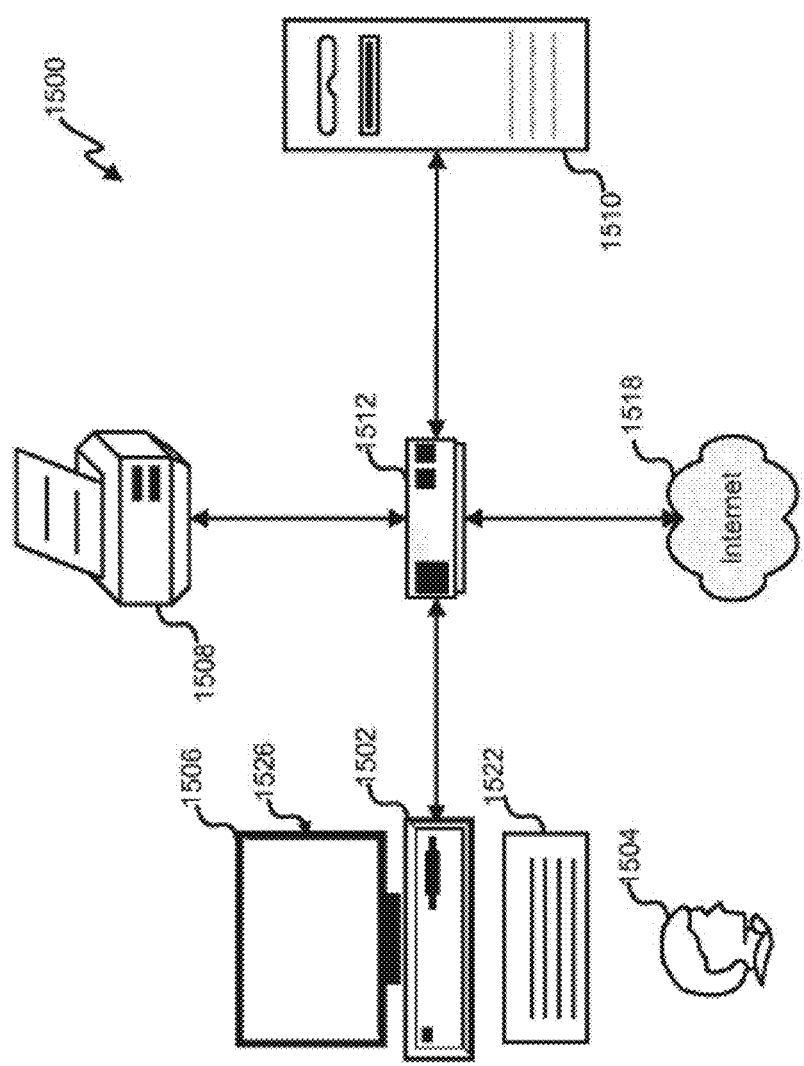
FIG. 15 illustrates a block diagram of an embodiment of a computer system, according to at least one embodiment.

Referring next to FIG. 15, an example environment with which embodiments may be implemented is shown with a computer system 1500 that can be used by a user 1504 to remotely control, for example, one or more of the sensor-equipped, network-connected smart-home devices according to one or more of the embodiments. The computer system 1510 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 1500 can include a computer 1502, keyboard 1522, a network router 1512, a printer 1508, and a monitor 1506. The monitor 1506, processor 1502 and keyboard 1522 are part of a computer system 1526, which can be a laptop computer, desktop computer, handheld computer, mainframe computer, etc. The monitor 1506 can be a CRT, flat screen, etc.

A user 1504 can input commands into the computer 1502 using various input devices, such as a mouse, keyboard, track ball, touch screen, scanner, sensing component, etc. If the computer system 1500 comprises a mainframe, a designer 1504 can access the computer 1502 using, for example, a terminal or terminal interface. Additionally, the computer system 1526 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer system 1526. Therefore, in this embodiment, the software can be used whether or not computer 1502 is connected to network router 1512. Printer 1508 may be connected directly to computer 1502, in which case, the computer system 1526 can print whether or not it is connected to network router 1512.

Figure 16:
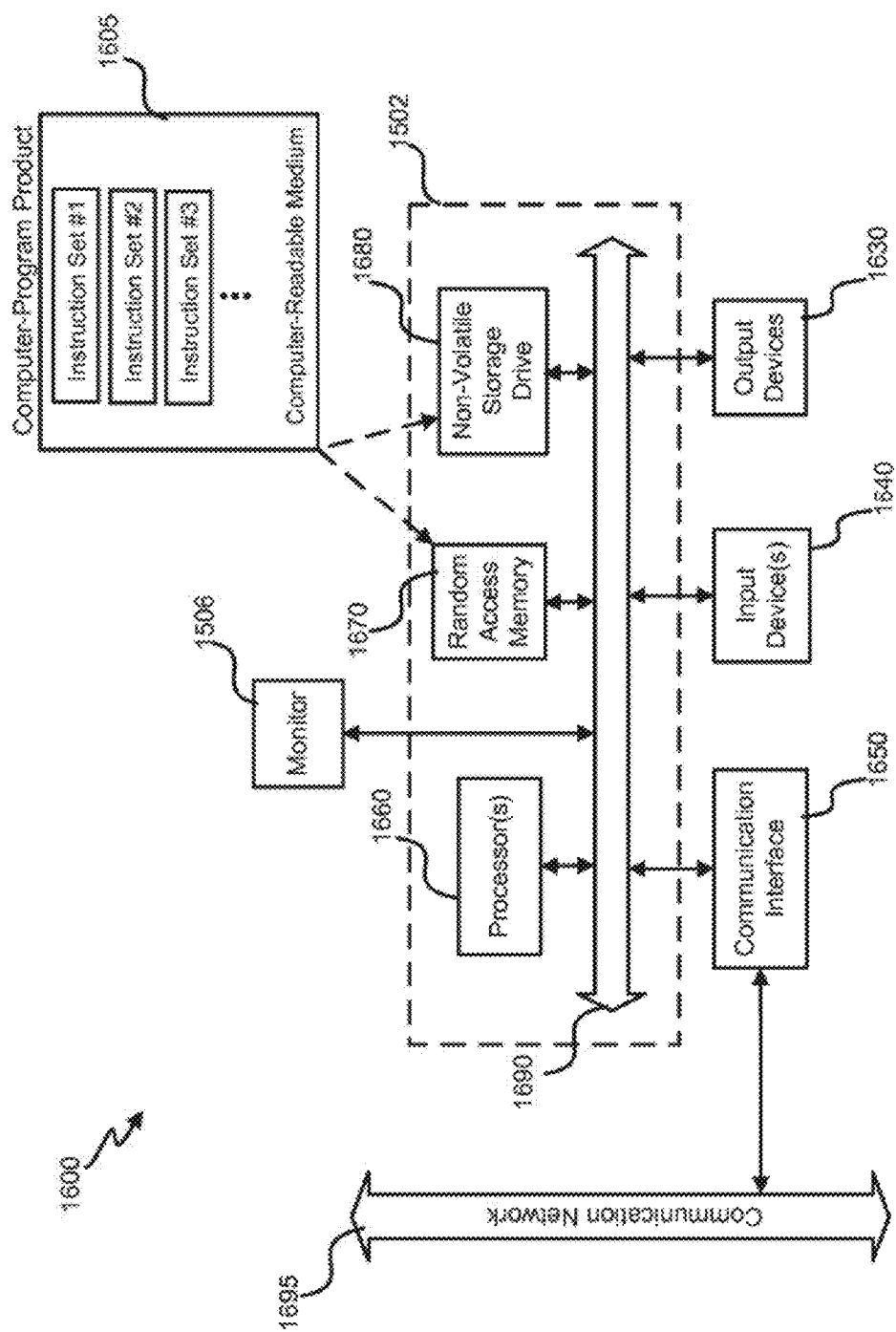
FIG. 16 illustrates a block diagram of an embodiment of a special-purpose computer, according to at least one embodiment.

With reference to FIG. 16, an embodiment of a special-purpose computer system 1600 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1526, it is transformed into the special-purpose computer system 1600.

Special-purpose computer system 1600 comprises a computer 1502, a monitor 1506 coupled to computer 1502, one or more additional user output devices 1630 (optional) coupled to computer 1502, one or more user input devices 1640 (e.g., keyboard, mouse, track ball, touch screen, scanner, sensing component, etc.) coupled to computer 1502, an optional communications interface 1650 coupled to computer 1502 and/or a communication network 1695, a computer-program product 1605 stored in a tangible computer-readable memory in computer 1502. Computer-program product 1605 directs system 1600 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650, and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.®, or the like. To support computer-program product 1605, the computer 1502 runs an operating system that handles the communications of product 1605 with the above-noted components, as well as the communications between the above-noted components in support of the computer-program product 1605. Example operating systems include Windows® or the like from Microsoft Corporation, Solaris® from Sun Microsystems, LINUX, UNIX, and the like.

User input devices 1640 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, scanners, any other sensing components, and other types of input devices. In various embodiments, user input devices 1640 are typically embodied as a computer mouse, a trackball, a track pad, a joystick, wireless remote, a drawing tablet, a voice command system. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1650 may be coupled to a computer network, to a FireWire® bus, or the like. In other embodiments, communications interface 1650 may be physically integrated on the motherboard of computer 1502, and/or may be a software program, or the like.

RAM 1670 and non-volatile storage drive 1680 are examples of tangible computer-readable media configured to store data such as computer-program product embodiments of the present disclosure, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1670 and non-volatile storage drive 1680 may be configured to store the basic programming and data constructs that provide the functionality of various embodiments of the present disclosure, as described above.

Software instruction sets that provide the functionality of the present disclosure may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present disclosure. RAM 1670 and non-volatile storage drive 1680 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 to communicate with each other as intended. Although bus subsystem 1690 is shown schematically as a single bus, alternative embodiments of the bus subsystem may utilize multiple busses or communication paths within the computer 1502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. According to embodiments, storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

Figure 17:
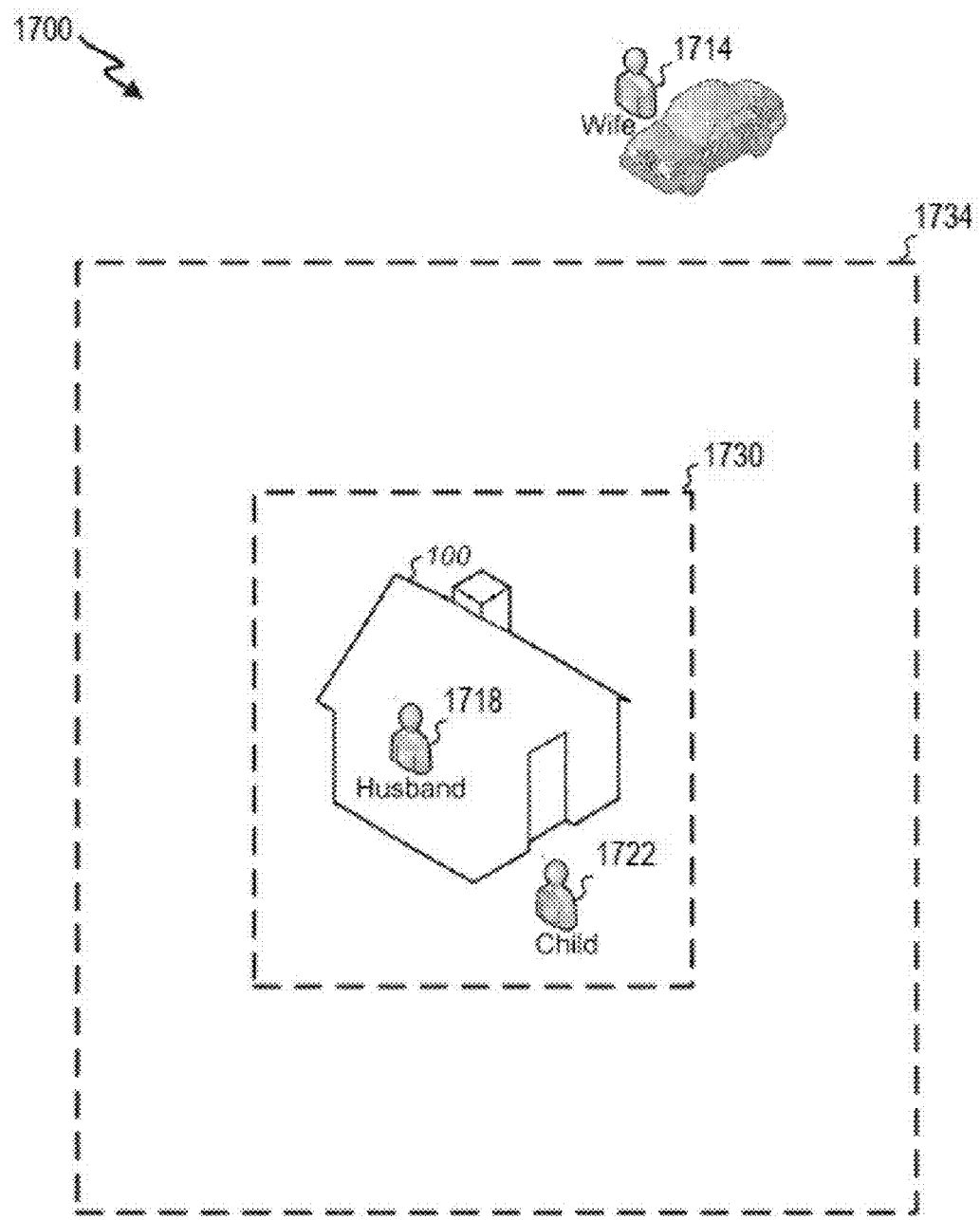
FIG. 17 is a schematic diagram illustrating example geo-fencing, according to at least one embodiment.

Referring now to FIG. 17, provided according to some embodiments are systems and methods for achieving smart-home objectives using occupant-location data (e.g., GPS data). According to embodiments, occupant-location data—in addition to other data obtained from smart home devices—is provided to the central server or cloud-computing system 164, which uses the data to make inferences regarding the current and future occupancy of the home and/or rooms, and to control the smart devices in the home or otherwise associated with the home in a corresponding manner. Further, according to embodiments, provided are systems and methods for conflict sensing and resolution for accommodating multiple occupants in the smart-home environment 100, which has occupant-location based controls of the smart home devices, such as temperature adjustments via the smart thermostat. For example, as described below, the systems and methods identify conflicts in the preferences (e.g., preferred temperature settings) of the occupants of the home and resolves the conflicts based on prescribed or learned rules, such has giving priority to the preferences of some occupants.

According to embodiments, the central server or cloud-computing system 164 obtains occupant-location data, such as GPS data, from the mobile devices 166 of the occupants. For example, the occupants of a home (e.g., the individuals who live in or frequently visit the home) register their respective mobile devices 166 as being associated with the home.

In some instances the central server or cloud-computing system 164 receives occupant-location data directly from the mobile devices, whereas in others the data is received from an intermediary, such as one of the smart devices in the home.

In instances where occupant-location data is received directly from the mobile device, the central server or cloud-computing system 164 can determine if the occupant is "at home" or "away", as explained below. When an occupant is at home, the central server or cloud-computing system 164 can determine the occupant's actual room-location (e.g., bedroom, kitchen, garage, etc.). To do, for example, the central server or cloud-computing system 164 cross-references the occupant-location (e.g., GPS coordinates) with a map of the home.

In instances where occupant-location data is received from smart devices, the central server or cloud-computing system 164 can infer that the occupant is inside the home. Further, the room-location of the occupants can be determined. For example, the smart wall switches, the smart wall plugs, the smart doorbells, and other smart devices in the smart-home environment 100 detect the presence of the mobile device 166 and transmit corresponding data to the central server or cloud-computing system 164. Such detection of mobile devices can be accomplished using WiFi, Bluetooth, NFC, etc. It should also be appreciated that passive RFID tags can be used to determine the room-location of occupants (and pets). For example, an RFID is associated with each of the occupants (and pets) of the house, such as by including the tags in wallets, bracelets, wristbands, mobile devices, collars, etc. The smart devices in the various rooms detect the RFID tags, and send that information to the central server or cloud-computing system 164. It should be appreciated that, because they are typical mounted in unobstructed locations, high on walls of often-occupied rooms, smart hazard detectors 104 are particularly well suited for RFID sensors.

In the illustrated example, the occupants include Wife 1714, Husband 1718, and Child 1722, all of whom have registered their mobile device 166 with the central server or cloud-computing system 164 as being associated with the smart-home environment 100. Further, two geo-location boundaries or "geo-fences" 1730, 1734 of any suitable area 1700 are registered as being associated with the smart-home environment 100. In some embodiments, the occupants of the home define and register the geo-fences, while in other embodiments the central server or cloud-computing system 164 auto-generates the geo-fences for the home.

Inner geo-fence 1730 defines the perimeter of living area of the home. The area within the inner-geo fence includes not only the home but also the land immediately surrounding the house, including any closely associated structures, such as garages or sheds ("the curtilage"). Outer geo-fence 1734 defines an outer perimeter, which is sometimes miles from the home. The outer geo-fence 1734 is adjustable and extends well beyond the curtilage. For example, the perimeter defined by the outer geo-fence 1734 may have a radius of two to three miles in some embodiments, while in other embodiments the radius is larger or smaller.

According to embodiments, the central server or cloud-computing system 164 infers that an occupant is "at home" when inside the inner geo-fence 1730 and that the occupant is "away" when outside of the inner geo-fence 1730. Further, the central server or cloud-computing system 164 infers an occupant is going home when the occupant moves (e.g., travels by car) from outside to inside the outer geo-fence 1734. As such, the central server or cloud-computing system 164 uses the inner geo-fence 1730 to determine when occupants leave the home, and it uses the outer geo-fence 1734 to determine when occupants are heading home.

Several example smart-home objectives will now be described with reference to FIG. 17. In one example, the central server or cloud-computing system 164 predicts that Wife 1714 is going home, and makes adjustments in the smart-home environment 100 in anticipation of her arrival. In this example, Wife 1714 travels from outside to inside the outer geo-fence 1734, thereby triggering an indication that Wife 1714 is heading home. The Wife's speed and the distance between the fence and the home 100 is used to predict the Wife's time of arrival. Using this information central server or cloud-computing system 164 can prepare for Wife's arrival, such as by pre-heating or cooling some or all of the rooms in the home 100 to Wife's preferred temperature. Time-to-temperature calculations can be used to make the pre-cooling or heading as efficient as possible, and to ensure Wife's preferred temperature is achieved before she arrives. In the event neither Husband 1718 nor Child 1722 is home, all rooms are pre-heated or cooled. However, if either or both Husband 1718 and Child 1722 are home, rooms associated with Wife can be pre-heated or cooled to Wife's desired temperature, while other rooms are set to temperatures based the preferences of Husband 1718 and/or Child 1722. Rooms associated with Wife can be inferred by the central server or cloud-computing system 164 based on historical occupancy and usage data, as well as based on a set of rules provided by the occupants (see below).

In another example, the central server or cloud-computing system 164 determines that the home 100 is vacant because all occupants (Wife 1714, Husband 1718, and Child 1722) are outside of the inner geo-fence 1730. In this case, the central server or cloud-computing system 164 places the smart devices in their "away" settings. For example, the lights are turned off, the HVAC is set to a temperature that requires little or no heating or cooling, the alarm is armed, the doors are locked, electronics and appliances (e.g., televisions, stoves, space heaters, etc.) are turned off, etc. In the event, all occupants' mobile devices are outside of the inner geo-fence 1730 and movement is detected in the house, the central server or cloud-computing system 164 can infer the movement is the family dog and can apply the dog's smart devices settings.

In yet another example, Wife 1714, Husband 1718, and Child 1722 are all inside the inner geo-fence 1720. Applying the techniques described above, the central server or cloud-computing system 164 knows that Wife 1714 is in the master bedroom and that Husband 1718 and Child 1722 are both in the den (see discussion regarding "room-occupancy detection"). Accordingly, the central server or cloud-computing system 164 adjusts the temperature in the master bedroom to Wife's preferred setting, and it applies a set of rules to determine whether to set the den to the Husband's or the Child's preferred setting. The set of rule, for each room of the home, provide a prioritized list of occupants and their respective settings. For example, for the den, Wife's settings are highest priority, then Husband's, and then the Child's. Thus, in this case, Husband's setting are applied in the den because his setting are higher priority than Child's. However, if Wife were to later join them in the den, her setting would be applied instead of Husband's.

In still another example, Wife 1714, Husband 1718, and Child 1722 are all inside the inner geo-fence 1730. Wife and Husband are in the den, but Child is in the yard playing. The central server or cloud-computing system 164 applies the above-described techniques to determine that Wife and Husband are in the den. However, Child is unaccounted for in any of the rooms. In this example, Child was detected in the den earlier that day, and none of the occupants have traveled outside of the inner-fence 1730 that day. Using this information, the central server or cloud-computing system 164 infers that Child is in the yard, playing. Alternatively, the central server or cloud-computing system 164 infers that Child is in the yard because it received data from the smart doorbell that the child exited the house, yet it is also receiving data from Child's mobile device that Child is inside of the inner geo-fence 1730. Because the Child is in the yard, the central server or cloud-computing system 164 prevents the irrigation system from turning on and it broadcasts occasional reminders to Husband and Wife via speakers provided in the smart devices, for example.

As described above (e.g., with respect to process 1300 of FIG. 13), a security score may be calculated for a smart-home environment. In some embodiments, a computing system may be configured to receive home data from one or more network-connected smart devices of a smart-home environment, process the received home data, and generate a security score based on the processed home data. For example, a computing system, such as central server or cloud-computing system 164, may be configured to receive home data 202 from one or more network-connected smart devices, such as one or more of devices 102/104/106/108/110/112/114/116/122/166/168/170 of a smart-home environment 100, process the received home data 202 as derived home data 208 (e.g., with a processing engine 206 and/or services 204/205 and/or third party sources 222/224/226/228/230 and/or paradigms 310a/310b/310c/310d and/or extrinsic information 316 and/or any other suitable information/services), and generate a security score (e.g., as a security service 205) based on the processed home data 208. The security score may be generated based on processed home data that may include at least one of various types of data, including, but not limited to, capability data, opportunity data, and environmental data.

Capability data may include any suitable data that may be indicative of at least one capability of at least one network-connected smart device of the one or more network-connected smart devices of the smart-home environment for which a security score is being calculated or otherwise generated. Such capability data may be indicative of any suitable capability or capabilities of any suitable smart device or smart devices, where each capability may be independent of any or all potential external influences. For example, certain capability data may be "device capability data", which may be any suitable data that may be indicative of at least one capability of a particular network-connected smart device of the smart-home environment, where each capability may be independent of any or all potential external influences on that smart device (e.g., as if the particular smart device were placed in a vacuum and not affected by any external influences, such as by an active user or by other characteristic(s) of the smart-home environment in which the smart device may currently exist). Such device capability data may include, but is not limited to, data that may be indicative of one or more of the following capabilities of a particular smart device: (i) current charge level of a battery of the device; (ii) maximum potential charge capacity of a battery of the device; (iii) any other current or potential capability of a battery or other power source of the device (e.g., estimated length of use possible if no external power source were to be provided for the device); (iv) currently enabled communication protocol(s) of the device; (v) all communication protocols available to the device; (vi) any other currently enabled or available communication capability of the device (e.g., bidirectional communication capability); (vii) currently enabled security features of the device; (viii) all security features available to the device; (ix) any other currently enabled or available security capability of the device (e.g., user authentication capabilities, data encryption capabilities, etc.); (x) currently enabled sensing features of the device; (xi) all sensing features available to the device; (xii) any other currently enabled or available sensing capabilities of the device (e.g., the number and types and quality of each sensor available to the device, the remaining lifespan/need to replace a worn down part of the device, etc.); (xiii) currently enabled processing features of the device; (xiv) all processing features available to the device; (xv) any other currently enabled or available processing capabilities of the device (e.g., the data processing speed and/or data processing power available to the device); (xvi) currently enabled output features of the device; (xvii) all output features available to the device; (xviii) any other currently enabled or available output capabilities of the device (e.g., the number and types and quality of each output component available to the device); (xix) any other suitable capabilities; and (xx) any combinations thereof. For example, this may enable the security score to be based on a determination of whether or not the capabilities of a particular smart device of the smart-home environment are outdated/insufficient, sufficient, or top-notch (e.g., as compared to all available smart devices that may be readily available in the current market, which may be determined via extrinsic information 316 accessible to processing system 206), thereby enabling a security score and/or associated suggestions to reflect the ability of a user to upgrade one or more aspects of one or more smart devices of the smart-home environment (e.g., if an upgradeable head unit or software is available). Such device capability data may be processed by a computing system 164 using data from one or more particular smart devices of the environment (e.g., based on information available to/detectable by the device and communicated by the device to the computing system) and/or using information from other sources accessible to the computing system 164 (e.g., extrinsic information 316, paradigms 310, entities 222-230, etc.) that may be used to supplement the processing of any data received from the smart device(s) for enabling processed home data 208 of the device capability type.

As another example, certain capability data may be "network capability data", which may be any suitable data that may be indicative of at least one capability of a network of two or more networked smart devices of the smart-home environment, where each capability may be independent of any or all potential external influences on that network of smart devices (e.g., as if the particular network of smart devices were placed in a vacuum and not affected by any external influences, such as an active user or characteristic(s) of the smart-home environment in which the network of smart devices may currently exist). Such network capability data may include, but is not limited to, data that may be indicative of one or more of the following capabilities of a particular network of two or more smart devices: (i) distance between any two smart devices of the network; (ii) shared communication protocol(s) between any two smart devices of the network; (iii) combined sensing capabilities of the network; (iv) mesh/spokesman/node relationship between any two or all smart devices of the network; (v) any other suitable capabilities; and (vi) any combinations thereof. For example, this may enable the security score to be based on a determination of whether or not the capabilities of the network of the smart-home environment enable proper networked communication between devices of the network, whether each one of various desired sensing capabilities and/or output capabilities for the environment are provided by at least one of the devices of the network, and the like. Such network capability data may be processed by a computing system 164 using data from the various smart devices of the network itself (e.g., based on information available to/detectable by the network and communicated by the network to the computing system) and/or using information from other sources accessible to the computing system 164 (e.g., extrinsic information 316, paradigms 310, entities 222-230, etc.) that may be used to supplement the processing of any data received from the network for enabling processed home data 208 of the network capability type.

Opportunity data may include any suitable data that may be indicative of at least one opportunity afforded to at least one network-connected smart device by at least one influencer of the smart-home environment in which the at least one network-connected smart device is provided. Such opportunity data may be indicative of any suitable opportunity or opportunities afforded to any suitable smart device or smart devices, where each opportunity may be afforded by at least one influencer of the smart-home environment in which each of the at least one smart device is provided. That is, opportunity data may be indicative of the effectiveness or ineffectiveness of smart device(s) and/or the ability or inability of smart device(s) to succeed based on any or all potential external factors capable of influencing the smart device(s). For example, certain opportunity data may be "device opportunity data", which may be any suitable data that may be indicative of at least one opportunity afforded to a particular network-connected smart device of the smart-home environment, where each opportunity may be based on any or all potential external factors capable of influencing that smart device (e.g., any external influences by an active user or characteristic(s) of the smart-home environment in which the smart device may currently exist). Such device opportunity data may include, but is not limited to, data that may be indicative of one or more of the following opportunities afforded to a particular smart device by the particular environment: (i) type and/or reliability of any environmental power source provided for the device (e.g., whether a fixed power source, such as a 120V line voltage wires of a structure 150 of environment 100, is powering the device); (ii) position and/or use of the device with respect to the environment (e.g., what type of room the device is provided in (e.g., kitchen or bedroom), what type of element the device is proximate/coupled to (e.g., HVAC 103, lamp 118, window 182, door 186, etc.), etc.); (iii) proximity of device to any environmental influencers that may have an undesired or desired effect on the performance of the device (e.g., a PIR sensor of a device being positioned in the direct path of an HVAC vent whereby the air flow from the vent may alter a characteristic of the sensor to increase the likelihood of triggering a false reading or preventing an accurate reading, a smoke detector being provided inside a fireplace thereby increasing the likelihood of triggering false alarms, a smoke detector being provided directly next to an open window thereby decreasing the likelihood of an accurate reading for the interior of the environment, a sensor of a smart device positioned next to a "dog bed" or other influencer of the environment where a considerable amount of dander or other uncommon particles may exist and undesirably influence the operation/effectiveness of that sensor, etc.); (iv) exposure to any environmental influencers that may have an undesired or desired effect on the security of the device (e.g., a large number of authentication codes being active for the device may indicate unnecessary exposure to a security breach, an authentication code for the device being too short/untrustworthy, how many occupants have had their contact information verified for use in response to an alarm condition of the device, responsiveness of a user/occupant to previous alarm conditions or other actions of the device (e.g., how quickly a user/occupant responded to an actual alarm or a "test alarm" that may be randomly generated by the device for testing the responsiveness of the user), etc.); (v) currently enabled/disabled communication protocol(s) of the device (e.g., as set by a user of the environment); (vi) currently enabled/disabled security feature(s) of the device (e.g., as set by a user of the environment); (vii) currently enabled/disabled sensing feature(s) of the device (e.g., thresholds or otherwise as set by a user of the environment); (viii) currently enabled/disabled processing feature(s) of the device (e.g., timers or otherwise as set by a user of the environment); (ix) currently enabled/disabled output features of the device (e.g., as set by a user of the environment); (x) any other suitable device opportunities; and (xi) any combinations thereof. For example, this may enable the security score to be based on a determination of whether or not the capabilities of a particular smart device of the smart-home environment are promoted or inhibited or jeopardized by one or more external influencers (e.g., by a user or other characteristic(s)) of the smart-home environment in which the smart device may currently exist, thereby enabling a security score and/or associated suggestions to reflect the ability of a user to make adjustments with respect to such external influencers on the smart device (e.g., a suggestion to move the smart device away from the vent, to increase a sensing threshold of a sensor, to turn on a device option such that the device may mimic the user's patterns when the user is away, etc.). Such device opportunity data may be processed by a computing system 164 using data from one or more particular smart devices of the environment (e.g., based on any information available to/detectable by the device and communicated by the device to the computing system) and/or using information from other sources accessible to the computing system 164 (e.g., extrinsic information 316, paradigms 310, entities 222-230, etc.) that may be used to supplement the processing of any data received from the smart device(s) for enabling processed home data 208 of the device opportunity type. Following just one particular example, a smart device with a PIR sensor may also include a camera or thermometer to detect data indicative of the device being positioned too close to a vent. Following another example, a sensor may continuously detect a high level of a particular particle (e.g., pet dander) and determine that an influencer of the environment may be causing such detection.

As another example, certain opportunity data may be "network opportunity data", which may be any suitable data that may be indicative of at least one opportunity afforded to a network of two or more networked smart devices of the smart-home environment, where each opportunity may be based on any or all potential external factors capable of influencing that network of smart devices (e.g., any external influences by an active user or characteristic(s) of the smart-home environment in which the network of smart devices may currently exist). Such network opportunity data may include, but is not limited to, data that may be indicative of one or more of the following opportunities afforded to a particular network of two or more smart devices: (i) environmental impediments to a communication channel/pathway between any two smart devices of the network (e.g., a concrete wall between two adjacent devices that may degrade/inhibit data communicated amongst the devices); (ii) environmental impediments to a communication channel/pathway between the network and communication system (e.g., reliability of the environment's wireless router 160 or connection to internet 162 for communicatively coupling the network of smart devices to computing system 164, availability of requisite/trusted SSL certificates for supporting secure video streaming with emergency personnel, etc.); (iii) type and/or reliability of any environmental power source provided for particular devices of the network (e.g., whether a fixed power source, such as a 120V line voltage wires of a structure 150 of environment 100, is powering at least one spokesman node of the network); (iv) availability/detectability of a "map" of the environment (e.g., quality of the map, positional information of the network with respect to the expanse or specific features of the environment); (v) network coverage of the environment (e.g., amount/locations of detected "black spots", percentage of doors 186 of environment 100 associated with a particular smart device (e.g., smart entry detector 112 and/or smart doorknob 122 and/or smart doorbell 106), percentage of overall interior volume of structure 150 of environment 100 monitored/sensed by hazard detectors 104 or any other smart device sensor type, percentage of overall exterior area of environment 100 covered by outdoor lighting system 114 or any other smart device output type, etc.); (vi) exposure to any environmental influencers that may have an undesired or desired effect on the security of the network (e.g., a large number of authentication codes being active for the network may indicate exposure to a security breach, an authentication code for the network being too short/untrustworthy, current security measures of an occupant's web browser or mobile app (e.g., on a device 166), how many occupants have had their contact information verified for use in response to an alarm condition of the network, responsiveness of a user/occupant to previous alarm conditions or other actions of the network (e.g., how quickly a user/occupant responded to an actual alarm or a "test alarm" that may be randomly generated by the network for testing the responsiveness of the user), etc.); (vii) currently enabled/disabled communication protocol(s) of the network (e.g., as set by a user of the environment); (viii) currently enabled/disabled security feature(s) of the network (e.g., as set by a user of the environment); (ix) currently enabled/disabled sensing feature(s) of the network (e.g., thresholds or otherwise as set by a user of the environment); (x) currently enabled/disabled processing feature(s) of the network (e.g., timers or otherwise as set by a user of the environment); (xi) currently enabled/disabled output features of the network (e.g., as set by a user of the environment); (xii) any other suitable network opportunities; and (xiii) any combinations thereof. For example, this may enable the security score to be based on a determination of whether or not the capabilities of a network of smart devices of the smart-home environment are promoted or inhibited or jeopardized by one or more external influencers (e.g., by a user or other characteristic(s)) of the smart-home environment in which the network may currently exist, thereby enabling a security score and/or associated suggestions to reflect the ability of a user to make adjustments with respect to external influencers on the network (e.g., a suggestion to move at least one of two adjacent smart devices such that a direct path between the two devices avoids a concrete wall, or to decrease the number of active authentication codes for the network, or to turn on a network option such that one or more devices of the network may work in tandem to mimic the user's patterns when the user is away, etc.). Such network opportunity data may be processed by a computing system 164 using data from the various smart devices of the network itself (e.g., based on information available to/detectable by the network and communicated by the network to the computing system) and/or information from other sources accessible to the computing system 164 (e.g., extrinsic information 316, paradigms 310, entities 222-230, etc.) that may be used to supplement the processing of any data received from the network for enabling processed home data 208 of the network opportunity type.

Environmental data may include any suitable data that may be indicative of at least one behavioral characteristic of the smart-home environment in which at least one network-connected smart device is provided. Such environmental data may be indicative of any suitable behavioral characteristic or characteristics of the smart-home environment in which any suitable smart device or smart devices is provided, where each behavioral characteristic may be indicative of at least one security influencer of the smart-home environment in which each of the at least one smart device is provided. For example, certain environmental data may be "micro-environmental data", which may be any suitable data that may be indicative of at least one behavioral characteristic of the particular smart-home environment in which each of the at least one smart device is provided (e.g., on a micro-level independent of other smart-home environments or any other environments beyond the scope of the particular smart-home environment that may be in the same neighborhood or share similar traits with the particular smart-home environment). Such micro-environmental data may include, but is not limited to, data that may be indicative of one or more of the following behavioral characteristics of the particular smart-home environment in which each of the at least one smart device is provided: (i) exposure of environmental objects with respect to public view (e.g., an expensive item, such as a large television, being visible through a window 182 of a structure 150 of the environment may increase the target of that environment and the likelihood of an attempted robbery, while a crime-deterring item, such as a guard dog or a label identifying the security features of the environment being made apparent to a would be thief may decrease the target of that environment and the likelihood of an attempted robbery); (ii) a potentially dangerous object not being secured (e.g., a gun detected outside of a suitable receptacle, such as a home safe smart device as described above); (iii) features of an ingress or of any other vulnerability of a structure of the environment (e.g., the size of a window being too small to enable a criminal to enter therethrough and/or a window being protected by security bars for preventing a criminal to enter through the window, thereby reducing the security risk of such a window, or the distance of a window above the external ground/earth being less than a certain threshold for enabling a criminal on foot to access the window, thereby increasing the security risk of such a window); (iv) occupant/personal device recognition (e.g., the number of occupants/personal devices at the environment that are known/verified or unknown/unverified to the smart device(s)/computing system, thereby increasing or decreasing the security of the environment); (v) activities/habits of the environment, such as (v.a) tendencies for a user to remember to lock a door and/or turn off a light/appliance after use, as may be detected by any suitable smart device as described above, which may increase a security score due to ingresses being locked and/or potentially dangerous environment elements being shut down after use, (v.b) certain types of food preparation in the environment may tend to be considered dangerous (e.g., deep frying, as may be detected through examination of particle size sensed by a blue IR sensor or any other suitable sensor of a smart device, may be considered more dangerous than making a bowl of cereal and may decrease a security score), (v.c) recreational smoking in the environment may negatively affect a security score (e.g., tobacco smoking or even use of a fire place that emits certain smoke that may be detectable by any suitable sensor of any suitable smart device may be dangerous or increase risk of fire), (v.d) nocturnal behaviors may increase a security score by discouraging a would be night-thief (e.g., occupants that are detected to be awake and active and/or using lights at night may reduce the size of a target of the environment for theft, rather than occupants that are either asleep or away from the environment at night such that a thief under the cover of darkness may be tempted to burglarize an inactive environment), and/or (v.e) irrational/careless behavior may decrease a security score by increasing the likelihood of a dangerous situation (e.g., as may be detected through analysis of the age/mental state of an occupant, such as an occupant that is sleep deprived or otherwise compromised (e.g., intoxicated, forgetful, immature, etc.), as may be detected by any suitable sensor of any suitable smart device), etc.; (vi) user-provided answers to security questions (e.g., "Do you hide a key to the environment under a door mat?", "When is the last time you practiced a fire drill?", "Is your environment provided with a back-up power generator in case of a power grid power outage?", etc.), as may be generated/proposed by one or more smart devices during interactive information-exchange sessions, as described in commonly-assigned U.S. patent application Ser. No. 13/440,910 (now U.S. Patent Application Publication No. 2013/0268125), which is hereby incorporated by reference herein in its entirety, where such answers may increase or decrease the security score; (vii) any other suitable micro-environmental data; and (viii) any combinations thereof. For example, this may enable the security score to be based on a determination of whether or not the behaviors exhibited at the environment on a micro-level promote or inhibit or jeopardize the security of the environment, thereby enabling a security score and/or associated suggestions to reflect the ability of a user to make adjustments with respect to such behaviors (e.g., a suggestion to stop deep frying inside a structure 150 of the environment or to move the expensive television away from the see-through window 182, etc.). Such micro-environmental data may be processed by a computing system 164 using data from one or more particular smart devices of the environment (e.g., based on any information available to/detectable by the device(s) and communicated by the device(s) to the computing system) and/or information from other sources accessible to the computing system 164 (e.g., extrinsic information 316, paradigms 310, entities 222-230, etc.) that may be used to supplement the processing of any data received from the smart device(s) for enabling processed home data 208 of the micro-environmental type. Following just one particular example, a single smart device or a combination of adjacent smart devices may include one or more cameras or other suitable sensors for identifying an expensive object within the environment that may be within a threshold distance of an uncovered window, or for detecting the presence of a pet that barks whenever a sound over a certain threshold is made, and the like. Following another particular example, a smart device may include a camera for identifying a window as well as an altimeter for identifying the altitude or height of that window above the ground. As yet another example, a smart device may identify a window and a proximate user device 166 and then poll that device 166 for its altimeter data. As another example, a smart device may include a camera configured to detect a window as well as security bars that may be protecting that window. As yet another example, a smart device may identify a window and then propose questions to a user about that window, such as "What is the height of this window above the earth?", or "What is the cross-sectional area of this window?", or "Are there any security bars protecting this window?", etc.

As another example, certain environmental data may be "macro-environmental data", which may be any suitable data that may be indicative of at least one behavioral characteristic of the environment surrounding or otherwise associated with the particular smart-home environment in which each of the at least one smart device is provided (e.g., on a macro-level related to other environments beyond the scope of the particular smart-home environment that may be in the same neighborhood as or share similar traits with the particular smart-home environment). Such macro-environmental data may include, but is not limited to, data that may be indicative of one or more of the following behavioral characteristics of environment(s) related to the particular smart-home environment in which each of the at least one smart device is provided: (i) accessibility of the particular environment to security agencies (e.g., the distance or travel time between the particular smart-home environment and an emergency response entity, such as the police, fire department, etc., where increased distance/travel time may decrease the security score, and where such travel time may vary by taking into account current weather/travel conditions); (ii) ambient environmental conditions (e.g., weather, acts of nature, traffic, construction, service status, entities (e.g., nuclear power plants), etc. existing at/around the particular smart-home environment that may impact the security of the particular smart-home environment, such as where a current drought or nearby forest fires or a firefighter strike may negatively impact the security score); (iii) historical data regarding the macro-environment (e.g., crime rates for the neighborhood of the particular smart-home environment, frequency and average duration of power outages in the neighborhood, etc., which may negatively or positively impact a security score); (iv) accessible security networks (e.g., number and size of "neighborhood security networks" accessible to or otherwise in communication with the particular smart-home environment, as described above, whereby the greater the amount of other smart device equipped environments a particular smart-home environment may synergize with, the higher the security score for that particular smart-home environment may be); (v) any other suitable macro-environmental data (e.g., security data related to other floors or the entrance of an apartment building if the particular smart-home environment is a single apartment or floor in a larger apartment complex, where such data may include the secureness of the ingress to the entire apartment complex, the crime rate for that building, the security features of the building that are not directly associated with the particular smart-home environment (e.g., fire escape available on the roof of the complex and the distance to the roof from the particular smart-home environment, etc.); and (vi) any combinations thereof. For example, this may enable the security score to be based on a determination of whether or not the behaviors exhibited at the environment on a macro-level promote or inhibit or jeopardize the security of the environment, thereby enabling a security score and/or associated suggestions to reflect the ability of a user to make adjustments with respect to such behaviors (e.g., a suggestion to enable communication with more neighborhood security networks, or to buy a backup power generator, etc.). Such macro-environmental data may be processed by a computing system 164 using data from one or more particular smart devices of the environment (e.g., based on any information available to/detectable by the device(s) and communicated by the device(s) to the computing system) and/or information from other sources accessible to the computing system 164 (e.g., extrinsic information 316, paradigms 310, entities 222-230, etc.) that may be used to supplement the processing of any data received from the smart device(s) for enabling processed home data 208 of the macro-environmental type. Following just one particular example, a smart device may include a GPS device for identifying the current geographical location of the device and, thus, the particular smart-home environment, while extrinsic information 316 or law enforcement 222 may provide crime data for that geographical location. As another example, a smart device may include a weather sensor that may be configured to calculate total rainfall or snowfall at that device for any given historical time period.

As mentioned above, a security score for a particular smart-home environment may be calculated by comparing home data from one or more smart devices of the particular smart-home environment against a list of security criterions to determine how many of the security criterions are satisfied (e.g., through processed capability data, opportunity data, and/or environmental data). Higher scores may indicate that a particular smart-home environment satisfies a high number of security criterions and is therefore relatively secure, whereas lower scores indicate that the particular smart-home environment fails to satisfy many of the criterions. According to embodiments, security scores can be normalized and scaled so that occupants of a particular smart-home environment can compare the security of their particular smart-home environment to other particular smart-home environments. For example, a score of 0 to 100 can be used, where 0 is the lowest possible score and 100 is the highest possible score. Further, for example, the central server or cloud-computing system 164 may generate a report or log that may list the security criterions and/or provide an indication of whether the particular smart-home environment satisfies each of the criterions. Occupants can review this list to determine which criterions are not satisfied and then make the appropriate improvements to the particular smart-home environment so as to increase the security score of the particular smart-home environment. Additionally, the central server or cloud-computing system 164 can use this log to generate a list of suggestions for improving the particular smart-home environment. It may prioritize the list based on which criterions are associated with the most points, indicate which creation can be easily and cheaply satisfied with only minor improvement, and/or indicate which unsatisfied criterions are typically satisfied in other smart-home environments. For example, the central server or cloud-computing system 164 can send the following message to an occupant (e.g., to an occupant's personal electronic smart device 166: "We notice that you often leave the front door unlocked. Most homes in your neighborhood keep the front door locked at all times. Locking your front door at night is an easy and inexpensive way to improve your home's security and to improve your security score." While certain security criterions for assessing the security of and/or calculating a security score have been discussed herein, it should be appreciated that any number and combination of security criterions can be used when assessing security and/or calculating a security score for a particular smart-home environment.

Figure 18:
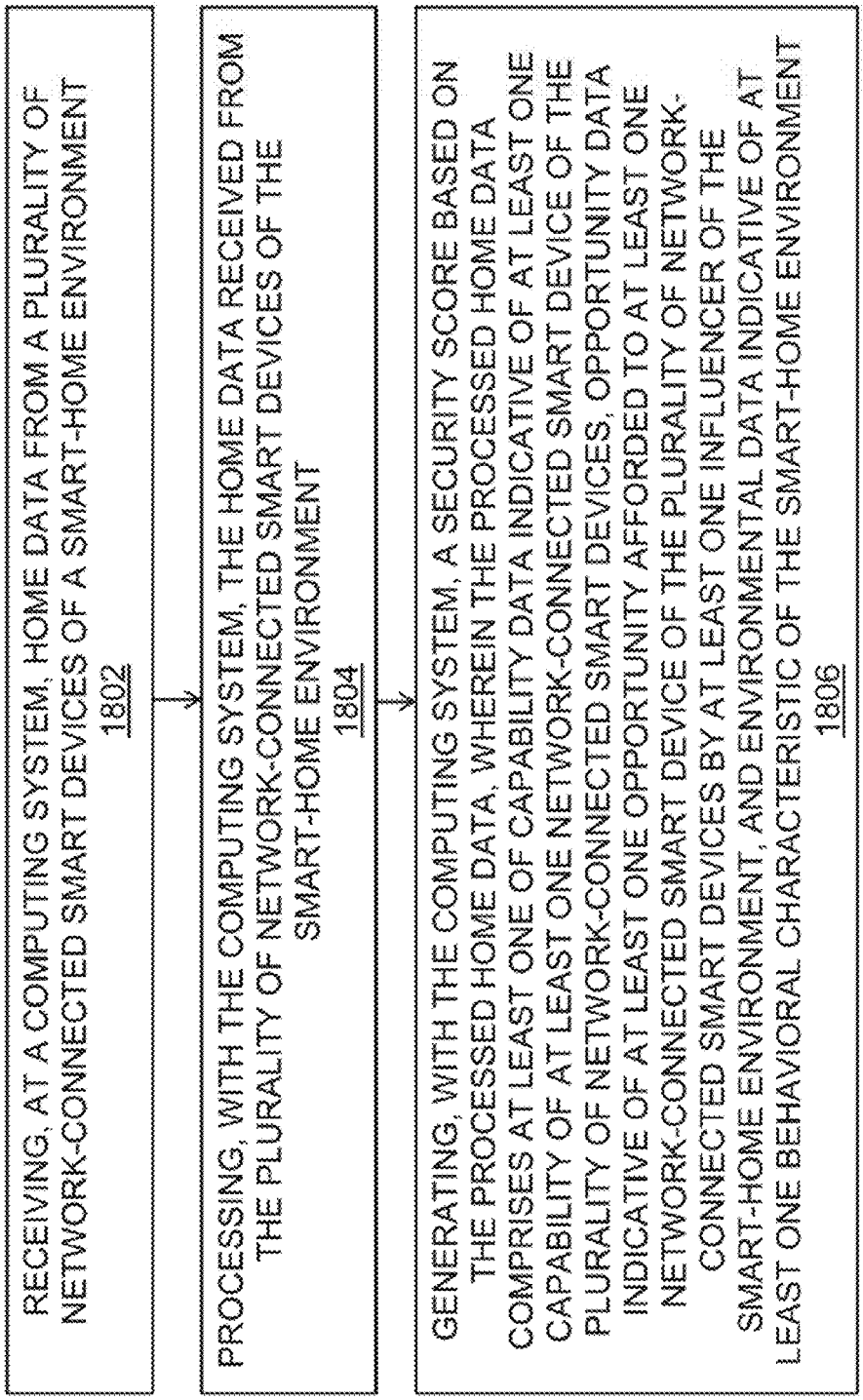
FIG. 18 provides an example process for generating a security score, according to at least one embodiment.

FIG. 18 is a flowchart of an illustrative process 1800 for generating a security score. At step 1802, process 1800 may include receiving, at a computing system, home data from network-connected smart devices of a smart-home environment. For example, as described above, computing system 164 may receive home data 202 from one or more network-connected smart devices 102/104/106/108/110/112/114/116/122/166/168/170 of a smart-home environment 100. Next, at step 1804, process 1800 may include processing, with the computing system, the home data received from the network-connected smart devices of the smart-home environment. For example, as described above, computing system 164 may process the received home data 202 as derived home data 208 (e.g., with a processing engine 206 and/or services 204/205 and/or third party sources 222/224/226/228/230 and/or paradigms 310a/310b/310c/310d and/or extrinsic information 316). Next, at step 1806, process 1800 may include generating, with the computing system, a security score based on the processed home data, wherein the processed home data includes at least one of capability data indicative of at least one capability of at least one network-connected smart device of the network-connected smart devices, opportunity data indicative of at least one opportunity afforded to at least one network-connected smart device of the network-connected smart devices by at least one influencer of the smart-home environment, and environmental data indicative of at least one behavioral characteristic of the smart-home environment. For example, as described above, computing system 164 may generate a security score (e.g., as a security service 205) based on the processed home data 208 that may include at least one of various types of data, including capability data, opportunity data, and environmental data.

It is understood that the steps shown in process 1800 of FIG. 18 are merely illustrative and that existing steps may be modified or omitted, additional steps may be added, and the order of certain steps may be altered.

Various capabilities of smart doorbell 106 may provide a smart and at least partially automated interface between a resident of smart-home environment 100 and any potential visitor at smart-home environment 100, including delivery services, friends, solicitors, strangers, and would-be-thieves. Smart doorbell 106 may be leveraged with one or more other network-connected smart devices of environment 100, such as one or more of devices 102, 104, 106, 108, 110, 112, 113, 114, 116, 122, 166, 168, and/or 170, and/or with services platform 200, such that smart doorbell 106 may serve as a trusted and effective liaison between a system user associated with environment 100 (e.g., a resident, owner, occupant, etc.) and a visitor that may approach an entry point of environment 100 at which smart doorbell 106 may be provided, whether or not the system user is currently at environment 100. For example, smart doorbell 106 may be a visitor interface or entryway interface device operative to detect and react to the approach to and/or departure from a location (e.g., an outer door 186 of structure 150 of environment 100) by a person or any other suitable visitor entity, announce such an approach or departure, enhance conventional doorbell functionality for both system users and visitors, control settings on a security system, increase the convenience and efficiency of package delivery, increase the traceability of package delivery, enable secure package delivery, detect environmental data and other useful data for environment 100 and system 164, and the like.

By virtue of potentially being mounted in place of a traditional doorbell or other conventional entryway interface (e.g., at outer structure door 186, at gated entry 116, at a lobby of a shared residence, such as a condominium or apartment building, at the front door of an individual residence at such a building, etc.), smart doorbell 106 may have access to plentiful electrical operating power, such as by coupling to wiring (e.g., to 120V "hot" line voltage wires) that may be behind walls 154 of smart-home environment 100 and that may be present at virtually all standard wired areas. Such an essentially unlimited power budget, the near-ubiquity of excellent installation locations throughout an environment 100, and the reasonably ample physical space on its face plate and in its housing to fit the necessary components, may combine to enable smart doorbell 106 to accommodate a rich and wide variety of sensing, interface, and communications capabilities for smart-home environment 100, as well as a general platform for the provision of even newer sensing, interface, and communications hardware as it becomes available over the coming decades. A rich variety of new interactions may be made possible between smart doorbell 106 and other devices of the smart-home environment 100. Occupancy sensing, for example, can be significantly enhanced by virtue of the great locations (e.g., usually right next to entryways) of most visitor or entryway interfaces, which may thereby allow for easy tracking of entities (e.g., system users, visitors, etc.) as they approach and/or enter and/or depart and/or exit entryways of environment 100, predictive occupancy algorithms, and so forth.

FIGS. 1 and 8A-8C illustrate example user interfaces and hardware features of a smart doorbell 106 that may incorporate or otherwise have access to a host of sensing, interface, and communications capabilities for enhancing comfort, convenience, and safety of its users. As shown, according to some embodiments, smart doorbell 106 may be split into at least two parts: a head unit 804 and a backplate 808. This bifurcation can increase the success and commercial longevity of smart doorbell 106 by making it a modular platform that may include at least two basic components. According to some embodiments, backplate 808 may be a permanent interface box (sometimes referred to herein as "docking station 808") that may serve as a physical connection into a wall or other suitable stable element of environment 100 and to the 120V line voltage wires or other wiring of the smart-home environment 100, and that may contain AC-to-DC powering circuitry 810. When installed, docking station 808 may resemble a conventional one-gang or two-gang wall box, except no dangerous high-voltage wires may be exposed to the user. According to some embodiments, docking station 808 may also include a cellular wireless interface or any other suitable communications interface circuitry 811.

According to some embodiments, head unit 804 (sometimes referred to herein as "replacement module 804") may actually at least partially contain or otherwise provide some or all of the sensors, processors, user interfaces, the rechargeable battery, and so forth of smart doorbell 106. Users can plug and unplug or otherwise removably couple unit 804 in and out of docking station 808. Many different commercial and functional possibilities for provisioning, maintenance, and upgrade are possible. For example, after years of using any particular head unit 804, a user may be able to acquire a new version of head unit 804 and simply plug it into the docking station 808. There are also many different versions for head unit 804, such as an extremely low-cost version that is nothing but a motion/occupancy detector and conventional doorbell, and then a progression of increasingly-capable versions, up to and including extremely fancy head units 804 with a large number of features. Thus, it should be appreciated that the various versions of head units 804 can all be interchangeable, with any of them working when placed into any docking station 808. This can advantageously encourage sharing and re-deployment of old head units 804—for example, when an important high-capability head unit 804 (for the front door, for example) can be replaced by a great new version of the head unit 804, then the old head unit 804 can be re-deployed to a back or basement door, etc. When first plugged into a particular docking station 808, a particular head unit 804 may be configured to ask the user via any suitable interface (e.g., 2D LCD display, 2D/3D holographic projection, voice interaction, etc.) a few simple questions, such as "Where am I?" and the user can select "front door" or "garage door" or "back door" or "front gate" and so forth. In other examples, head unit 804 can provide instructions, such as "Press button once if I am at the front door, press twice if I am at the back door," etc.

According to some embodiments, head unit 804 may include one or more of a main processor 814, storage 816, button and/or touch screen display and/or any other suitable user interface 812 (e.g., keyboard, trackball, switch, slide, 3-dimensional user input devices/user interfaces, etc.), audio speaker 836, microphone 844, power converter 840, global positioning system (GPS) component 850 (e.g., GPS receiver), radio frequency identification (RFID) locator 854, and general physical module receiver 858. Head unit 804 may additionally or alternatively include one or more types of a wireless and/or wired networking component 862. In view of the ample power availability, a variety of any suitable communications capabilities can be provided by networking component 862 to smart doorbell 106, including Bluetooth, Wi-Fi, ZigBee, 3G/4G wireless, CAT6 wired Ethernet, and even optical fiber from the curb. Furthermore, because smart doorbell 106 may be coupled to a home 120V system or any other suitable wired or wireless power system, a HomePlug or other powerline-communications capability can be provided by networking component 862. Such communication capabilities may enable smart doorbell 106 to communicate with any other smart device of environment 100 and/or with any suitable element of platform 200.

Head unit 804 of smart doorbell 106 may additionally or alternatively include any number of any suitable sensor components 828, such as any suitable temperature sensor, any suitable humidity sensor, any suitable occupancy sensor, any suitable ambient light sensor (ALS), any suitable fire sensor, any suitable smoke sensor, any suitable carbon monoxide (CO) sensor, any suitable proximity sensor, any suitable passive infrared (PIR) or other motion sensor, any suitable ultrasound sensor, any suitable still or video camera or scanner (e.g., a charge-coupled device (CCD) camera, a complementary metal-oxide-semiconductor (CMOS) camera, or any suitable scanner (e.g., a barcode scanner or any other suitable scanner that may obtain identifying information from a code, such as a linear barcode, a two-dimensional or matrix barcode (e.g., a quick response ("QR") code), a three-dimensional barcode, or the like), any suitable near-field communication (NFC) technique sensor (e.g., for sensing an entity wearing an infrared or NFC-capable smartphone or other suitable element), any suitable RFID technique sensor (e.g., for sensing an entity wearing an RFID bracelet, RFID necklace, RFID key fob, or other suitable element), any suitable audio sensor (e.g., a microphone, which may operate in conjunction with an audio-processing application that may be accessible to doorbell 106 (e.g., at environment 100, system 164, or other accessible component(s) of platform 200), which may identify a particular voice or other specific audio data for authenticating a user or for any other suitable purpose)), any suitable biometric sensor (e.g., a fingerprint reader or heart rate sensor or facial recognition sensor or any other feature recognition sensor, which may operate in conjunction with a feature-processing application that may be accessible to doorbell 106 (e.g., at environment 100, system 164, or other accessible component(s) of platform 200), for authenticating a user or for any other suitable purpose), and the like. A rechargeable battery 832 or any equivalently capable onboard power storage medium may also be provided by head unit 804. For example, battery 832 can be a rechargeable Lithium-Ion battery. In operation, smart doorbell 106 may charge battery 832 during time intervals in which the hardware power usage is less than what power stealing can safely provide, and may discharge to provide any needed extra electrical power during time intervals in which the hardware power usage is greater than what power stealing can safely provide, which may thereby extract power as needed from the 120V "hot" line voltage wire or other suitable power source. Battery 832 may be used as a conventional back-up source or as a reservoir to supply excess DC power if needed for short periods.

User interface 812 may include one or more visual displays (e.g., thin film transistor (TFT), organic light-emitting diode (OLED), or any other suitable display), touchscreen, and/or button input capabilities, audio speaker 836, microphone 844, and the like. In some embodiments, (e.g., as may be shown in FIGS. 8A and 8B), a particular head unit 804 of smart doorbell 106 may include user interface 812 with a click-and-rotate annular ring input button. According to such embodiments, the click-and-rotate annular ring input button may be used by a visitor to simply "ring" a doorbell (e.g., for a visitor to attempt to announce itself). Furthermore, in some embodiments, such a click-and-rotate annular ring input button may be operative to provide menu-driven interfaces for user governance of some or all of the various capabilities of doorbell 106. User interface 812 may additionally or alternatively be configured to take a variety of forms, including, but not limited to, a touch pad, dial, click wheel, scroll wheel, touch screen, 3-dimensional input and/or output interface, one or more buttons (e.g., a single conventional doorbell-like button or multiple buttons of a keyboard), mouse, joy stick, track ball, and the like. Moreover, one or more of sensor components 828 may also be at least partially used as an input component (e.g., by sensing data from a user (e.g., as a microphone, camera, scanner, biometric sensor, and the like)) and/or may be at least partially integrated into user interface 812 (e.g., user interface 812 may include a biometric fingerprint scanner to identify the fingerprint of an entity that may touch user interface 812). As may be shown in FIGS. 8A-8C, a 2D image and/or 3D holographic image projector 830 may also be provided so that the effective dimension of the display is not just limited to the physical size of a face of head unit 804. For example, as described below (e.g., with respect to FIG. 8C), if a package is to be deposited by a visitor, smart doorbell 106 may leverage projector 830 to project a defined drop-off area for the package (e.g., area AL of FIG. 1, as described below in more detail). When button 812 is depressed, touched, or otherwise selectively interacted with and/or utilized by a visitor, doorbell 106 may be operative to generate and transmit a signal (e.g., via any suitable wired or wireless communication path) to a user-communicative component for alerting a user that a visitor is at doorbell 106, where such a user-communicative component may be any suitable smart component of smart environment 100 (e.g., an output component of a hazard device 104 or a communication mechanism available to a user device 166) or any conventional component of a user environment (e.g., a chime of a conventional doorbell and/or an emergency light of a home).

Smart doorbell 106 of environment 100 may be configured to include any suitable combination of any of the components described above with respect to any component of platform 200 so as to appropriately interact with other smart devices of environment 100 and services platform 200 and any other suitable entity, such as system users registered with or associated with environment 100 (e.g., owners, occupants, etc.) and/or visitor entities that may visit environment 100 (e.g., package deliverers, friends, solicitors, strangers, would-be-thieves, etc.). Such a smart doorbell 106 may be a visitor interface or entryway interface device operative to control and detect a visitor's approach to and/or departure from a location (e.g., an outer door 186 of structure 150 of environment 100), announce such an approach or departure, enhance conventional doorbell functionality for both system users and visitors, control settings on a security system, increase the convenience and efficiency of package delivery, increase the traceability of package delivery, enable secure package delivery, detect environmental data and other useful data for environment 100 and system 164, and the like. Doorbell 106, on behalf of smart environment 100 and platform 200 (e.g., system 164), may act as a custodian to environment 100 with respect to any visitors that may approach environment 100.

One or more sensors 828 of doorbell 106, alone or in combination with other smart devices and/or rules-based inference engines and/or artificial intelligence and/or any other processing capabilities provided at environment 100 and/or otherwise by services platform 200, may be operative to detect when a package is attempted to be delivered to smart-home environment 100, and then doorbell 106 may be operative to take one or more of a variety of automated actions in response to such detection. For example, as shown in FIG. 1, if a visitor entity or deliverer DL (e.g., a human courier or a drone or otherwise) is attempting to deliver a package PL to a portion of environment 100, such as to structure 150 at an entryway 186 provided with a smart doorbell 106, doorbell 106 may be operative to access certain package identification information associated with package PL. In some embodiments, doorbell 106 may be operative to receive certain package identification information from deliverer DL, such as by deliverer DL actively physically communicating such package identification information to doorbell 106 (e.g., audibly to an sensing component 828 of doorbell 106) and/or by deliverer DL electronically communicating such package identification information to a networking communication component 862 of doorbell 106 (e.g., by communicating digital data from a deliverer's mobile device 266, which may be similar to a user device 166) using any suitable communications protocol (e.g., via a communication path 107). In some embodiments, doorbell 106 may be operative to access certain package identification information directly from package PL, such as by a scanner sensing component 828 of doorbell 106 scanning information (e.g., code information) from a label ID (e.g., a shipping label or delivery label) coupled to or otherwise associated with package PL (e.g., via a communication path 105). In response to detecting such package identification information of package PL, platform 200 (e.g., doorbell 106, alone or in combination with other smart devices and/or rules-based inference engines and/or artificial intelligence provided at environment 100 and/or services platform 200) may be operative to access additional information based on that detected package identification information (e.g., the sender, recipient, a description of the contents of package PL, whether signature is required to complete the delivery, etc.) and/or to take one or more of a variety of automated actions based on that detected package identification information and/or additionally accessed information.

Such package identification information that may be associated with a package (e.g., package PL) may be generated by any suitable entity or combination of entities using any suitable data. In some embodiments, certain package identification information that may be associated with package PL may uniquely identify a particular smart-home environment 100 and/or a system user registered with or otherwise associated with environment 100 (e.g., a resident of environment 100) and/or a mode setting thereof, such that an entity with access to such package identification information may be able to access additional information associated with that environment 100 or user of environment 100. For example, a delivery entity (e.g., a courier service such as Federal Express) that may be in the process of delivering package PL to environment 100 may use certain package identification information to access any suitable smart environment data (e.g., dynamic data) regarding environment 100 or a user thereof that may be identifiable by that package identification information for increasing the convenience and efficiency of package delivery. Such smart environment data may be indicative of a status of environment 100 or of a particular user of environment 100 (e.g., the availability of someone at environment 100 to receive package PL), whereby a delivery entity may be able to leverage such smart environment data for more efficiently attempting to deliver package PL.

Figure 19:
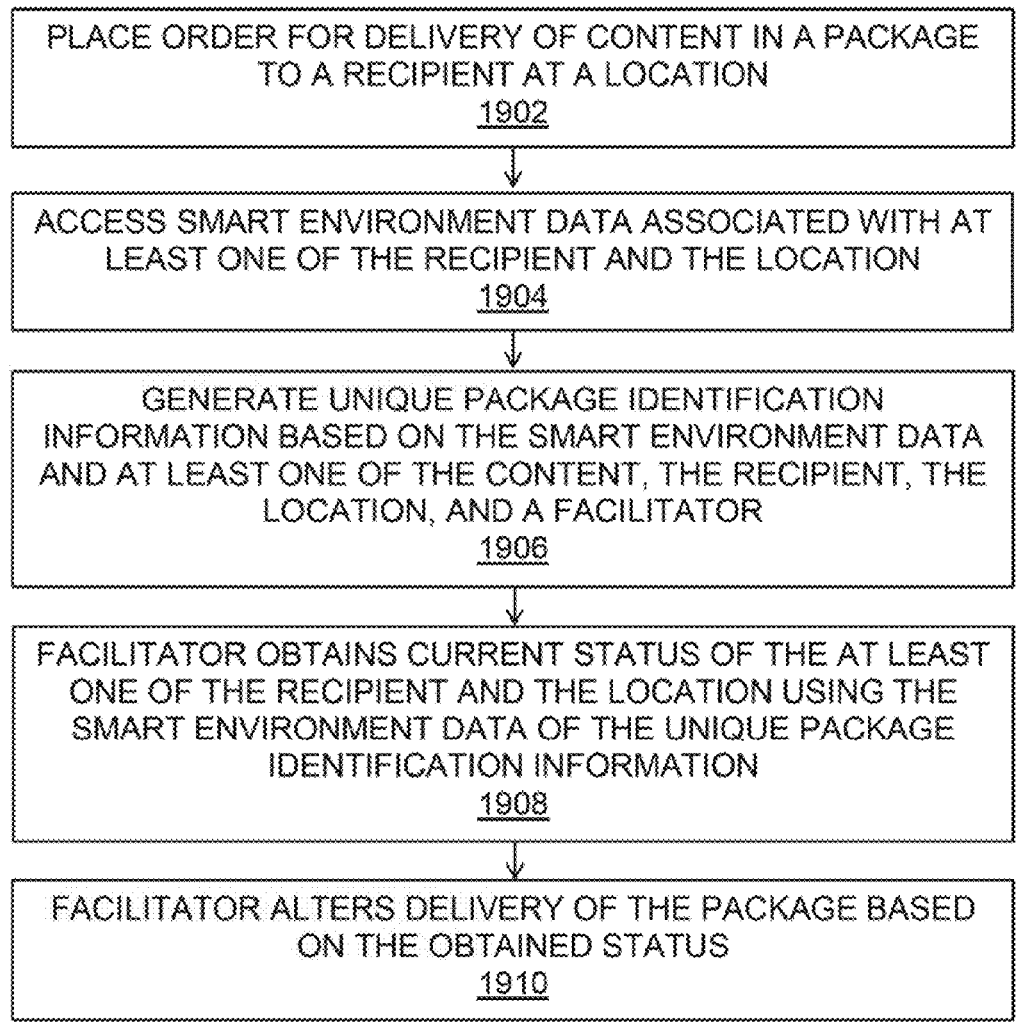
FIG. 19 provides an example process for handling a visitor at a smart environment, according to at least one embodiment.

FIG. 19 is a flowchart of an illustrative process 1900 for enhancing visitor handling (e.g., package delivery). At step 1902, process 1900 may include placing an order for delivery of content in a package to a recipient at a location. Such an order may be made by any suitable ordering entity using any suitable communication technique, including via the telephone, the Internet (e.g., via a web browser or a mobile application), a local "in-person" order, and the like, with respect to any suitable facilitator entity. For example, the ordering entity may be the same as or different than the recipient (e.g., the order may be made by the intended recipient or by another party (e.g., when ordering a gift for the recipient)). As just one example, a mobile device, such as a mobile device 166, may be used by any suitable person to place the order. Any suitable fulfillment entity or combination of fulfillment entities may facilitate the placement of the order, such as a clerk at a store or a telephonic call center, an online server running code that may enable the ordering entity to place the order (e.g., Amazon.com or Seamless.com or any other suitable online vendor), or any other order facilitator. The content to be delivered in the package of the placed order may be any suitable content (e.g., goods or services) that may be physically transported and/or eventually provided at a particular physical location. The package may or may not include wrapping or a covering to securely contain the content during delivery. Instead, the content (e.g., the goods or services desired to be delivered) may not be wrapped in a "physical" package but may be delivered as is (e.g., a new car may be ordered for delivery where the car may not be bound in any package when delivered but the car may be considered both the content and the package, a cable repairman may be ordered for delivery (e.g., to fix a cable connection at the environment 100) where the repairman may be considered both the content and the package, while a set of glassware may be ordered as content for delivery where the glassware may be wrapped in protective bubble wrap and enclosed in a cardboard box as packaging for the glassware content when delivered). The location may be any physical location to which content may be delivered, such as any suitable mailing address, post office box, or the like. A recipient may or may not be identified when the order is placed at step 1902. In some embodiments, one or more particular recipients may be identified when the order is placed (e.g., "John Doe" or "John and Jane Doe" or "Rex the Dog" or "Nest Labs, Inc."). Alternatively, no recipient may be identified and the order may be placed while only identifying a location at which the package should be delivered (e.g., 1 Main Street, Gotham, U.S.A.). Alternatively, no location may be identified and the order may be placed while only identifying a recipient to which the package should be delivered (e.g., John and Jane Doe).

Next, at step 1904, process 1900 may include accessing smart environment data that may be associated with at least one of the recipient and the location of the order of step 1902. Such smart environment data may include any suitable data indicative of a particular smart home environment 100 and/or user (e.g., user UL or UR of FIG. 1) that may be registered or otherwise associated with platform 200 (e.g., a smart entity). For example, any smart environment 100 (e.g., smart home or other environment equipped with one or more smart devices) that may be integrated with platform 200 may be associated with any suitable environment platform-identifier (e.g., via address, geographic coordinates, unique environment ID, etc.) that platform 200 may use to uniquely identify environment 100 in any suitable way. Additionally or alternatively, any system user (e.g., person, animal, etc.) that may be registered or otherwise associated with platform 200 may be associated with any suitable user platform-identifier (e.g., via name, address, facial detection, a registered personal mobile device 166, unique user ID, etc.) that platform 200 may use to uniquely identify that user in any suitable way. In some embodiments, by leveraging the identification of the recipient and/or location provided during placement of the order at step 1902, certain smart environment data may be accessed that may be associated with that recipient and/or location (e.g., any suitable user platform-identifier of platform 200 associated with that recipient as a known user of platform 200 and/or any suitable environment platform-identifier of platform 200 associated with that location as a known environment of platform 200). For example, a facilitator entity, such as a fulfillment entity that may facilitate the placement of the order and/or a delivery entity that may facilitate the delivery of the order, may communicate with platform 200 in order to attempt to access such smart environment data (e.g., if the recipient or location of the order matches any known user or environment of platform 200). As just one example, such a facilitator entity may be a fulfillment entity (e.g., Amazon.com) or a delivery entity (e.g., Federal Express) and may be a business 228 that may be operative to communicate with any other suitable portion of platform 200 (e.g., system 164 via one or more APIs 210) to access such smart environment data that may be associated with the recipient and/or location of the order. As another example, a fulfillment entity may also be a delivery entity (e.g., a restaurant that receives an order, prepares the meal content, and then delivers (e.g., on foot or bicycle or car) the meal content in a package (e.g., brown bag) to environment 100). Alternatively or additionally, the ordering entity that placed the order of step 1902 may provide the facilitator entity with suitable smart environment data (e.g., a user platform-identifier of platform 200 associated with the recipient and/or an environment platform-identifier of platform 200 associated with the location may be known to and shared by the ordering entity with a facilitator entity, either during or after placement of the order at step 1902). Alternatively or additionally, the order placed at step 1902 may be at least partially enabled by a component or subsystem of platform 200 (e.g., of system 164) that may be operative to provide the facilitator entity (e.g., fulfillment entity and/or delivery entity) with suitable smart environment data associated with the order (e.g., a user platform-identifier of platform 200 associated with the recipient and/or an environment platform-identifier of platform 200 associated with the location of the order may be known to and shared by system 164 with a facilitator entity (e.g., via API 210), either during or after placement of the order at step 1902).

At step 1906, process 1900 may include generating unique package identification information (e.g., unique invitation identification information) based on the accessed smart environment data and at least one of the content, the recipient, and the location of the ordered package and/or a facilitator of the ordered package. For example, if a smart environment 100 and/or a user of platform 200 (e.g., a smart system entity) is associated with the location and/or recipient of the ordered package such that smart environment data indicative of that smart environment and/or user may be accessed at step 1904, unique package identification information may be generated at step 1906 that may identify that smart environment and/or that user of platform 200 (e.g., using the smart environment data) and/or at least one identifier of the ordered package (e.g., the content, the recipient, the location, and/or a facilitator/fulfiller/deliverer entity that may be at least partially responsible for delivering the package, etc.). Such unique package identification information may be generated by any suitable entity, such as by system 164 and/or a business facilitator entity 228, and may be shared with any other suitable entity or entities (e.g., with system 164 by facilitator entity 228 and/or with facilitator entity 228 by system 164). For example, in some embodiments, system 164 may associate smart environment data of a smart system entity (e.g., an environment 100 and/or user U) with at least one of a recipient or location of a placed order and may generate unique package identification information for that order using the smart environment data and any suitable identifier(s) of that order, and then may share that unique package identification information with a facilitator 228 of the order (e.g., a delivery entity charged with delivering the ordered package). Alternatively, in some embodiments, a business 228 that may facilitate the order (e.g., a retail entity or a delivery entity) may access smart environment data when at least one of the recipient and location of an order is associated with a smart system entity of system 164 and then business 228 may generate unique package identification information for that order using the smart environment data and/or any suitable identifier(s) of that order (e.g., recipient, deliverer, orderer, contents, location, etc.), where such unique package identification information may be shared by facilitator business 228 with system 164 or any other suitable portion of platform 200 (e.g., a confirmation number generated by such a facilitator entity for a specific order (e.g., a unique order confirmation number) may be leveraged as such unique package identification information).

Process 1900 may include a facilitator obtaining, at step 1908, a current status or mode setting of a smart system entity (e.g., an environment 100 and/or user U) of the smart environment data that may be associated with the unique identification information of the ordered package and then, at step 1910, altering delivery of the ordered package based on the obtained status. That is, when a smart environment 100 and/or a user U of system 164 (e.g., a smart system entity) may be associated with a placed order (e.g., as a location and/or recipient of the order) such that unique package identification information may be generated that links that environment or user with the placed order, the handling of that order may be affected by any suitable characteristic of that environment or user. For example, after an order for a package is placed (e.g., at step 1902) but before that ordered package is delivered (e.g., at step 1910), a current status or characteristic of at least one smart system entity associated with the ordered package, as may be determined through leveraging platform 200 and unique package identification information (e.g., at step 1908), may be obtained by a facilitator for altering the delivery of the package.

As just one example, when a facilitator delivery entity is about to deliver the ordered package (e.g., when the ordered package is received at a distribution center proximal to the location from a remote originating distribution center), the delivery entity may leverage the unique package identification information of the package to obtain current status information of a smart system entity associated with the package (e.g., associated with the unique package identification information) from platform 200 (e.g., system 164) in order to determine how to most efficiently deliver the package. In some embodiments (e.g., after step 1906 and/or prior to step 1908), the unique package identification information may be incorporated into data (e.g., code data or NFC data) of a shipping label that may be affixed to or otherwise associated with the package (e.g., label ID of package PL of FIG. 1), and such a label may be scanned by the delivery entity in advance of an actual delivery attempt of the ordered package (e.g., at step 1908) so as to enable the delivery entity to obtain current status information about the ordered package from platform 200. Such status information may be dynamic and change over time (e.g., after step 1906 but before step 1908), such that the facilitator entity may obtain current status information before attempting to deliver the package in order to efficiently deliver the package based on the most useful status information. For example, a deliverer of delivery entity business 228 may first access and leverage the unique package identification information of a package to obtain current status information prior to a deliverer of delivery entity business 228 arriving at environment 100 with the package. As shown in FIG. 1, for example, a deliverer agent DR at a dispatch center DC of business 228 remote from location LU of environment 100 may utilize label ID of package PL to access and leverage the unique package identification information of package PL to obtain current status information prior to business 228 instructing deliverer agent DL of FIG. 1 to arrive at door 186 of environment 100 with package PL.

Status information regarding a smart system entity (e.g., a smart environment 100 or user U) may be any suitable information generated by or inferred from any suitable data of platform 200 (e.g., of sensors of environment 100 and/or from user U). As just one particular example, as mentioned above, system 164 may use tracking information to make inferences regarding the current and/or future occupancy of home environment 100 and/or the current and/or future location of a user U (e.g., at environment 100, like user UL of FIG. 1 and Husband 1718 of FIG. 17, or away from environment 100, like user UR of FIG. 1 and Wife 1714 of FIG. 17), where such current and/or future occupancy inferences may be obtained as current status information and then may be leveraged by a facilitator to affect the delivery of the package (e.g., to delay delivery until a time when environment 100 may be occupied by the recipient to receive the delivery). As another example, system 164 may be configured to enable a user U to access information about any ordered packages that may be associated with that user (e.g., packages to be delivered to that user as a recipient or to that user's smart environment as a location), which may be determined through identifying any unique package identification information that may be associated with that user or an environment of that user (e.g., with an applicable smart system entity), such that the user may manually update any settings that he or she may wish to have be associated with any such ordered package (e.g., for affecting its delivery). For example, using a device 166, a user may interface with any suitable user interface that may be provided by any suitable entity of platform 200 (e.g., system 164) to dictate and/or edit any status information that may be associated with an ordered package and then used by a facilitator business 228 for efficiently delivering that package, such as altering the delivery location (e.g., target) at which the package ought to be delivered or defining a particular time during which the delivery should or should not be made to the location, and the like. Therefore, the status information that may be obtained by a facilitator (e.g., a deliverer at step 1908) may be indicative of the actual current status of a smart system entity (e.g., a smart environment 100 or user U) at that moment and/or of a future status of that smart system entity (e.g., during what future times environment 100 is expected to be occupied and during what future times environment 100 is expected to not be occupied, etc.), and such status information may be based on inferences or other processing that may be automatically carried out by platform 200 (e.g., system 164) based on any suitable sensed data with respect to any smart system entity (e.g., by any smart sensing devices of environment 100) and/or based on any manual instructions or settings defined or otherwise provided by a system user to platform 200 (e.g., to a smart device and/or to system 164).

A do-not-disturb mode may be set for a particular environment 100 or at least a portion thereof for any suitable length of time that may start at a current or future moment. Such a mode may indicate that environment 100 may not be willing or able to accept at least certain package deliveries (e.g., deliveries requiring a confirmation of receipt user signature by a particular user or any user). Such a mode may be manually set by an appropriate user (e.g., a user with appropriate management rights for environment 100 using any suitable device 166 or interaction with any other suitable smart device of environment 100 or any other suitable component of system 164 of platform 200) for any suitable reason, such as when the user does not want to greet a visitor (e.g., if the user is feeling under the weather or going to sleep) or when the user will not be at environment 100 (e.g., when the user is going on vacation or leaving a babysitter at home with a child). Alternatively, platform 200 may be operative to collect any suitable information from one or more smart devices of environment 100 and may make inferences in order to automatically set a do-not-disturb mode for environment 100 (e.g., based on sensed occupancy data and sensed movement data).

Information indicative of when environment 100 may be associated with such a mode may be a type of current status information that may be associated by platform 200 with unique package identification information and shared with or otherwise made accessible to a facilitator entity (e.g., a delivery business 228) for increasing the efficiency of package delivery and/or of any other activity that may include a visitor interacting with environment 100. Such information may be handled with sensitivity so as to not be leveraged for sinister purposes (e.g., for a third party to detect when an environment 100 is in a do-not-disturb mode so as to assume no one is home and attempt a robbery of the premises). System 164 may be configured to share information about a do-not-disturb mode of an environment 100 or any other suitable status information of environment 100 or a user thereof with a third party, such as a facilitator of a package delivery, only when certain data is accessible to that third party. For example, system 164 may only share such status information when a facilitator entity queries system 164 with respect to particular unique package identification information (e.g., such information as may be generated at step 1906 and linked with a particular ordered package). Certain facilitator entities (e.g., Federal Express) may be trusted and enabled by platform 200 to interpret such unique package identification information for appropriately querying system 164 about such status information, and whereby system 164 may be configured to only share such status information when queried by a trusted entity (e.g., when the unique package identification information is known by or otherwise leveraged by an entity (e.g., a deliverer entity) trusted by system 164 and not just when any entity has access to the recipient and/or location data of the ordered package).

Status information of a smart system entity associated with unique package identification information of an ordered package may include various types of information that may be obtained and leveraged (e.g., at steps 1908/1910) by a facilitator entity for delivering the package in a manner that may be more efficient for the facilitator entity and/or that may be more convenient for environment 100 or a user thereof. For example, such status information may include information indicative of when to allow delivery to a particular location (e.g., after 4:00 PM on Mondays and Wednesdays only at environment 100), information indicative of preferred alternate delivery methods (e.g., do not deliver to environment 100 but rather hold a particular package at a particular deliverer pick up location for manual pick-up by a particular user, or deliver to another recipient and/or to another location other than the recipient and/or location initially defined at step 1902), information indicative of authorization to deliver without signed confirmation of receipt of delivery (e.g., a particular authenticated user of the system hereby authorizes deliverer to deliver a particular package to a particular location and leave next to the front door of that location without a human user signing for that delivery), and/or any other suitable information indicative of any other suitable delivery preferences or delivery instructions. For example, in response to receiving status information indicative of authorization to deliver to another location, the facilitator may be operative to obtain status information associated with a smart environment of that other location (e.g., for repeating one or more steps of process 1900 with respect to that smart environment).

In some embodiments, status information may be provided to a facilitator on a macro-level in addition to or as an alternative to providing status information with respect to just one particular environment 100 and/or user thereof. For example, status information may be made available to a facilitator entity business 228 that may be generally indicative of a status or trend of a particular group of smart system entities (e.g., a neighborhood or ZIP code that may include multiple smart environments 100) that may include a smart system entity identified based on certain package information. As just one example, such status information may be indicative of certain days of the week or other suitable current or future periods when a majority or any suitable threshold amount of environments of a group of environments including an environment associated with certain package information are not available to receive packages, and such information may be leveraged by the facilitator entity to avoid scheduling deliveries to that entire group (e.g., neighborhood) of environments during those days. Any suitable grouping of environments or users or other suitable smart system entities of any suitable size and type may be used to generate group or macro-level status information that may be made available to a facilitator entity for more efficiently handling business (e.g., deliveries) associated with that group. By grouping smart system entities and only sharing status data at a group-level with third parties, such as facilitator entities, platform 200 may protect the privacy and/or security of certain environments by not sharing status information associated specifically with only a particular single environment 100 (e.g., to preserve at least some anonymity about the status of a particular smart environment).

By accessing certain status information of a smart environment 100 or other suitable smart system entity of platform 200, as may be detected or inferred by system 164, a facilitator entity business 228 may be configured to optimize package delivery. For example, data indicative of when a particular location may and may not be able to receive a package delivery may be processed by any suitable distribution system to dictate when certain packages are dispatched for maximizing the likelihood of a successful physical delivery. In some embodiments, when status information is obtained at step 1908 indicative of current availability of a target environment 100 to receive a package (e.g., availability for the next 4 hours), facilitator 228 may immediately deliver the package to environment 100, yet, in other embodiments, when status information is obtained at step 1908 indicative of no current availability of a target environment 100 to receive a package (e.g., not available for at least the next 4 hours), facilitator 228 may delay the delivery of the package to environment 100 (e.g., until new status information may be obtained at a later use of step 1908). As another example, in some embodiments, when status information is obtained at step 1908 indicative of an instruction to deliver a package to an initial target environment 100 that is currently available to receive the package (e.g., availability for the next 4 hours), facilitator 228 may immediately deliver the package to environment 100, yet, in other embodiments, when status information is obtained at step 1908 indicative of an instruction to deliver a package to a new target environment 100*a* rather than an initial target environment 100, facilitator 228 may repeat one or more of steps 1904-1910 with respect to smart environment data associated with that new target environment 100*a*. This may reduce overhead costs for a delivery entity (e.g., reduce fuel prices and wasted man hours by limiting the number of failed delivery attempts) and/or may reduce insurance costs by limiting the exposure of perishable contents from unnecessary and degrading delivery effects.

One, some, or all of steps 1902, 1904, 1906, 1908, and 1910 may be at least partially or completely automated using one or more computer systems (e.g., computer system 1500 and/or computer system 1600) that may be leveraged by one or more of environment 100, system 164, facilitator entity business 228, and the like for automatically associating a smart system entity of system 164 with an ordered package and then sharing certain status information of that smart system entity with a deliverer or other facilitator entity at any suitable time for positively affecting the delivery of the package. A user of system 164 may actively and manually define certain preferences or instructions to be shared with facilitator entity businesses 228 for affecting the delivery of a particular ordered package currently associated with that user or for affecting the delivery of any package that may be associated with that user in the future. Alternatively or additionally, the delivery of ordered packages associated with a user or environment may be based on inferences made by system 164 and selectively shared with facilitator entity businesses 228 (e.g., without any active manual preferences made by the user but instead done transparently to a user). Therefore, in some embodiments, once an order is placed at step 1902, one, some, or all of steps 1904-1910 may be carried out transparently to a system user (e.g., to a recipient of package PL) by platform 200 based on any status information that may be determined automatically by system 164 and/or based on previously defined settings made by a system user.

It is understood that the steps shown in process 1900 of FIG. 19 are merely illustrative and that existing steps may be modified or omitted, additional steps may be added, and the order of certain steps may be altered.

When delivery of an ordered package is actually attempted at a smart environment 100, whether or not in accordance with process 1900, one or more smart devices of environment 100 may be leveraged to at least partially automate the handling of the delivery attempt, which may increase the efficiency of the delivery attempt and/or to minimize any inconvenience to a user of environment 100 that such a delivery attempt may cause. For example, an entryway interface device, such as a smart doorbell 106, may be provided at a suitable entryway of a suitable portion of a smart environment 100 for initiating or otherwise facilitating interaction between a delivery entity and smart environment 100 that may efficiently handle a package delivery attempt (e.g., to reduce delivery failures, to increase user satisfaction and convenience, and/or to minimize risk of package theft).

According to some embodiments, one or more sensing components 828 or other suitable components of doorbell 106 in combination with rules-based inference engines or artificial intelligence or any other suitable processing components of platform 200 provided at a central server such as system 164 or otherwise may be used to detect when a package is attempted to be delivered to smart-home environment 100 and to take a variety of automated actions in response. For example, sensing components 828 may be operative to "see" the uniform of a delivery person approaching doorbell 106 or the truck of the delivery person, or the sensors can "hear" a delivery drone or hear a delivery truck in combination with footsteps of a delivery person approaching the door within a period after hearing the truck. Once the deliverer is within a predetermined distance from the door or entry point 186 that may be associated with smart doorbell 106, doorbell 106 may be configured to ask the suspected deliverer (e.g., using speaker 838) if he or she is a delivery person, to which that person can reply with an audible response or by indicating as such on user interface 812 of doorbell 106. If the person is making a delivery, doorbell 106 can be configured to instruct the person to place the package in a suitable location proximate doorbell 106 such that its scanner or any other suitable sensing component 828 can scan the bar code or other type of identifying tag affixed to or associated with the package being delivered for detecting suitable package identification information.

According to embodiments, a central server, such as system 164, can use the bar code or any suitable data detected directly from the deliverer or local package to obtain information about the package, such as the sender, recipient, a description of the item therein, whether signature is required, etc. Based on this information, rules-based inferences engines or artificial intelligence or otherwise of platform 200 may be operative to make one or more inferences regarding any action to take next. For example, if occupants or, more particularly, if a specified recipient or recipients are in the home and the package is from a sender or contains an item that is of particular interest to the one or more occupants, an announcement can be made in the home, indicating the package is currently being dropped off and providing details about the package. On the other hand, if the sender or item is not of particular interest to one of the occupants based on the occupants past responses to receiving such deliveries, then no announcement may be made and the occupants can discover the package in due course. Similarly, if no occupants are home but an inference is made that the package is of particular interest to one of the occupants, a text message, e-mail, telephone call, or any other suitable contact attempt can be made to the one or more identified occupants, indicating that the package is being delivered.

According to embodiments, in the event a signature may be required for the package but none of the occupants are home or available to interface with the deliverer to provide such a signature, an inference may be made not to disturb the occupants and doorbell 106 can be configured to provide authorization to the deliverer to leave the package. For example, doorbell 106 may be operative to present an authorization code (e.g., in plain text, barcode, or encrypted forms) via any suitable output component of doorbell 106 and may prompt the deliverer to use a deliverer device to record, scan, photograph, or otherwise acquire the authorization code. Once the authorization code has been acquired by the deliverer, doorbell 106 can then instruct the deliverer regarding how to properly leave the package at environment 100, such as at the front door, around the back of the house in a discrete location, etc.

Figure 20:
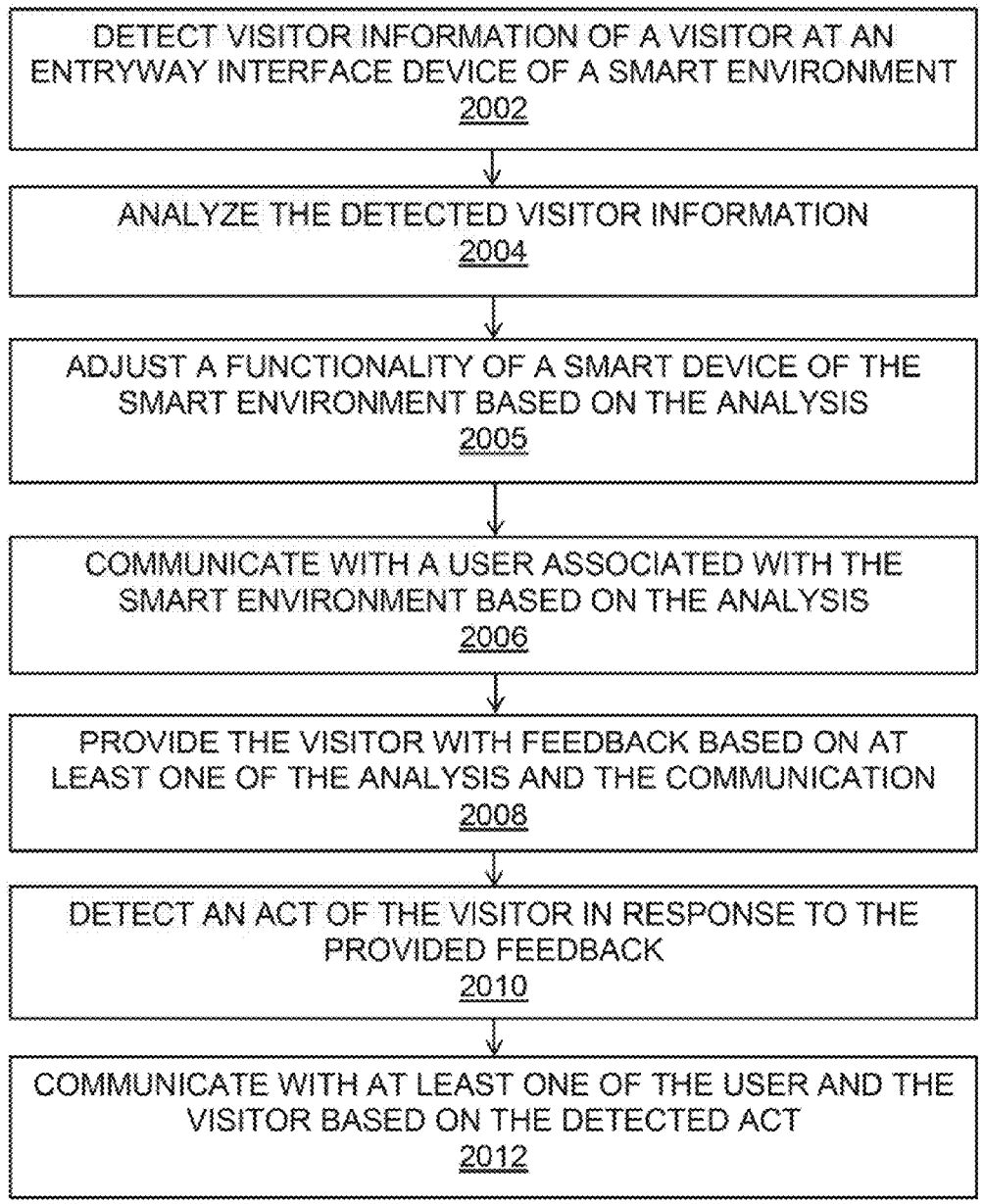
FIG. 20 provides an example process for handling a visitor at a smart environment, according to at least one embodiment.

FIG. 20 is a flowchart of an illustrative process 2000 for enhancing visitor handling (e.g., package delivery). At step 2002, process 2000 may include detecting visitor information of a visitor at an entryway interface device of a smart environment, where such a visitor may be a deliverer and such visitor information may be package information associated with a package provided by the deliverer at the entryway interface device of the smart environment. For example, as shown in FIG. 1, when a deliverer DL arrives with a package PL at a portion of environment 100 (e.g., at a door entry point 186 of structure 150 of environment 100), smart doorbell 106 may be configured to detect any suitable package information associated with package PL. In some embodiments, doorbell 106 may be operative to receive certain package identification information from deliverer DL, such as by deliverer DL actively physically communicating such package identification information to doorbell 106 (e.g., audibly to an audio sensor 828 of doorbell 106) and/or by deliverer DL electronically communicating such package identification information to a networking communication component 868 or scanner sensor 828 of doorbell 106 (e.g., by communicating digital data from a deliverer's mobile device 266, which may be similar to a user device 166) using any suitable communications protocol or code delivery technique (e.g., via a data path 107). Additionally or alternatively, in some embodiments, doorbell 106 may be operative to access certain package identification information directly from package PL, such as by a scanner sensor 828 of doorbell 106 scanning information (e.g., code information or simple printed recipient/location/deliverer information) from a label ID (e.g., a shipping label or delivery label) affixed to or otherwise associated with package PL (e.g., via a data communication path 105). Such detected package identification information may include any suitable information that may identify any suitable characteristic of the package or of its attempted delivery, such as an identity of an orderer of the package (e.g., the entity that placed an order for the package at step 1902 of process 1900), an identity of a facilitator of the package (e.g., a fulfillment entity that may have processed the order for the package at step 1902 of process 1900, a deliverer entity that may be responsible for deliverer DL bringing package PL to environment 100, etc.), an identity of the time and data of the currently attempted delivery, an identity of an intended recipient of the package (e.g., the recipient indicated during placement of the order by the orderer or an updated recipient as may be defined by updated status information generated by a smart system entity (e.g., during process 1900 as described above)), an identity of an intended delivery location of the package (e.g., the delivery location indicated during placement of the order by the orderer or an updated delivery location as may be defined by updated status information generated by a smart system entity (e.g., during process 1900 as described above)), an identity of the content of the package (e.g., a description of the specific content or any suitable information describing certain attributes of the content (e.g., perishable, heavy, must be refrigerated, etc.)), an identity of any suitable delivery requirements for the package (e.g., a requirement that a particular user or a particular type of user (e.g., an adult) must sign for the package to enable delivery, etc.), and the like.

Such detected package identification information of step 2002 may be unique package identification information that may be initially generated or at least partially defined by system 164 of platform 200 based on smart environment data of a smart system entity associated with the package prior to the delivery attempt (e.g., as described above with respect to step 1906 of process 1900), where such "smart" unique package identification information may be detected by doorbell 106 directly from deliverer DL or device 266 of deliverer DL and/or from package PL (e.g., from label ID). Alternatively, such detected package identification information of step 2002 may be conventional package identification information, such as handwritten addressee information that may be manually entered on a shipping label ID of the package by a human or any other conventional delivery shipping label information. In some embodiments, the delivery attempt may be for a package that does not include any shipping label ID at all. For example, package PL may simply be a plate of cookies that a friendly neighbor has made and is attempting to deliver as deliverer DL to an occupant of environment 100. In such embodiments, the information associated with the package that may be detected by doorbell 106 may be captured image data of deliverer DL and/or package PL (e.g., as may be captured by a camera sensing component 828 of doorbell 106), spoken word data as may be provided by deliverer DL describing the delivery of package PL (e.g., as may be captured by an audio sensing component 844 of doorbell 106), textual data as may be entered by deliverer DL describing the delivery of package PL (e.g., as may be captured by a keyboard user interface input component 812 of doorbell 106), or any other suitable data that may be detected by doorbell 106 via any suitable data path regarding deliverer DL and/or package PL.

Doorbell 106 may be configured to detect any suitable package identification information at step 2002 in any suitable way, such as by instructing a detected deliverer DL to share such information (e.g., by instructing deliverer DL to position an appropriate portion of package PL (e.g., label ID) in an appropriate location (e.g., using any suitable output component of doorbell 106 or other smart device) such that a sensing component 828 of doorbell 106 may be able to access information therefrom), or doorbell 106 may be configured to automatically detect any suitable package identification information without requiring any specific activity on behalf of the deliverer DL (e.g., doorbell 106 may automatically detect suitable package identification information whenever a deliverer DL arrives with package PL within a particular distance of doorbell 106 (e.g., via NFC or RFID or Bluetooth technology)). When deliverer DL or package PL is detected by doorbell 106, either in response to a deliverer actively identifying itself or the package to doorbell 106, or in response to doorbell 106 automatically identifying the deliverer and/or the package, certain types of information may be accessed for analysis by environment 100 (e.g., time and date of attempted delivery, identification of deliverer, recipient, content of package, any delivery requirements, etc.).

At step 2004, process 2000 may include analyzing the detected visitor information (e.g., the detected package identification information) of step 2002 (e.g., in conjunction with any other suitable data available to platform 200, such as settings of a current mode of environment 100 or of a user). For example, in response to detecting such package identification information at step 2002 with respect to deliverer DL and/or package PL, doorbell 106, alone or in combination with other smart devices and/or rules-based inference engines and/or artificial intelligence provided locally at environment 100 and/or in conjunction with system 164 and/or any other component(s) of services platform 200 (e.g., business 228), may be operative, at step 2004, to access any suitable additional information based on that detected package identification information that may be useful (e.g., identification of the sender, intended recipient, intended delivery location, deliverer, description of the contents of package PL, whether signature is required to complete the delivery, etc.) and/or any other suitable data available to platform 200 (e.g., setting information of a current mode of environment 100 and/or of a system user), and then to analyze all such available information for determining whether or not to take one or more of a variety of automated actions based on that detected package identification information and/or any additionally accessed information.

Certain package identification information may be directly determined by doorbell 106 from any suitable initial data provided by deliverer DL and/or package PL (e.g., via data communication paths 105 or 107) while other package identification information may be accessed by doorbell 106 from other sources based on such initial data (e.g., from service 164 and or business 228 via service 164). For example, a unique code that may be scanned by doorbell 106 from label ID at package PL may be a unique identifier that doorbell 106 may share with service 164 such that service 164 may access particular types of data associated with that identifier (e.g., recipient, content, etc.) from facilitator business 228. Alternatively, such particular recipient and content data may be locally obtained by doorbell 106 directly from package PL or deliverer DL (e.g., via path 107 from device 266, which may or may not be accessing such data from server data of business 228 via internet 162).

Current status information of a smart system entity associated with the package delivery, which may be similar to the status information that may be obtained by a deliverer at step 1908, may be obtained and analyzed at step 2004. Whether or not a facilitator entity 228 may be configured to or otherwise allowed to obtain current status information of a smart system entity associated with package PL (e.g., at step 1908), environment 100 (e.g., in conjunction with system 164) may be configured to obtain and utilize such current status information at step 2004 in response to detecting certain package identification information at step 2002, where such status information may have been actively defined by a user of system 164 or inferred or artificially generated by system 164 for all deliveries generally or for a specific package delivery.

Any rules or instructions that may be obtained, generated, or otherwise determined by platform 200 (e.g., environment 100 and/or system 164) at step 2004 based on the detected package identification information of step 2002 may be leveraged in any suitable way for positively affecting the delivery attempt of package PL. Once all available and accessible package data associated with the package delivery attempt has been obtained by environment 100 (e.g., package information obtained directly by doorbell 106 from package PL and/or deliverer DL, and/or any additional package information obtained via system 164 based on any initial package information obtained by doorbell 106), environment 100 (e.g., in combination with system 164) may analyze that package data in combination with any suitable smart environment data or rules or settings or inferences or modes that may be associated with environment 100 or any user or other smart system entity that may be associated with the package data and/or with environment 100 so as to determine one or more ways in which to efficiently handle the delivery attempt of package PL at doorbell 106. Such smart environment data that may be analyzed or processed in conjunction with any package data and/or visitor/deliverer data may include any suitable data associated with a smart environment user (e.g., a user that has been identified as an intended recipient of the package or any other user associated with environment 100) and/or any suitable data associated with the smart environment itself, such as the current and/or anticipated future location of the smart environment user (e.g., location within environment 100 or outside of environment 100, such as with respect to geo-fences 1730/1734 (e.g., the user is currently driving towards environment 100 and will arrive at environment 100 within 2 minutes, so as to receive the package)), the current and/or anticipated future status or mode of a smart environment user (e.g., sleeping, busy, on the telephone, etc.), the current and/or anticipated future mode of the environment or user (e.g., a do-not-disturb mode, etc.), and the like. Any suitable smart environment data described herein with respect to any smart device of environment 100 or in conjunction with any other feature of platform 200 (e.g., system 164 and/or third parties 222-230 and/or extrinsic information 316 and/or processing paradigms 310) may be analyzed or otherwise processed at step 2004 in conjunction with any package information that may be associated in any way with a package delivery attempt detected at step 2002 in order to initiate or otherwise prompt (e.g., with doorbell 106 and/or other suitable components of environment 100 and/or platform 200) any suitable action(s) for positively affecting the handling of a visitor (e.g., the delivery attempt of package PL (e.g., at one or more of steps 2005-2012 of process 2000)). In some embodiments, as soon as a deliverer DL is detected, doorbell 106 may be operative to indicate to deliverer DL that doorbell button 812 is disabled (e.g., to prevent deliverer DL from even bothering to try to contact an occupant through interaction with button 812). In some particular embodiments, as described below in more detail, doorbell 106 may be operative to indicate that doorbell button 812 is disabled in order to prevent any visitor from even bothering to try to contact an occupant through interaction with button 812, at least until certain visitor detection and analysis has been completed by system 164.

At step 2005, process 2000 may include adjusting the functionality of at least one smart device of environment 100 based on the analysis of step 2004 or even based solely on the detection of step 2002. As just one example, when a visitor is detected at step 2002, smart environment 100 may be operative to turn on a light (e.g., outdoor lighting 114) to increase the safety of the visitor and/or to increase the security of environment 100. As another example, when a visitor is detected at step 2002, smart environment 100 may be operative to emit any suitable sound (e.g., a dog bark or a greeting) from any suitable smart device (e.g., from audio speaker 836 of doorbell 106) to increase the awareness of the visitor with respect to environment 100. As another example, when a visitor is detected at step 2002, smart environment 100 may be operative to lock any unlocked entry ways to structure 150 (e.g., by locking smart doorknob 122) to increase the security of environment 100.

At step 2006, process 2000 may include communicating with a user associated with the smart environment based on the analysis of step 2004. As just one example, when the analysis of step 2004 determines that an intended recipient of package PL is a user that is currently located at environment 100 and is in an active and available state (e.g., not sleeping, on the telephone, or in any another do-not-disturb state, as may be determined by smart environment 100), smart environment 100 may be operative to communicate information indicative of the current package delivery attempt to that user in any suitable way at step 2006 (e.g., by audibly announcing any suitable information related to the delivery attempt of the particular package via an audio speaker of a smart device that may be located most proximal to the current location of that user within environment 100). As another example, when the analysis of step 2004 determines that an intended recipient of package PL is a user that is not currently located at environment 100, smart environment 100 may be operative to communicate information indicative of the current package delivery attempt to that user via system 164 in any suitable way at step 2006 (e.g., by transmitting an electronic message to a personal device 166 associated with that user).

In response to such communication by environment 100 to a user, the user may communicate in any suitable way a response back to environment 100 (e.g., via any suitable smart device (e.g., hazard device 104 or device 166) to any suitable component of environment 100 or system 164, where such communication may be indicative of how the user would like environment 100 to handle the detected delivery attempt. For example, the user may instruct any suitable device of environment 100 that the user does not wish to directly interface with the deliverer but that the delivery should be completed or carried out in some particular automated manner by environment 100 and the deliverer. As another example, the user may communicate to environment 100 that the user will interface with the deliverer locally, whereby the user may move towards entry point 186 for physically interacting with deliverer DL to receive package PL. As yet another example, the user may communicate to environment 100 that the user will interface with the deliverer remotely via one or more devices of environment 100 or system 164, whereby environment 100 may enable the user to communicate via a first smart device (e.g., a hazard device 104 of environment 100 that may be proximate to user UL local to environment 100 or a personal device 166 of user UL or UR whether the user is local to or remote from environment 100) and whereby environment 100 may enable deliverer DL to communicate via a second smart device (e.g., doorbell 106 or other suitable device of environment 100), such that the interconnectivity of those devices of environment 100 may facilitate effective communication between the user and the deliverer. In certain embodiments, by facilitating communication with an appropriate user via environment 100 and system 164 rather than requiring a deliverer to attempt to contact a user independently (e.g., via a telephone number that may be associated with the ordered package (e.g., at step 1902), process 2000 may reduce the burden of the deliverer while also retaining certain privacy of the user by utilizing system 164 as an intermediary between the user and the deliverer such that certain types of contact information or ways of communicating with the user are guarded and protected by system 164 and not necessarily shared with the deliverer while still enabling communication between the deliverer and the user via such ways of communication. That is, whether or not a user is local to environment 100, system 164 may enable communication between the user and the deliverer without sharing the whereabouts or contact information of the user with the deliverer. A user may communicate with system 164 via any suitable communication enabled by a smart device of environment 100 when the user (e.g., user UL) is local to environment 100 (e.g., via gestures, as may be described above with respect to smart device 104, via touch input via a touch user interface, audible spoken commands, etc.) and/or via any suitable communication enabled by a system 164 when the user is local to or remote from (e.g., user UR) environment 100 (e.g., via a user device 166).

At step 2008, process 2000 may include providing the visitor (e.g., the deliverer) with feedback based on at least one of the analysis of step 2004 and any communication of step 2006. As just one example, when the analysis of step 2004 determines that there are currently no occupants local to environment 100 or otherwise in an active and available state, and/or when no user response is received for any communication attempt of step 2006, system 164 may be operative to determine that smart environment 100 may handle the attempted delivery without active user input and doorbell 106 may provide the deliverer at step 2008 with instructions or other suitable feedback on how to proceed with the delivery. Alternatively, when the analysis of step 2004 determines that there is a user local to environment 100 that is in an active and available state, and/or when a user response is received for any communication attempt of step 2006, system 164 may be operative to determine that a user of smart environment 100 may at least partially handle the attempted delivery and doorbell 106 may provide the deliverer at step 2008 with instructions or other suitable feedback on how to proceed with the delivery. The type of feedback that may be provided via doorbell 106 to the deliverer at step 2008 may vary based on the analysis of step 2004 and/or any communication of step 2006. For example, the feedback may include active communication from the user to the deliverer via doorbell 106 (e.g., audio and/or visual or other suitable information may be conveyed to the deliverer by doorbell 106, where such information may be generated and transmitted by or otherwise under the control of the user via another smart device that the user may directly interface with and that may be communicatively coupled to doorbell 106). Alternatively, the feedback may include automated instructions generated by system 164 for communication to the deliverer via doorbell 106 (e.g., a message that may communicate that "a user is not currently able to actively receive the package right now, please do the following to complete the delivery . . . ", etc.). Additionally or alternatively, the feedback may include providing certain environment access to the deliverer, such as by opening door 186 by unlocking doorknob 122 for a certain amount of time (e.g., if deliverer DL is approved by system 164 as an expected and/or authorized deliverer (e.g., through analysis of a label ID), door 186 may be unlocked such that deliverer DL may be enabled to enter structure 150 for delivering package PL within structure 150). In some embodiments, a deliverer device 266 may be operative to be communicatively coupled with a smart device of environment 100 and feedback may be communicated by such a smart device to deliverer device 266 for receipt by the deliverer via an output of deliverer device 266 (e.g., device 266 may be communicatively coupled with a communication component 862 via path 107 (e.g., paired via BlueTooth or any other suitable protocol) and such feedback may be communicated via path 107 and then provided to the deliverer via any suitable output component of device 266).

At step 2010, process 2000 may include detecting an act of the visitor (e.g., an act of the deliverer with the package) based on the provided feedback of step 2008 (e.g., an act performed by the visitor in response to the provided feedback). Doorbell 106 and/or any other smart device of environment 100 may be configured to detect an action of deliverer DL and/or package PL at step 2010 in response to system 164 providing deliverer DL with feedback at step 2008, where that action may be any suitable action indicative of deliverer handling package PL in a particular way. As just one example, in response to instructing deliverer DL to leave package PL at a particular location (e.g., within a detection range of a sensing component 828 of doorbell 106) at step 2008, doorbell 106 may detect such placement of package PL at step 2010. As another example, in response to requesting that deliverer DL deliver package PL to a neighboring environment (e.g., to a next door neighbor of environment 100 that may also be equipped with a smart doorbell) at step 2008, doorbell 106 of environment 100 may detect a confirmatory response provided by deliverer DL that the request will be followed (e.g., directly from deliverer DL at a user interface component 812/844 of doorbell 106 or from deliverer device 266 via path 107 at a communications component 862 of doorbell 106) or a confirmatory communication by a smart device of the neighboring environment that may confirm receipt of the package). Any suitable action of deliverer DL and/or of package PL may be detected or otherwise received by any suitable component of environment 100 and/or of system 164 at step 2010, where such detection may enable system 164 to update system-information about the status of the attempted delivery (e.g., successfully delivered at front door 186, successfully delivered to neighbor ABC, to be re-delivered at time XYZ, etc.). Alternatively or additionally, a deliverer DL may communicate with system 164 at step 2010 via any suitable communication enabled by a smart device of environment 100 accessible by deliverer DL (e.g., via gestures at doorbell 106, as may be described above with respect to smart device 104, via touch input via a touch user interface, audible spoken commands, etc.) and/or via any suitable communication enabled by system 164 and deliverer device 266.

At step 2012, process 2000 may include communicating with at least one of the user and the visitor (e.g., the deliver) based on the detected act of step 2010. Doorbell 106 and/or any other smart device of environment 100 may be configured to confirm detection of an action of deliverer DL and/or package PL with deliverer DL (e.g., by communicating any suitable confirmation information directly to deliverer DL or to delivery device 266 via doorbell 106 or to delivery business 228 via system 164 of platform 200). Alternatively or additionally, doorbell 106 and/or any other component of environment 100 and/or system 164 may be configured to confirm detection of an action of deliverer DL and/or package PL with a user of environment 100 (e.g., by communicating any suitable confirmation information to the user via any suitable smart device or personal device of the user, similarly to any communication of step 2006). This may enable deliverer DL and/or the user to remain updated with respect to the current status of the attempted delivery as determined by environment 100 of system 164 (e.g., successfully delivered at front door 186, successfully delivered to neighbor ABC, to be re-delivered at time XYZ, etc.). Such communication of step 2012 may enable deliverer DL to know whether or not any action performed at step 2010 was successfully detected by system 164, thereby removing any doubt about the status of the delivery. This may also create an electronic receipt or trail of the attempted delivery, not only for the particular deliverer DL and/or a user of environment 100, but also any other interested party, such as a management system of a delivery entity or fulfillment entity business 228. By such confirmation of delivery status being electronically or otherwise generated by system 164 rather than by delivery entity business 228, the confirmation may be considered even more reliable or leveraged in combination with any similar confirmation data that may be generated by delivery business 228 (e.g., based on manual entry into delivery device 266 by deliverer DL) to ensure accurate delivery status is available to platform 200. By providing confirmation data indicative of a detected delivery action to deliverer DL (e.g., via doorbell 106) and/or to delivery entity business 228 (e.g., via an API 210 of platform 200), system 164 may serve as a secondary or impartial source of information regarding the delivery of packages carried out by delivery entity business 228. This may increase the efficiency and/or effectiveness of delivery entity business 228 and/or may lower overhead costs (e.g., insurance costs) of delivery entity business 228, as system 164 may provide a new source of accurate and real-time electronic data that may be made available to delivery entity business 228 for use in managing its package delivery tasks while also not being as dependent on delivery data provided by its own deliverers DL. Moreover, by providing confirmation data indicative of a detected delivery action to a user of environment 100 (e.g., via any suitable system-user communication capability of platform 200), a user may be able to have access to an up-to-date status of a package delivery while also being enabled to virtually communicate with a deliverer during a delivery attempt in a manner that is convenient and secure for the user and the deliverer.

One or more of steps 2002-2012 of process 2000 may be repeated for a particular delivery attempt of a particular package or for any other visitor handling. For example, in response to analysis at step 2004 of any package delivery information detected at step 2002, a user may communicate with the smart environment at step 2006 and that user communication may be shared with deliverer DL at step 2008, in response to which an action of deliverer DL may be detected by the smart environment at step 2010 and that detected action may be communicated back to the user at step 2012, in response to which the user may once again communicate with the smart environment at step 2006 based on that communicated detected action, thereby repeating at least part of process 2000. Therefore, process 2000 may support a virtual conversation between deliverer DL and a user or service 164 as an automated agent of the user.

It is understood that the steps shown in process 2000 of FIG. 20 are merely illustrative and that existing steps may be modified or omitted, additional steps may be added, and the order of certain steps may be altered.

In some embodiments, communication of certain package information to a user at step 2006 may equip the user with the ability to decide how the user may want the delivery attempt to be handled. For example, the user may decide to go meet the deliverer at door 186 for personally receiving the package, or the user may remotely instruct the deliverer to leave the package at a certain location via a communication path supported by environment 100 (e.g., via doorbell 106 and any other suitable device) such that the user may actively determine at least a portion of the feedback that may be provided to the deliverer at step 2008. Alternatively, communication of certain package information to a user at step 2006 may not be successfully received by a user in time for the user to effectively respond for immediate use by system 164, or such communication may not even be attempted (e.g., if the user is known by system 164 to be on vacation or otherwise or otherwise in a do-not-disturb mode where system 164 may determine not to contact the user). In such embodiments, system 164 may be configured to determine and generate the feedback provided to the deliverer at step 2008 without any active input from the user. Such feedback may instead be automatically determined based on inferences or rules of platform 200 (e.g., system 164) and/or any restrictions that may be applicable to the particular delivery (e.g., user signature required). For example, feedback provided at step 2008 may include an instruction for deliverer DL to simply leave package PL at door 186 or to deliver package PL to a neighbor or to re-attempt the delivery at another time that may be specified (e.g., a time that may be determined by system 164 as when an appropriate system user is expected to be available at environment 100 for receiving a delivery). However, if a signature or any other suitable type of acknowledgment of receipt of the package is required in order to complete delivery (e.g., as may be detected through the package information detected and analyzed at steps 2002 and 2004), feedback provided at step 2008 by doorbell 106 may include certain data that may satisfy that receipt acknowledgment requirement. For example, system 164 may have access to any suitable trusted security information that may also be known by or validated by delivery business 228, whereby use of such information by system 164 within feedback provided to deliverer DL at step 2008 may be received and confirmed by delivery business 228 as an acceptable form of waiver of responsibility or acknowledgment such that deliverer DL may be able to leave package PL at environment 100 without actively receiving a signature of a user. For example, doorbell 106 may present an authorization code (e.g., in plain text, as any suitable code, or encrypted forms) on a user interface (e.g., on a display 830) as at least a portion of feedback at step 2008 and may prompt deliverer DL to use deliverer device 266 to record, scan, photograph, or otherwise acquire the authorization code for authentication and acceptance (e.g., as a detectable act at step 2010). Once the authorization code has been acquired and accepted by deliverer DL, doorbell 106 may be operative to then instruct deliverer DL with respect to where to leave package PL.

Communication between deliverer DL and a system user of system 164 may include various types of conversation types. For example, in some embodiments, deliverer DL may specifically dictate when and how package PL will be delivered. As just one such example, in response to system 164 providing feedback to deliverer DL at step 2008 indicative of the fact that a user of environment 100 is not available to actively communicate with deliverer DL for facilitating completion of the delivery, deliverer DL may communicate information to system 164 (e.g., via doorbell 106) at step 2010 that may be indicative of the fact that deliverer DL is going to return package PL to a suitable pick-up location (e.g., distribution center DC of business 228) and that package PL will be available at that location for pick-up by the user at a certain time. In response to such a communication from deliverer DL, system 164 may confirm receipt of that information to deliverer DL and/or may share such information with a user at step 2012. Such a situation may enable the user to be informed of the pick-up status of the package PL in real-time or as soon as the user is able to receive such a communication from system 164, thereby allowing the user to conveniently swing by that pick-up location to retrieve package PL on the user's way home to environment 100. As opposed to conventional practice where a deliverer leaves a paper notice on a user's front door indicating that the user missed the delivery attempt and that the user must bring that paper notice to the pick-up center to retrieve the package, system 164 may immediately and automatically share such notification information with a user electronically (e.g., via e-mail or text messaging or any other suitable system communication with the user) such that the user need not waste time by driving home to receive a paper notice only to turn right around and drive to the pick-up location to retrieve the package). Such interaction between deliverer DL and system 164 (e.g., via doorbell 106) and such interaction between system 164 and a system user may not only increase the convenience for the user, but may also increase the efficiency of deliverer DL (e.g., by saving paper notices and removing doubt as to whether the notice will be received by the user). Moreover, the automated communication of such notice information may be provided to a system user without requiring or even allowing direct communication between deliverer DL and the user, thereby enabling system 164 to remain a custodian of certain contact information and whereabouts information of the user.

As another example, communication between deliverer DL and a system user of system 164 may include two-way communication. As mentioned, a real-time virtual two-way conversation between a user and a deliverer DL at doorbell 106 may be enabled by system 164. For example, a user may communicate a request to system 164 at step 2006 (e.g., "I am unable to come to the door to sign for the package, what are my options?") that may then be provided by system 164 to deliverer DL at step 2008 (e.g., relayed as audio data from an audio sensing device at the user to audio output data from doorbell 106), in response to which deliverer DL may provide a response with one or more options for the user (e.g., "you can sign for the package at a designated pick-up location after 5 pm today or a neighbor can sign for the package now on your behalf") that may be detected by system 164 (e.g., doorbell 106) at step 2010 and relayed to the user at step 2012, after which the user may again communicate to deliverer DL with his decision.

Alternatively, a delayed response virtual conversation between a user and a deliverer DL may be enabled by system 164. For example, system 164 may communicate to deliverer DL (e.g., via doorbell 106) at step 2008 that a user of environment 100 is not available to actively communicate with deliverer DL for facilitating completion of the delivery. In response to such feedback, deliverer DL may communicate information to system 164 (e.g., via doorbell 106) at step 2010 that may be indicative of the fact that deliverer DL will re-attempt to deliver package PL at environment 100 tomorrow. In response to detection of such a communication from deliverer DL, system 164 may confirm receipt of that information to deliverer DL and may share such information with a user at step 2012 (e.g., automatically or immediately after such detection). However, at some later time that same day (e.g., after deliverer DL and package PL have left environment 100), a system user may actually digest that information as shared with it by system 164. In response thereto, as opposed to allowing deliverer DL to re-attempt delivery of package PL at environment 100 the following day as currently planned, the user may wish to retrieve package PL from delivery business 228 that evening at dispatch center DC or the user may wish for deliverer DL to deliver package PL to the user's office rather than to environment 100 or any other suitable change to the currently planned delivery strategy. Therefore, system 164 may be configured to enable the user to share such a desire with delivery business 228 for systematically altering the delivery strategy. For example, system 164 may be operative to provide an intuitive application or user interface (e.g., on the user's device 166 or via any smart device of environment 100) that may enable a user to select from any available options for altering the delivery strategy, where such options may be known or otherwise determined by system 164 based on the package information detected at steps 2002/2004 and/or based on any other suitable information that may be made available to system 164 (e.g., from delivery business 228 via an API 210 or otherwise)). A user-selected option may then be automatically communicated from system 164 to delivery business 228 for updating the planned delivery strategy of package PL, thereby increasing the efficiency and/or convenience of the delivery process.

Various types of feedback may be provided to deliverer DL by system 164 (e.g., via doorbell 106) at step 2008 and, responsive thereto, deliverer DL may commit various types of acts that may be detected by system 164 (e.g., via doorbell 106) at step 2010 for advancing the attempted delivery of package PL. In some embodiments, platform 200 (e.g., environment 100 and/or system 164) may be configured to enable secure drop-off of package PL by deliverer DL at environment 100 when a system user is unable to physically receive package PL from deliverer DL at environment 100 (e.g., when no user is at environment 100 or when a user is at environment 100 but currently unavailable for active package receipt (e.g., when the user is sleeping or otherwise pre-occupied or otherwise unfit to meet deliverer DL)). Certain steps may be taken by system 164 and/or certain features of environment 100 may be enabled so as to increase the security and reliability of such an "unsupervised" drop-off, otherwise such a drop-off may not be approved by delivery business 228 (e.g., such an act may not meet insurance standards of business 228) or may not be of interest to a user (e.g., such an act may not meet the security interests of the user). For example, platform 200 (e.g., system 164 in conjunction with environment 100) may be configured to enable a secure drop-off of a package, confirm such a drop-off, secure the package after such a drop-off, remind a user of the secured package, enable authorized recovery of the secured package, and confirm such authorized recovery for completing the delivery process.

In some embodiments, an unsupervised drop-off may be enabled when environment 100 is configured with an ability to receive and retain package PL in a secure location that may be trusted by both deliverer DL and a system user. For example, a certain secure area of environment 100 may be temporarily made accessibly by system 164 to deliverer DL (e.g., by feedback at step 2008) such that deliverer DL may deposit package PL within that secure area (e.g., at step 2010) for later retrieval by a trusted system user (e.g., the intended recipient). Any suitable secure area may be provided by environment 100 for this purpose. As one example, structure 150 may include a lobby (not shown) just beyond entry point door 186 that itself may be separated by the remainder of structure 150 by another locked door, and system 164 may be configured to temporarily unlock door 186 (e.g., via smart doorknob 122) for granting deliverer DL temporary access to that lobby for depositing package PL therein. Such a lobby may be a shared lobby amongst multiple distinct tenants (e.g., a shared lobby of a multi-residence apartment building). In such embodiments, the lobby may include an area that may otherwise be selectively accessible to mailmen (e.g., via a shared key that Postal Service workers often times are equipped with in urban areas where large apartment buildings are common). Such temporary access as may be granted by system 164 in response to suitable detection and analysis (e.g., at steps 2002 and 2004) may overcome the need for certain deliverers to carry around one or more master keys for certain neighborhoods or apartment buildings, which may also reduce security concerns for the building while increasing the efficiency and effectiveness of deliverers to securely deposit packages in areas of an environment 100 that have at least a certain amount of security provided to it (e.g., due to a front door of a lobby that is generally accessible only by trusted occupants of the building and not by any visitor attempting to gain access to the building). As another example, a smart safe (e.g., a smart appliance 113) may be provided by environment 100 adjacent doorbell 106 external to structure 150 (e.g., smart appliance 113a), the interior of which may be selectively and temporarily made accessible to deliverer DL (e.g., via any suitable control signals of system 164 or environment 100 (e.g., via doorbell 106)) for enabling placement of package PL therein. Any such secure area (e.g., a lobby, a safe, etc.) of environment 100 that may be made temporarily accessible to deliverer DL by system 164 (e.g., automatically through system processing and control) may be securely monitored by platform 200 during such temporary access in order to ensure that deliverer DL positions package PL in that area and/or to ensure that nothing is removed from that area during the period of that temporary access. One or more sensing components 828 of doorbell 106 or of any other smart device of environment 100 may be configured to at least partially carry out such monitoring (e.g., a sensing component within the secure area or external to the secure area but that may sense activity within the secure area and/or at the temporarily accessible opening to the secure area may be activated and/or enhanced (e.g., by platform 200) during such temporary accessibility for securely monitoring the activity of deliverer DL during that accessibility). Additionally or alternatively, one or more output components of doorbell 106 or of any other smart device of environment 100 may be configured to at least partially indicate to deliverer DL where and how to deposit the package securely.

System 164 may require that a certain level of trust be achieved between platform 200 (e.g., environment 100 and/or system 164) and deliverer DL before enabling such temporary access to such a secure area of environment 100. For example, certain package delivery data may be retrieved and analyzed at steps 2002 and 2004 prior to enabling such an "unsupervised" drop-off, such as specific identification data of the particular deliverer DL and/or of the particular package PL at doorbell 106 that system 164 may be able to confirm or cross-check with a trusted delivery business 228 (e.g., via an API 210 of platform 200 between system 164 and business 228). Therefore, system 164 may confirm the identity of deliverer DL and/or package PL based not only on identification data that may be provided to system 164 locally at environment 100 (e.g., via doorbell 106) but also on data that may be provided to system 164 from business 228 remotely from environment 100 (e.g., via an API 210), such that a visitor may not attempt to gain access to a secure area of environment 100 by fraudulently purporting to be a deliverer associated with a trusted delivery entity business 228. Such confirmation by cross-referencing locally-obtained deliverer/package identification data with known or expected whereabouts status data for a particular deliverer/package may be utilized by system 164 for any suitable situation at steps 2002/2004 in order to improve the security of an attempted package delivery.

Once a suitable level of trust is determined by system 164 for deliverer DL and/or package PL such that system 164 may be configured to enable an unsupervised drop-off, system 164 may be operative to instruct deliverer DL (e.g., via doorbell 106) how to carry out such an unsupervised drop-off. For example, doorbell 106 may be configured to audibly instruct deliverer DL as to where to find a secure drop-off area that may be made temporarily accessible to the deliverer for securing package PL (e.g., via audio speaker 836 that may provide any suitable audio output, such as a verbal instruction to "open the safe just to the right of the front door, place the package therein, and then close the safe"). Alternatively or additionally, doorbell 106 may be configured to visually instruct deliverer DL as to where to find a secure drop-off area that may be made temporarily accessible to the deliverer for securing package PL (e.g., via user interface 812 and/or projector/display 830). During such instructing, system 164 may also control the secure area for enabling deliverer DL to have access thereto (e.g., by unlocking a door to a safe).

Once deliverer DL is instructed how/where to access a secure area and such a secure area is made temporarily accessible to deliverer DL (e.g., at step 2008), system 164 may be configured to securely monitor that secure area during the period when the secure area is made accessible (e.g., by leveraging any suitable monitor sensing components 828 of doorbell 106 and/or any suitable sensing components of the secure area itself or otherwise (e.g., any cameras that may be provided by a smart safe appliance, etc.)). Such monitoring may be leveraged not only to confirm that a particular package PL is secured within the secure area but also to confirm that nothing is removed from the secure area. For example, one or more sensors of environment 100 may be configured to detect label ID or any other suitable identifier of package PL intermittently and/or continuously during the process of placing package PL within the secure area such that system 164 may detect and confirm that package PL has been positioned with the secure area (e.g., steps 2010 and 2012). Additionally or alternatively, one or more sensors of environment 100 may be configured to monitor the access point of such a secure area continuously during the process of placing package PL within the secure area such that system 164 may confirm that nothing is removed from the secure area. Such confirmation of proper drop-off of package PL may be shared with delivery entity business 228 by system 164 (e.g., via API 210) and/or with deliverer DL (e.g., via doorbell 106) and/or with a system user (e.g., via a user device 166 or any suitable smart device). Once the positioning of package PL has been confirmed within the secure area, system 164 may be configured to terminate the accessibility to the secure area (e.g., by locking the door to the safe).

If no physically distinct secure area (e.g., safe or lobby) is available to environment 100, system 164 may enable proper drop-off of package PL by designating a certain area of environment 100 as an area at which package PL may be left and adequately securely monitored by system 164 (e.g., doorbell 106). For example, at step 2008, rather than instructing deliverer DL towards a safe or lobby that may be temporarily made accessible to deliverer DL for depositing package PL, system 164 may leverage doorbell 106 or any other suitable smart device of environment 100 to instruct deliverer DL towards an open area at which deliverer DL may deposit package PL. As shown in FIG. 1, one or more components of doorbell 106 (e.g., projector 830) may be operative to generate and display to deliverer DL a suitable deposit area AL at which package PL may be dropped-off (e.g., light from projector 830 may shine to identify area AL on any suitable surface, or instructions provided on a display user interface 812 or audible instructions via audio speaker 836 may otherwise enable deliverer DL to identify the location of area AL). Area AL may be on a portion of a stoop or sidewalk or any other suitable portion of environment 100 adjacent door 186 or otherwise easily accessible to deliverer DL that may be securely monitored by environment 100 (e.g., by one or more sensing components 828 of doorbell 106). For example, area AL may be within a sensing range of an NFC or RFID or camera or any other suitable sensing component 828 of doorbell 106, such that when package PL may be positioned within area AL by deliverer DL, package PL may be securely monitored by one or more smart devices of environment 100, which may ensure secure drop-off of package PL. As another example, area AL may not be proximate doorbell 106 but may be an area that may be monitored by another smart device of environment 100 (e.g., a smart device that may be coupled to outdoor lighting 114, which may be around a corner of structure 150 from front door 186, such that other visitors to front door 186 may not obviously notice package PL that has been deposited by deliverer DL for secure monitoring by environment 100). As with the deposit of package PL within any other suitable secure area (e.g., a safe or lobby), system 164 may be configured to monitor and confirm the adequate deposit of package PL at area AL with deliverer DL and/or delivery entity business 228 for furthering the delivery attempt (e.g., such that deliverer DL may confidently leave package PL at environment 100). Any suitable smart device of environment 100 may provide and/or monitor such an area AL or any other secure area for use in unsupervised drop-off and monitoring of a package PL.

Alternatively or additionally, system 164 may enable proper drop-off of package PL by providing an accessory device that may be coupled to package PL for enabling secure monitoring of package PL by system 164 (e.g., doorbell 106). For example, at step 2008, rather than instructing deliverer DL towards a safe or lobby that may be temporarily made accessible to deliverer DL for depositing package PL, system 164 may leverage doorbell 106 or any other suitable smart device of environment 100 to instruct deliverer DL to couple an accessory component 890 (e.g., of doorbell 106 of FIGS. 8A-8C) to package PL and then to leave package PL with accessory component 890 near doorbell 106 for secure monitoring. As shown in FIG. 1, accessory component 890 of doorbell 106 may be coupled to package PL (e.g., fastened, adhered, affixed, snapped, tied to, rest on, or otherwise attached), where accessory component 890 may be operative to communicate with or be detected by any other component(s) of doorbell 106 (e.g., communications component 862 (e.g., Bluetooth) and/or sensor component 828) or any other suitable components of environment 100 or platform 200 when coupled to package PL such that platform 200 may monitor the location and/or any other suitable characteristic(s) of package PL (e.g., based on the monitored location and/or any other suitable characteristic(s) of accessory component 890). For example, accessory component 890 may be configured to include any suitable sensing components (e.g., motion sensing components or any other suitable sensing components as described above with respect to sensing components 828) that may detect movement or any other suitable characteristic of accessory component 890 and, thus, package PL when coupled thereto, and such sensed characteristics may be communicated to or otherwise detected by any other component(s) of doorbell 106 and/or any other suitable smart device of environment 100 and, thus, system 164. Alternatively or additionally, doorbell 106 and/or any other suitable smart device of environment 100 may be operative to detect the location of accessory component 890 such that if package PL is moved after deliverer DL leaves package PL (e.g., by an animal or wind or otherwise), doorbell 106 and/or any other suitable smart device of environment 100 may be operative to track such movement for use in finding package PL for recovery. Such a physical coupling of package PL to a component of environment 100 (e.g., accessory 890 of doorbell 106) may increase the ability and/or effectiveness of system 164 to securely monitor a package during and after an unsupervised drop-off Accessory component 890 may be reusable anytime a new package is to be deposited for secure monitoring by doorbell 106 and/or any other suitable smart device of environment 100. As just one example, accessory component 890 may be an RFID tag that may be communicatively coupled or otherwise known by another component of doorbell 106. Any movement of package PL (e.g., as may be detected through leveraging accessory component 890) at all or above a certain threshold may trigger one or more additional sensing components of doorbell 106 or otherwise of environment 100 to monitor package PL/component 890 so as to heighten the secure monitoring of package PL. Accessory component 890 may be operative to wirelessly communicate with other components of doorbell 106 and/or any other suitable smart device of environment 100 and/or may communicate via a wire 892 that may extend between accessory component 890 and other components of doorbell 106. If wire 892 is cut or otherwise disrupted, additional heightened security may be enacted by system 164 to track package PL. In some embodiments, a holder 891 of doorbell 106 and/or any other suitable smart device of environment 100 may be selectively opened and closed (e.g., through electronic control of system 164) for selectively enabling accessory component 890 to be removed from the remainder of doorbell 106 and/or any other suitable smart device of environment 100 for attachment to package PL.

Once package PL has been disposed in a secure area of environment 100 or otherwise disposed for secure monitoring (e.g., using accessory component 890) by deliverer DL, system 164 may continue to intermittently or continuously monitor package PL and/or the secure area (e.g., area AL) to maintain the security of the dropped-off package. As one example, environment 100 may be configured to continuously or intermittently monitor the position of dropped-off package PL, such as by detecting status data from accessory component 890 coupled to package PL or by sensing package PL within area AL or by confirming that a secure area (e.g., a lobby or safe) has remained inaccessible since disposal of package PL therein. After any suitable monitoring period of any suitable length during which the security of package PL has been confirmed by environment 100, system 164 may be configured to communicate such security status with any suitable entity, such as delivery entity business 228 and/or any suitable user of environment 100 (e.g., an intended recipient of package PL). However, if at any time after secure disposal of package PL by deliverer DL, environment 100 detects any type of change in the status of package PL or of a secure area or component with which environment 100 may be securing package PL, any suitable sensing functionality of environment 100 may be activated or enhanced and/or any suitable alarm or notification functionality may be activated. For example, if any movement of package PL is detected by environment 100 (e.g., by a motion sensing component 828 of doorbell 106), additional sensing components of environment 100 (e.g., a camera sensor 828 of doorbell 106) and/or other helpful components of environment 100 (e.g., outdoor lighting 114) may be activated to sense additional information about the status of package PL and/or its surroundings (e.g., whether an animal or other entity may be moving package PL). Alternatively or additionally, in such instances, an alarm may be activated and communicated within structure 150 (e.g., if any occupancy currently exists within structure 150) and/or outside of environment 100 (e.g., at doorbell 106 and/or to any suitable law enforcement entities 222 or delivery entity business 228 or users of environment 100 for aid in securing package PL). When a package PL has been deposited by deliverer DL for secure monitoring by environment 100, any suitable events may be monitored for enhancing the protection of package DL, including, for example, detecting when any unknown user or visitor may come within a certain distance of a secure area at which package PL has been deposited. For example, doorbell 106 or any other suitable portion of smart environment 100 that may be able to monitor package PL may be equipped with walkup-identification technology (e.g., face recognition, RFID, ultrasonic sensors) that may "fingerprint" or create or otherwise have access to a "signature" for known users of environment 100, such that, in operation, when a person who does not live in the home or is otherwise not registered with the smart home or whose fingerprint or signature is not recognized by the smart home "walks up" to package PL, environment 100 may provide an alarm and/or may increase the protection of package PL by activating a new form of package monitoring/securing (e.g., a more sensitive movement sensor with respect to package PL).

As mentioned, when a package PL has been left by a deliverer DL at environment 100, system 164 may be configured to communicate information indicative of that package deposit to any suitable entity (e.g., a system user of environment 100 and/or delivery entity business 228 and the like). Additionally or alternatively, system 164 may be configured to send any suitable reminders at any suitable moment to a system user or delivery entity or other suitable entity that may keep such an entity mindful of the status of a package that has been left at environment 100 but that has not yet been claimed by a system user. Such reminders may be achieved via any suitable communication technique, such as e-mail, telephone, text message, alert via any suitable smart device (e.g., via a user interface of a hazard device 104 within structure 150 or via a user interface 812 of doorbell 106 that may be easily identified by a user of environment 100 upon waking up within structure 150 or arriving to door 186 of structure 150). As just one example, when a known system user of environment 100 arrives at structure 150 (e.g., at door 186), doorbell 106 may be operative to detect that arrival and, responsive thereto, communicate to that user that package PL has been recently left by deliverer DL for user retrieval (e.g., an audible or textual message via an output component of doorbell 106 that may state "welcome home user X, a package PL was delivered by delivered by deliverer DL at time Y and is currently secured at location Z awaiting your retrieval"). Alternatively, a simple blinking light may be provided by doorbell 106 (e.g., projector 830) when a package is awaiting user retrieval.

When a previously-deposited package PL is awaiting user retrieval (e.g., from a secure area being monitored by environment 100), environment 100 may be configured in various suitable ways for enabling secure retrieval of the package. In some embodiments, certain particular users may be designated by system 164 as authorized to retrieve a securely monitored package PL. For example, an appropriately credentialed system user associated with environment 100 generally and/or package PL specifically may be enabled by system 164 to identify one or more particular people that environment 100 may allow to retrieve package PL. In such circumstances, facial detection or other suitable "fingerprint" or "signature" detection capabilities of a smart device of environment 100 may be leveraged to detect a particular user that system 164 may be configured to determine has been authorized (e.g., automatically or by rules-based inferencing techniques or by specific user designation, etc.) to securely retrieve package PL. Alternatively, certain entities may be provided with a particular security PIN or other suitable code that may be received by environment 100 (e.g., by doorbell 106) and confirmed by system 164 as a trusted pass for securely retrieving package PL. For example, if an intended recipient of package PL is a known system-user of environment 100 and that user receives a communication (e.g., at step 2012) that deliverer DL has successfully performed a secure unsupervised drop-off of package PL in a secure area of environment 100, that user may interface with system 164 (e.g., via personal device 166) in any suitable way for enabling another entity (e.g., a neighbor) to retrieve that package PL on his or her behalf (e.g., that communication received by the user may include a code generated by platform 200, whereby the user may share that code with any entity for use by that entity at environment 100 for re-enabling accessibility to the secure area of the smart environment for collecting the disposed package). As one example, the user may create a security clearance within system 164 (e.g., by sharing the identity of that entity with system 164), such that when the entity is detected at environment 100 (e.g., at doorbell 106), environment 100 may be configured to share the location of the secured package PL with the entity and to at least temporarily grant access to that secured area for package retrieval. As another example, the user may instruct system 164 to generate a security code that may enable access to the securely monitored package, and the user may then share that security code with the entity to retrieve the package (e.g., by e-mailing or otherwise communicating that code to the entity (e.g., via communication techniques of system 164)). As another example, system 164 may be operative to define a particular period of time during which the securely monitored package may be accessible for retrieval by any entity. For example, a system user may interface with system 164 (e.g., via personal device 166) in any suitable way for defining a future time period (e.g., between 5:00 and 5:15 pm this afternoon) during which system 164 may be operative to alter certain security monitoring techniques that may enable any entity to effectively retrieve the package PL. As just one example, although camera monitoring of the secure area at which package PL has been deposited may continue through the defined time-period, an alarm or other security features may be disabled during that time such that an entity may successfully retrieve the package without triggering any unnecessary enhanced security. Alternatively or additionally, automatic deduction may be utilized by system 164 for enabling environment 100 to safely allow retrieval of a monitored package PL when certain situations arise. For example, when a known system user is detected by environment 100 within a threshold distance of package PL and then package PL is concurrently moved from the secure area, then system 164 may not sound any alarms but may simply allow the package to be retrieved and may communicate confirmation of such retrieval along with any other suitable information (e.g., time and date of the retrieval, identity of the detected system user associated with that retrieval, etc.) to any suitable entity (e.g., to the recipient user associated with package PL, deliverer entity business 228, etc.) via any suitable communication capability of system 164. As another example, even if no entity is specifically detected when the package is retrieved, if door 186 is legitimately opened within a certain duration of time prior to or after such retrieval, then no alarm may be generated and the retrieval may be communicated by system 164 to any appropriate target.

When a package PL is retrieved at environment 100 after being securely monitored, system 164 may be configured to obtain any suitable information in order to confirm user receipt of the package and/or to otherwise appropriately complete the delivery process of that package. For example, depending on any delivery requirements for a particular package, as may be determined by system 164 during data detection and/or analysis of steps 2002/2004, various data may be obtained by system 164 during retrieval of package PL. In some embodiments, when package retrieval is enabled, any suitable signature or confirmation of receipt action may be collected or otherwise detected by system 164 from the retrieving entity (e.g., the intended recipient system user or a neighbor granted retrieval rights, as described above). For example, environment 100 may instruct the retrieving entity to communicate its identity to environment 100 (e.g., via a sensing component 828 or user interface 812 of doorbell 106) or otherwise environment 100 may indicate that an alarm will be sound. As another example, environment 100 may require that a retrieving entity present the retrieved package at a suitable smart device of environment 100 or to any other suitable component of system 164 within a suitable period of time after retrieval otherwise environment 100 may indicate that an alarm will be sound. In such embodiments, the retrieving entity may position the retrieved package PL in functional view of a sensing component of a smart device of system 164 (e.g., position label ID within a sensing area of a sensing component 828 of doorbell 106 or within a sensing area of a sensing component of any other smart device other than doorbell 106 (e.g., a hazard device 104 of structure 150 or a personal device 166 or smart environment device of the retrieving entity, which may be a user of a neighboring environment that is not environment 100 but that is also a part of system 164)), such that system 164 may confirm that package PL has been retrieved at a certain time and/or by a certain entity that may be in communication with system 164. Such sensed information by system 164 may be leveraged by system 164 to achieve a certain amount of trust with respect to the security of the retrieved package such that a confirmation communication may be sent (e.g., at an iteration of step 2012) to one or more suitable parties (e.g., an intended recipient system user and/or delivery entity business 228) to confirm successful retrieval of package PL from a securely monitored area of environment 100, thereby enabling closure of that delivery. Such data may be invaluable to a delivery entity that may otherwise never determine if/when a package left at a particular location was actually received by a trusted entity.

One, some, or all of the various sub-processes described above with respect to enabling a secure delivery of a package by a deliverer to a system user of environment 100 may provide for enhanced security data to be collected and shared throughout the delivery. For example, at any one or more of step 2002 (e.g., where information related to a package delivery attempt may be detected by environment 100), step 2004 (e.g., where additional system information related to the delivery may be acquired and analyzed), step 2006 (e.g., where any suitable data may be communicated between system 164 and any suitable system user to further an attempted package delivery), step 2008 (e.g., where any suitable feedback or instructions may be communicated by system 164 to a deliverer of the package or to a potential retriever of the package, or any other suitable visitor (e.g., at doorbell 106)), step 2010 (e.g., where any suitable action or characteristic of the package or of a deliverer or of any other suitable visitor may be detected during an attempted package delivery), and/or step 2012 (e.g., where any suitable confirmation of a detected action may be communicated by system 164 to an entity at environment 100 (e.g., at doorbell 106) or to any other suitable entity (e.g., a system user and/or a delivery entity business 228) during an attempted package delivery) of process 2000, any suitable data may be collected, stored, processed, or otherwise analyzed by platform 200 (e.g., by environment 100 and/or system 164) and shared with any suitable entity for enhancing the security and/or convenience of an attempted package delivery.

Time stamps, specific identification of packages and/or visitors (e.g., deliverers) and retrievers, specific actions of packages and/or of visitors (e.g., deliverers) and/or of retrievers, and the like may be sensed, collected, stored, and shared by environment 100 and/or system 164 with any suitable entities, such as system users, other smart environments, trusted third party entities (e.g., businesses 228), and any other suitable data targets. Such data collection and sharing may reduce any insurance liability previously held by a delivery entity business 228 that may otherwise have had to attempt delivery of a package multiple times due to an environment being unable to securely receive the package during an initial attempt and/or have left a package at an environment in an insecure fashion (e.g., on a front stoop of a user without any smart devices of the environment being operative to securely monitor the package until it was appropriately retrieved, etc.). As another example, such data collection and sharing may enable better tracking of the handling of a package (e.g., in order to determine when during the delivery process the package may have been ruined (e.g., for fragile package contents)), where one or more sensors of environment 100 may, for example, continuously or intermittently monitor and share movement data of a package as the package is deposited at environment 100 by deliverer DL, as the package is secured prior to retrieval, and/or as the package is retrieved. This also may enable accurate location and time tracking of deliverer DL and package PL by detecting and logging data at environment 100 (e.g., by enabling deliverer DL to "check-in" to environment 100 and/or "check-out" from environment 100). Moreover, rather than relying on delivery information generated and reported by deliverer DL (e.g., via data entered into delivery device 266 by deliverer DL during an attempted delivery), system 164 may generate and report its own data that may be compared to and/or relied on by delivery entity business 228 instead of any data generated by deliverer DL, as system data 164 (e.g., as may be generated by doorbell 106) may be trustworthy as an impartial data source (e.g., as compared to a deliverer who may enter incorrect data to inflate his efficiency and/or hide his inefficiencies).

By enabling communication between system 164 and delivery entity business 228, status information about deliverer DL known to delivery entity business 228 may be shared with system 164, whereby system 164 may leverage a known status of environment 100 (e.g., modes, current/future occupancy data, current functionality of certain smart devices, etc.) in combination with the shared status information about deliverer DL to enhance the handling of a potential delivery at environment 100 by deliverer DL. As one example, delivery entity business 228 may communicate to system 164 an estimated time of arrival for deliverer DL at environment 100 such that system 164 may communicate with smart environment 100 in order to accommodate the arrival of deliverer DL (e.g., by turning on outdoor lighting 114 to enable safe and easy access to door 186 by deliverer DL and/or by turning off any sprinkler system smart device (not shown) that may otherwise impair the deliverer's ability to easily bring package PL to door 186 (e.g., to prevent package PL from getting wet)). Additionally or alternatively, as another example, delivery entity business 228 may communicate to system 164 information identifying the deliverer DL in order to improve the ability of environment 100 to detect the expected deliverer (e.g., by enhancing certain sensing functionality of one or more smart devices (e.g., pre-loading a picture of the expected deliverer to increase efficiency of facial detection or turning on additional sensors that may specifically attempt to detect characteristics of the expected visitor, etc.)). Additionally or alternatively, as another example, delivery entity business 228 may communicate to system 164 information identifying the contents of package PL (e.g., contents requiring a cold environment to stay fresh) in order to improve the ability of environment 100 to appropriately receive the expected package (e.g., by turning on a cooling feature of a secure area (e.g., an air conditioner within the safe area of safe appliance 113*a*)). Such communication may also enhance convenience of the delivery process for a recipient user or any other suitable user of environment 100, as system 164 may be operative to continuously keep that user up-to-date with respect to the delivery status and security of package PL while enabling that user control over how that package may be delivered, deposited, and/or retrieved. For example, in response to system 164 receiving status information from delivery entity business 228 about an upcoming planned delivery to environment 100, system 164 may be operative to analyze that status information (e.g., in combination with any current modes or other information associated with environment 100) and may then automatically communicate certain information to a system user about that planned delivery (e.g., via any suitable smart device or personal user device), such that the system user may update any suitable mode settings or define a new mode or otherwise provide instructions to system 164 for handling the planned delivery once the deliverer and/or package are physically detected at environment 100. Additionally or alternatively, by enabling communication between system 164 and delivery entity business 228, status information about environment 100 and/or system users associated therewith known to system 164 may be shared with delivery entity business 228 and/or deliverer DL. As mentioned above (e.g., with respect to FIG. 19), a status of environment 100 indicative that environment 100 is in a do-not-disturb mode for times X, Y, and Z, as may be shared by system 164 with delivery entity business 228 (e.g., after status information about deliverer DL known to delivery entity business 228 may be shared with system 164), may enable delivery entity business 228 to more efficiently schedule attempted deliveries to environment 100 (e.g., to adjust a planned and/or current delivery attempt). As another example, a status of environment 100 indicative of the ability of smart environment 100 to securely monitor a package during an "unsupervised" drop-off, as may be shared by system 164 with delivery entity business 228 (e.g., after status information about deliverer DL known to delivery entity business 228 may be shared with system 164), may enable delivery entity business 228 to more confidently deliver a package to environment 100 even if a do-not-disturb status of environment 100 may not be known.

FIG. 21 is a flowchart of an illustrative process 2100 for handling a visitor. For example, process 2100 may be for enhancing delivery of a package by a delivery service-provider entity, which may include a delivery computing system, to at least one smart environment, which may include at least one smart device. At step 2102, process 2100 may include determining, at a server, environment status data of the at least one smart environment based on sensor data collected from the at least one smart device located in the at least one smart environment. At step 2104, process 2100 may include exposing, by the server, at least one application program interface for access by the delivery computing system of the delivery service-provider entity to identify at least a portion of the determined environment status data for the purpose of enhancing the delivery of the package by the delivery service-provider entity to the at least one smart environment.

It is understood that the steps shown in process 2100 of FIG. 21 are merely illustrative and that existing steps may be modified or omitted, additional steps may be added, and the order of certain steps may be altered.

Figure 22:
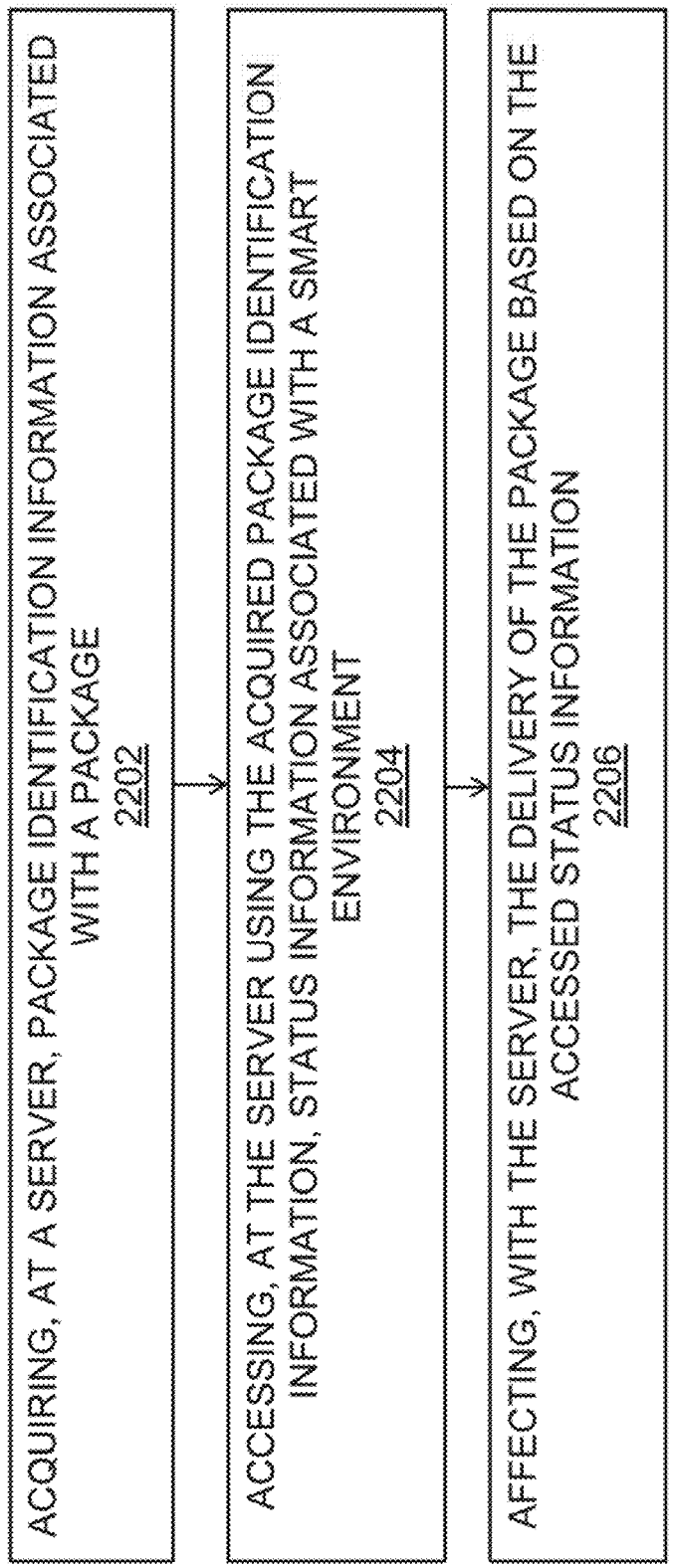
FIG. 22 provides an example process for delivering a package, according to at least one embodiment.

FIG. 22 is a flowchart of an illustrative process 2200 for handling a visitor. For example, process 2200 may be for delivering a package. At step 2202, process 2200 may include acquiring, at a server, package identification information associated with the package. Then, at step 2204, process 2200 may include accessing, at the server using the acquired package identification information, status information associated with a smart environment. Then, at step 2206, process 2200 may include affecting, with the server, the delivery of the package based on the accessed status information.

It is understood that the steps shown in process 2200 of FIG. 22 are merely illustrative and that existing steps may be modified or omitted, additional steps may be added, and the order of certain steps may be altered.

Figure 23:
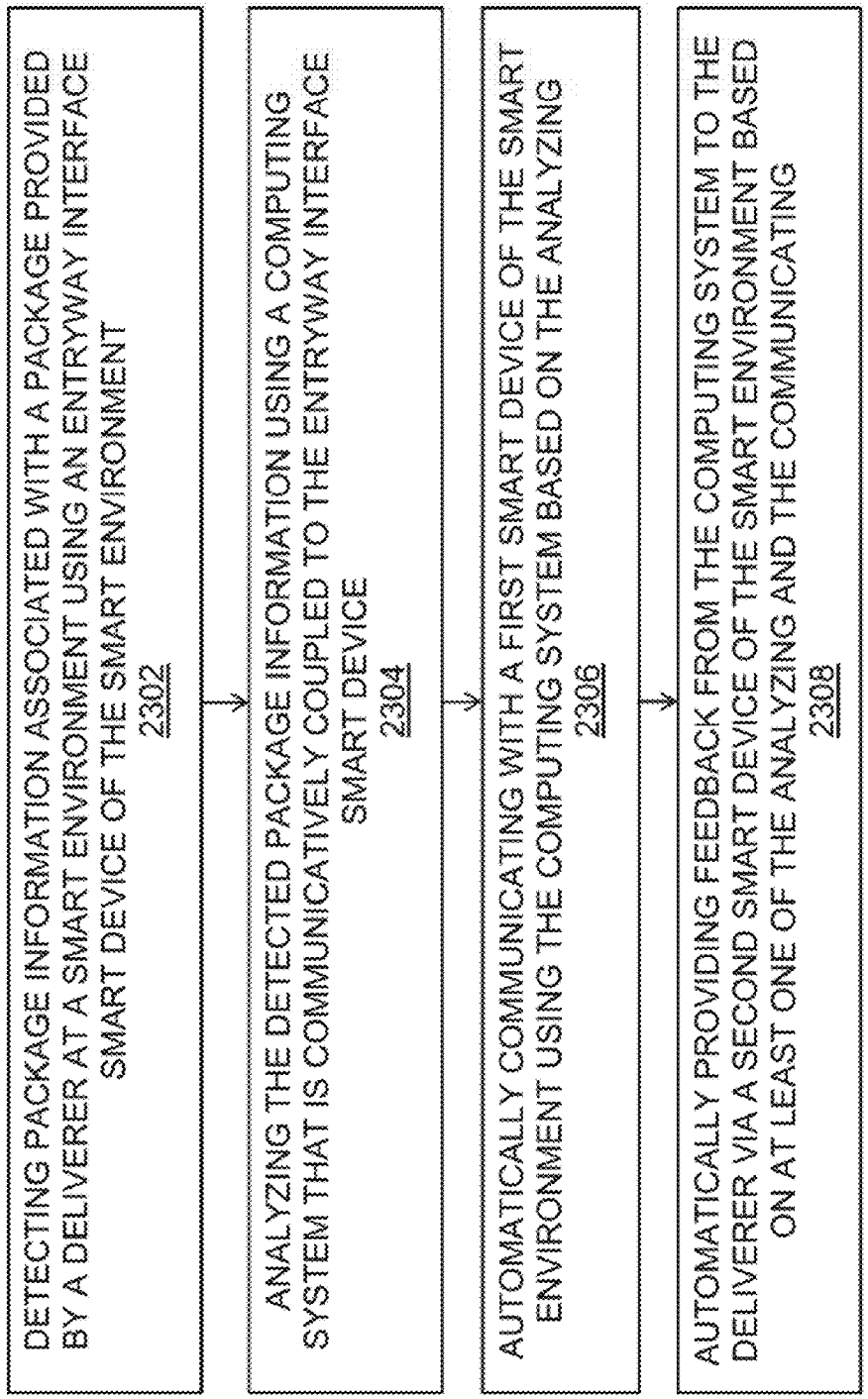
FIG. 23 provides an example process for handling a delivery attempt of a package, according to at least one embodiment.

FIG. 23 is a flowchart of an illustrative process 2300 for handling a visitor. For example, process 2300 may be for handling a delivery attempt of a package provided by a deliverer at a smart environment that includes a number of smart devices. At step 2302, process 2300 may include detecting package information associated with the package provided by the deliverer at the smart environment using an entryway interface smart device of the smart devices. At step 2304, process 2300 may include analyzing the detected package information using a computing system that is communicatively coupled to the entryway interface smart device. Process 2300 may also include at least one of step 2306 and step 2308. Step 2306 may include automatically communicating with a first smart device of the smart devices using the computing system based on the analyzing. Step 2308 may include automatically providing feedback from the computing system to the deliverer via a second smart device of the smart devices based on at least one of the analyzing and the communicating.

It is understood that the steps shown in process 2300 of FIG. 23 are merely illustrative and that existing steps may be modified or omitted, additional steps may be added, and the order of certain steps may be altered.

Figure 24:
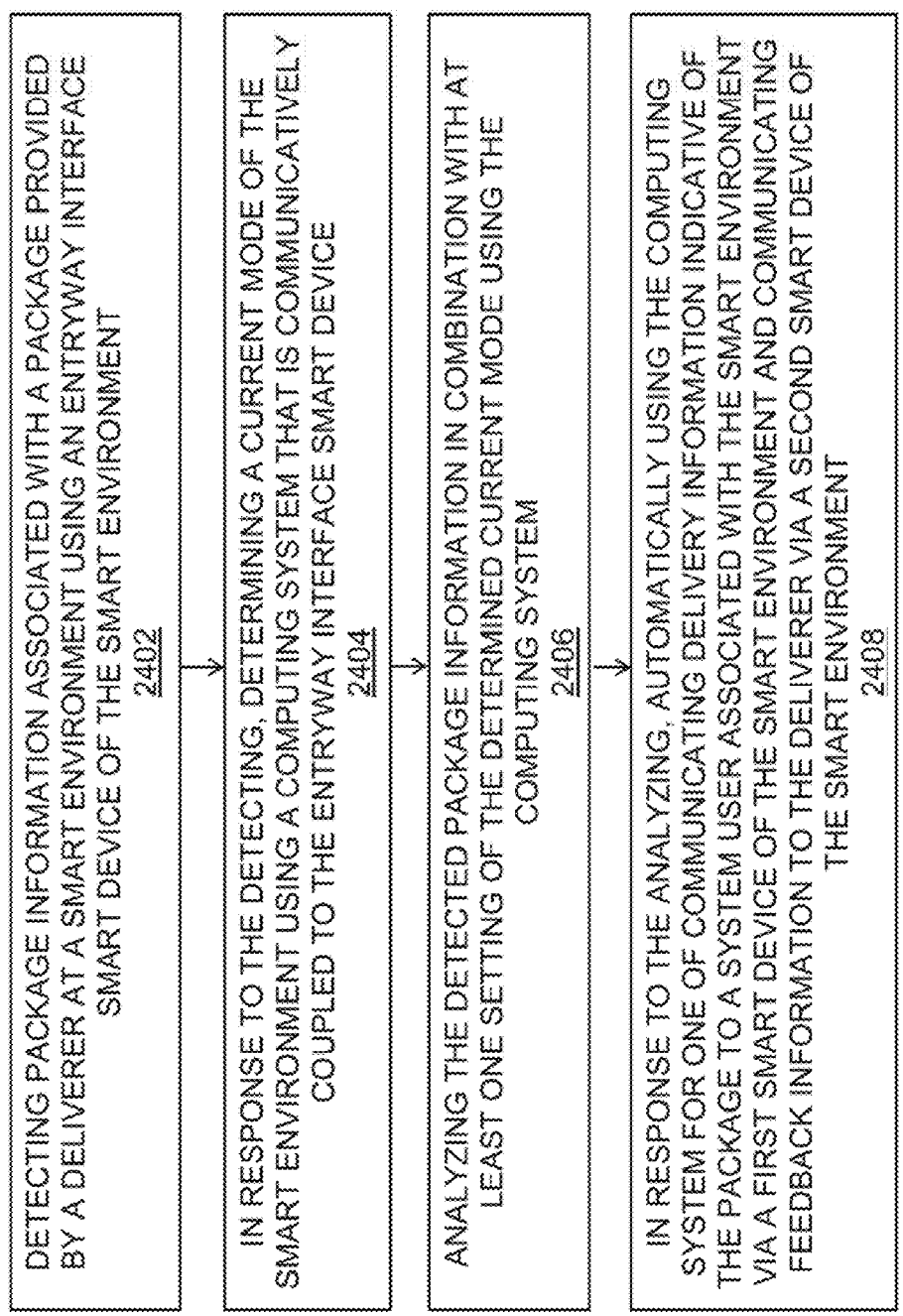
FIG. 24 provides an example process for handling a delivery attempt of a package, according to at least one embodiment.

FIG. 24 is a flowchart of an illustrative process 2400 for handling a visitor. For example, process 2400 may be for handling a delivery attempt of a package provided by a deliverer at a smart environment that includes a number of smart devices. At step 2402, process 2400 may include detecting package information associated with the package provided by the deliverer at the smart environment using an entryway interface smart device of the smart devices. At step 2404, process 2400 may include, in response to the detecting, determining a current mode of the smart environment using a computing system that is communicatively coupled to the entryway interface smart device. At step 2406, process 2400 may include analyzing the detected package information in combination with at least one setting of the determined current mode using the computing system. At step 2408, process 2400 may include, in response to the analyzing, automatically using the computing system for one of communicating delivery information indicative of the package to a system user associated with the smart environment via a first smart device of the smart devices and communicating feedback information to the deliverer via a second smart device of the smart devices.

It is understood that the steps shown in process 2400 of FIG. 24 are merely illustrative and that existing steps may be modified or omitted, additional steps may be added, and the order of certain steps may be altered.

Figure 25:
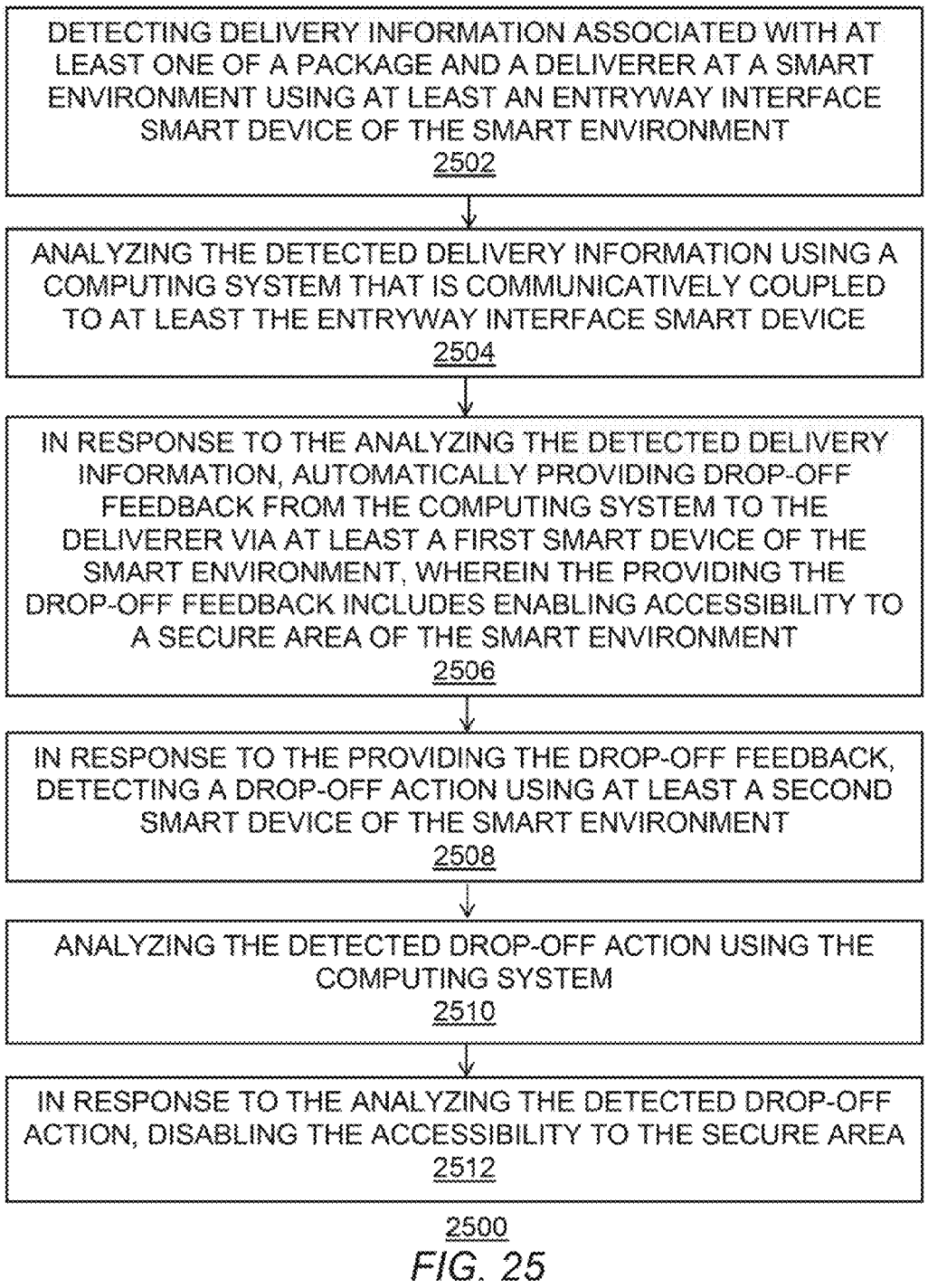
FIG. 25 provides an example process for securely handling a delivery of a package, according to at least one embodiment.

FIG. 25 is a flowchart of an illustrative process 2500 for handling a visitor. For example, process 2500 may be for securely handling a delivery of a package by a deliverer at a smart environment that includes a number of smart devices. At step 2502, process 2500 may include detecting delivery information associated with at least one of the package and the deliverer at the smart environment using at least an entryway interface smart device of the smart devices. At step 2504, process 2500 may include analyzing the detected delivery information using a computing system that is communicatively coupled to at least the entryway interface smart device of the smart devices. At step 2506, process 2500 may include, in response to the analyzing the detected delivery information, automatically providing drop-off feedback from the computing system to the deliverer via at least a first smart device of the smart devices, wherein the providing the drop-off feedback may include enabling accessibility to a secure area of the smart environment. At step 2508, process 2500 may include, in response to the providing the drop-off feedback, detecting a drop-off action using at least a second smart device of the smart devices. At step 2510, process 2500 may include analyzing the detected drop-off action using the computing system. At step 2512, process 2500 may include, in response to the analyzing the detected drop-off action, disabling the accessibility to the secure area.

It is understood that the steps shown in process 2500 of FIG. 25 are merely illustrative and that existing steps may be modified or omitted, additional steps may be added, and the order of certain steps may be altered.

Figure 26:
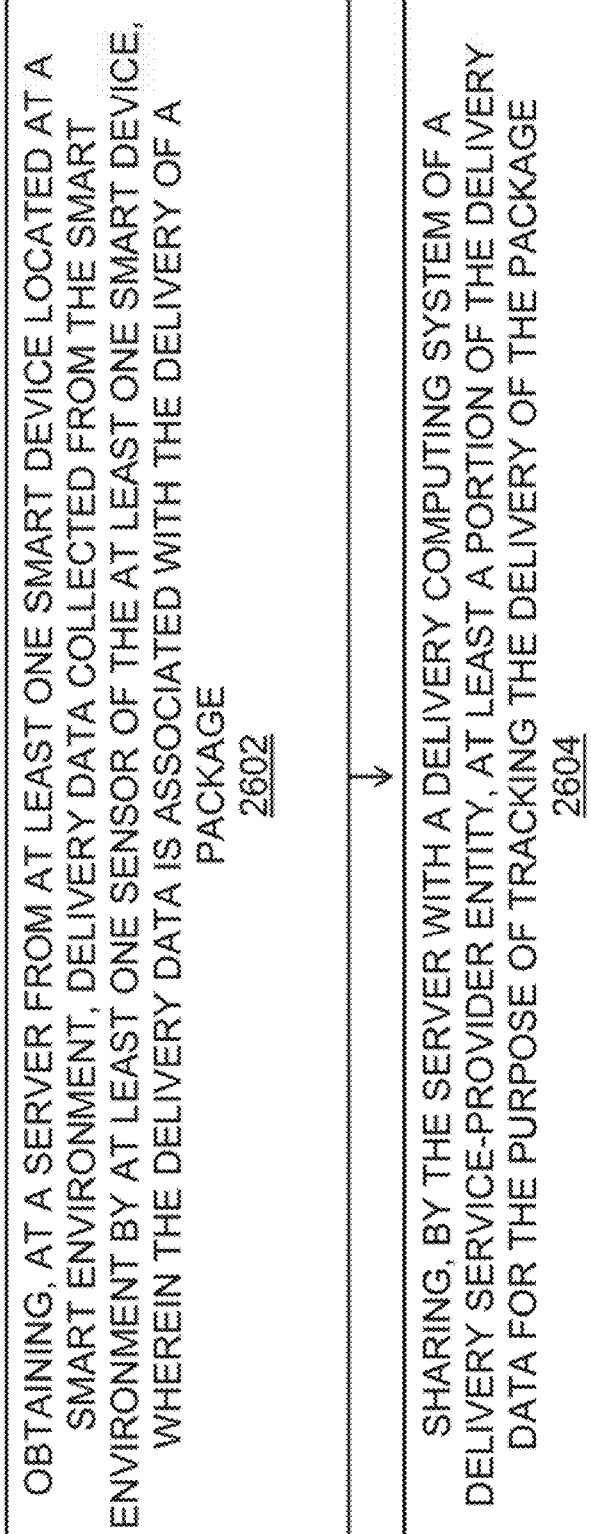
FIG. 26 provides an example process for tracking delivery of a package, according to at least one embodiment.

FIG. 26 is a flowchart of an illustrative process 2600 for tracking delivery of a package by a delivery service-provider entity that includes a delivery computing system to a smart environment that includes at least one smart device. At step 2602, process 2600 may include obtaining, at a server from the at least one smart device located at the smart environment, delivery data collected from the smart environment by at least one sensor of the at least one smart device, wherein the delivery data is associated with the delivery of the package. At step 2604, process 2600 may include sharing, by the server with the delivery computing system of the delivery service-provider entity, at least a portion of the delivery data for the purpose of tracking the delivery of the package.

It is understood that the steps shown in process 2600 of FIG. 26 are merely illustrative and that existing steps may be modified or omitted, additional steps may be added, and the order of certain steps may be altered.

FIG. 27 is a flowchart of an illustrative process 2700 for tracking delivery of a package by a delivery service-provider entity to a smart environment that includes at least one smart device. At step 2702, process 2700 may include obtaining, at a delivery computing system of the delivery service-provider entity, deliverer data from a personal device of a particular deliverer of the delivery service-provider entity, wherein the deliverer data is associated with the delivery of the package. At step 2704, process 2700 may include obtaining, at the delivery computing system of the delivery service-provider, delivery data from the at least one smart device of the smart environment, wherein the delivery data is associated with the delivery of the package. At step 2704, process 2700 may include analyzing, with the delivery computing system of the delivery service-provider, at least a portion of the obtained deliverer data in combination with at least a portion of the obtained delivery data for the purpose of tracking the delivery of the package.

It is understood that the steps shown in process 2700 of FIG. 27 are merely illustrative and that existing steps may be modified or omitted, additional steps may be added, and the order of certain steps may be altered.

Figure 28:
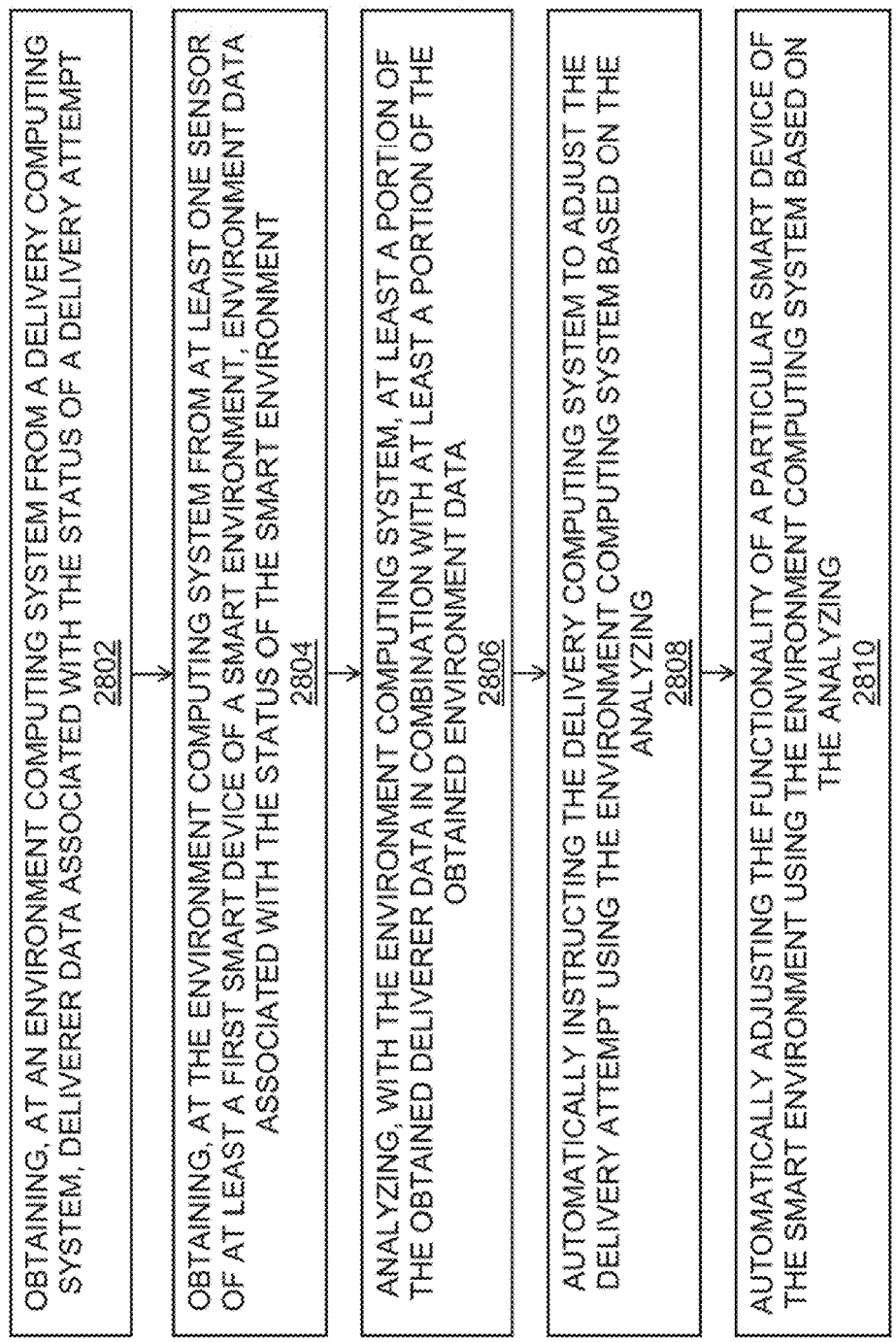
FIG. 28 provides an example process for handling a delivery attempt of a package, according to at least one embodiment.

FIG. 28 is a flowchart of an illustrative process 2800 for handling a visitor. For example, process 2800 may be for handling a delivery attempt of a package at a smart environment that includes a number of smart devices by a deliverer of a delivery service-provider entity that includes a delivery computing system. At step 2802, process 2800 may include obtaining, at an environment computing system from the delivery computing system, deliverer data associated with the status of the delivery attempt. At step 2804, process 2800 may include obtaining, at the environment computing system from at least one sensor of at least a first smart device of the smart devices, environment data associated with the status of the smart environment. At step 2806, process 2800 may include analyzing, with the environment computing system, at least a portion of the obtained deliverer data in combination with at least a portion of the obtained environment data. Process 2800 may also include at least one of step 2808 and step 2810. At step 2808, process 2800 may include automatically instructing the delivery computing system to adjust the delivery attempt using the environment computing system based on the analyzing. At step 2810, process 2800 may include automatically adjusting the functionality of a particular smart device of the smart devices using the environment computing system based on the analyzing.

It is understood that the steps shown in process 2800 of FIG. 28 are merely illustrative and that existing steps may be modified or omitted, additional steps may be added, and the order of certain steps may be altered.

Smart doorbell 106 of environment 100 may be configured to include any suitable combination of any of the components described above so as to appropriately interact with other smart devices of environment 100 and services platform 200 and any suitable user thereof, such as users registered with or associated with environment 100 (e.g., owners, occupants, etc.) and/or users visiting environment 100 (e.g., package deliverers, friends, solicitors, strangers, and would-be-thieves). In addition to or as an alternative to increasing the convenience and efficiency of package delivery, increasing the traceability of package delivery, and/or enabling secure package delivery, such a smart doorbell 106 may be a visitor interface or entryway interface device that may be operative to detect and control or otherwise handle a person's approach to or departure from a location (e.g., an outer door 186 of structure 150 of environment 100), announce such an approach or departure, enhance conventional doorbell functionality for both residents and visitors, control settings on a security system, detect environmental data and other useful data for environment 100 and system 164, and the like. Therefore, doorbell 106, on behalf of smart environment 100 and system 164 and users associated therewith, may act as a security custodian to environment 100 with respect to any visitors that may approach environment 100, where the behavior of such custodial action may be based on any suitable information of system 164, including any suitable modes or settings of any suitable portion or entirety of smart environment 100 and/or of a user of such a smart environment.

Any suitable type of mode, such as a "do-not-disturb mode," may be set for a particular system user U, for a particular environment 100, and/or for at least a particular portion of a particular environment 100, indefinitely or for any suitable length of time that may start at a current or future moment. Such a mode may be determined based on any suitable information generated by or inferred from any suitable data of environment 100 and/or user U available to platform 200. As just one particular example, as mentioned above, system 164 may use tracking information to make inferences regarding the current and/or future occupancy of home environment 100 and/or the current and/or future location of a user U (e.g., at environment 100, like user UL of FIG. 1 and Husband 1718 of FIG. 17, or away from environment 100, like user UR of FIG. 1 and Wife 1714 of FIG. 17), where such inferences may be used to define a current or future mode of environment 100 and/or of a user U. As another example, platform 200 may leverage sensed data from one or more sensors of one or more smart devices of environment 100 to at least partially define a particular current or future mode for environment 100 (e.g., programs/algorithms may assess detected sounds, vibrations, and movements to determine whether the home occupants are home or away, sleeping or awake, etc.). Alternatively or additionally, a user U may actively select or otherwise at least partially define a particular current or future mode for environment 100 or a system user by manually communicating mode selection data to system 164 (e.g., via direct user interaction with a user device 166 and/or any suitable smart device of system 164 accessible by the user). Various determinations of various factors may combine to enable a particular mode for a particular system user and/or a particular system environment or specific portion thereof (e.g., no occupancy within environment 100, lack of user movement within a darkened bedroom, etc.), and various settings may be enabled or made available during that enabled mode (e.g., turn on lights within environment 100 at a certain time of day to mimic occupancy, prevent disruptive communication of an attempted delivery at environment 100 to a darkened room thereof, etc.).

For example, a do-not-disturb mode for environment 100 generally may indicate that environment 100 may not be willing or able to accept at least certain package deliveries (e.g., deliveries requiring a confirmation of receipt user signature by a particular user or any user). Such a mode may be manually set by an appropriate user (e.g., a user with appropriate management rights for environment 100 using any suitable device 166 or interaction with any other suitable smart device of environment 100) for any suitable reason, such as when the user does not want to greet a visitor (e.g., if the user is feeling under the weather or going to sleep) or when the user will not be at environment 100 (e.g., when the user is going on vacation or leaving a babysitter at home with a child). Alternatively, platform 200 may be operative to collect any suitable information from one or more smart devices of environment 100 and may make inferences in order to automatically set a do-not-disturb mode for environment 100 (e.g., based on sensed occupancy data and sensed movement data). When a current mode of environment 100 is set to a "do-not-disturb" mode, various suitable settings may be applied by system 164 in response to various suitable detected activities. As just one example, in response to a visitor (e.g., deliverer DL with or without a package PL) being detected by doorbell 106 of environment 100 when environment 100 is in a do-not-disturb mode, system 164 may be operative to automatically initiate a particular action, such as communicating to the detected visitor (e.g., via user interface 812 or audio speaker 836 of doorbell 106) that it is not an appropriate time to visit environment 100 and to come back at a later time. Additionally or alternatively, as mentioned above, information indicative of when environment 100 may be associated with a do-not-disturb mode may be a type of current status information that may be shared with or otherwise made accessible to a facilitator entity (e.g., a delivery business 228) for increasing the efficiency of package delivery (e.g., delaying delivery until after a do-not-disturb mode is over) and/or of any other activity that may include a visitor interacting with environment 100. Such information may be handled with sensitivity so as to not be leveraged for sinister purposes (e.g., for a third party to detect when an environment 100 is in a do-not-disturb mode so as to assume no one is home and attempt a robbery of the premises). For example, communication to a detected visitor of such a mode may simply indicate that an occupant of environment 100 is otherwise preoccupied at the moment (e.g., "on an important telephone call" or "putting the baby to sleep") and does not wish to interact with the detected visitor, whether or not there is in fact an occupant currently at environment 100, where such a communication may be automatically updated or selected by system 164 as may be appropriate for a particular time of day (e.g., communicate that an occupant is "sleeping" if after 10:00 pm or that an occupant is "in an important meeting" if during regular business hours, etc.) or for a particular visitor (e.g., communicate that an occupant is "not available" when a known visitor is detected or "on an important telephone call" when an unknown visitor is detected, etc.). As another example, system 164 may be configured to share information about a do-not-disturb mode of an environment 100 or any other suitable status information of environment 100 or a user thereof with a third party, such as a facilitator of a package delivery, only when certain data is accessible to that third party. For example, system 164 may only share such status information when a facilitator entity queries system 164 with respect to particular unique package identification information (e.g., such information as may be generated at step 1906 and linked with a particular ordered package). Certain facilitator entities (e.g., Federal Express) may be trusted and enabled by platform 200 to interpret such unique package identification information for appropriately querying system 164 about such status information, and whereby system 164 may be configured to only share such status information when queried by a trusted entity (e.g., when the unique package identification information is leveraged by an entity trusted by system 164 and not just when any entity has access to the recipient and/or location data of the ordered package).

Various types of data may be detected and analyzed for potentially affecting a current or future mode of a system user and/or at least a portion of a smart environment. For example, user location information with respect to the boundaries of environment 100 or a portion thereof (e.g., with respect to a particular room of structure 150) may be leveraged for determining a system mode. If no user is detected within a particular room of environment 100, then that room may be put into a do-not-disturb mode such that no information is fruitlessly attempted to be communicated to an occupant of that room (e.g., via any smart devices of that room). As another example, if an occupant is detected within a particular room of environment 100, but that occupant is detected to have not moved more than a particular threshold amount in a particular amount of time and/or a brightness value of light is below a particular threshold in that room, then it may be inferred that the occupant is asleep and that room may be put into a do-not-disturb mode such that no information is communicated to an occupant of that room (e.g., via any smart devices of that room) to prevent the occupant from being awoken. Additionally or alternatively, any other suitable activity of a user may be detected by one or more smart devices for at least partially determining a mode of the user and/or environment 100. For example, platform 200 may determine that a user is conducting a video conference call with business partners (e.g., by analyzing certain movements and actions of the user in conjunction with detected operation of one or more appliances or electronic devices of environment 100 (e.g., a video conferencing machine or television or user device) and may utilize that information to infer that the user should not be bothered during that activity. In certain embodiments, calendar data may be accessible and analyzed for determining a system mode. For example, a calendar application for a particular user (e.g., as may be accessible by a processing component of platform 200 from a user device 166) may be accessed and analyzed (e.g., independently or in combination with other detected data) to determine a current or future activity of the user (e.g., leveraging calendar data indicative of an "important telephone call with client X" at a current time in combination with detection of the user being on the telephone may be used to enable a do-not-disturb mode for that user during the duration of that telephone call).

Additionally or alternatively, a user may affirmatively provide platform 200 with information that may be leveraged to at least partially determine one or more modes to be enabled. For example, a user may communicate any suitable information to platform 200 via any suitable device of environment 100 to define any suitable characteristic that may be analyzed for enabling a mode and/or to specifically enable a particular mode. In some embodiments, a user may communicate to platform 200 (e.g., via a user device 166 and/or any suitable user interface of any suitable smart device of environment 100) a particular activity that the user is currently performing or will be performing at a future time, such as "putting my baby down for a nap" or "conducting an important business call" or "reading an important work document" or "feeling under the weather" or the like. Such information may be verbally communicated by the user to platform 200 or may be manually entered by interfacing with a graphical user interface or any other suitable user interface of platform 200. Such information may be communicated to platform 200 by a user from any suitable location, whether or not the user is local to a particular environment for affecting a mode of that environment. For example, a user that may have recently left environment 100 via car may utilize its personal device 166 for communicating to platform 200 that the user wishes for a do-not-disturb mode to be enabled for environment 100. In some embodiments, a particular mode may be set manually by a user (e.g., to override any alternative mode that might be enabled based on current detected data, such as to enter a do-not-disturb mode for the entirety of environment 100 despite a child and a babysitter currently actively occupying environment 100).

Each one of multiple different system users can be associated with its own distinct mode. For example, a first user occupant of environment 100 may be in a do-not-disturb mode (e.g., when on an important telephone call or simply when wishing to not be disturbed) and a second user occupant of environment 100 may not be in a do-not-disturb mode, whereby platform 200 may be operative to balance the settings of each enabled mode of the various occupants of environment 100 when responding to an event (e.g., when a visitor is detected (e.g., at step 2002), platform 200 may communicate with a personal device associated with the second user (e.g., at step 2006) while platform 200 may avoid any communication with devices of environment 100 that may disturb the first user). As one example, platform 200 may be operative to communicate silently with a user device 166 of a first "available" user via a smart device that is proximate to a first "available" user (e.g., with silent blinking lights or text message on a user interface of such a smart device) but not to communicate in any manner that may disturb a "not available" user that may be sleeping next to the available user (e.g., not with an audible message via a smart device proximate both users). Additionally or alternatively, each one of multiple different zones or areas of environment 100 can be associated with its own distinct mode. For example, a first room of environment 100 may be in a do-not-disturb mode (e.g., a bedroom when one or more occupants may be resting therein) and a second room of environment 100 may not be in a do-not-disturb mode (e.g., a living room where one or more occupants may be casually watching television), whereby platform 200 may be operative detect such modes and to balance the settings of each enabled mode of the various rooms of environment 100 when responding to an event (e.g., when a visitor is detected (e.g., at step 2002), platform 200 may communicate with one or more smart devices located within the second room (e.g., at step 2006) while platform 200 may avoid any communication with any devices of the first room that may disturb the occupant(s) therein).

Any particular data or combination of various types of data accessible by platform 200, which may be detected or otherwise received by one or more of devices 102/104/106/108/110/112/113/114/116/122/166/168/170 of a smart-home environment 100, may be processed by platform 200 (e.g., with a processing engine 206 and/or services 204/205 and/or third party sources 222/224/226/228/230 and/or paradigms 310a/310b/310c/310d and/or extrinsic information 316 and/or any other suitable information/services, for example, in combination with rules-based inference engines and/or artificial intelligence) as received home data 202 (e.g., for generating derived home data 208), and that data may be analyzed or otherwise used to define and enable a particular mode for a particular user and/or for at least a particular portion of an environment 100. Such a mode may be associated with an entire environment 100 or only a portion thereof. For example, a particular wing of structure 150 may be utilized at a certain time as an exhibition area for a performance or a meeting, such that that area should be in a do-not-disturb mode at that time such that information may not be communicated to that area by platform 200 for specific events (e.g., for detection of a deliverer DL with a package PL). Additionally or alternatively, such a mode may be associated with a particular user, whether or not the user is local to environment 100 (e.g., user UL) or remote from environment 100 (e.g., user UR). For example, a particular user may be associated with an enabled do-not-disturb mode when an important business call is being conducted by that user, regardless of whether that user is conducting the call within environment 100 or remotely from environment 100 (e.g., while driving away from environment 100), such that that user may not be communicated to by platform 200 in a disturbing manner for alerting that user of a specific event (e.g., for detection of a deliverer DL with a package PL, such as at step 2006).

When a current mode is enabled for a particular environment or user, various suitable settings may be followed by platform 200 for that mode in response to particular events being detected. For example, when a visitor is detected at environment 100 (e.g., at step 2002), different type(s) of communication may be conducted by platform 200 with one or more users depending on whether or not environment 100 is in a particular do-not-disturb mode (e.g., at step 2006) and/or different type(s) of feedback may be provided by platform 200 to the visitor depending on whether or not environment 100 is in a particular do-not-disturb mode (e.g., at step 2008). When environment 100 is in a particular type of do-not-disturb mode, for example, platform 200 may be operative not to communicate the detection of a visitor using any devices within environment 100 according to communication settings of that mode (e.g., so as not to wake any sleeping occupants or so as not to fruitlessly attempt to communicate with non-existent occupants), yet, when environment 100 is not in a do-not-disturb mode, platform 200 may be operative to communicate such detection of a visitor using one or more devices within environment 100 (e.g., so as to alert the occupants of the visitor).

In some embodiments, certain settings of a particular mode may vary based on certain characteristics of a particular event being detected. For example, when a first particular visitor is detected at environment 100 (e.g., at step 2002), a first particular communication operation may be conducted by platform 200 with a user when environment 100 is in a particular do-not-disturb mode (e.g., at step 2006) and/or a first particular feedback may be provided by platform 200 to the visitor when environment 100 is in a particular do-not-disturb mode (e.g., at step 2008), yet, when a second particular visitor is detected at environment 100 (e.g., at step 2002), a second particular communication operation may be conducted by platform 200 with a user when environment 100 is in that same particular do-not-disturb mode (e.g., at step 2006) and/or a second particular feedback may be provided by platform 200 to the visitor when environment 100 is in that same particular do-not-disturb mode (e.g., at step 2008). For example, when a particular do-not-disturb mode has been enabled for environment 100 (e.g., because the user is taking a nap), most visitors detected by environment 100 may be provided by platform 200 with feedback instructing the visitor to return at a later time as the occupants are currently unavailable and no communication may be provided by platform 200 to an occupant that might wake the occupant, yet a particular important visitor (e.g., a deliverer DL with a highly anticipated or desired package PL) detected by environment 100 may be provided by platform 200 with feedback (e.g., at step 2008) instructing the visitor to wait for an occupant to come to the door and appropriate communication may be provided by platform 200 (e.g., at step 2006) to the napping occupant (e.g., to wake the occupant and instruct the occupant to further the desired delivery process).

Various settings of a particular mode for an environment or system user may dictate the functionality of one or more devices (e.g., one or more smart devices of environment 100). In some embodiments, certain mode settings may dictate such functionality in a time-based fashion. For example, lighting of environment 100 (e.g., one or more lamps 118 or outdoor lighting 114) may be automatically turned on 30 minutes before sunset (e.g., at 5:00 pm) by platform 200 when environment 100 is in a do-not-disturb mode, which may mimic occupant interaction with environment lighting such that environment 100 may appear occupied. Additionally or alternatively, in some embodiments, certain mode settings may dictate such functionality based on detection of any visitor or a particular visitor. For example, lighting of environment 100 (e.g., one or more lamps 118 or outdoor lighting 114) may be automatically turned on when a visitor is detected by platform 200 (e.g., at doorbell 106) when environment 100 is in a do-not-disturb mode, which may mimic occupant interaction with environment lighting when a visitor is detected such that environment 100 may appear occupied. As another example, certain audio (e.g., a dog barking) may be automatically output (e.g., by audio speaker 836 of doorbell 106) when an unknown visitor is detected by platform 200 (e.g., at doorbell 106) when environment 100 is in a do-not-disturb mode, which may mimic occupant interaction with environment lighting when a visitor is detected such that environment 100 may appear occupied or otherwise more prepared to thwart a would-be-thief.

As yet another example, certain settings of a mode may dictate that platform 200 automatically provides certain feedback with environment 100 when a particular event is detected while that mode is enabled for environment 100 or a user thereof. For example, certain settings of a do-not-disturb mode may be operative to cause certain feedback (e.g., a visual indicator or audible message) to be automatically output by environment 100 (e.g., by projector 830, user interface 812, and/or audio speaker 836 of doorbell 106) when a known visitor or any visitor is detected by platform 200 (e.g., by doorbell 106) at environment 100 when such a do-not-disturb mode is enabled for environment 100 or for a user thereof. Such feedback may be provided (e.g., at step 2008) to indicate to the visitor detected (e.g., at step 2002) that no occupant of environment 100 is currently available to interact with the visitor. For example, such feedback may convey to the detected visitor that "occupant X is currently on an important telephone call right now and cannot be bothered" or "occupant X is currently nursing the baby, please come back at another time" or the like, which may in some way alert the visitor not to bother interacting any further with environment 100 (e.g., not to bother depressing or otherwise interacting with button 812 of doorbell 106) when the visitor is detected such that environment 100 may appear occupied but unable to accommodate occupant interaction with the visitor. As another example, such feedback may be provided as a simple indication of the mode on or with respect to user interface doorbell button 812 or any other suitable component of doorbell 106 or other smart device of environment 100 that a visitor would usually interact with to reach an occupant (e.g., doorbell button 812 may be provided with a blinking red light or text message reading "doorbell deactivated, please come back at another time"), whereby a visitor may easily determine that any active visitor interaction with environment 100 would not be worthwhile. In some such embodiments, such feedback may be provided at an initial entry point to environment 100 (e.g., at a front gate at the border of the curtilage of environment 100), which may thereby indicate the do-not-disturb mode to the visitor at an initial detection of the visitor at environment 100 rather than after the visitor has fruitlessly advanced to the front door 186 of structure 150. This may save valuable time for the visitor (e.g., obviating the need for a deliverer DL to get out of a delivery truck with package PL for approaching door 186) and/or may prevent more intimate visitor interaction with portions of environment 100 that may disturb an occupant (e.g., visitor interaction with front door 186 may needlessly rile up an occupant dog on the interior side of door 186). In some embodiments, in addition to or as an alternative to providing such feedback to a detected visitor, certain settings of a do-not-disturb mode may be operative to adjust certain functionalities of certain devices of environment 100 when a known visitor or any visitor is detected by platform 200 (e.g., by doorbell 106) at environment 100 when such a do-not-disturb mode is enabled for environment 100 or for a user thereof. Such functionality adjustment may include, for example, deactivating the functionality of platform 200 to communicate an interaction of a visitor with doorbell button 812 to a system user of environment 100 when a particular mode is enabled for environment 100 or a user thereof. That is, the conventional functionality of doorbell button 812 may be at least partially deactivated when a particular mode is enabled.

Various levels of detailed information regarding the mode may be communicated in such feedback dependent upon the type of visitor detected. For example, if a deliverer DL of a trusted third party deliverer entity 228 is detected (e.g., at step 2002), then platform 200 may be operative to provide feedback (e.g., at step 2008) that may indicate when the current do-not-disturb mode will be over (e.g., "no one is currently available to receive you, but please return between 3:00 pm and 5:00 pm when an occupant will be ready to greet you"). However, if an unknown visitor is detected, then less detailed feedback may be provided, such as "no one is currently available to receive you, please leave the premises immediately". In certain embodiments, platform 200 may be configured to provide visitor-specific messages to specific visitors that may be detected during specific modes. For example, when an occupant is set to take a nap and instructs platform 200 to enable a do-not-disturb mode for the user and/or at least a portion of environment 100 but that occupant wishes to leave a message for a particular visitor if that visitor is detected during that mode (e.g., "Hi visitor Y, I am sorry to miss you, but I had to take a nap, I left your backpack next to the mailbox for you"), the occupant may provide specific instructions for associating such a message with that mode and that message may be communicated to such a visitor if that visitor is detected by platform 200 (e.g., at doorbell 106) when environment 100 is in such a do-not-disturb mode. Such messages or other suitable customizable settings of a mode may be defined by a user when local to environment 100 (e.g., via any suitable smart device of environment 100) or when remote from environment 100 (e.g., via a user device 166, such as, for example, when the user is currently on vacation but would like to leave a customized note for a visitor that is expected to arrive at environment 100 while the user is still on vacation and environment 100 is in a do-not-disturb mode).

Certain current mode information and/or future mode information of an environment or user may be shared with one or more suitable outside service providers. For example, as mentioned above with respect to FIG. 19, current status information (e.g., mode) of an environment or user may be obtained by a delivery facilitator business entity 228 (e.g., at step 1908) to affect the delivery of a package (e.g., to delay delivery until a time when environment 100 may be occupied by the recipient to receive the delivery). As another example, current status information (e.g., mode) of an environment or user may be obtained by a law enforcement agency 222 and/or suitable emergency response entity 230 or other suitable security entity or neighboring environment to affect protection of the environment or its users (e.g., to increase security from thieves of environment 100 in a do-not-disturb mode until an active occupant is within environment 100). Mode status information of a smart system entity may include various types of information that may be obtained and leveraged (e.g., at steps 1908/1910) by a third party for more efficiently delivering a package and/or for protecting an environment entity that may be accomplished in a more convenient manner for environment 100 or for a user thereof. For example, such status information may include information indicative of when to allow delivery to a particular location (e.g., after 4:00 PM on Mondays and Wednesdays only), information indicative of preferred alternate delivery methods (e.g., do not deliver to environment 100 but rather hold a particular package at a particular deliverer pick up location for manual pick-up by a particular user, or deliver to another recipient and/or to another location other than the recipient and/or location initially defined at step 1902), information indicative of authorization to deliver without signed confirmation of receipt of delivery (e.g., a particular authenticated user of the system hereby authorizes deliverer to deliver a particular package to a particular location and leave next to the front door of that location without a human user sitting for that delivery), and/or any other suitable information indicative of any other suitable delivery preferences or delivery instructions. As another example, such status information may include information indicative of when an environment is more susceptible to certain security breaches (e.g., no occupants will be alert at environment 100 after 11:00 PM on Mondays and at all on Wednesdays), information indicative of current occupancy on a room by room basis (e.g., one child in room A, two adults in room B, etc., which may be leveraged for increasing the ability of security personnel to handle a situation (e.g., a fire)), information indicative of last detected movement on a room by room basis (e.g., movement detected within room A 10 minutes ago, movement detected from room B into room C 5 seconds ago, etc., which may be leveraged for increasing the ability of security personnel to handle a situation (e.g., a robbery)), information indicative of authorization to access environment 100 without real-time user approval (e.g., information indicative of user authorization of a particular authenticated security entity (e.g., an authenticated firefighter) to access at least certain portions of environment 100 without a human user authorizing such access in real-time, which may be leveraged for increasing the ability of security personnel to handle a situation (e.g., a fire)), and/or any other suitable information indicative of any other suitable security preferences or security instructions.

In some embodiments, mode status information may be provided to a delivery facilitator and/or a security facilitator on a macro-level in addition to or as an alternative to providing mode status information with respect to just one particular environment 100 and/or user thereof. For example, mode status information may be made available to a facilitator entity 222/228/230 that may be generally indicative of a mode status or mode trend of a particular group of smart system entities (e.g., a neighborhood or ZIP code that may include multiple smart environments 100). As just one example, such mode status information may be indicative of certain days of the week when a majority of such environments of the group are in a do-not-disturb mode and/or are otherwise not available to receive packages, and such information may be leveraged by the facilitator entity to increase security to that entire group (e.g., neighborhood) of environments during those days and/or to avoid scheduling deliveries to that entire group (e.g., neighborhood) of environments during those days. Any suitable grouping of environments or users or other suitable smart system entities of any suitable size and type may be used to generate group or macro-level mode status information that may be made available to a facilitator entity for more efficiently handling the purpose (e.g., security and/or deliveries) associated with that group. By grouping smart system entities and only sharing mode status data at a group-level with third parties, such as delivery facilitator entities, the privacy and/or security of certain environments may be protected by platform 200 by not sharing mode status information associated specifically with only a particular single environment 100 or user (e.g., to preserve at least some anonymity about the status of a particular smart environment or user).

By accessing certain mode status information of a smart environment 100 or other suitable smart system entity of platform 200, as may be detected or inferred by system 164, a facilitator entity may be configured to optimize package delivery or environment security. For example, data indicative of when a particular location may and may not be able to receive a package delivery may be processed by any suitable distribution system to dictate when certain packages are dispatched for maximizing the likelihood of a successful physical delivery. This may reduce overhead costs for a delivery entity (e.g., reduce fuel prices and wasted man hours by limiting the number of failed delivery attempts) and/or may reduce insurance costs by limiting the exposure of perishable contents from unnecessary and degrading delivery effects. As another example, data indicative of when a particular location may and may not be actively occupied may be processed by any suitable security system to dictate when certain security measures are dispatched for increasing the security of the environment. This may reduce overhead costs for a security entity (e.g., reduce fuel prices and wasted man hours by limiting the number of unnecessary visits by a security officer to a location that is currently actively occupied) and/or may reduce insurance costs by limiting the exposure of environments to less than secure conditions. For example, one, some, or all of steps 1902, 1904, 1906, 1908, and 1910 may be at least partially or completely automated using one or more computer systems (e.g., computer system 1500 and/or computer system 1600) that may be leveraged by each one of environment 100, system 164, facilitator entity 222/228/230, and the like for associating a smart system entity of system 164 with a mode and then sharing certain mode status information of that smart system entity with a deliverer or other entity at any suitable time for positively affecting the delivery of a package or the security of the environment or user. A user of system 164 may actively and manually define certain preferences or instructions to be shared with such a facilitator entity. Alternatively or additionally, the delivery of packages and/or third-party security of a user or environment by a facilitator entity may be based on inferences made by system 164 or other suitable processing component(s) of platform 200 (e.g., at environment 100 or remote therefrom) and selectively shared with such a facilitator entity (e.g., without any active manual preferences made by a user but instead done transparently to a user).

Figure 29:
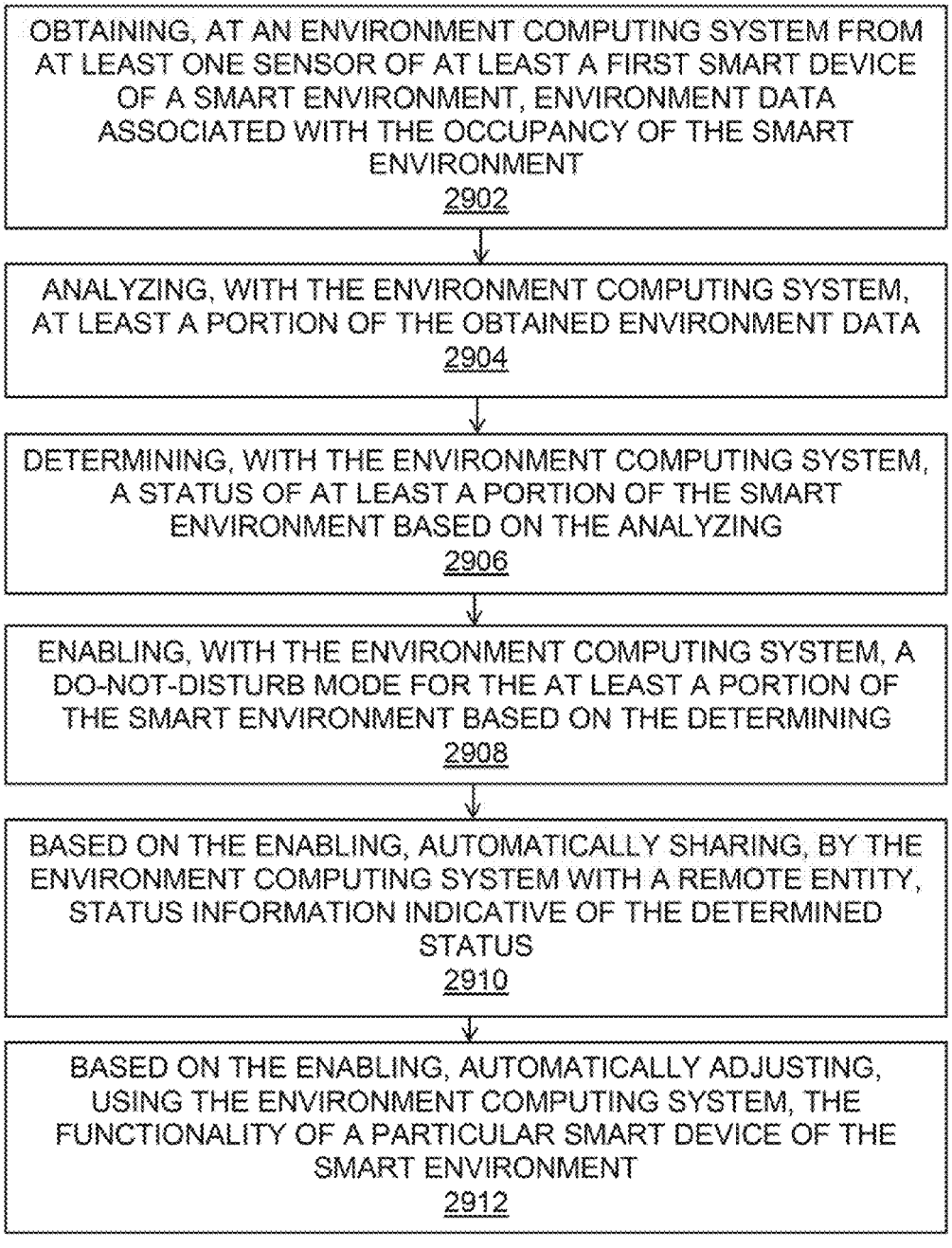
FIG. 29 provides an example process for managing a smart environment, according to at least one embodiment.

FIG. 29 is a flowchart of an illustrative process 2900 for managing a smart environment that comprises a number of smart devices. At step 2902, process 2900 may include obtaining, at an environment computing system from at least one sensor of at least a first smart device of the smart devices, environment data associated with the occupancy of the smart environment. At step 2904, process 2900 may include analyzing, with the environment computing system, at least a portion of the obtained environment data. At step 2906, process 2900 may include determining, with the environment computing system, a status of at least a portion of the smart environment based on the analyzing. At step 2908, process 2900 may include enabling, with the environment computing system, a do-not-disturb mode for the at least a portion of the smart environment based on the determining. Process 2900 may also include at least one of step 2910 and step 2912. At step 2910, process 2900 may include, based on the enabling, automatically sharing, by the environment computing system with a remote entity, status information indicative of the determined status. At step 2912, process 2900 may include, based on the enabling, automatically adjusting, using the environment computing system, the functionality of a particular smart device of the smart devices.

It is understood that the steps shown in process 2900 of FIG. 29 are merely illustrative and that existing steps may be modified or omitted, additional steps may be added, and the order of certain steps may be altered.

Smart doorbell 106 of environment 100 may be configured to include any suitable component or combination of components described above so as to effectively interact with other smart devices of environment 100 and of services platform 200 and with any suitable users thereof, such as users registered with or associated with environment 100 (e.g., owners, occupants, etc.) and/or users visiting environment 100 (e.g., package deliverers, friends, solicitors, strangers, and would-be-thieves), for increasing the security of environment 100 and/or for increasing the convenience of users of environment 100. For example, doorbell 106 may be operative to initially detect a visitor at environment 100, analyze visitor information based on the initial detection (e.g., in light of any applicable enabled modes), adjust a functionality of one or more smart devices of environment 100 based on such analysis, communicate with a user of environment 100 based on such analysis, provide feedback to the visitor based on such analysis and/or based on such communication, detect at least one act performed by the visitor in response to the provided feedback, and/or communicate with at least one of the user and the visitor based on the detected act. A first adjustment of the functionality of a smart device may be performed based on analysis of initial visitor detection information (e.g., based on the detection of a visitor generally), while a second adjustment of the functionality of a smart device may be later performed based on analysis of additional visitor detection information (e.g., based on the detection of an act of a visitor, where detection and analysis of such an act may identify a class of the visitor or that may identify the visitor specifically). Certain adjustment of the functionality of a smart device may enable the visitor to access at least a portion of environment 100 (e.g., unlocking of doorknob 122 of door 186 for enabling a visitor to enter structure 150). Such access may be granted based on analysis of visitor information revealing a trusted invitee (e.g., a guest to a party at a specifically designated time) or a trusted security service entity (e.g., a fireman during a detected emergency situation). The granted access may be limited in one or more ways based on the identity of the visitor and/or based on any other suitable data available for analysis. Various additional data may be leveraged during the analysis of any suitable detected visitor information, including data from a neighborhood security network of one or more additional smart environments associated (e.g., physically) with environment 100. Each one of these various security features that may be provided by doorbell 106 and platform 200 for enhancing visitor handling at environment 100 is described below in more detail.

As described above, at step 2002 of process 2000 for enhancing visitor handling, visitor information of a visitor may be detected at an entryway interface device of a smart environment. For example, one or more sensing components 828 of doorbell 106 may be operative to detect any suitable visitor information when any suitable visitor comes within a suitable sensing range of doorbell 106. Such a visitor may be any suitable entity, such as a package deliverer (e.g., deliverer DL of FIG. 1, which may be a human or a drone or otherwise), security entities (e.g., firemen, policemen, security system agents, etc.), any other suitable agents of any third party entities known to platform 200 (e.g., entities 222-230), friends of one or more users of environment 100 that may or may not be known to platform 200, solicitors, strangers, would-be-thieves, and the like. At step 2002, first visitor identification information may be detected when a visitor is initially sensed by platform 200 at environment 100 (e.g., by doorbell 106). Such initial first visitor identification information may be any suitable detectable data that may then be analyzed by platform 200 (e.g., at step 2004) in order to determine that a visitor may be present at environment 100. For example, simple motion data (e.g., as may be sensed by a motion sensing component 828 of doorbell 106) may be adequate for analysis by platform 200 (e.g., by doorbell 106 alone, in combination with other processing components of environment 100, and/or in combination with other processing components of platform 200, such as system 164) to determine that a visitor is present at doorbell 106. Alternatively, more advanced sensing may be performed at step 2002 for initially detecting the presence of a visitor at step 2002 (e.g., motion sensing, audio sensing, camera sensing, PIR sensing, ambient light sensing, ultrasonic sensing, and/or any other suitable sensing capabilities of doorbell 106 or of environment 100 generally (e.g., sensing capabilities of one or more other smart devices)). As just one example, audio sensing of a fingerprint or signature matching a delivery truck or any other suitable vehicle that may be generally associated with a visitor may be initially detected and analyzed, which may result in additional visitor sensing functionality being enhanced for further detection and analysis (e.g., video sensing and/or motion sensing).

At step 2004, process 2000 may include analyzing the detected visitor information of step 2002 (e.g., in conjunction with any other suitable data available to platform 200, such as settings of a current mode of environment 100 or of a user), for determining the presence of a visitor at environment 100 and how to initially respond to such a determination. For example, in response to detecting such visitor information at step 2002, doorbell 106, alone or in combination with other processing components of other smart devices and/or rules-based inference engines and/or artificial intelligence provided locally at environment 100 and/or at or in conjunction with system 164 and/or at or in conjunction with any other component(s) of services platform 200, may be operative, at step 2004, to access any suitable additional information that may be useful for interpreting the detected visitor information (e.g., motion sensing thresholds, visitor "signatures" or "fingerprints", and/or any other suitable data that may help to make a determination about the presence of a visitor in light of the detected visitor information) and/or additional information that may be useful for determining how to proceed if the presence of a visitor is determined (e.g., current mode settings of environment 100, etc.), and then to analyze all such available information for determining whether or not a visitor is present and, if so, whether to take one or more of a variety of automated actions based on that detected visitor presence.

At step 2005, process 2000 may include adjusting the functionality of at least one smart device of environment 100 based on the analysis of step 2004 or even based solely on the detection of step 2002. As just one example, when any potential visitor information is detected at step 2002, smart environment 100 may be operative to turn on a light (e.g., outdoor lighting 114 or projector 830 of doorbell 106) at step 2005 to increase the safety of the potential visitor and/or to increase the security of environment 100. As another example, when any potential visitor information is detected at step 2002, smart environment 100 may be operative to increase the sensing functionality of one or more smart devices of environment 100 at step 2005 (e.g., by increasing the sampling rate of a sensing component, by increasing or varying the sensing area covered by a sensing component, by turning on one or more additional sensing components (e.g., of doorbell 106) that may have previously been turned off for power conservancy, etc.) to increase the security of environment 100 (e.g., by enhancing the ability of environment 100 to monitor any potential visitor activity). As another example, when any potential visitor information is detected at step 2002, smart environment 100 may be operative to generate certain activity at step 2005 that may mimic occupancy at environment 100 detectable by the visitor to increase the security of environment 100, such as by turning on a lamp 118 within structure 150 and/or by outputting audio data from an audio output component of any smart device within structure 150 that may resemble a dog barking or any other suitable noises or activity that may lead a visitor to believe that an active occupant is at environment 100. In some embodiments, such audio data may be output by an audio output component of a device located within structure 150 but adjacent to door 186, such that the outputted audio (e.g., a played-back recording of a dog barking) may realistically sound like occupancy within structure 150. In other embodiments, such as when an actual dog is known to be within structure 150, audio data that is only audible to a dog may be output by an audio output component of environment 100, which may prompt the actual dog to bark for increasing the security of environment 100. As yet another example, when any potential visitor information is detected at step 2002, smart environment 100 may be operative to output a general message at step 2005 that may instruct the visitor how to initially interface with environment (e.g., by outputting audio data from audio speaker 836 or visual data from projector 830 of doorbell 106 or any other suitable data from any other suitable smart device of environment 100 that may be received by the detected visitor), where such a message may include any suitable instruction such as "Please identify yourself and your intention" or "Please align any identification information with a sensing component of the doorbell" or the like, to increase the security of environment 100 and further the visitor handling of process 2000. As another example, when any potential visitor information is detected at step 2002, smart environment 100 may be operative to lock any unlocked entry ways to structure 150 (e.g., by locking smart doorknob 122) at step 2005 to increase the security of environment 100, whereby, in such embodiments, the previous locked/unlocked condition of such entry ways may be restored once the visitor is no longer detected or has been otherwise securely dealt with.

Such adjusting of the functionality of one or more smart devices of environment 100 at step 2005 may be based on the analysis of step 2004. For example, such adjusting may be done automatically in response to a determination that the presence of a visitor has been detected. Additionally or alternatively, such adjusting may be done automatically not only in response to a determination that the presence of a visitor has been detected but also in response to analysis of any applicable mode settings, rules, inferences, or other suitable information available to platform 200 that may be processed for determining the way or ways in which certain smart device functionality ought to be adjusted in response to the determined visitor presence (e.g., time of day, current functionality of certain smart devices, current mode of environment 100, current occupancy of environment 100, and/or any other suitable information). Such adjusting may also be performed whether or not the detected visitor presence has been determined with respect to a particular visitor (e.g., next door neighbor John Doe), with respect to a particular visitor type (e.g., a delivery drone or a gas utility service man or security agent or firefighter, etc.), or with respect to a visitor generally (e.g., a human or drone or any other suitable entity that may be handled by platform 200 as a potential visitor to environment, even including an animal such as a cat that may be detectable as an unknown stray or detectable as the neighbor's missing pet (e.g., via an NFC chip coupled to the cat and NFC sensing component 828), whereby process 2000 may enable proper detection of the cat and communication of its presence to appropriate users/authorities). Such initial detection of the presence of a visitor may be determined based on analysis of initial detected visitor information that may be compiled without active communication by the visitor of its intent to environment 100. Instead, in some embodiments, the presence may be initially determined when the analysis of the visitor information determines that the shape and/or motion and/or any other suitable characteristic of a potential visitor (e.g., generically or specifically) has been detected. Such initial adjusting of the functionality of one or more smart devices at step 2005 in response to initial detection of the presence of a visitor may automatically increase the security of environment 100 and/or increase the safety or convenience of the detected visitor that may be potentially attempting to interact with environment 100 for any suitable purpose (e.g., for communicating with an occupant, for delivering a package, for fetching an item, etc.).

Figure 30:
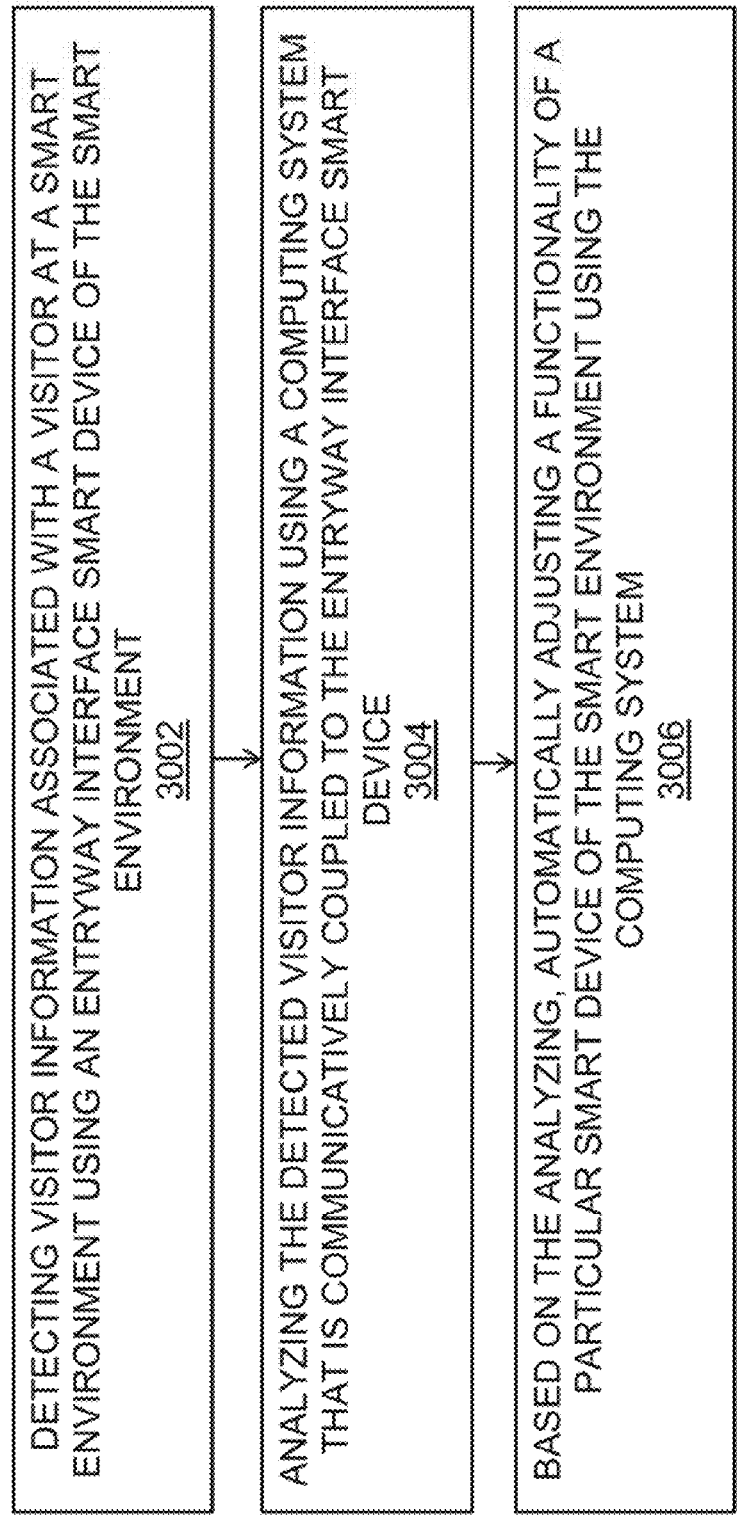
FIG. 30 provides an example process for handling a visitor at a smart environment, according to at least one embodiment.

FIG. 30 is a flowchart of an illustrative process 3000 for handling a visitor at a smart environment that includes a number of smart devices. At step 3002, process 3000 may include detecting visitor information associated with the visitor at the smart environment using an entryway interface smart device of the smart devices. At step 3004, process 3000 may include analyzing the detected visitor information using a computing system that is communicatively coupled to the entryway interface smart device. At step 3006, process 3000 may include, based on the analyzing, automatically adjusting a functionality of a particular smart device of the smart devices using the computing system.

It is understood that the steps shown in process 3000 of FIG. 30 are merely illustrative and that existing steps may be modified or omitted, additional steps may be added, and the order of certain steps may be altered.

As described above, at step 2006, process 2000 may include communicating with a user associated with the smart environment based on the analysis of step 2004. As just one example, when the analysis of step 2004 determines that the presence of a visitor has been initially detected at environment 100 and that a mode of environment 100 or of a system user is such that communication may be attempted, smart environment 100 may be operative to communicate the determined visitor presence to an appropriate system user or portion of environment 100 in any suitable way at step 2006 (e.g., by audibly announcing any suitable information related to the visitor presence via an audio speaker of a smart device that may be located most proximal to the current location of a user within environment 100). As another example, when the analysis of step 2004 determines that no appropriate user is available within environment 100, smart environment 100 may be operative to communicate the visitor presence to a system user or appropriate third party via platform 200 in any suitable way at step 2006 (e.g., by transmitting an electronic message to a personal device 166 associated with a remote user UR or by transmitting an electronic message to a trusted third party security entity 222-230 associated with environment 100). For example, in some embodiments, a video (e.g., a recorded loop or a live stream of the detected visitor) or still image or any other suitable detected visitor information (e.g., as detected at step 2002) may be communicated at step 2006 to such a user or third party automatically or in response to a request relayed from such a user or third party after being notified of the detected visitor, whereby such communicated visitor information data may be utilized by such a user or third party in any suitable way (e.g., to actively monitor the visitor's activity and/or to attempt to specifically identify the identity of the visitor or at least the type of the identified visitor).

At step 2008, process 2000 may include providing the visitor with feedback based on at least one of the analysis of step 2004 and/or any communication of step 2006. As just one example, when the analysis of step 2004 determines that there are currently no occupants local to environment 100 or otherwise in an active and available state for appropriately being told of the detected visitor, and/or when no user response is received for any communication attempt of step 2006 with respect to a detected visitor, platform 200 may be operative to determine that smart environment 100 may proceed with handling the detected visitor without active user input and doorbell 106 may provide the visitor at step 2008 with instructions or other suitable feedback on how to proceed. Alternatively, when the analysis of step 2004 determines that there is a user local to environment 100 that is in an active and available state for appropriately being told of the detected visitor, and/or when a user or third party response is received for any communication attempt of step 2006 with respect to a detected visitor, platform 200 may be operative to determine that a user or third party privy to smart environment 100 may at least partially handle the visitor and doorbell 106 may provide the visitor at step 2008 with instructions or other suitable feedback on how to proceed. The type of feedback that may be provided via doorbell 106 and/or via any other suitable smart device of environment 100 to the visitor at step 2008 may vary based on the analysis of step 2004 and/or any communication of step 2006. For example, the feedback may include active communication from the user or third party to the visitor via doorbell 106 (e.g., audible and/or visual information and/or any other suitable information may be conveyed to the visitor by doorbell 106, where such information may be generated and transmitted by or otherwise under the control of the user via another smart device that the user may directly interface with and that may be communicatively coupled to doorbell 106). This may enable a virtual conversation between the user and the visitor via platform 200 (e.g., by repeating one or more of steps 2002-2012, as described above with respect to a deliverer visitor). Alternatively, the feedback may include automated messages or instructions generated by system 164 for communication to the visitor via doorbell 106 (e.g., a message that may communicate that "a user is not currently able to actively interact with you right now, please proceed as follows . . . ", etc.). Additionally or alternatively, the feedback may include providing certain environment access to the visitor, such as by opening door 186 by unlocking doorknob 122 for a certain amount of time (e.g., if the visitor is approved by system 164 as an expected and/or authorized visitor, door 186 may be unlocked such that the visitor may be enabled to enter structure 150).

In some embodiments, feedback provided by platform 200 at step 2008 to an initially detected visitor may convey a request for the detected visitor to provide more and/or specific information about the visitor's identity and/or the visitor's intent using any suitable output component of doorbell 106 or any other smart device of environment 100 that may be detected by the visitor. For example, such feedback may include any suitable audible and/or visual request for the visitor to physically communicate with environment 100, such as a request to "please state your full name and your intent". As another example, such feedback may include any suitable request for the visitor to avail at least a specific portion of the visitor to environment 100 for being properly sensed by environment 100 (e.g., within a detection range of a sensing component 828 of doorbell 106), such as a request to "please align your face with the doorbell's camera" or "please present a form of identification to the doorbell's scanner" or any other suitable instructions for facilitating the detection of any specific visitor identification information and/or visitor intent information. Label ID may be any suitable form of visitor identification, such as a label of package PL or a driver's license of the visitor or an identification tag of a delivery drone or an RFID tag of a pet or personal property, etc., that may be properly sensed by environment 100.

At step 2010, process 2000 may include detecting an act of the visitor based on the provided feedback of step 2008 (e.g., an act performed by the visitor in response to the provided feedback). Doorbell 106 and/or any other smart device of environment 100 may be configured to detect an action of the visitor at step 2010 in response to platform 200 providing the visitor with feedback at step 2008, where that action may be any suitable action indicative of the visitor interacting with environment 100 (e.g., doorbell 106) in a particular way. As just one example, in response to instructing the visitor to provide specific information about its identity and/or its intent or otherwise to avail at least a specific portion of the visitor (e.g., its face or a label ID) to sensing by environment 100 for detection of such specific identification information (e.g., within a detection range of a sensing component 828 of doorbell 106) at step 2008, doorbell 106 may detect such additional visitor identification/intent information at step 2010. Any suitable action of the visitor may be detected or otherwise received by any suitable component of environment 100 and/or otherwise of platform 200 at step 2010, where such detection may enable platform 200 to update system-information about the detected visitor, such as with respect to the specific identity of the visitor (e.g., neighbor Billy Bob), the specific type of visitor (e.g., Federal Express deliverer, child, firefighter), the specific intent of the visitor (e.g., visitor wants to say hi to occupant X, visitor wants to deliver package PL, visitor wants to pick up an item it accidently left at environment 100, etc.), and/or the like. For example, a visitor may communicate with platform 200 at step 2010 via any suitable communication enabled by a smart device of environment 100 accessible by the visitor and/or via any suitable communication enabled by platform 200 and a visitor device 266. In some embodiments, suitable visitor identification data may be communicated with platform 200 by the visitor at step 2010 via visitor gestures towards doorbell 106, as may be described above with respect to smart device 104, via visitor touch input via a touch user interface 812, via visitor audible spoken information via microphone 844, and/or the like. A visitor may scan a driver's license or other suitable identification such as the visitor's face or fingerprint (e.g., at a scanner sensing component 828 of doorbell 106). Additionally or alternatively, platform 200 may be configured to automatically detect such additional visitor identification/intent information at step 2010 without prompting the visitor to do so at step 2008. For example, label ID may be automatically detected by a sensing component 828 of doorbell 106 when a visitor is present within a specific distance of doorbell 106 and not in response to a specific act of the visitor done in response to a specific feedback request of platform 200.

Specific visitor identification/intent information detected (e.g., at step 2010 or initially at step 2002) may then be analyzed by platform 200 for more specifically identifying the visitor or its intent (e.g., by repeating step 2004). For example, platform 200 may be operative to analyze such detected visitor information by running any suitable facial detection or fingerprint or other biometric sensing algorithms or any other suitable entity identification algorithms or comparisons using any available databases or processing paradigms or extrinsic information, such as social network contact information of various entities known by the various occupants of environment 100 or known agent information of various business/emergency response entities or known sex offenders or criminals or missing person/pet identification databases of law enforcement agencies in order to detect or confirm the identity of the visitor. One or more iterations of detecting visitor information, analyzing detected visitor information, providing the visitor with feedback, and/or detecting an act of the visitor of process 2000 may be conducted by platform 200 (e.g., via doorbell 106, any other smart devices of environment 100, and/or any other processing capabilities of platform 200), with or without any active communication from a system user or third party, in order to determine the identity and/or intent of a detected visitor with any suitable amount of clarity, confidence, accuracy, and/or specificity for effectively handling the visitor.

At step 2012, process 2000 may include communicating with at least one of the user and the visitor based on the detected identity and/or intent of the visitor. Doorbell 106 and/or any other smart device of environment 100 may be configured to confirm detection of an identity and/or intent of the visitor with the visitor (e.g., by communicating any suitable confirmation information directly to the visitor via doorbell 106). Alternatively or additionally, doorbell 106 and/or any other component of environment 100 and/or system 164 may be configured to confirm detection of an identity and/or intent of the visitor with a user of environment 100 (e.g., by communicating any suitable confirmation information to the user via any suitable smart device of environment 100 or personal device 166 of the user, similarly to any communication of step 2006). This may enable the visitor and/or the user to remain updated with respect to the current status of the handling of the visitor by platform 200.

One or more of steps 2002-2012 of process 2000 may be repeated for any suitable visitor handling. For example, in response to analysis at step 2004 of any visitor information detected at step 2002, feedback requesting additional visitor identification information may be provided to the visitor at step 2008, in response to which an action of the visitor attempting to provide additional visitor information may be detected by the smart environment at step 2010 and any additional visitor information of that detected action may be analyzed at step 2004, in response to which one or more of steps 2005-2012 may again follow. Therefore, process 2000 may support a virtual interaction between a visitor and platform 200 (e.g., environment 100 or service 164 as an automated agent of a system user).

It is understood that the steps shown in process 2000 of FIG. 20 are merely illustrative and that existing steps may be modified or omitted, additional steps may be added, and the order of certain steps may be altered.

Platform 200 may be operative to enable certain functionality of doorbell 106 to being utilized by a visitor whether or not certain visitor identification information and/or certain visitor intent information has been confirmed. For example, platform 200 may be operative to enable the visitor to leave any suitable message for a system user of environment 100 for eventual receipt by that user (e.g., an audio message, a video message, a text message, etc. that may be obtained by one or more sensing components 828 of doorbell 106). The visitor may simply wish to leave a "voicemail" message for environment 100 and doorbell 106 may be operative to enable the visitor to record such a message (e.g., via microphone 844), whereby such a message may then be eventually communicated to a system user of environment 100 (e.g., according to any applicable rules or inferences or mode settings). For example, at step 2008, doorbell 106 may be operative to provide feedback to the visitor indicative of the ability of doorbell 106 to receive such a message (e.g., via audio speaker 836 or projector 830 communicating such a possibility to the visitor, such as by conveying a message like "leave a voicemail for a user of environment 100 by pressing button 812 now"), and in response the visitor may communicate such a message to doorbell 106 at step 2010. This may encourage certain types of visitors to interact with environment 100 in a manner that may not unnecessarily bother a user of environment 100, whether or not a do-not-disturb mode Is enabled for environment 100 or that user. For example, a neighbor visitor may be swinging by environment 100 to return a mitten that was accidently left by a system user at the neighbor's home, and such a visitor may simply provide a message for capture by platform 200 at step 2010 (e.g., "Hi, this is neighbor Billy Bob, I am leaving your mitten at your doorstep"), and platform 200 may then share that message with a system user at a time convenient to the user at step 2012.

Platform 200 may be operative to prevent certain functionality of doorbell 106 from being utilized by a visitor until certain visitor identification information and/or certain visitor intent information has been confirmed. For example, user interface button 812 of doorbell 106 may be disabled or presented to the visitor as non-functional (e.g., by displaying a "disabled" message on the button) until any suitable condition has been confirmed by platform 200. By seemingly presenting the visitor with no ability to "ring" the bell to beckon an occupant, doorbell 106 may encourage a visitor to interact with platform 200 in a cooperative manner (e.g., to provide appropriate visitor information at step 2008). This may dissuade a visitor from incessantly pressing button 812 or otherwise interacting with doorbell 106 in an unproductive manner. In such embodiments, the actual functionality of doorbell button 812 may be enabled or disabled based on any suitable settings of platform 200 (e.g., if a visitor presses doorbell button 812 despite being presented to the visitor as non-functional, such a visitor interaction may be detected by platform 200 and handled in any suitable way, such as by outputting an audible tone at one or more smart devices of environment 100 for alerting an occupant of the visitor and/or by storing data indicative of that visitor interaction for later use (e.g., for security profiling and/or user review as described below)).

When platform 200 may attempt to analyze certain system data (e.g., at step 2004) and/or to communicate with a system user during process 2000 (e.g., at step 2006), such as for enabling a user to decide actively how platform 200 may proceed with handling a detected visitor, platform 200 may also be operative to simultaneously communicate certain information to the detected visitor while such analysis and/or user communication is attempted. For example, certain feedback may be provided by environment 100 (e.g., by doorbell 106) to a detected visitor at step 2008 while platform 200 may also be at least attempting to analyze data at step 2004 and/or to communicate with a user at step 2006. Such feedback may be provided for maintaining the visitor's attention and/or for providing security to environment 100. As one example, such feedback may be a communication instructing the visitor to wait for further instructions (e.g., by playing "hold music" or "hold video" (e.g., an advertisement) or telling the visitor "please wait a moment"), which may maintain the visitor's attention and/or ensure the visitor that their arrival is being handled. Any other suitable message, which may be customizable by a system user and utilized by platform 200 based on current mode settings or otherwise, may be provided to a detected visitor (e.g., "if you are a solicitor, please leave this property immediately otherwise you are hereby agreeing to pay the system user $50"). As another example, such feedback may be a communication that may convey to the visitor that some active occupancy exists at environment 100 (e.g., by outputting audio of a dog barking from within structure 150, as also described above with respect to step 2005), which may increase the security of environment 100 rather than having the visitor wait for instructions amidst silence that may lead the visitor to assume that no one is home, whether or not that assumption is correct. The type of such feedback may vary based on the identity and/or intent of the visitor as may be already determined by platform 200. For example, if the visitor has been determined to be somewhat trusted (e.g., a known acquaintance of a system user or a deliverer of a trusted delivery entity business, etc.), then pleasant hold music may be provided as such feedback. However, if the identity of the visitor has not yet been determined or has been determined to be a stranger or otherwise suspect, then dog barking or other security-enhancing feedback may be provided.

Similarly, the type of attempted communication with a user (e.g., at step 2006, which may be carried out at least partially simultaneously with such feedback to the visitor at step 2008) may vary based on the identity and/or intent of the visitor as may be already determined by platform 200

(e.g., at step 2002/2004). For example, if the visitor has been determined to be somewhat trusted (e.g., a known acquaintance of a system user or a deliverer of a trusted delivery entity business, etc.), then attempted communication with the user may be conducted by platform 200 through indicating as much (e.g., communication conveying "your acquaintance Billy Bob is here" or "a Federal Express deliverer is here"). However, if the identity of the visitor has not yet been determined or has been determined to be a stranger or otherwise suspect, then attempted communication with the user may be conducted by platform 200 through indicating as much (e.g., communication conveying "an unknown visitor is here"). As another example, if the identity of the visitor has not yet been determined or has been determined to be a stranger or otherwise suspect, then an attempted communication may be carried out using a communication technique that may prompt a pet dog to bark loudly (e.g., emitting a high-pitched "dog whistle" type communication from an output component of a smart device of environment 100), thereby not only putting any human user occupants on notice of the unknown visitor's detected presence but also increasing the security of environment 100 by making the visitor aware of the presence of the barking dog, but, if the identity of the visitor has been determined to be somewhat trusted, then an attempted communication may be carried out using a communication technique that may not prompt a pet dog to bark loudly (e.g., emitting a communication (e.g., visual information and/or an audio communication) that may not excite a dog from an output component of a smart device of environment 100), thereby putting any human user occupants on notice of the trusted visitor's detected presence while not unnecessarily riling up a pet.

Platform 200 may be configured to selectively enable a conventional doorbell interface to the visitor at step 2008 (e.g., based on any suitable analysis at step 2004). For example, when any visitor is detected at environment 100 or when a specific type of visitor is detected at environment 100 during any mode or during a particular mode of environment 100 (e.g., at steps 2002/2004), platform 200 may be operative to provide feedback to the visitor at step 2008 that may be indicative of a visitor's option to interact with doorbell button 812 of doorbell 106 for attempting to announce the visitor's presence to an occupant of environment 100. In such embodiments, doorbell 106 may be operative to communicate to the visitor via any suitable communication mechanism (e.g., via projector 830, speaker 836, or an indicator on button 812 itself) any suitable feedback indicating that button 812 has been enabled for optional visitor interaction (e.g., feedback conveying a message along the lines of "the visitor may ring doorbell button 812 to attempt to alert an occupant of your presence"). For example, this may be enabled by platform 200 if a current occupant of environment 100 is not in a do-not-disturb mode but is willing to be notified of visitors in response to a visitor's active interaction with a doorbell button. This may also provide the visitor with some sense of control in the process. As another example, such feedback may be more specific based on current active occupancy or mode of environment 100. As just one specific example, if a first user A (e.g., Husband 1718) is an active and available occupant at environment 100 but a second user B (e.g., Wife 1714) is currently unavailable at environment 100 (e.g., as may be determined through analysis at step 2004), doorbell 106 may be operative to communicate to the visitor via any suitable communication mechanism (e.g., via projector 830, speaker 836, or an indicator on button 812 itself) any suitable feedback indicating that button 812 has been enabled for optional visitor interaction for attempting to alert only first user A but not second user B of the visitor's presence. Therefore, platform 200 may be operative to provide the visitor with the option to choose whether or not to "ring" doorbell button 812 for attempting to alert occupant user A of the visitor's presence, which may increase the convenience of not only the visitor but also of occupant user A, for example, when the visitor may choose to walk away from environment 100 without ringing the bell if the visitor only wanted to see user B but not user A. This too may provide the visitor with some sense of control in the process. In response to such feedback, the visitor may choose to interact with button 812 of doorbell 106 for alerting the available occupant(s) of its presence at step 2010. If two or more occupants are available to be notified of the visitor's presence, such availability may be communicated to the visitor (e.g., at step 2008) and doorbell 106 may provide the visitor with the ability to selectively choose which of the available occupants may be notified of the visitor's presence (e.g., at step 2010). For example, a first portion of button 812 may indicate that visitor interaction therewith may notify a first available occupant of the visitor's presence (e.g., using an output component of a first smart device proximate the first occupant), while a second portion of button 812 may indicate that visitor interaction therewith may notify a second available occupant of the visitor's presence (e.g., using an output component of a second smart device proximate the second occupant), and while a third portion of button 812 may indicate that visitor interaction therewith may notify both the first available occupant and the second available occupant of the visitor's presence.

Figure 31:
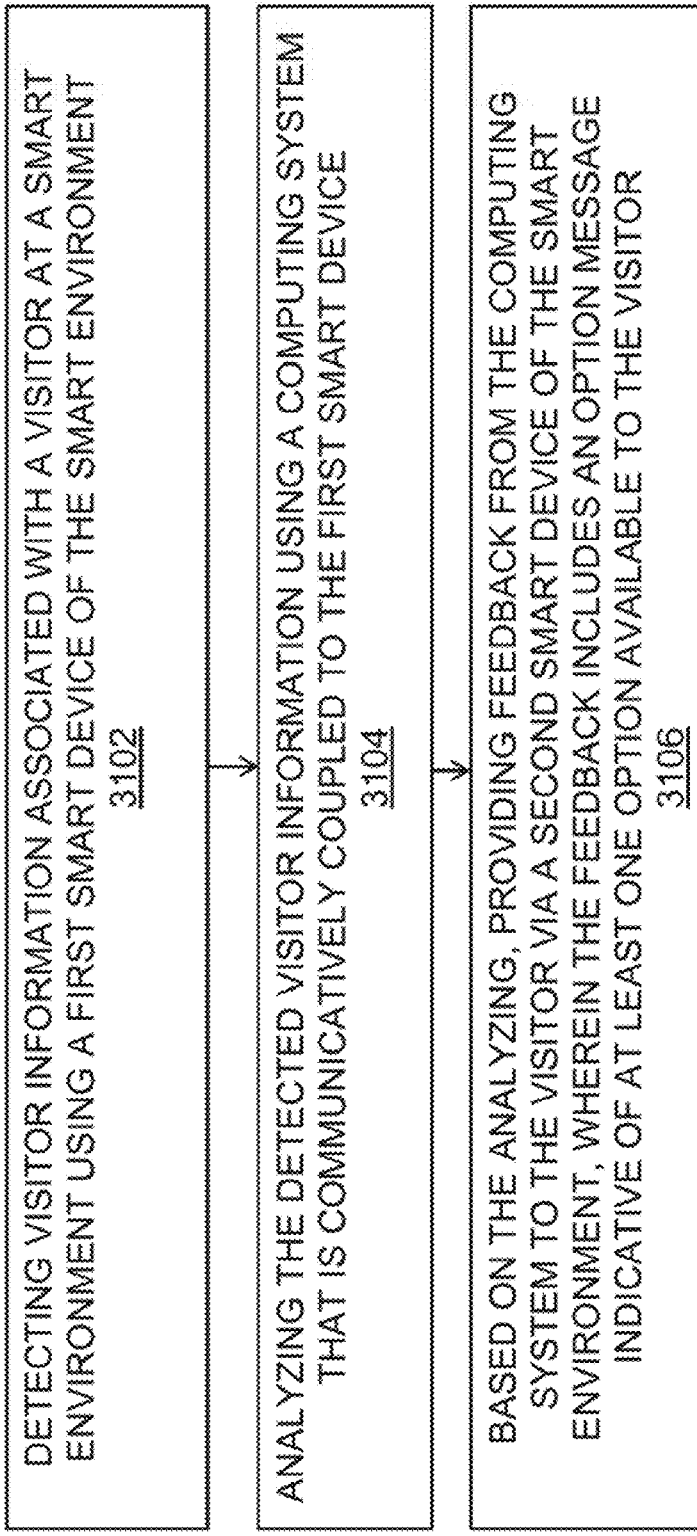
FIG. 31 provides an example process for handling a visitor at a smart environment, according to at least one embodiment.

FIG. 31 is a flowchart of an illustrative process 3100 for handling a visitor at a smart environment that includes a number of smart devices. At step 3102, process 3100 may include detecting visitor information associated with the visitor at the smart environment using a first smart device of the smart devices. At step 3104, process 3100 may include analyzing the detected visitor information using a computing system that is communicatively coupled to the first smart device. At step 3106, process 3100 may include, based on the analyzing, providing feedback from the computing system to the visitor via a second smart device of the smart devices, wherein the feedback includes an option message indicative of at least one option available to the visitor.

It is understood that the steps shown in process 3100 of FIG. 31 are merely illustrative and that existing steps may be modified or omitted, additional steps may be added, and the order of certain steps may be altered.

When any suitable level of clarity, confidence, accuracy, and/or specificity has been achieved by platform 200 with respect to the presence, identity, and/or intent of a detected visitor, such visitor identity and/or intent may be analyzed (e.g., at step 2004/2006) in conjunction with any other suitable data (e.g., occupancy data or availability data or settings of a mode of environment 100 or of a system user, inferences, rules, user input, neighboring smart environments, third party entities, time of day, etc.) and then various potential types of specific feedback may be provided to the visitor based on that analysis (e.g., at step 2008) and/or various functionalities of smart devices of environment 100 may be adjusted based on that analysis (e.g., at step 2005). Therefore, in response to determining any visitor identification information and/or visitor intention information, platform 200 may be operative to take particular action (e.g., automatically) based on various factors of the particular situation for controlling doorbell 106 and/or any other suitable smart devices of environment 100 to increase the security of environment 100, increase the efficiency of the visitor's intentions, increase the convenience of a system user with respect to the handling of the visitor, and the like.

When a general class of visitor has been determined, various actions may be taken by platform 200. For example, when a deliverer visitor of a known delivery business entity has been detected, platform 200 may be operative to communicate any suitable delivery instructions to the visitor, as described above. As another example, when a firefighter visitor has been detected, platform 200 may be operative to grant access to structure 150 in all situations or only in certain situations (e.g., if a hazard detector 104 has detected a specific type of hazard within structure 150 and no occupant activity has been detected within a certain duration of time). As another example, if a solicitor visitor has been detected (e.g., an entity with an identified intention to solicit something from a system user of environment 100), platform 200 may be operative to communicate any suitable message to the solicitor (e.g., "please leave this property immediately or you will be subject to arrest" or "please kindly leave a message with doorbell 106 and your solicitation will be considered at a later time").

When a specific visitor has been identified, various actions may be taken by platform 200. For example, when a trusted friend visitor of a system user has been detected, platform 200 may be operative to communicate any suitable status information of that system user to the visitor, where such status information may indicate that the user is currently napping, that the user is currently putting the baby down for a nap but will be available in a few minutes, that the user is currently away from but driving towards environment 100 with an expected arrival time in a few minutes, that the user is currently at the grocery store, or any other suitable status information that may be determined by platform 200. Platform 200 may enable a system user (e.g., via an application on a user device 166) to define different sharing thresholds for different visitors, such that a user may enable platform 200 to share only particular status information with particular visitors at particular times as the user desires. For example, a system user may define a mode setting that instructs platform 200 to convey a particular message if a particular visitor is detected at environment 100 at a particular time, such as "Hi neighbor Billy, I am currently napping but I left your sunglasses hidden next to the large oak tree in the backyard for your own retrieval". In some embodiments, platform 200 may be operative to adjust a functionality of a smart device in conjunction with conveying such a message to a particular detected visitor, such as by conveying the message "Hi Uncle Nick, I am sorry I am running late, I will be home in 10 minutes, please go inside and make yourself comfortable" with doorbell 106 while also temporarily unlocking door 186 with doorknob 122. Therefore, a do-not-disturb mode that may be enabled by a system user when he is napping may include conditional settings that may be operative to instruct platform 200 to interact with most detected visitors by conveying a message to the visitor that "the occupant is currently unavailable at this time, please try again later", but that may be operative to instruct platform 200 to interact with a particular detected visitor (e.g., a highly anticipated visitor) by conveying a unique message "the occupant will be with you in just a moment" to the visitor and to immediately alert the napping user of the particular detected visitor (e.g., via any suitable smart device communication that may be suitable to wake the napping user and convey the presence of the particular detected visitor). Based on any suitable analysis in response to a particular visitor being detected, any suitable message may be conveyed and/or any suitable smart device functionality may be adjusted by platform 200.

Platform 200 may be operative to remind system users of certain expected visitors in order to enable adjustment of certain mode settings. For example, platform 200 may leverage any suitable data, such as user calendar event data, deliverer entity business shipping schedule data, and the like to identify certain periods of time during which a visitor is expected at environment 100, and platform 200 may enable adjustment of certain mode settings for handling such visitors in advance of that mode being enabled for execution by platform 200. As just one example, delivery entity business 228 (e.g., Federal Express) may share a planned delivery time for a package PL at environment 100 with system 164 (e.g., via API 210) and platform 200 may utilize such information to alert a system user of that expected delivery time if it may coincide with a time frame of a particular mode to be enabled at environment 100. That is, if user UL interacts with platform 200 to enable a do-not-disturb mode for the next 3 hours because that user is about to take a nap, platform 200 may identify that the delivery of package PL is planned for within that 3 hour time period, communicate as much to the user, and may enable user-adjustment of certain mode settings of the do-not-disturb mode that may affect the handling of the delivery of that particular package PL. For example, the do-not-disturb mode may initially include mode settings operative to instruct platform 200 to tell any detected visitor to come back at a later time, but the expected delivery of package PL may require a physical user signature in order to complete the delivery, whereby platform 200 may be operative to analyze such data and ask the user whether it would like to adjust a setting of the do-not-disturb mode for the handling of that particular delivery visitor (e.g., "would you like to update the settings to alert you if this particular package is attempted to be delivered during the do-not-disturb mode?"), such that the user may update the mode settings of the do-not-disturb mode to instruct platform 200 to wake up the napping user if the delivery of package PL is actually detected by environment 100 at doorbell 106 while that do-not-disturb mode is enabled.

As another particular example, a calendar application for a particular user (e.g., as may be accessible from a user device 166) may be accessed and analyzed (e.g., independently or in combination with other detected data) by platform 200 to determine an expected arrival time of an expected visitor at environment 100 (e.g., leveraging calendar data indicative of "repair man coming to environment 100 at 3:00 pm to fix backyard swimming pool") and platform 200 may utilize such information to alert a system user of that expected visitor time if it may coincide with a time frame of a particular mode to be enabled or recently enabled at environment 100. That is, if a system user interacts with platform 200 to enable a do-not-disturb mode indefinitely (e.g., if user Husband 1718 and Child 1722 are detected by platform 200 to leave environment 100 and exit inner geo-fence 1730 at 2:30 pm, thereby leaving environment 100 unoccupied and thereby automatically enabling a particular do-not-disturb mode for environment 100), platform 200 may automatically identify that the time frame of the expected visitor may overlap with the enablement time frame of the do-not-disturb mode, may communicate this identified overlap to the user, and may enable the user to adjust one or more mode settings of that enabled mode in order to affect the handling of that expected visit. For example, the do-not-disturb mode may initially include mode settings operative to lock gated entry 116 and to convey a message to any detected visitor at gated entry 116 (e.g., via a doorbell 106 at gated entry 116) that "no one is available at this time, please come back again later", however such visitor handling may prevent an expected pool repairman from servicing a pool of environment 100 beyond gated entry 116, whereby platform 200 may be operative to analyze such data and ask the user whether it would like to adjust a setting of the do-not-disturb mode for the handling of that particular repairman visitor (e.g., "would you like to update the settings to enable access to the outdoor pool if a visit by this particular repairman is detected during the do-not-disturb mode?"), such that the user may update the mode settings of the do-not-disturb mode to instruct platform 200 to temporarily unlock gated entry 116 if the pool repairman is actually detected by environment 100. Therefore, platform 200 may be operative to analyze expected visitor information in combination with mode settings of any modes to be enabled during expected visits and may be operative to either automatically update certain mode settings or automatically suggest certain mode setting updates to a system user based on that analysis. This may add an additional layer of convenience to a system user with respect to the handling of visitors at environment 100 by platform 200.

FIG. 32 is a flowchart of an illustrative process 3200 for handling a visitor at a smart environment that includes a number of smart devices. At step 3202, process 3200 may include detecting visitor information associated with the visitor at the smart environment using a first smart device of the smart devices. At step 3204, process 3200 may include analyzing the detected visitor information using a computing system that is communicatively coupled to the first smart device. At step 3206, process 3200 may include, based on the analyzing, providing feedback from the computing system to the visitor via a second smart device of the smart devices, wherein the feedback includes at least one of a pre-recorded system message from the computing system to the visitor and a user message from a user of the smart environment to the visitor.

It is understood that the steps shown in process 3200 of FIG. 32 are merely illustrative and that existing steps may be modified or omitted, additional steps may be added, and the order of certain steps may be altered.

Figure 33:
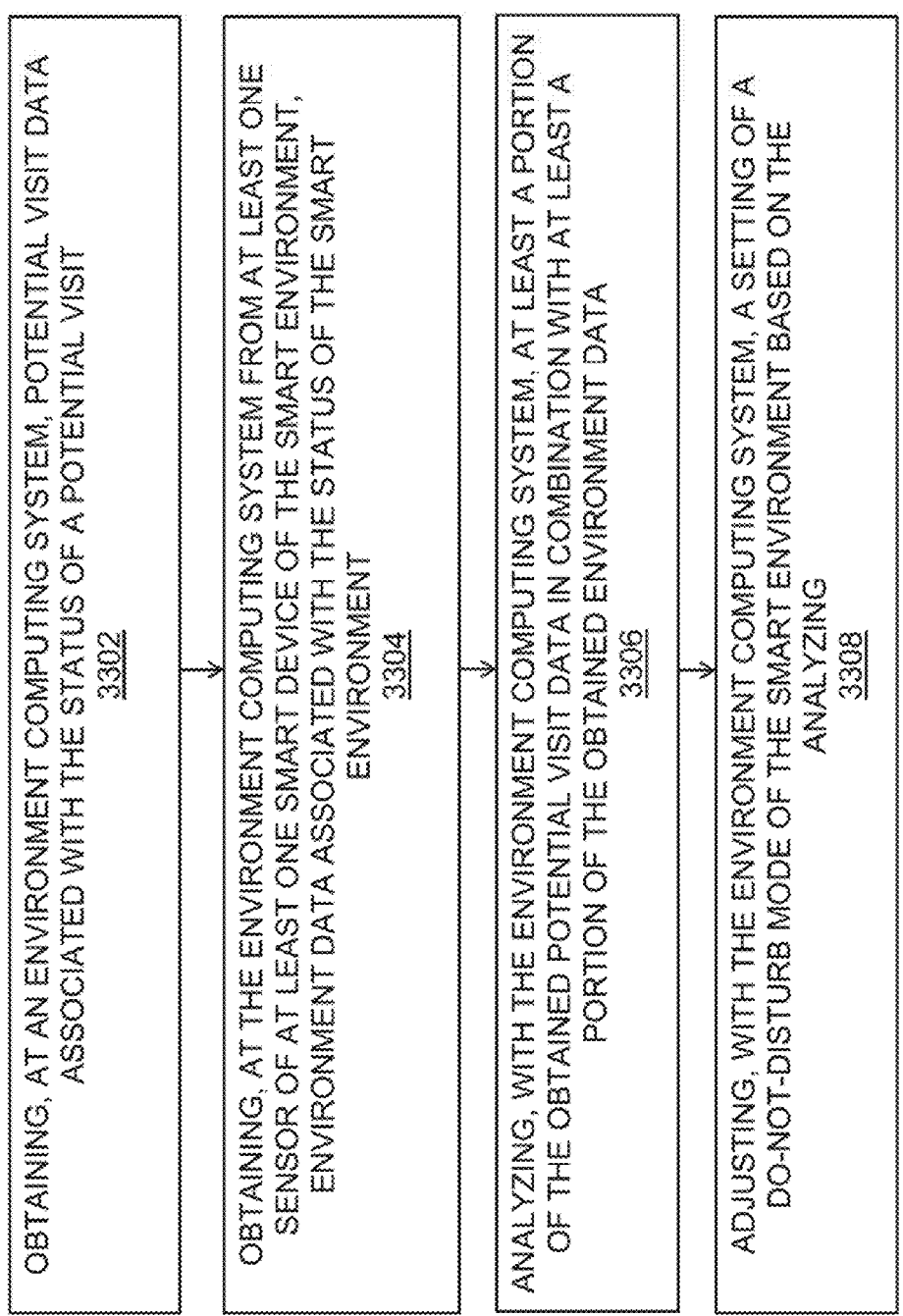
FIG. 33 provides an example process for handling a potential visit by a visitor at a smart environment, according to at least one embodiment.

FIG. 33 is a flowchart of an illustrative process 3300 for handling a potential visit by a visitor at a smart environment that includes a number of smart devices. At step 3302, process 3300 may include obtaining, at an environment computing system, potential visit data associated with the status of a potential visit. At step 3304, process 3300 may include obtaining, at the environment computing system from at least one sensor of at least one smart device of the smart devices, environment data associated with the status of the smart environment. At step 3306, process 3300 may include analyzing, with the environment computing system, at least a portion of the obtained potential visit data in combination with at least a portion of the obtained environment data. At step 3308, process 3300 may include adjusting, with the environment computing system, a setting of a do-not-disturb mode of the smart environment based on the analyzing.

It is understood that the steps shown in process 3300 of FIG. 33 are merely illustrative and that existing steps may be modified or omitted, additional steps may be added, and the order of certain steps may be altered.

Platform 200 may be operative to detect any suitable type of behavior of a visitor, in addition to or as an alternative to merely the presence, identification, and/or intent of the visitor, and platform 200 may be operative to analyze such detected visitor behavior for increasing the effectiveness of platform 200 to secure environment 100 and/or to handle a visitor. For example, certain detected behavior of a visitor may be analyzed and deemed suspicious, in response to which one or more security features of platform 200 may be leveraged for increasing the security of environment 100. Additionally or alternatively, certain detected behavior of a visitor may be analyzed and deemed informative for use in strengthening any suitable inferences that may be made by any suitable component(s) of platform 200. Any suitable behavior of a visitor at environment 100, including any visitor interaction with structure 150 or with any other suitable portion of environment 100, may be detected by any suitable portion of platform 200, including any sensing component(s) of doorbell 106, entry detector 112, doorknob 122, and/or any other suitable smart device of environment 100.

Certain visitor behavior may be detected as suspicious and leveraged to increase the security of environment 100 in one or more ways. For example, platform 200 may be operative to detect if/when a visitor attempts to open a door or other entry point to a portion of environment 100 before platform 200 has granted that visitor access to such an entry point, in response to which platform 200 may be operative to leverage the detection of such suspicious visitor behavior to adjust certain security mechanisms of environment 100. For example, one or more sensing components of doorbell 106 (e.g., a camera) or of entry detector 112 at door 186 may be operative to detect when a visitor touches doorknob 122 and/or otherwise attempts to gain access to structure 150 through a closed door 186. As another example, as shown in FIG. 14, smart doorknob 122 may include one or more sensing components 1428, which may include any suitable sensing components similar to those described above with respect to sensing components 828, and which may be operative to detect when a visitor twists, grabs, pulls, or at least touches doorknob 122 and/or otherwise attempts to gain access through door 186. For example, one or more of sensing components 1428 may be positioned within a handle portion 1401 of doorknob 122 that may be accessible to a visitor beyond an external side 186e of door 186, where an internal side 186i of door 186 may face an interior of structure 150 when door 186 is closed for preventing entry of the visitor into structure 150, and at least one sensing component 1428 may be operative to detect visitor touching, rotation, pulling, grabbing, or any other suitable visitor interaction with doorknob handle 1401 or with any other suitable portion of doorknob 122. For example, one doorknob sensing component 1428 may include an accelerometer or any other suitable motion sensing component for detecting certain visitor interaction with doorknob 122. Additionally or alternatively, a doorknob sensing component 1428 may include a biometric sensing component, such as a fingerprint detector, that may be operative to detect certain specific identification information of a visitor interacting with doorknob 122 (e.g., for use in determining visitor trust and/or unlocking doorknob 122). Any other suitable visitor behavior may be detected and deemed suspicious by platform 200 for initiating enhanced security features other than visitor interaction with doorknob 122 prior to being granted access through closed door 186. For example, platform 200 may be operative to analyze detected information (e.g., at steps 2002/2004) to deem any one of the following or any combination of the following visitor interactions to be suspicious: any suitable unauthorized interaction with doorknob 122 (e.g., physically touching, grabbing, twisting, pulling, etc.); any suitable unauthorized interaction with structure 150 (e.g., visitor physically knocking on door 186 or opening a mail slot or other feature of door 186); one or more failed attempts by the visitor to supply a correct access code or other suitable authentication for entry through closed door 186; interaction with user interface/button 812 of doorbell 106 in an unauthorized manner (e.g., a visitor pressing button 812 when button 812 is presented as disabled); any inappropriate visitor interaction with one or more components of a smart device (e.g., a visitor blocking a camera sensing component 828 of doorbell 812); any visitor behavior that prevents or inhibits visitor identification (e.g., a visitor detected to be wearing a mask); and the like.

In response to platform 200 detecting a visitor interacting with doorknob 122, with doorbell 106, with any other smart device associated with door 186, and/or with any suitable portion of closed door 186 itself in any particular manner that may be deemed suspicious or otherwise, for example, prior to platform 200 or an authorized user thereof granting the visitor access through door 186, platform 200 may be operative to adjust a functionality of environment 100 to increase the security thereof. For example, a first or additional lock (e.g., a lock of doorknob 122) may be enabled by platform 200 to more securely retain door 186 in its closed position. As another example, an alarm or any other suitable message may be conveyed by platform 200 to (i) the visitor (e.g., by doorbell 106) for instructing the visitor to stop attempting to open door 186 but rather interact only with doorbell 106 and/or (ii) to a system user (e.g., by personal device 166) for alerting the user of the detected suspicious behavior and/or (iii) to an appropriate trusted third party (e.g., law enforcement 222) for raising a threat level of environment 100. As another example, platform 200 may be operative to increase the sensing functionality of one or more smart devices of environment 100 in response to detecting suspicious visitor behavior, such as, by increasing the sampling rate of a sensing component, by increasing or varying the sensing area covered by a sensing component, by turning on one or more additional sensing components (e.g., biometric/fingerprint scanner of doorknob 122, etc.) that may have previously been turned off for power conservancy, etc. to increase the security of environment 100 (e.g., by enhancing the ability of environment 100 to monitor any additional potential visitor activity or identify the visitor in any suitable way).

Certain visitor behavior may be detected as informative and leveraged for use in strengthening any suitable inferences that may be made by any suitable component(s) of platform 200. For example, platform 200 may be operative to detect when a visitor is granted access through door 186 or is not granted access through door 186 and may update any platform-information based on that treatment of the visitor and any other interaction that visitor had with environment 100. For example, if a detected visitor (e.g., as detected at one or more iterations of step 2002) is granted authorized access through door 186 (e.g., through any suitable workings of platform 200, such as a system user interacting with platform 200 for authorizing the opening of door 186 for that visitor or that visitor successfully providing an authorized access code for electronically opening door 186), any suitable visitor information gathered about that visitor (e.g., pictures, fingerprints, voice samples, identification card information, visitor interaction with doorbell 106 or doorknob 112 or any other portion of environment 100 prior to the visitor's authorized access, etc.) may then be leveraged in any suitable way by platform 200 for associating that visitor information with a "trusted" entity of environment 100. On the other hand, if a detected visitor is not granted authorized access through door 186 (e.g., through any suitable workings of platform 200, such as a system user interacting with platform 200 for forbidding the opening of door 186 for that visitor or that visitor unsuccessfully providing an authorized access code for electronically opening door 186), any suitable visitor information gathered about that visitor (e.g., pictures, fingerprints, voice samples, identification card information, visitor interaction with doorbell 106 or doorknob 112 or any other portion of environment 100 prior to the visitor's access being declined, etc.) may then be leveraged in any suitable way by platform 200 for associating that visitor information with an "untrusted" entity of environment 100. An association of detected visitor information with determined visitor accessibility treatment for a given visitor interaction with environment 100 may be leveraged by platform 200 as data for informing the processing/analysis of any suitable operation or setting or inference or rule of platform 200, including any future attempt to detect the identity of a visitor and/or the level of trust to be afforded to such a visitor. Therefore, if a particular visitor gains authorized access through door 186, then any or all visitor information detected by doorbell 106 or otherwise by environment 100 about the identification of that visitor and/or its interaction with environment 100 may be leveraged in the future for any suitable purpose by platform 200, such as for increasing the efficiency with which platform 200 may handle a later visit by that particular visitor at environment 100 or any other environment of platform 200 (e.g., by using that data for more quickly identifying the visitor or for more reliably classifying the visitor as a trusted or untrusted visitor for use in determining how platform 200 may handle that later visit). For example, if analysis (e.g., at step 2004) of detected visitor information is not able to reveal the specific identity of a detected visitor currently at environment 100 but such analysis is able to reveal that the detected visitor was previously granted access to environment 100 five days earlier (e.g., by leveraging previously collected visitor information during such analysis), platform 200 may be operative to classify the detected visitor as a "trusted" entity and may utilize that classification for enhancing the current handling of that visitor (e.g., by sharing that trusted classification and any other suitable information, such as the fact that the same visitor was granted access five days ago, with a system user of environment during the current visitor handling (e.g., at step 2006)). Similarly, if analysis (e.g., at step 2004) of detected visitor information is not able to reveal the specific identity of a detected visitor currently at environment 100 but such analysis is able to reveal that the detected visitor was previously denied access to environment 100 five days earlier (e.g., by leveraging previously collected visitor information during such analysis), platform 200 may be operative to classify the detected visitor as an "untrusted" entity and may utilize that classification for enhancing the current handling of that visitor (e.g., by sharing that untrusted classification and any other suitable information, such as the fact that the same visitor was denied access five days ago, with a system user of environment during the current visitor handling (e.g., at step 2006) or by more securely locking door 186 (e.g., at step 2005)).

Figure 34:
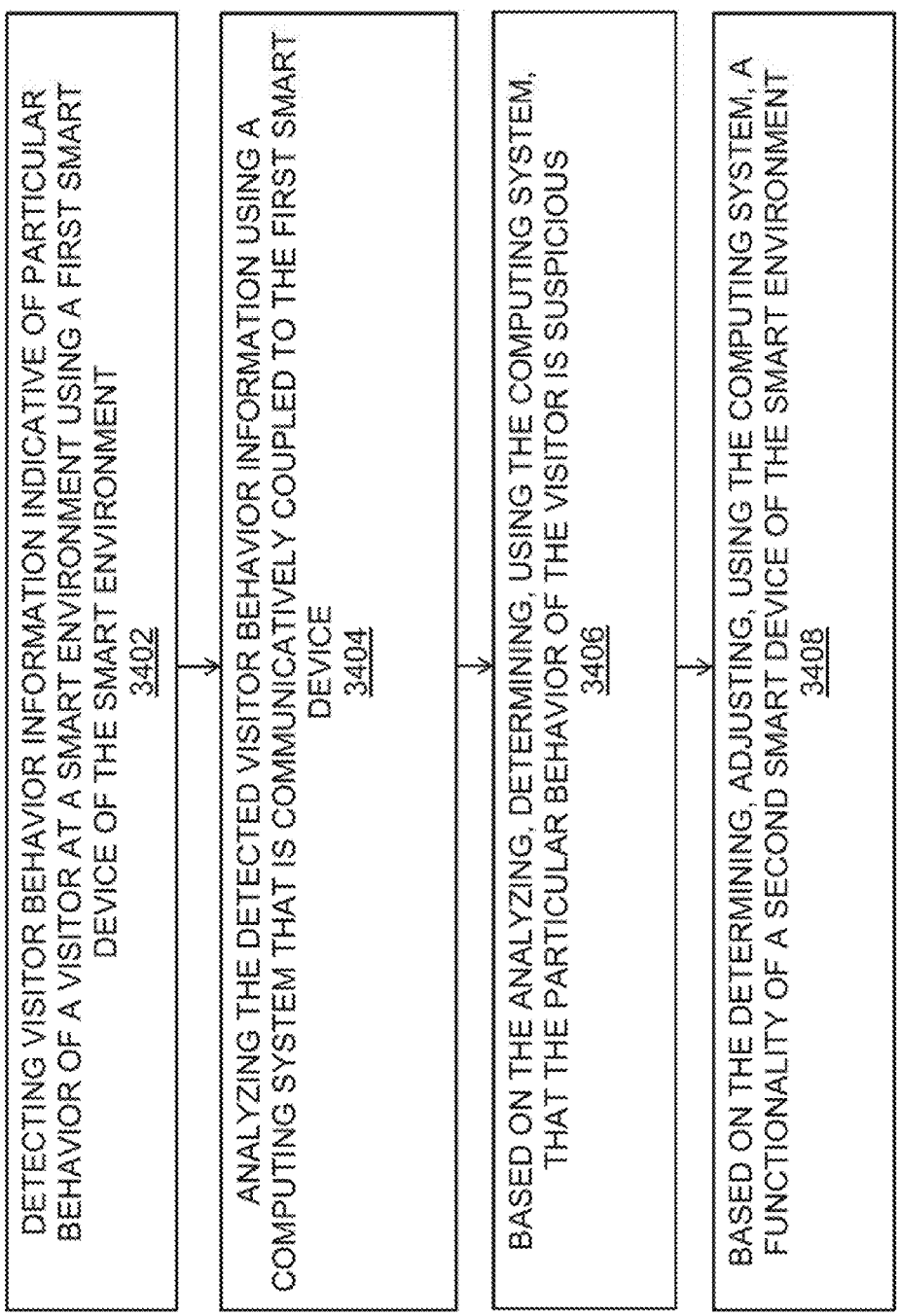
FIG. 34 provides an example process for handling a visitor at a smart environment, according to at least one embodiment.

FIG. 34 is a flowchart of an illustrative process 3400 for handling a visitor at a smart environment that includes a number of smart devices. At step 3402, process 3400 may include detecting visitor behavior information indicative of particular behavior of the visitor at the smart environment using a first smart device of the smart devices. At step 3404, process 3400 may include analyzing the detected visitor behavior information using a computing system that is communicatively coupled to the first smart device. At step 3406, process 3400 may include, based on the analyzing, determining, using the computing system, that the particular behavior of the visitor is suspicious. At step 3408, process 3400 may include based on the determining, adjusting, using the computing system, a functionality of a second smart device of the smart devices.

It is understood that the steps shown in process 3400 of FIG. 34 are merely illustrative and that existing steps may be modified or omitted, additional steps may be added, and the order of certain steps may be altered.

Figure 35:
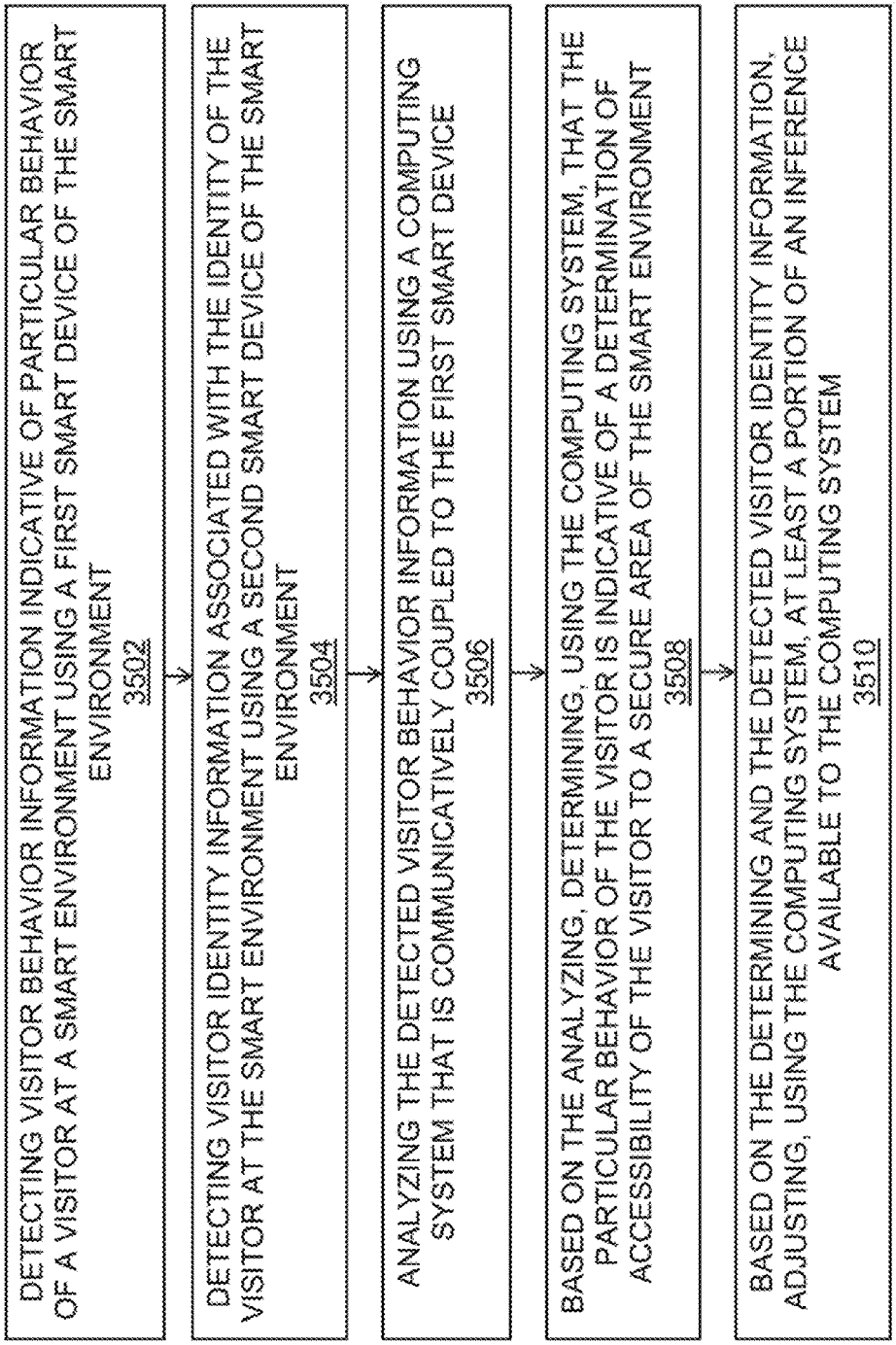
FIG. 35 provides an example process for handling a visitor at a smart environment, according to at least one embodiment.

FIG. 35 is a flowchart of an illustrative process 3500 for handling a visitor at a smart environment that includes a number of smart devices. At step 3502, process 3500 may include detecting visitor behavior information indicative of particular behavior of the visitor at the smart environment using a first smart device of the smart devices. At step 3504, process 3500 may include detecting visitor identity information associated with the identity of the visitor at the smart environment using a second smart device of the smart devices. At step 3506, process 3500 may include analyzing the detected visitor behavior information using a computing system that is communicatively coupled to the first smart device. At step 3508, process 3500 may include, based on the analyzing, determining, using the computing system, that the particular behavior of the visitor is indicative of a determination of accessibility of the visitor to a secure area of the smart environment. At step 3510, process 3500 may include, based on the determining and the detected visitor identity information, adjusting, using the computing system, at least a portion of an inference available to the computing system.

It is understood that the steps shown in process 3500 of FIG. 35 are merely illustrative and that existing steps may be modified or omitted, additional steps may be added, and the order of certain steps may be altered.

Platform 200 may be operative to leverage data collected by one or more various other smart environments and/or entities 222-230 and/or other suitable data sources of platform 200 for increasing the security of a particular environment 100 during a visitor interaction at environment 100 and/or for enhancing the efficiency/convenience of how that visitor interaction is handled at environment 100. For example, data collected by smart environments or other entities that are within a suitable threshold distance of environment 100 may be leveraged by platform 200 for adjusting the functionality of smart devices of environment 100 and/or analyzing data associated with smart environment 100. The threshold distance defining the relationship between such remote data collection sources and environment 100 may vary based on the purpose of leveraging the data from such remote data sources.

Data indicative of a particular visitor being detected by one or more smart environments other than environment 100 or by one or more third party entities 222-230 or by any other detection source of platform 200 may be leveraged by platform 200 for affecting the operation of smart environment 100 with respect to handling the potential arrival of that particular visitor at environment 100. For example, if a particular "visitor" is detected at a first location LA by a first environment 100a of platform 200 (e.g., by one or more smart devices of that environment 100a) at a first time A and platform 200 determines through any suitable processing/ analysis that the detected visitor is "of interest" for any suitable reason, then platform 200 may leverage any suitable information about that detected visitor for any suitable use at other environments or entities of platform 200, such as at one or more entities 222-230 associated with environment 100a/location LA and/or at smart environment 100b at location LB and smart environment 100c at location LC and smart environment 100 at location LU, each of which may be within a particular distance DD of detecting environment 100a. Platform 200 may be operative to determine that a particular visitor of interest has been detected at any suitable location, not only from visitor information detected at a smart environment of platform 200 (e.g., at one or more of environments 100, 100a, 100b, 100c, etc.) but also from visitor information detected by any suitable entity of platform 200 whether or not that entity is local to a smart environment (e.g., by a personal device 166 of user UR or Wife 1714 remote from environment 100, or by a device 266 of any agent of any entity 222-230, or by any other device capable of sensing visitor information at any particular location and sharing such detected visitor information with any suitable component of platform 200). As mentioned above, a "visitor" that may be detected by platform 200 may be any suitable entity that can be identified in any suitable way by one or more sensing components or data sources of platform 200. Such a detectable visitor may be a human (e.g., a deliveryman or delivery woman of firefighter or security guard or any other suitable human agent of an entity 222-230 of platform 200, a system user/occupant associated with a smart environment, a friend/neighbor/acquaintance of a system user, a solicitor, a stranger, would-be-thieves, etc.), a vehicle of such a human (e.g., a car of a system user or delivery truck of a deliverer), a drone (e.g., a delivery drone or a security drone or any other unmanned vehicle or robot that may carry out certain tasks), an animal (e.g., a pet or stray animal or wild animal that may be detected via facial recognition or any other suitable detection methods such as RFID tag detection, etc.), or any other property or entity that may be detectable in any suitable manner (e.g., a briefcase that may include an RFID tag or any other suitable detectable identity).

As a particular example, if a particular visitor detected at environment 100a is determined to be a suspected criminal (e.g., by detecting that visitor interact suspiciously with environment 100a or by comparing visitor information detected by environment 100a with a wanted persons database of law enforcement entity 222), platform 200 may be operative to increase the security of neighboring environments 100b, 100c, and 100 in any suitable way. For example, in response to detecting a suspected criminal at neighboring environment 100a, platform 200 may inform law enforcement entity 222 and/or may adjust the functionality of one or more smart devices of environment 100 by activating outdoor lighting 114 of environment 100, locking all entry points to environment 100, increasing the sensing capabilities of certain sensing components of environment 100 (e.g., components 828 of doorbell 106), prioritizing the use of that suspected criminal's identification information when attempting to identify a detected visitor at environment 100 (e.g., at steps 2002/2004), warning users/occupants of environment 100 to be extra cautions/on the look-out for that suspected criminal (e.g., by communicating identification information of that suspect (e.g., a photo, last known whereabouts, etc.) via smart devices of environment 100 to its users), enabling a particular mode for environment 100 (e.g., a criminal high alert mode), and the like.

Other types of detected visitors may be determined to be of interest by platform 200 for various other reasons than for being a suspected criminal and such detection may be leveraged by platform 200 for affecting the operation of neighboring environments accordingly in respective various ways. For example, based on the detection of a missing child or a missing pet or a missing briefcase at a first location nearby environment 100 (e.g., within distance DD of environment 100), platform 200 may inform law enforcement entity 222 and/or may adjust the functionality of one or more smart devices of environment 100 for increasing the likelihood that such a visitor of interest may be detected at environment 100 (e.g., turn on outdoor lights 114, increase sensing functionality of one or more smart devices at environment 100 at least with respect to detecting the visitor of interest, etc.). As a particular example, in in the event Child 1722 goes missing from environment 100, that event may be reported to system 164 or any other component(s) of platform 200 distinct from environment 100 (e.g., by Husband 1718 of environment 100 when he realizes the child is missing from environment 100, or automatically by one or more smart devices of environment 100 that may automatically detect when the child is no longer an occupant of environment 100, or otherwise when Child 1722 moves outside of geo-fence 1730), such that certain modes or operations or functionalities of various other smart environments of platform 200 within a particular distance of environment 100 (e.g., environments in the neighborhood) may be adjusted to increase the ability of platform 200 to safely locate the missing child. As another particular example, in the event a dog goes missing from one home environment, platform 200 can leverage data indicative of that event such that the network-connected smart devices of other home environments in the neighborhood can be tuned to detect motions that indicate the presence of a dog. In this example, if a dog is detected by an outdoor network-connected smart device (e.g., doorbell 106) of a home environment that does not typically detect dogs, then a message can be sent therefrom to the home environment of the missing dog indicating that a stray dog was detected and providing the location of the detection. Further, in some examples, any suitable specific identification information may be detected for a lost entity, such as pet, when any suitable identification component is coupled thereto. For example, an RFID tag may be provided on the dog's collar and a network-connected smart device of other home environments in the neighborhood may locate the dog by "reading" the RFID tag and sharing the location of the dog upon request (e.g., automatically by platform 200 when a located entity is known to be missing or otherwise of interest by platform 200 (e.g., by system 164 or the environment 100 that is missing the entity). RFID tags may be placed on other property, too, such as bicycles such that other property may be located in a similar manner.

As another example, based on the detection of a deliverer at a first location nearby environment 100, platform 200 may inform deliverer entity business 228 that may track such a deliverer and/or may adjust the functionality of one or more smart devices of environment 100 for handling a potential arrival of that deliverer (e.g., by turning off a sprinkler system of environment 100, alerting a system user of environment 100 that a deliverer is nearby and may be attempting the delivery of a package to environment 100 shortly, etc.). As yet another example, based on the detection of a solicitor at a first location nearby environment 100, platform 200 may inform academic institution 226 that may track such solicitors and/or may adjust the functionality of one or more smart devices of environment 100 for preventing that solicitor from bothering any occupants of environment 100 (e.g., by preventing access of the solicitor through gated entry 116, enabling a do-not-disturb mode for environment 100 for a period of time within which platform 200 may estimate the solicitor may arrive at environment 100, etc.). Therefore, detection of a particular type of visitor at a particular location within a particular distance of smart environment 100 may be leveraged by platform 200 to automatically pre-emptively prepare smart environment 100 for handling that visitor if it were to arrive at environment 100 (e.g., in accordance with any settings or preferences of that particular environment 100 (e.g., based on the system preferences of a user of environment 100 to interact or not interact with a solicitor)).

Platform 200 may be operative to monitor detected visitor identification data from all available data sources over time for tracking the path traveled by particular visitors and/or predicting a future path of such visitors. Platform 200 may leverage such a tracked path of travel for dynamically updating the operation of a certain smart environment based on the calculated likelihood that the tracked path of travel will align with the location of that smart environment. Additionally or alternatively, platform 200 may leverage data about such a tracked path of travel for sharing with or selling to interested entities, such as law enforcement agencies 222 (e.g., for tracked paths of suspected criminals or missing persons), animal control agencies (e.g., for tracked paths of certain animals that may be tagged or otherwise detectable by sensing components of platform 200), academic institution entities 226 (e.g., for tracked paths of certain solicitors, such as during election cycles for studying certain trends), delivery business entities 228 (e.g., for tracked paths of deliverers), emergency response entities 230 (e.g., for tracked paths of emergency risks and or emergency responders), and the like. This may enable platform 200 to leverage a wide net of visitor sensing components (e.g., sensing components 828 of smart doorbells 106) that may be provided at effective locations (e.g., at various smart environment entry points, such as at door 186 and/or gated entry 116, etc.) at various environments (e.g., environments 100, 100a, 100b, 100c, 100d, 100e, 100f, etc.) that may be spread out across various geographical locations across a neighborhood, city, state, country, or globe, for tracking various types of visitor entities and/or specific visitor entities not only to increase the security and efficiency of those environments 100 but also to increase the effectiveness of various third party entities (e.g., entities 222-230) and paradigms (e.g., paradigms 310) of platform 200 that may have a specific interest in such detected visitors.

Platform 200 may be operative to analyze a tracked path of a visitor for making inferences regarding the likelihood of a predicted future path for that visitor, and to adjust functionalities of a smart environment based on such tracking and predicting. For example, in response to detecting a suspected criminal at environment 100a at a first location LA at a first time, platform 200 may inform law enforcement entity 222 of the specifics of that detection and/or may adjust the functionality of one or more environments within a certain distance DD of location LA, such as environment 100b at location LB and environment 100c at location LC and environment 100 at location LU (e.g., by increasing a security level of one or more smart devices of environment 100), but not remote environments 100d, 100e, or 100f that may be beyond distance DD of detecting location LA. However, if the next time that same suspected criminal is detected by platform 200 is at environment 100c at location LC at a second time, then platform 200 may be operative to determine that the tracked path of the suspected criminal (e.g., the direction of tracked path TPA) is moving farther away from location LU of environment 100 and, in response to that determination, platform 200 may be operative to once again adjust the functionality of environment 100, but this time by reverting the functionality back to its previous settings (e.g., by reducing a security level of one or more smart devices of environment 100). Alternatively, however, if the next time that same suspected criminal is detected by platform 200 is at environment 100b at location LB at a second time, then platform 200 may be operative to determine that the tracked path of the suspected criminal (e.g., the direction of tracked path TPB) is moving closer towards location LU of environment 100 and, in response to that determination, platform 200 may be operative to once again adjust the functionality of environment 100, but this time by increasing a security level of one or more smart devices of environment 100 to an even higher level or by putting environment 100 on even higher alert as analysis by platform 200 of the tracked path of the suspected criminal from location LA to location LB may predict a predicted future path of that criminal (e.g., the direction of predicted path PTPB) that may be determined to pose an increased likelihood that the criminal may arrive at location LU of environment 100. Similarly, analysis of a tracked path of a deliverer visitor (e.g., deliverer DL) may enable platform 200 to dynamically adjust a predicted potential deliverer arrival time at environment 100 and utilize that prediction to update modes or settings of environment 100 for preparing environment 100 and/or its users accordingly. Moreover, such tracking and prediction of a deliverer by platform 200 may be shared with a delivery entity business 228 for providing trusted (impartial) tracking data of its deliverer.

Platform 200 may be operative to detect and track the path of a neighborhood security guard or any other suitable entity amongst various smart environments that the guard may be tasked with monitoring. As described above with respect to tracking a deliverer DL, platform 200 may be operative to track a security guard or any other suitable entity as it visits various smart environments. For example, doorbell 106 or any other suitable smart device of smart environment 100 that may be accessible to a security guard as it inspects the security of environment 100 may be leveraged for enabling accurate location and time tracking of such a security guard by detecting and logging data at each inspected environment 100 (e.g., by enabling the guard to "check-in" at environment 100 prior to inspecting environment 100 and "check-out" from environment 100 after inspecting environment 100). For example, when a security guard is initially detected at environment 100 (e.g., via any suitable sensing component 828 of doorbell 106 or of any other suitable smart device of environment 100), the identity of that guard is authenticated and the time of that detection is collected by platform 200. The security guard may guarantee such detection by affirmatively using a guard identification card at doorbell 106 when initially arriving at environment 100. Then, environment 100 may be operative to activate or otherwise utilize one or more additional sensing components of environment 100 for tracking any action of the guard at environment 100 (e.g., for detecting the movements of the guard about certain portions of environment 100 for confirming that the guard actually carried out certain security duties (e.g., for confirming the guard investigated each applicable area of environment 100 over a sufficient length of time)). Then, when finished inspecting the security of environment 100, the security guard may be enabled to check-out from environment 100 by once again authenticating its identification at doorbell 106 or elsewhere at environment 100 before leaving environment 100.

Therefore, rather than relying on inspection information generated and reported by a security guard itself during or after an inspection of an environment 100 or multiple environments within a neighborhood as a neighborhood watch guard (e.g., via data entered into a personal device of the guard, which may be similar to delivery device 266 of deliverer DL), system 164 may be operative to generate and report its own tracking data that may be compared to and/or relied on by a security agency entity (e.g., a security business 228) instead of any data generated by the guard, as data generated by system 164 (e.g., as may be generated by doorbell 106 and/or other smart devices of environment 100) may be trustworthy as an impartial data source (e.g., as compared to a guard who may enter incorrect data to inflate his efficiency and/or hide his inefficiencies and/or forget to enter data at all). By leveraging its visitor identity and activity sensing capabilities at one or more smart environments, platform 200 may be operative to effectively confirm the appearance and activity of any suitable entity not only at a single particular environment 100 but also to track such appearance and activity at multiple other environments for ensuring that the entity fulfills its particular obligations or for at least providing some oversight for motivating the same. While certain above examples may describe multiple smart environments in the context of distinct lots of neighboring properties (e.g., various distinct smart home environments on different plots of land within the same neighborhood or ZIP code), various other arrangements of neighboring environments may be operative to enable the various concepts of this disclosure, such as various smart environments being associated with various residential apartment units in the same condominium building structure or in various condominium building structures, or with various commercial office suites in the same commercial office building structure or in various commercial office building structures.

Figure 36:
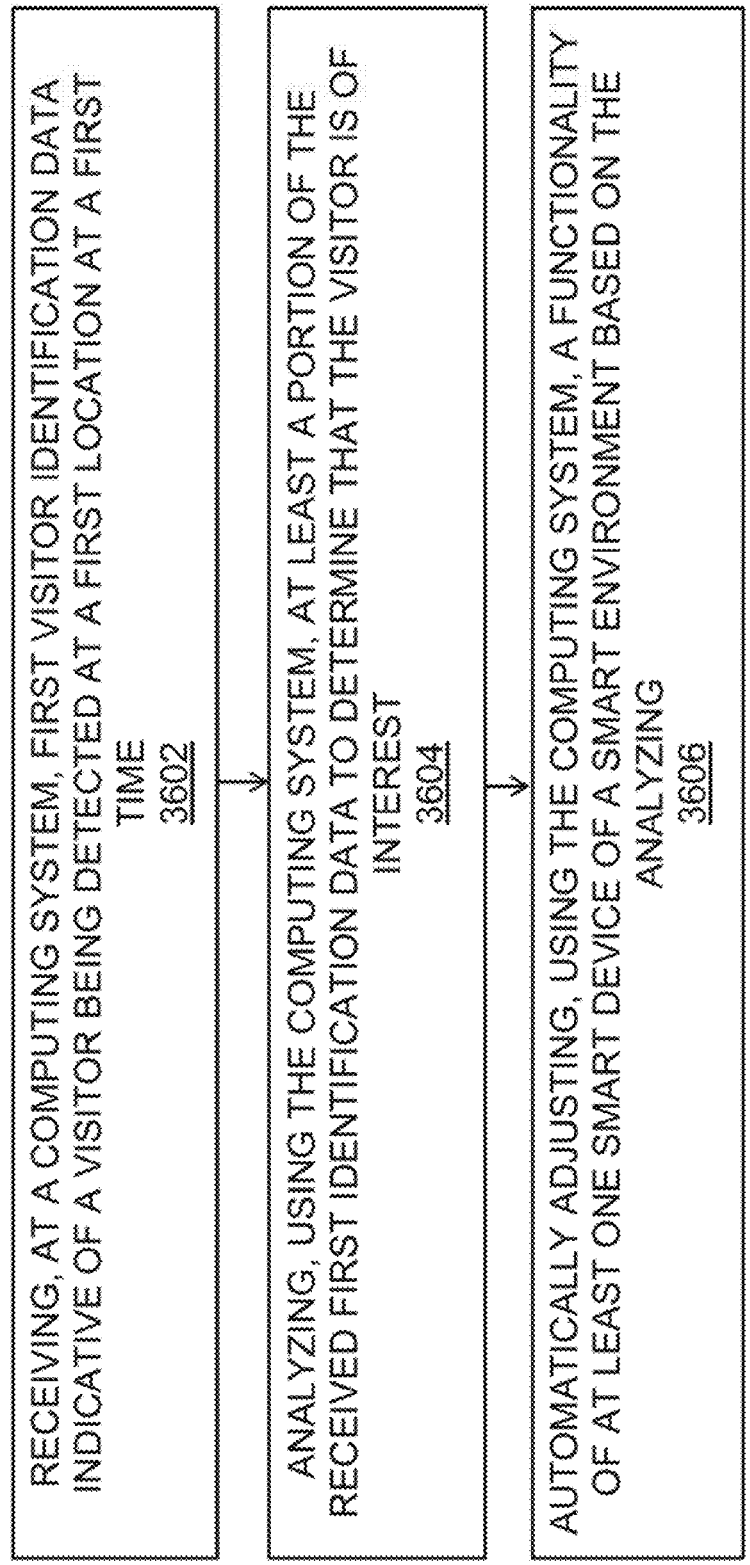
FIG. 36 provides an example process for potentially handling a visitor at a smart environment, according to at least one embodiment.

FIG. 36 is a flowchart of an illustrative process 3600 for potentially handling a visitor at a smart environment that includes at least one smart device. At step 3602, process 3600 may include receiving, at a computing system, first visitor identification data indicative of the visitor being detected at a first location at a first time. At step 3604, process 3600 may include analyzing, using the computing system, at least a portion of the received first identification data to determine that the visitor is of interest. At step 3606, process 3600 may include automatically adjusting, using the computing system, a functionality of the at least one smart device of the smart environment based on the analyzing.

It is understood that the steps shown in process 3600 of FIG. 36 are merely illustrative and that existing steps may be modified or omitted, additional steps may be added, and the order of certain steps may be altered.

Platform 200 may be operative to enable at least partial or limited access to at least certain portions of smart environment 100 by any suitable entity, whether or not that entity is known by platform 200 (e.g., known by any smart environment or service entity 222-230 or processing paradigm 310 or extrinsic information 316 or otherwise (e.g., at system 164)). Such access may be provided to any particular entity as an invitee by generating a smart invitation that may be associated with a particular type of access to a smart environment. While process 1900 of FIG. 19 has previously been described with respect to placing an order for delivery of content in a package to a recipient at a location, where unique package identification information may be generated based on one or more attributes of the order and on smart environment data associated with the order, and where such unique package identification information may be integrated into data of a label ID that may be affixed to the package and later leveraged by a deliverer and/or the smart environment for facilitating the delivery of that package by the deliverer to the environment, one or more steps of process 1900 may be utilized with respect to inviting an invitee (e.g., a person or other suitable entity) to be a trusted visitor at a smart environment, where unique invitation identification information may be generated based on one or more attributes of the invitation (e.g., invitation time, invitee, etc.) and/or smart environment data associated with the smart environment, and where such unique invitation identification information may be integrated into data of a smart invitation (e.g., label ID) that may be leveraged by the invitee and/or the smart environment for facilitating the accessibility of that smart environment by the invitee. While the following may describe the generation and use of a smart invitation in the context of an invitee's access to a social gathering at a smart environment, it is to be understood that such a smart invitation concept may be leveraged for any suitable situation, including the above-described package delivery context (e.g., a Federal Express package delivery or a local restaurant food delivery).

When a system user of environment 100 (e.g., a user with management authority to grant access to environment 100) wishes to enable access to environment 100 by a visitor entity at a future time, the user may be enabled by platform 200 to define one or more parameters or rules or settings for environment 100 that may be satisfied by a visitor entity upon arrival at environment 100 (e.g., via doorbell 106 and/or any other suitable smart device) for gaining access to environment 100 (e.g., through gated entry 116 into environment 100 generally or through door 186 into structure 150 of environment 100). In some embodiments, as described above, a system user may define a mode setting that may instruct platform 200 to adjust a functionality of a smart device of environment 100 in conjunction with conveying a particular message if a particular visitor is detected at environment 100 at a particular time, such as by conveying the message "Hi Uncle Nick, I am sorry I am running late, I will be home in 10 minutes, please go inside and make yourself comfortable" with doorbell 106 while also temporarily unlocking door 186 with doorknob 122 for enabling access by that particular detected visitor to structure 150 through door 186. This setting may be defined by the system user interacting with platform 200 in any suitable way. For example, the system user may interact with any suitable user interface of any suitable environment smart device or user personal device for conveying to platform 200 the identity of the particular visitor to be granted access along with any suitable conditions for that access besides that visitor being detected at environment 100 (e.g., accessibility to be limited to only a portion of environment 100, accessibility to be granted only if the visitor is detected during a certain time (e.g., between 2:00 pm and 5:00 pm on Monday), etc.). In some embodiments, platform 200 may only require that the system user convey the name or even a nickname (e.g., "Uncle Nick") of the particular visitor, as platform 200 may already have access to at least some identification record data for an entity with that name that may have been previously associated with environment 100 in any suitable way (e.g., as a previously detected visitor at environment 100 or as a social connection to the system user on a social network with photographs or other identification made available to platform 200 (e.g., at social paradigm 310c), etc.), such that platform 200 may be automatically enabled to adequately confirm the identity of that named particular visitor when its presence may be detected at environment 100 for carrying out the accessibility setting made by the system user.

In other embodiments, platform 200 may not be pre-equipped to detect the identity of a particular visitor at environment 100 for association with a particular accessibility setting being made by the system user for that particular visitor. Instead, some identification information for the particular visitor may need to be provided to platform 200 (e.g., by the system user) such that platform 200 may leverage that identification information for later confirming the presence of the particular visitor at environment 100 for carrying out the accessibility setting made by the system user. For example, the system user may communicate unique identifying feature data of the visitor to platform 200 for later use in identifying the presence of that visitor at environment 100. In such embodiments, such unique identifying feature data may include a photograph of the visitor's face or any other visually identifiable feature, a voice sample of the visitor, a fingerprint of the visitor (e.g., if the visitor is a human), an RFID code (e.g., a unique ID code that may be associated with the visitor), or the like, which may be sensed by environment 100 if that visitor arrives at environment 100. In such embodiments, the visitor may not be aware of the accessibility setting enabled by environment 100 prior to the visitor being granted such access, but instead environment 100 may be operative to detect the visitor identification information needed by platform 200 to authenticate the visitor's identity solely due to the visitor's presence at environment 100 (e.g., due to the visitor being within a sensing range of a sensing component 828 of doorbell 106).

In other embodiments, not only may platform 200 not be pre-equipped to detect the identity of a particular visitor at environment 100 for association with a particular accessibility setting being made by a system user for that particular visitor, but also the system user may not be able to communicate unique identifying feature data of the visitor to platform 200 for later use in identifying the presence of that visitor at environment 100 (e.g., the system user may not have access to a proper photograph of the visitor that may be made available to platform 200 for enabling detection of that visitor at environment 100). In such embodiments or otherwise, unique invitation identification information may be generated based on a system user's decision to generate a smart invitation for an invitee visitor with respect to environment 100, and such unique invitation identification information may be shared with both the invitee visitor and platform 200 for later use in identifying the presence of that invitee visitor at environment 100 to authorize carrying out an accessibility setting made by the system user for that invitee visitor to environment 100. Such unique invitation identification information may be made available to both platform 200 and the invitee visitor without specific physical identifying feature data of the invitee being known by the system user (e.g., without the system user having access to a photograph or RFID code or other unique identifying feature of the invitee), which may increase the security and/or privacy of the invitee. Instead, the unique invitation identification information generated and provided to platform 200 and the invitee visitor may be uniquely created for a particular smart invitation that might be configured to be useful one time only. While the following may describe the generation and use of such a smart invitation and unique invitation identification information in the context of an invitee visitor's access to a social gathering at a smart environment, it is to be understood that such a smart invitation concept may be leveraged for any suitable situation, including the above-described package delivery context (e.g., a Federal Express package delivery or a local restaurant food delivery). For example, such unique invitation identification information of such a smart invitation may be similar to the unique package identification information of label ID described above with respect to a package delivery process of FIG. 19, whereby such an invitee visitor may be the facilitator (e.g., a deliverer entity or fulfillment entity).

Figure 37:
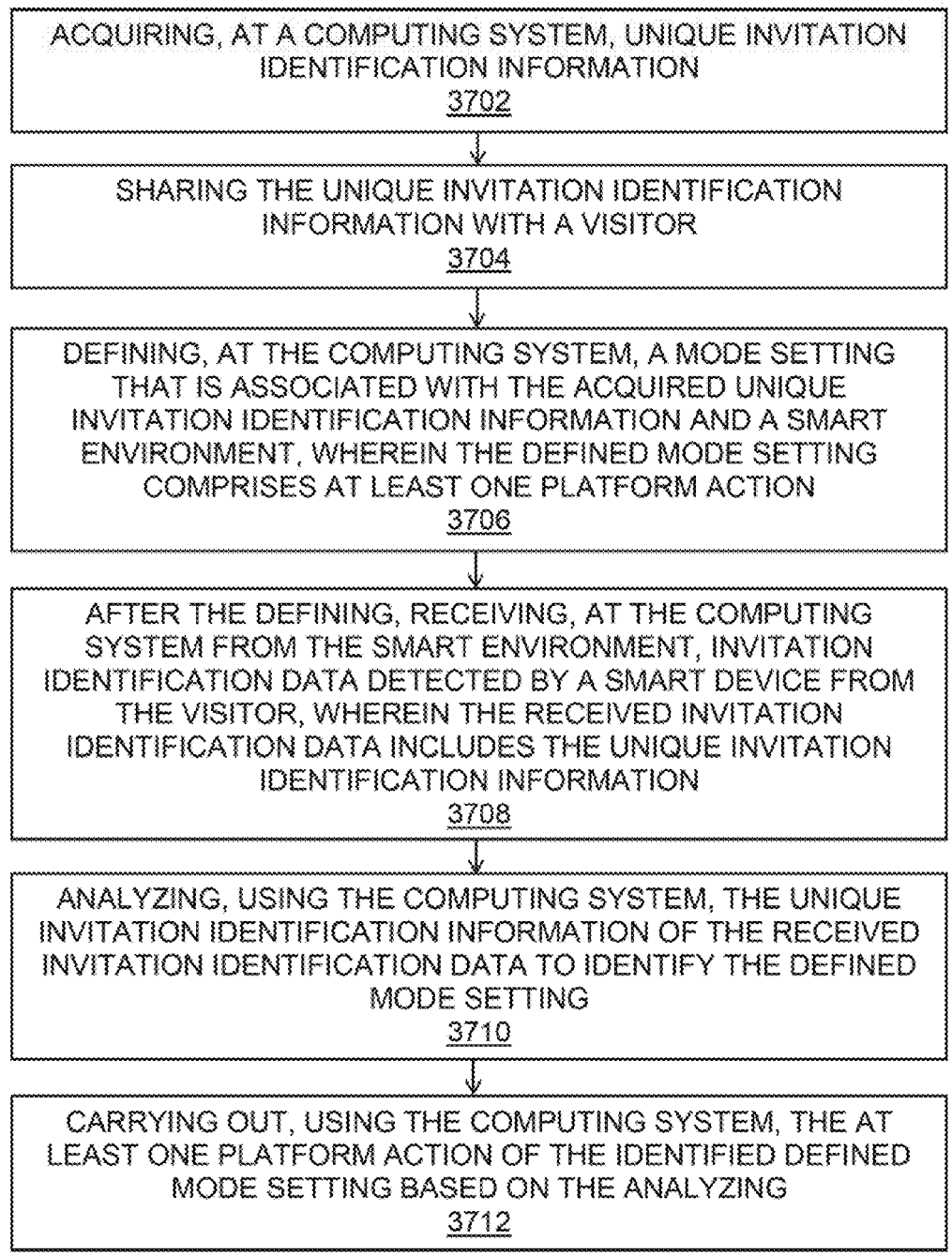
FIG. 37 provides an example process for handling a visitor at a smart environment, according to at least one embodiment.

FIG. 37 is a flowchart of an illustrative process 3700 for enhancing visitor handling using a smart invitation. At step 3702, process 3700 may include acquiring unique invitation identification information for a smart invitation. When a system user wishes to define a setting for enabling certain accessibility to environment 100 to an invitee visitor through the generation of a smart invitation with unique invitation identification information for sharing with both the invitee visitor and platform 200 for later use in identifying the presence of that invitee visitor at environment 100 to authorize carrying out such an accessibility setting, the system user may generate a request to create such unique invitation identification information. This may be enabled in any suitable context. For example, a system user may request that any suitable unique invitation identification information be generated by any suitable entity for use as at least a portion of a smart invitation. Such unique invitation identification information may be any suitable data that may be sensed by a sensing component of environment 100 (e.g., by a sensing component 828 of doorbell 106) but that may preferably not be easily guessed by an entity not privy to the unique invitation identification information. For example, such unique invitation identification information may be any suitable password (e.g., a word or string of characters) of any suitable length of any suitable combination of numbers, letters, symbols, and the like (e.g., "XASJCDCFNKWE7821DNDKN" or "CLAM CHOWDER", etc.) that may be generated in any suitable way but also easily shared with an invitee (e.g., physically via mail, digitally via e-mail, orally via telephone or in person, etc.) and sensed by a sensing component of environment 100 (e.g., received at a keypad user interface sensing component 812 of doorbell 106 when manually typed in by a visitor, received at an audio sensing component 828 or at a microphone sensing component 844 of doorbell 106 when orally spoken by a visitor or at a camera sensing component 828 of doorbell 106 when presented for scanning by the visitor, etc.). As another example, such unique invitation identification information may be any suitable code, such as a linear barcode, a two-dimensional or matrix barcode (e.g., a quick response ("QR") code), a three-dimensional barcode, or the like, that may be uniquely generated but also easily shared with an invitee (e.g., physically via mail, digitally via e-mail, etc.) and sensed by a sensing component of environment 100 (e.g., read by a scanner sensing component 828 of doorbell 106). As another example, such unique invitation identification information may be any electronically stored information, such as such information stored on an RFID or NFC device or any other suitable component from which such electronically stored information may be obtained (e.g., electromagnetically or through electromagnetic induction), where such unique invitation identification information may be uniquely generated and stored on such a component and then shared with an invitee (e.g., physically via mail, etc.) and sensed by a sensing component of environment 100 (e.g., read by an NFC sensing component or RFID sensing component 828 or other electromagnetic sensing component of doorbell 106). In some embodiments, the system user may generate the unique invitation identification information itself (e.g., by simply making one up in its head). In other embodiments, any suitable component of platform 200 (e.g., system 164) may generate the unique invitation identification information on behalf of the system user. In other embodiments, a third party entity may generate the unique invitation identification information on behalf of the system user (e.g., an order facilitator entity, such as a restaurant with which a system user is placing a food order for delivery to environment 100, where such unique invitation identification information may be a confirmation code for that specific order, etc.).

Next, at step 3704, process 3700 may include sharing the acquired unique invitation identification information with an invitee (e.g., as at least a portion of a smart invitation). For example, once particular unique invitation identification information has been generated or otherwise acquired (e.g., at step 3702), such unique invitation identification information may be shared by the system user with a particular invitee with which the system user may wish to associate a particular accessibility setting at environment 100. The system user may create a smart invitation including the unique invitation identification information and may communicate the smart invitation to the invitee using any suitable communication mechanism. If the unique invitation identification information is a password that may be manually entered by an invitee at environment 100, the system user may simply call a human invitee on the telephone and orally share the password with the invitee as part of a smart invitation (e.g., "your password is 'XSG27HT'") along with any other suitable information that may help the invitee use the password, such as the reason for the password (e.g., "Use your password to access my birthday party"), the address of environment 100 (e.g., "Present your password to the smart doorbell adjacent the front door at 123 Main Street"), the time at which the invitee should use the password (e.g., "anytime between 7:00 pm and 11:00 pm this Saturday"), and/or any special or additional instructions (e.g., "You must wear red to be granted access as we will be celebrating Valentine's Day"). Similarly, the user may physically mail or e-mail a written message conveying similar information as a smart invitation to the invitee. As another example, if the unique invitation identification information is a code that may be presented by an invitee for scanning at environment 100, the system user may physically mail a print out of the code or e-mail or otherwise communicate a digital copy of the code (e.g., that may be printed by the invitee for use or presented in its digital form by the invitee for use) along with any other suitable information descriptive of the intended use of the code to the invitee as a smart invitation. The unique invitation identification information for a particular smart invitation may be provided in a physical tag, such as an RFID tag or NFC element that may be mailed to the invitee or otherwise made accessible to the invitee for use at environment 100. In certain embodiments, if platform 200 generates the unique invitation identification information on behalf of the system user or if platform 200 is provided with the unique invitation identification information by the user or any other entity, platform 200 may be operative to generate a complete smart invitation for the system user and communicate that smart invitation to an invitee on behalf of the system user for making the entire process easier for the system user. In such embodiments, for example, the system user may simply have to communicate to platform 200 a communication address for the invitee (e.g., an e-mail address of the invitee) and any other suitable information that the user may wish to include in the smart invitation (e.g., the time of the party, dress code, location of environment 100 at which the party may be held, etc.), and platform 200 may be operative to automatically generate and transmit to the invitee a smart invitation that may include not only the unique invitation identification information but also the other information describing the invitation. A web browser or a mobile application may be operative to provide such a service to a system user for generating unique invitation identification information and/or communicating to a user-designated invitee particular unique invitation identification information in combination with any additional user-designated invitation information as a smart invitation, where such a service may be provided by platform 200 (e.g., system 164) or a third party entity (e.g., an online invitation/e-card company business 228). As yet another example, a third-party order facilitator entity may generate unique invitation identification information when taking an order for a package from the system user (e.g., as a confirmation code for that order), where the facilitator entity may share such unique invitation identification information with the system user and/or directly with platform 200.

Process 3700 may also include defining a mode setting at step 3706 based on the unique invitation identification information acquired at step 3702. Before, during, or after sharing particular unique invitation identification information with a particular invitee at step 3704, that particular unique invitation identification information may also be provided to platform 200 (e.g., at step 3706) for use in defining any suitable mode setting that may instruct platform 200 how to handle detection of that particular unique invitation identification information by environment 100 (e.g., when presented by the particular invitee at a sensing component of doorbell 106 or any other suitable smart device of environment 100). Platform 200 may be operative to enable a system user to interact with platform 200 in any suitable manner for at least partially defining such a mode setting (e.g., via a personal device 166 or any suitable smart device of environment 100). Any environment 100 that the system user may have authorization to control may be associated with such a mode setting and any suitable platform action(s) by any suitable component(s) of platform 200 may be selectively associated with that environment 100 and the particular unique invitation identification information in such a defined mode setting, whereby platform 200 may be operative to carry out such action(s) when the particular unique invitation identification information of that mode setting is detected at environment 100. Such a platform action may include enabling access to a portion of environment 100 (e.g., via door 186 by controlling smart doorknob 122), conveying a particular message at an entryway of environment 100 where the particular unique invitation identification information may be detected (e.g., via an output component of doorbell 106 to the invitee, such as "Welcome to the party—head through this door and straight back through the kitchen to the back patio"), conveying a particular message to the system user (e.g., via user device 166 or any suitable smart device local to the user, such as "Invitee John Doe has just arrived and is being let in to the party"), conveying a particular message to a social network (e.g., via social paradigm 310c, such as "Invitee John Doe arrived at System User's party at 9:08 pm"), and/or any other possible platform action available to platform 200. As one particular example, a message to be conveyed to a visitor as a platform action of a mode setting may be at least partially defined by dynamic information, such as the current location of the system user within environment 100, such that a particular message conveyed to the visitor at an entryway of environment 100 (e.g., via doorbell 106) may be "Welcome to the party—head through this door and straight back through the kitchen to the back patio to find your party host" if the system user is currently located on the back patio at the time the platform action is to be carried out (e.g., as may be determined by platform 200 through any suitable tracking capabilities as may be described herein) or may be "Welcome to the party—head through this door and up the master stair case to the library to find your party host" if the system user is currently located in the library at the time the platform action is to be carried out. Such a platform action for conveying a message to a visitor may be communicated by platform 200 via any suitable smart device (e.g., via an output component 812, 830, and/or 836 of doorbell 106) or to a personal device 266 of the visitor (e.g., via a communications component 862 of doorbell 106) as may be sensed by a smart device of environment 100 or otherwise determined by platform 200.

Along with one or more platform actions, one or more conditions may also be selectively associated with a particular unique invitation identification information in such a defined mode setting, whereby platform 200 may be operative to carry out the one or more associated platform actions when the particular unique invitation identification information of that mode setting is detected at environment 100 while any associated conditions are satisfied. As one example, such a condition may include a particular time frame during which the mode setting may be active (e.g., 7:00 pm to 11:00 pm, such that if the particular unique invitation identification information of that mode setting is detected at environment 100 before 7:00 pm or after 11:00 pm then the one or more associated platform actions of that mode setting may not be carried out by platform 200). As another example, such a condition may include a particular maximum threshold occupancy of environment 100 under which the mode setting may be active (e.g., 75 people, such that if the particular unique invitation identification information of that mode setting is detected at environment 100 while 75 or more people are currently detected within environment 100 then the one or more associated platform actions of that mode setting may not be carried out by platform 200). As another example, such a condition may include general visitor identification information that must be satisfied for the mode setting to be active (e.g., detected visitor wearing red, such that if the particular unique invitation identification information of that mode setting is detected at environment 100 when presented by a visitor that is not wearing any red clothing (e.g., as may be detectable by a camera sensing component of doorbell 106) then the one or more associated platform actions of that mode setting may not be carried out by platform 200 (e.g., for strictly enforcing a dress code requirement for a Valentine's Day party)). As yet another example, such a condition may include particular visitor identification information that must be satisfied for the mode setting to be active (e.g., detected visitor satisfies a particular facial detection operation, such that if the particular unique invitation identification information of that mode setting is detected at environment 100 when presented by a visitor whose face does not successfully match a particular facial detection operation (e.g., as may be detectable by a camera sensing component of doorbell 106 in combination with a facial recognition process that may compare detected visitor facial data with a photograph of the intended invitee that may be provided to platform 200 (e.g., by the system user) or otherwise accessible to platform 200 (e.g., via querying pictures of a social network database in conjunction with a name associated with the invitation, etc.) for defining such a condition of the defined mode setting) then the one or more associated platform actions of that mode setting may not be carried out by platform 200 (e.g., for ensuring that the invitee visitor to whom the smart invitation was sent is the actual visitor presenting the particular visitor identification information at environment 100)).

Multiple mode settings may be associated with a single event, and each mode setting may be edited independently and/or certain characteristics (e.g., platform actions and/or conditions) of multiple mode settings may be edited simultaneously. For example, each guest invited to a particular event (e.g., a Valentine's day party at a system user's environment 100) may receive its own smart invitation that may be associated with its own particular mode setting defined at platform 200. However, platform 200 may be operative to enable a system user to edit a certain condition of all such mode settings for that particular event at the same time (e.g., through a single instruction provided to platform 200). For example, the system user may decide that a time frame condition for each mode setting defined for each smart invitation for an event should be increased from 4 hours to 6 hours (e.g., instead of from 7:00 pm to 11:00 pm, now each smart invitation to that event should be active from 7:00 pm to 1:00 am). Alternatively, different mode settings for different smart invitations for the same event may be edited independently. For example, the system user may edit a general visitor identification information condition of the mode setting associated with a particular smart invitation to a particular user (e.g., to not require that the specific invitee of that invitation be wearing red to be granted access). If any characteristic of any mode setting of a smart invitation has been edited after the smart invitation has been shared with an invitee, platform 200 may be operative to automatically send an updated invitation to that invitee alerting the invitee of the change made to its invitation (e.g., a simple e-mail or text message alerting the invitee that a condition or other characteristic of the invitation has changed), which may or may not include generating and sharing new particular unique invitation identification information to be associated with that invitation, as the initially acquired and shared unique invitation identification information that is also associated with a mode setting need not change when a condition of that mode setting is later edited.

Process 3700 may also include receiving invitation identification data that includes the unique invitation identification information from a smart environment as detected by a smart device of the smart environment at step 3708, and then analyzing the unique invitation identification information of the received invitation identification data from the smart environment to identify the defined mode setting associated with that smart environment at step 3710. Once a mode setting has been defined for a particular unique invitation identification information with smart environment 100 and one or more associated platform tasks and any suitable conditions (e.g., at step 3706), platform 200 may be operative to analyze that particular unique invitation identification information when detected at that smart environment using any suitable sensing component(s) of smart environment 100. In response to detecting that particular unique invitation identification information of the defined mode setting at environment 100, platform 200 may be operative to analyze that detected unique invitation identification information in combination with any appropriate defined mode setting(s) of that unique invitation identification information, for example, to confirm that any suitable conditions of that defined mode setting are also satisfied (e.g., by analyzing any suitable data available to platform 200 (e.g., via one or more sensing components of one or more smart devices at environment 100 and/or any additional data otherwise accessible to a computing system of platform 200 (e.g., system 164 or a computing system local to environment 100)). In some embodiments, platform 200 may be operative to communicate with the visitor (e.g., via doorbell 106) and/or adjust sensing capabilities of environment 100 (e.g., sensing components 828 of doorbell 106) in any suitable manner as described herein, for enabling platform 200 to properly determine whether or not a condition has been satisfied (e.g., by conveying a message to the visitor to "present your invitation to the scanner just above the doorbell button" or "please align your uncovered face with the camera just above the doorbell button", etc.). If all such conditions are confirmed to be satisfied, then platform 200 may be operative to carry out any platform tasks of that defined mode setting. For example, process 3700 may also include carrying out at least one platform action of a mode setting identified as associated with the detected unique invitation identification information and the smart environment at step 3712. At any point after the mode setting has been defined (e.g., at step 3706) but before the particular unique invitation identification information of the defined mode setting has been detected at environment 100 (e.g., at step 3708), platform 200 may be operative to enable any appropriate system user to edit one or more characteristics of the defined mode setting (e.g., any associated platform tasks and/or any associated conditions and/or even the associated smart environment that is to detect the particular unique invitation identification information of the defined mode setting). Therefore, at any point after the smart invitation has been shared by the user with the invitee (e.g., at step 3704) but before the smart invitation has been used at a smart environment of the user (e.g., at step 3708), the functionality of the smart invitation may be altered in any suitable way(s) (e.g., at step 3706).

It is understood that the steps shown in process 3700 of FIG. 37 are merely illustrative and that existing steps may be modified or omitted, additional steps may be added, and the order of certain steps may be altered.

In some embodiments, platform 200 may be operative to enable any suitable entity to edit or define certain characteristics of such a defined mode setting, where that entity may be the invitee (e.g., as may gain access to editing capabilities on platform 200 through use of the smart invitation (e.g., in an online user interface provided by platform 200)) or any other suitable entity that may be enabled by the system user or platform 200, and where that entity may or may not be any user of any component of platform 200, let alone the system user that may have initiated the smart invitation process and that may have management control of the associated smart environment. For example, if a particular platform task associated with the mode setting is a message to be conveyed to the system user when the smart invitation is used at smart environment 100, the invitee may be enabled to at least partially define what that message might be. As just one example, such a platform task may be to communicate a particular message throughout every portion of environment 100 that is occupied at the time when the smart invitation is used (e.g., as a party-wide announcement letting all the current party attendees know that the invitee associated with the smart invitation has just arrived). Therefore, the invitee may be enabled to upload an audio recording to platform 200 (e.g., via an invitee visitor device 266 to system 164) in advance of the use of the smart invitation at environment 100, such that platform 200 may be operative to access and playback that audio recording throughout environment 100 (e.g., via audio output components of each smart device within environment 100) when the invitee uses the smart invitation to access the party (e.g., audio recording may be the invitee's catch phrase or favorite song or any other suitable information). Alternatively, platform 200 may enable the invitee to provide such a message to platform 200 at the same time as when the invitee presents the smart invitation to smart environment 100. For example, once a smart invitation has been presented by the invitee visitor and detected by environment 100, platform 200 (e.g., via doorbell 106) may prompt the invitee visitor to convey certain information to platform 200 for use as the invitee enters environment 100 (e.g., a request for the invitee to state the name by which it should be introduced to the party (e.g., "John the Party Animal Doe is here") and/or the name of an intro song via microphone 844 of doorbell 106, or providing multiple options for an intro song to the visitor from which the visitor may select one via a touch screen user interface 812 of doorbell 106, where such options may be at least partially defined by any suitable data available to platform 200, such as songs queued in a party playlist being played-back at environment 100 (e.g., by a smart device 166 of environment 100)). Any suitable options determined in any suitable manner may be presented to the visitor for selection, in response to which one or more suitable platform actions may be carried out, such as options for music to be played, options for an interactive game being played, and the like.

In some embodiments, a platform action of a mode setting of a smart invitation may require that platform 200 only enable accessibility to environment 100 by a single human in response to detection of that smart environment (e.g., to prevent "piggybacking" such that each invitation may only be used by a single visitor). For example, in response to detecting a smart invitation at doorbell 106 of door 186, a mode setting associated with that invitation may instruct platform 200 to carry out a platform action that may unlock doorknob 122 for enabling access through door 186 while also enabling and/or otherwise monitoring data from a camera or motion sensor or any other suitable sensing component functionally positioned at door 186 for detecting movement through door 186 (e.g., a sensing component 828 of doorbell 106 or a sensing component 1428 of doorknob 122) such that an alarm may be triggered if more than one person is detected passing through door 186 in response to unlocking door 186 for that detected invitation. Additionally or alternatively, a platform action of a mode setting of a smart invitation may require that platform 200 only enable accessibility to environment 100 one time only in response to detection of that smart environment (e.g., to prevent a particular invitation from being used more than once, thereby preventing re-admittance to an event and/or preventing a smart invitation from being passed on to other entities for unauthorized use of a single invitation). For example, in response to detecting a particular smart invitation at environment 100 and carrying out any associated platform actions (e.g., enabling accessibility to environment 100 through door 186), a condition of the mode setting for that invitation may instruct platform 200 to prevent such platform actions from being carried out a second time for that invitation, although there are various other suitable ways for defining a mode setting or otherwise configuring platform 200 to carry out a certain platform action no more than a certain amount of times (e.g., once) per detection of a particular smart invitation.

After a system user has shared a smart invitation with an invitee and an associated mode setting has been defined with platform 200 (e.g., at steps 3702-3706), the later handling of the smart invitation may occur transparent to the user (e.g., at steps 3708-3712). That is, a smart invitation with unique invitation identification information may be presented by an invitee visitor at environment 100, detected and analyzed by platform 200, and any suitable actions handled automatically by platform 200 based on an associated defined mode setting without any further system user interaction. This may enable a system user to focus on enjoying the party without having to worry about whether or not a new guest is at door 186 (e.g., can the host hear the door bell ringing over the noise of the party) and if such a guest needs to be let in (e.g., does the host need to greet the guest and tell it where to go). Instead, the host system user can enjoy the party knowing that platform 200 has been enabled to automatically and securely and conveniently interact with any new guests that may arrive at environment 100.

This may be particularly useful for shared environments, such as apartment buildings, where a system user may not be able to leave door 186 unlocked during an event like a system user of a suburban home might feel more comfortable doing. For example, structure 150 may be an urban apartment building, where door 186 may be a front door to a lobby that may be shared by each individual apartment resident. In such embodiments, mode settings of a smart invitation presented at doorbell 106 of door 186 may enable door 186 (e.g., via doorknob 122) to be accessible for 10 seconds after detection of the smart invitation and may convey a message to the visitor (e.g., "Please take the elevator to the 6$^{th}$ floor, then take a left as you exit the elevator and present your invitation to the doorbell at the front door of Apartment 6A"), whereby the same invitation may then be presented to and detected by a second smart device of environment 100 for executing additional operations of the mode settings associated with that smart invitation (e.g., for providing access to the actual apartment of the system user). Certain conditions of a mode setting associated with a particular smart invitation may be analyzed for satisfaction at a particular one of multiple presentation points of the smart invitation. For example, mere detection of the unique invitation identification information of an invitation at a first smart device of environment 100 may enable accessibility to a front door of a lobby of an apartment building, yet a maximum threshold occupancy condition may only be analyzed for satisfaction at a second smart device of environment 100 prior to enabling accessibility to a front door of a specific apartment of the apartment building.

A smart invitation may enable access to only a certain portion of environment 100 (e.g., via a platform action of an associated mode setting (e.g., as carried out at step 3712)). For example, continuing with the circumstances of an apartment building that may have a front lobby shared by multiple residents as well as a particular residential unit of a particular system user of platform 200, a mode setting defined for a smart invitation may include a platform action that enables a visitor access to only that shared lobby in response to detection of that invitation at a smart device of environment 100. This may enable a deliverer with a particular smart invitation (e.g., a package label ID containing unique invitation identification information) to drop-off a package in a lobby of a building without platform 200 granting that deliverer access to any particular residence of that building, thereby maintaining certain security of that residence while also providing certain security for that package (e.g., that the package is held within a secure area of environment 100 not accessible to untrusted entities (e.g., members of the general public that are not able to access that lobby)). Such limited accessibility may satisfy certain delivery requirements of a deliverer business entity 228 (e.g., drop-off requirements generally or even "signed recipient receipt" requirements if that lobby is deemed secure enough (e.g., a lobby of a single residence home to which no non-system trusted entities may have accessibility)). As another example, a platform action associated with a particular smart invitation may enable temporary accessibility to a smart safe (e.g., a smart appliance 113) that may be provided by environment 100 adjacent doorbell 106 external to structure 150 (e.g., smart appliance 113a), the interior of which may be selectively and temporarily made accessible to deliverer DL (e.g., via any suitable control signals of system 164) by platform 200 for enabling placement of package PL therein in response to detection of the smart invitation (e.g., package label ID) at doorbell 106. Any such secure area (e.g., a lobby, a safe, etc.) of environment 100 that may be made temporarily accessible to an invitee visitor (e.g., deliverer DL) by platform 200 (e.g., automatically through system processing and control of mode settings of a smart invitation in response to presentation and detection of that smart invitation) may be securely monitored by system 164 during such temporary access in order to ensure that deliverer DL positions package PL in that area and/or to ensure that nothing is removed from that area during the period of that temporary access. One or more sensing components 828 of doorbell 106 or of any other smart device of environment 100 may be configured to at least partially carry out such monitoring. Additionally or alternatively, one or more output components of doorbell 106 or of any other smart device of environment 100 may be configured to at least partially indicate to deliverer DL where and how to deposit the package securely.

A platform action of a mode setting associated with a particular smart invitation for a particular smart environment may be at least partially defined by one or more characteristics defining the details of the smart invitation. For example, if a smart invitation is generated in response to an order being placed for delivery of contents (e.g., whereby the unique invitation identification information of the invitation may be based on a confirmation number of that order or otherwise generated based on that order), certain information detailing that order (e.g., a description of the contents, the time the order was placed, the intended recipient of the order, the facilitator of the order, etc.) may be automatically associated with the mode setting of that smart invitation (e.g., through information sharing from an order facilitator business 228 and system 164 via an API 210). For example, such information may be automatically leveraged by platform 200 for defining certain characteristics of certain platform actions of the mode setting, such as a platform action to convey a particular message to occupant(s) of environment 100 (e.g., via any/all suitable smart devices of environment 100, such as only those in rooms currently occupied within structure 150) when the smart invitation is detected at environment 100 (e.g., at doorbell 106), for example, where such a message may convey "The delivery of the food order placed at restaurant X by occupant Y at time Z is currently being attempted at door 186". Therefore, not only may a smart invitation be automatically made accessible to the facilitator of an order at the time the order is placed (e.g., as may be provided by system 164 to the facilitator or generated by the facilitator and shared with system 164), but one or more suitable platform actions of a mode setting associated with that smart invitation may be at least partially automatically defined by platform 200 based on information associated with that order. This may increase the efficiency with which environment 100 may handle an invitee visitor in response to that visitor presenting a specific smart invitation at environment 100 (e.g., if there are multiple people at environment 100 that may have made different food orders and that are currently awaiting the delivery thereof). This may not only increase the convenience of the occupant users by being informed what delivery attempt is currently being detected, but this may also increase the convenience of the deliverer by not having to manually announce the particulars of the attempted delivery (e.g., "Hello, this is a delivery for occupant Y by restaurant X") but instead by only having to present its smart invitation (e.g., a delivery receipt containing the confirmation number (i.e., the unique invitation identification information), such as of a label ID) to environment 100 (e.g., doorbell 106) for automatic detection/analysis/handling by platform 200.

Smart invitations may be useful to a system user when managing accessibility to environment 100 during times when that system user may not be present at environment 100. For example, when a smart invitation is generated to provide environment accessibility to a somewhat trusted entity (e.g., a temporary tenant, as may be prevalent in the popular home-sharing/swapping context), a system user may wish to provide certain constraints on the use of the environment by that entity. As just one example, total occupancy conditions for such a smart invitation mode setting may be useful to prevent a temporary tenant from hosting large gatherings at environment 100. If detected occupancy within structure 150 is equal to a certain number, a mode setting may prevent additional access to structure 150 through use of a smart invitation. In some embodiments, a system user may define a do-not-disturb mode for environment 100 when environment 100 has been made temporarily accessible to entities that have only limited trust, such that deliveries or other types of visitor handling may be suspended or handled in a special way when a temporary tenant has accessibility rights, thereby preventing platform 200 from enabling a temporary tenant to receive a package from a deliverer. As mentioned, various platform actions may be edited for a smart invitation at any moment by an authorized system user, such that a temporary tenant's rights with respect to environment 100 may be varied remotely (e.g., by a remote system user UR via system 164) when a situation warrants. For example, a system user may be notified by platform 200 that a package has been left within a safe 113a, and that system user may then choose to grant temporary accessibility rights to safe 113a to a temporary tenant that may currently have accessibility rights to certain areas of environment 100 but not to safe 113a via a particular smart invitation by editing a mode setting of that smart invitation to now allow accessibility to that safe 113a via use of that smart invitation (e.g., if the system user wishes for the package to be moved by the temporary tenant to a cooler climate (e.g., a refrigerator)).

A smart invitation may be leveraged in any suitable context for increasing the security of environment 100. For example, particular unique invitation identification information of a smart invitation may be associated with a particular security entity (e.g., an emergency response entity 230) and a mode setting for that smart invitation may be managed for defining the various ways in which that smart invitation may be used by that security entity for interacting with environment 100. As just one example, a fire department may have access to a particular smart invitation with particular unique invitation identification information that may be associated with a mode setting for environment 100, such that a system user may edit that mode setting for varying the accessibility rights that the fire department may have with respect to environment 100. In some embodiments, such a mode setting may be defined to instruct platform 200 to enable the fire department to access all portions of environment 100 at any time the smart invitation of the fire department is detected by environment 100 (e.g., if a system user occupant of environment 100 is elderly and implicitly trusts the fire department in all situations at all times). Alternatively, such a mode setting may be defined to instruct platform 200 to enable the fire department to access environment 100 only if no active occupants are detected at environment 100 and a specific hazard is detected at environment 100 when the smart invitation of the fire department is detected by environment 100 (e.g., if a system user wishes to allow the fire department to enter environment 100 if no one is home or if everyone is sleeping/motionless and at least one smart hazard detector 104 or other smart device of environment 100 detects smoke). Additionally or alternatively to determining physical accessibility to environment 100 as a platform action (e.g., via unlocking door 186 with smart doorknob 122), such a mode setting may be defined to instruct platform 200 to convey certain information to the fire department when the smart invitation of the fire department is detected by environment 100 as a platform action (e.g., via any suitable output component of doorbell 106), such as the current occupancy of environment 100 and/or the specific location of each occupant within environment 100 and/or a map of environment 100 and/or a listing of hazards detected by various hazard detectors 104 of environment 100, such that the fire department may be adequately informed when handling a potential emergency event at environment 100. Different conditions may be associated with different platform actions of a particular mode setting of a particular smart invitation. For example, when a fire department smart invitation is detected at environment 100, a mode setting may instruct platform 200 to enable access through door 186 only if a particular hazard has been detected by environment 100 and no occupancy motion has been detected by environment 100, whereas that same mode setting may instruct platform 200 to convey detected occupancy status information and/or environment map information and/or detected hazard information of environment 100 with the fire department visitor (e.g., via doorbell 106) at all times or only when no current occupancy is detected.

In some embodiments, the particular unique invitation identification information of such a smart invitation available to the fire department may be generated by the fire department and shared with any appropriate component(s) of platform 200 (e.g., system 164) for enabling a mode setting to be defined for that particular unique invitation identification information with respect to various particular smart environments. Therefore, the same particular unique invitation identification information of a smart invitation available to the fire department may be used by multiple different system users of platform 200 for defining multiple different mode settings for multiple different smart environments that are to be associated with that particular unique invitation identification information of the fire department, which may enable the fire department to use only a single smart invitation with that same particular unique invitation identification information at every smart environment the fire department may potentially visit. This may obviate the need for the fire department to carry around multiple types of skeleton keys or otherwise worry about having to interact with various smart environments in different ways, but instead may enable the fire department to present the same smart invitation with the same particular unique invitation identification information at every smart environment, and the mode settings for that smart invitation with respect to any particular smart environment may vary based on the desires of the system user of that smart environment. Therefore, a system user may be provided with the ability to control and edit the various ways in which platform 200 may handle a fire department when the presence of the fire department is authenticated at environment 100, while the fire department may only need one smart invitation for use with multiple smart environments. The same may be true for any other suitable entity, such as a package delivery entity (e.g., Federal Express or the local U.S. Postal Service) that may have access to a single smart invitation that may be presented at each smart environment (e.g., within a particular delivery area covered by that entity) and different system users of different environments may define different mode settings for handling that smart invitation. For example, a particular entity may be responsible for (e.g., provide service to) the entirety of the locations within a ZIP Code, and the particular entity may share the particular unique invitation identification information of its smart invitation as well as its responsible ZIP Code with platform 200 (e.g., with system 164 via API 210), and platform 200 may be operative to define a distinct mode setting based on the particular unique invitation identification information of that smart invitation with each smart environment within that ZIP Code.

Figure 38:
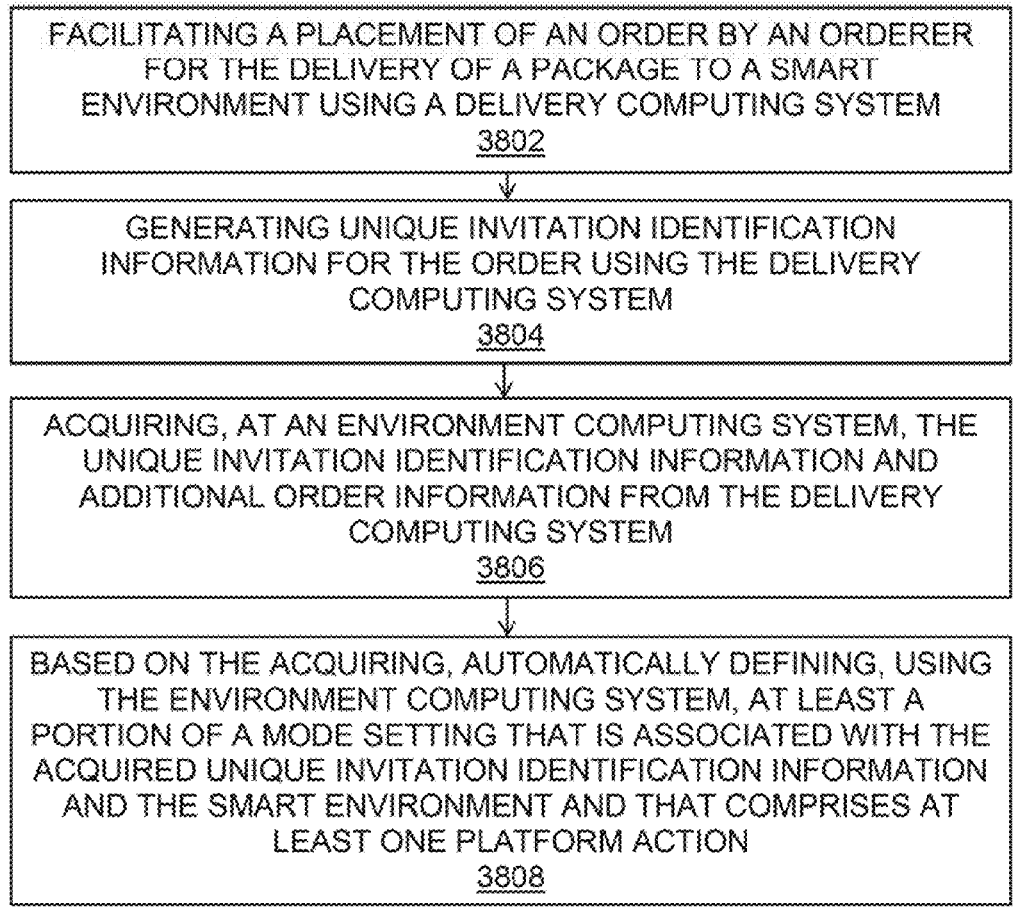
FIG. 38 provides an example process for handling delivery of a package, according to at least one embodiment.

FIG. 38 is a flowchart of an illustrative process 3800 for handling delivery of a package by a deliverer of a delivery service-provider entity that includes a delivery computing system to a smart environment that includes at least one smart device. At step 3802, process 3800 may include facilitating at least a portion of a placement of an order by an orderer for the delivery of the package to the smart environment using the delivery computing system. At step 3804, process 3800 may include generating unique invitation identification information for the order using the delivery computing system. At step 3806, process 3800 may include acquiring, at an environment computing system, the unique invitation identification information and additional order information from the delivery computing system. At step 3808, process 3800 may include, based on the acquiring, automatically defining, using the environment computing system, at least a portion of a mode setting that is associated with the acquired unique invitation identification information and the smart environment and that includes at least one platform action. In some embodiments, process 3800 may also include, after the defining, receiving, at the environment computing system from the smart environment, invitation identification data detected by the at least one smart device from the deliverer, wherein the received invitation identification data includes the unique invitation identification information, then analyzing, using the environment computing system, the unique invitation identification information of the received invitation identification data from the smart environment to identify the defined mode setting associated with the unique invitation identification information and the smart environment, and then automatically carrying out, using the environment computing system, the at least one platform action of the identified defined mode setting based on the analyzing.

It is understood that the steps shown in process 3800 of FIG. 38 are merely illustrative and that existing steps may be modified or omitted, additional steps may be added, and the order of certain steps may be altered.

Figure 39:
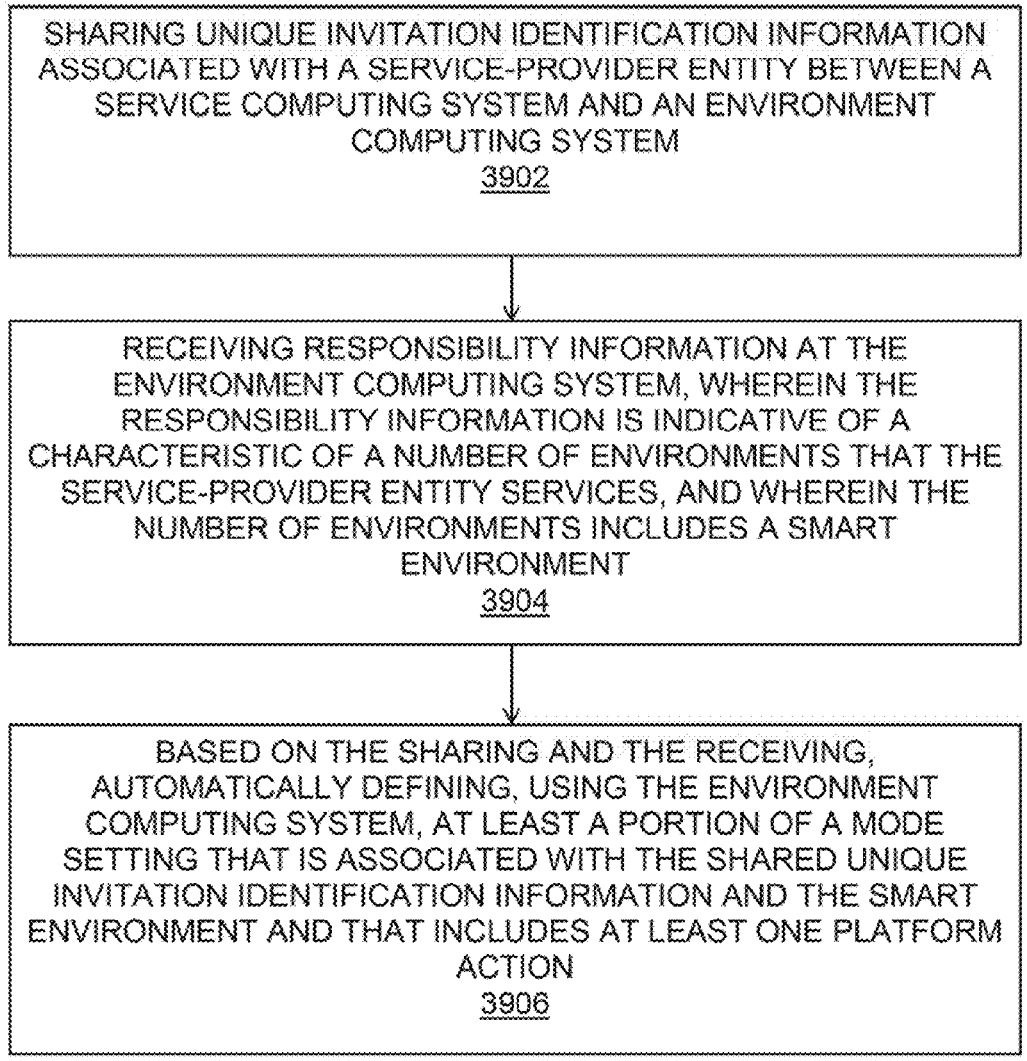
FIG. 39 provides an example process for handling an agent of a service-provider entity, according to at least one embodiment.

FIG. 39 is a flowchart of an illustrative process 3900 for handling an agent of a service-provider entity that includes a service computing system at a smart environment that includes at least one smart device. At step 3902, process 3900 may include sharing unique invitation identification information associated with the service-provider entity between the service computing system and an environment computing system. At step 3904, process 3900 may include receiving responsibility information at the environment computing system, wherein the responsibility information is indicative of a characteristic of a number of environments that the service-provider entity services, and wherein the number of environments includes the smart environment. At step 3906, process 3900 may include, based on the sharing and the receiving, automatically defining, using the environment computing system, at least a portion of a mode setting that is associated with the shared unique invitation identification information and the smart environment and that includes at least one platform action. In some embodiments, process 3900 may also include, after the defining, obtaining, at the environment computing system from the smart environment, invitation identification data detected by the at least one smart device from the agent, wherein the received invitation identification data includes the unique invitation identification information, then analyzing, using the environment computing system, the unique invitation identification information of the received invitation identification data from the smart environment to identify the defined mode setting associated with the unique invitation identification information and the smart environment, and then automatically carrying out, using the environment computing system, the at least one platform action of the identified defined mode setting based on the analyzing.

It is understood that the steps shown in process 3900 of FIG. 39 are merely illustrative and that existing steps may be modified or omitted, additional steps may be added, and the order of certain steps may be altered.

If handling of a detected visitor at environment 100 enables an attempt to communicate with a system user of environment 100, platform 200 may be operative to provide different feedback to the visitor (e.g., at doorbell 106) and to the system user (e.g., via a user device 166 or any other suitable smart device of environment 100 proximate the user). Enabling different feedback to be provided to a system user and to a detected visitor may independently enhance the experience of the user and visitor in various ways.

Any suitable handling of the detection of any suitable visitor or invitation at environment 100 may include any suitable communication attempt to a system user associated with environment 100. For example, after initial detection of any visitor generally (e.g., at steps 2002/2004) and/or after detecting a specific act of a visitor (e.g., at step 2010), platform 200 may be operative to attempt to communicate any suitable information indicative of that detection to a system user (e.g., at step 2006 and/or step 2012), whether or not that system user is local to environment 100 (e.g., user UL via communication at a personal device 166 of the user and/or via communication at any suitable smart device of environment 100) or remote from environment 100 (e.g., user UR via communication at a personal device 166 of the user). The content of such a communication to a system user and the manner in which such a communication may be attempted by platform 200 may vary based on any suitable data available to platform 200, such as any suitable information relating to the identification and/or intent of the detected visitor, the intended user the visitor is attempting to communicate with, any mode setting of environment 100, the occupancy status of environment 100, information provided by any third party entity (e.g., one or more of entities 222-230), paradigms 310a-310d, and the like. In certain situations, the content and/or manner of a communication to a system user may vary as more time elapses without receiving a user response.

For example, when a particular system user is identified as a target of the communication, platform 200 may first attempt to communicate (e.g., at step 2006 and/or step 2012) just with that particular system user (e.g., by communicating with a personal user device 166 associated with that specific user and/or with one or smart devices determined to be local to that specific user (e.g., hazard device 104a proximate user UL)). However, if no user response or other suitable indication is received by platform 200 suggesting that the communication was received by the user (e.g., within a particular amount of time or after a particular amount of attempts), platform 200 may be operative to adjust the communication attempt by varying a characteristic of the output component(s) with which a smart device may attempt to facilitate the communication (e.g., by increasing the volume of an audibly conveyed message and/or by switching to or also using a visual output component (e.g., a flickering light) of the smart device) and/or by communicating with additional smart devices (e.g., by communicating with additional or all suitable smart devices of environment 100 (e.g., with any hazard detectors 104 of environment 100 not specifically associated with a do-not-disturb mode (e.g., not in a sleeping baby's room) or all hazard detectors 104 of environment 100 or all smart devices of environment 100) and/or by changing the message of the communication attempt (e.g., from "User UR, there is someone at the door for you" to "Occupants, there is someone at the door")). Therefore, platform 200 may be operative to target one or more specific devices associated with one or more specific users and/or one or more specific areas of environment 100 with an initial output characteristic when initially attempting to communicate with a user before expanding that communication attempt to other output characteristics and/or other devices and/or other environment areas, which may limit the amount that such an attempted communication may disturb environment 100 while also maximizing the likelihood of eventually contacting an appropriate occupant. Additionally or alternatively, platform 200 may be operative to craft a targeted message for one or more specific users when initially attempting to communicate with a user before expanding the breadth of that message to incite a response from other users, which may limit the amount that such an attempted communication may disturb environment 100 while also maximizing the likelihood of eventually contacting an appropriate occupant. After an initial attempt, an additional attempt may not only include the use of additional output characteristics or devices or messages but may also continue to employ the characteristics of the initial attempt. Alternatively, after an initial attempt, an additional attempt may only include the use of additional output characteristics or devices or messages but may not continue to employ the characteristics of the initial attempt (e.g., to discontinue a potential disturbance to a user who is unable or unwilling to respond to the initial attempt).

Figure 40:
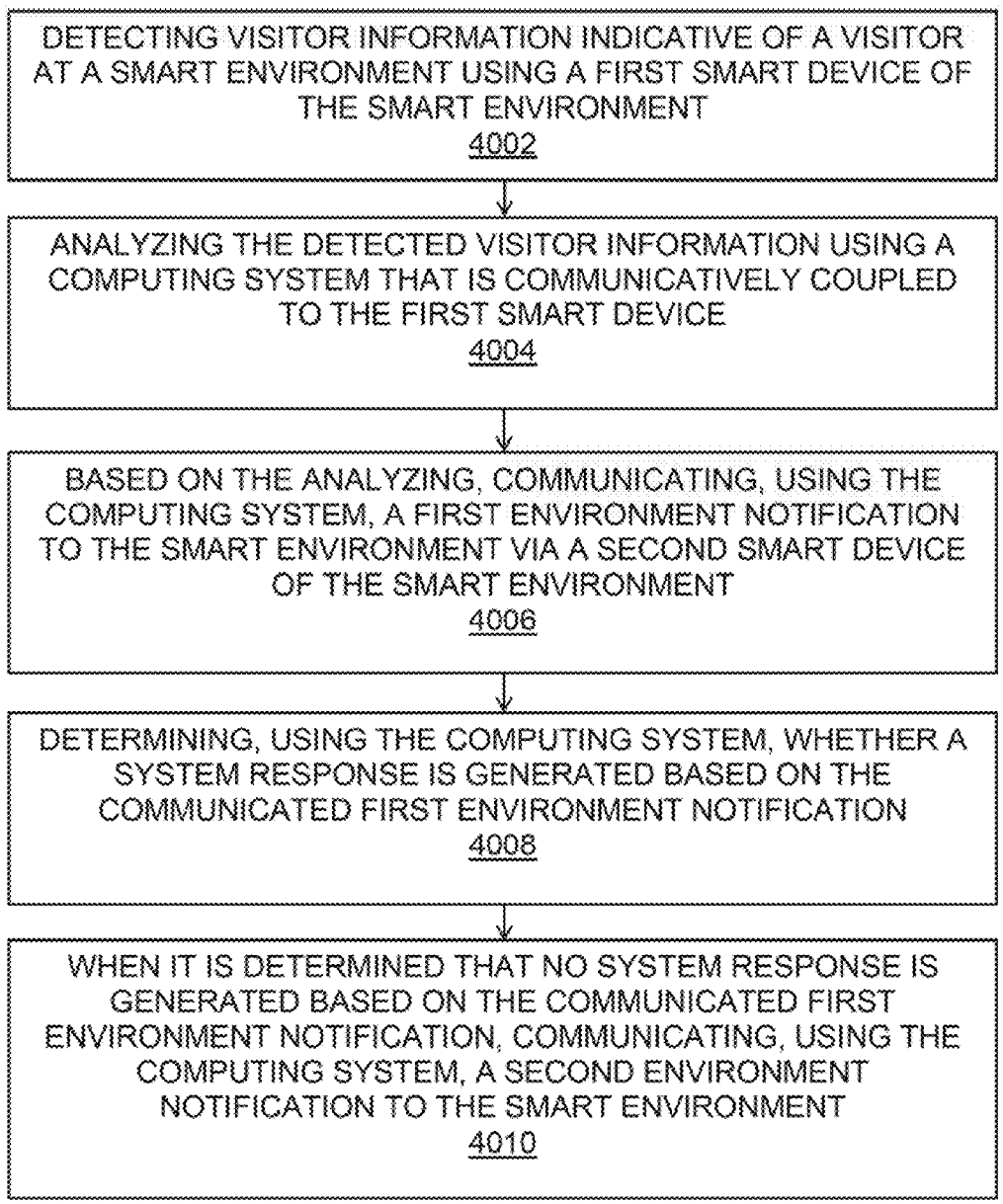
FIG. 40 provides an example process for handling a visitor at a smart environment, according to at least one embodiment.

FIG. 40 is a flowchart of an illustrative process 4000 for handling a visitor at a smart environment that includes a number of smart devices. At step 4002, process 4000 may include detecting visitor information indicative of the visitor at the smart environment using a first smart device of the smart devices. At step 4004, process 4000 may include analyzing the detected visitor information using a computing system that is communicatively coupled to the first smart device. At step 4006, process 4000 may include, based on the analyzing, communicating, using the computing system, a first environment notification to the smart environment via a second smart device of the smart devices. At step 4008, process 4000 may include determining, using the computing system, whether a system response is generated based on the communicated first environment notification. At step 4010, process 4000 may include, when it is determined that no system response is generated based on the communicated first environment notification, communicating, using the computing system, a second environment notification to the smart environment.

It is understood that the steps shown in process 4000 of FIG. 40 are merely illustrative and that existing steps may be modified or omitted, additional steps may be added, and the order of certain steps may be altered.

If handling of a detected visitor by platform 200 enables a visitor to interact with environment 100 (e.g., doorbell 106) for actively attempting to communicate with a system user of environment 100 (e.g., at step 2010), platform 200 may be operative to provide different feedback to the visitor (e.g., at doorbell 106) and to the system user (e.g., via a user device 166 or any other suitable smart device of environment 100 proximate the user). For example, at any suitable time a visitor may actively interact with (e.g., depress) a doorbell button or other suitable doorbell user interface 812 of doorbell 106 for attempting to communicate with a system user of environment 100 (e.g., whether or not such interface 812 may be indicative of being enabled or disabled for such use), platform 200 may be operative to communicate information indicative of that visitor interaction with a system user in any suitable manner. In some embodiments, such communication to a system user may be based on an adjusted version of that visitor interaction such that certain characteristics of that visitor interaction may be filtered or otherwise processed in order to limit the annoyance of such a communication to the system user and/or to otherwise make such a communication as effective as possible.

Platform 200 may be operative to communicate any number of visitor interactions within a certain period of time as a single communication type to a system user. For example, if a visitor presses doorbell button 812 ten times within a single ten second period of time or only one time within a single ten second period, platform 200 may be operative to generate the same communication for a system user (e.g., a single buzzer sound emitted from one or more smart devices within environment 100 and/or a single message conveyed within environment 100 (e.g., "a visitor has rung the doorbell"), rather than doing so ten times). This may limit the disturbance caused to any system user by platform 200 when communicating such a visitor interaction.

Additionally or alternatively, platform 200 may be operative to communicate any length of a visitor interaction within a certain period of time as a single communication type to a system user. For example, if a visitor presses and then holds doorbell button 812 for ten seconds straight within a single ten second period of time or presses and then holds doorbell button 812 for only one second within a single ten second period, platform 200 may be operative to generate the same communication for a system user (e.g., a single buzzer sound emitted for a single second length of time from one or more smart devices within environment 100, rather than doing so for a ten second length of time). This may limit the disturbance caused to any system user by platform 200 when communicating such a visitor interaction.

Platform 200 may be configured in any suitable way (e.g., by a system user or automatically through heuristics or rules or inferences or any other suitable data or controlling entity of platform 200) to define the period of time within which one or more visitor interactions may result in a single communication to a system user and/or the length of time during which a single visitor interaction may last that may result in a single communication to a system user. This may enable various modes whereby a certain type of visitor interaction may result in different communications to a system user depending on various factors (e.g., environment mode, occupancy status, visitor identification, etc. and/or user customized settings for how defining particular visitor interaction types may be handled and communicated to that user). In some embodiments, a pattern of two or more visitor interactions and/or a single interaction of at least a specific length may result in a particular type of communication to a system user. For example, if more than a certain amount of visitor interactions are detected within a particular amount of time and/or if a single visitor interaction is held for more than a certain amount of time and/or any other suitable type of visitor interaction is detected (e.g., a specific pattern of multiple visitor interactions of specific types), platform 200 may be operative to communicate a respective particular type of alert to a system user (e.g., to indicate an "urgent" visitor disposition or a "unique" visitor interaction (e.g., a specific 7-note "shave and a haircut—two bits" rhythmic interaction by a visitor with a smart device input component may be detected and operative to generate a melodic version of that same "shave and a haircut—two bits" riff as a communication to a system user via a smart device output component)). This may enable a certain type of visitor interaction to override certain standard response settings of platform 200 so as to enable a visitor to communicate to a system user an urgent communication or an otherwise unique communication. Therefore, while ten visitor depressions of doorbell button 812 within ten seconds may result in the same user communication attempt as one visitor depression within ten seconds (e.g., a single buzzer sound emitted from one or more smart devices within environment 100 and/or a single message conveyed within environment 100 (e.g., "a visitor has rung the doorbell") so as to not annoy or otherwise disturb a system user by providing ten distinct user communication attempts (e.g., ten distinct buzzer sounds)), eleven visitor depressions of doorbell button 812 within ten seconds may result in a different (e.g., more urgent) user communication attempt (e.g., multiple buzzer sounds emitted from one or more smart devices within environment 100 and/or a single but stronger message conveyed within environment 100 (e.g., "a visitor has URGENTLY rung the doorbell")). Therefore, while platform 200 may be operative to filter down certain "annoying" visitor interaction types for providing a more palatable alert to a system user, platform 200 may also be operative to determine certain visitor interaction types to be urgent or otherwise unique in nature for providing a more urgent or otherwise unique alert to a system user. While visitor interactions with environment 100 have been described with respect to visitor "depressions" or other suitable interactions with a doorbell button 812, which may be similar to some conventional visitor interactions with conventional doorbells/intercoms (e.g., for "ringing a doorbell"), any suitable visitor interaction type with respect to any suitable input component(s) and/or sensing component(s) of any suitable smart device or devices of environment 100 (e.g., a visitor's audible communication via a microphone 844 of doorbell 106 or selection of an option on a touchscreen user interface 812 of doorbell 812 via touching that touchscreen) may be processed and handled in any suitable manner by platform 200 for filtering any undesirable or otherwise annoying visitor interactions while also appropriately detecting certain visitor interactions that maybe leveraged for adjusting the urgency or uniqueness or any other suitable tone of an attempted communication by platform 200 to a system user in response to such detecting.

As described above, platform 200 may be operative to disable a functionality of a user interface or doorbell button input component 812 of a smart doorbell 106 for any suitable reason (e.g., based on any suitable settings or inferences, etc.). For example, a message may be conveyed to the visitor that the doorbell input component has been disabled, thereby discouraging the visitor from even attempting to functionally interact with the doorbell input component (e.g., through the visitor depressing or "ringing" the doorbell). Alternatively or additionally, whether or not it is conveyed to the visitor that a functionality of a doorbell input component is disabled, platform 200 may be operative to prevent contacting a system user in certain manners or at all in response to an interaction of any visitor with that doorbell input component under certain system circumstances (e.g., if the visitor interacts with the doorbell input component before providing the smart environment with any requested visitor identification information and/or visitor intent information). This may be considered "whitelisting", as platform 200 may be operative to require that certain requirements be met before enabling the functionality of the doorbell input component for a visitor generally (e.g., before platform 200 may be operative to generate any system user notifications in response to any visitor interaction with that doorbell input component), such as determining a specific identification of the visitor and/or at least determining whether the visitor is trusted or untrusted.

Alternatively or additionally, platform 200 may be operative to prevent contacting a system user in certain manners or at all in response to an interaction of a particular visitor with that doorbell input component (e.g., if a particular visitor has been determined to interact with environment 100 (e.g., doorbell 106) in a manner that is undesirable to a system user. This may be considered "blacklisting", as platform 200 may be operative to prevent certain visitor interaction by a certain visitor from being communicated as system user notification, which may be done whether the certain visitor is determined to be trusted or untrusted. Therefore, platform 200 may be operative to enable a system user to easily "blacklist" a particular visitor during a particular mode of smart environment 100 (e.g., by defining a mode setting) such that certain or all interactions by that particular visitor with environment 100 (e.g., with doorbell button 812) may not result in a system user notification that might otherwise be generated by platform 200 for a non-blacklisted visitor interacting in the same manner. A blacklisted visitor may be detected like any other suitable visitor (e.g., as described above with respect to steps 2002/2004). For example, any suitable fingerprint or signature of a visitor may be identified (e.g., through facial recognition, receipt of affirmatively provided visitor identification, detection of an NFC or RFID tag for that particular visitor, Wi-Fi pairing signals or any other suitable signals that may be detected from a visitor personal device 266 and analyzed by platform 200, etc.).

Platform 200 may be operative to blacklist a visitor or at least certain visitor interactions of a visitor in any suitable way (e.g., based on inferences or system user instructions). For example, in some embodiments, platform 200 may be operative to record a log (e.g., as home data 202) that may include a listing of the identity (e.g., general or specific) of some or all of the visitors detected each day at environment 100 as well as a listing of any interaction each visitor may have had with environment 100 (e.g., "Visitor A pressed doorbell button 812 of doorbell 106 at front door 186 five times within a ten second period starting at 3:45:15 PM on Tuesday"). Platform 200 may be operative to provide such a log for review by a system user of environment 100 such that the system user may select certain visitors or certain interactions of certain visitors to be added to a blacklist, whereby, going forward, platform 200 may be operative to prevent such visitors or such interactions of such visitors from resulting in the generation of system user notifications (e.g., via a smart device output component proximate the system user). Once a particular visitor (e.g., all interactions by "Visitor A") and/or a particular visitor interaction (e.g., an interaction by "Visitor A" that includes pressing doorbell button 812 more than once within a ten second period) has been blacklisted, platform 200 may be operative to handle such a blacklisting in any suitable manner when detected. For example, in response to detecting a blacklisted interaction, platform 200 may be operative to convey a message to the visitor (e.g., via speaker 836 or projector 830 or otherwise) that such an interaction will not be recognized by a system user and that discourages such behavior going forward. The message may include a customized message from the system user as to why the interaction has been blacklisted and what may be a preferable alternative.

As just one real-world example, there may be an overly enthusiastic mailman deliverer DL that always presses doorbell button 812 when he or she delivers the mail each day, despite a system user's requests to the contrary (e.g., because user notifications provided in response to such doorbell presses inevitably wake up a napping child within environment 100). After 2-3 days of this same activity, platform 200 may be operative to recognize (e.g., at steps 2002/2004) that the same Wi-Fi pairing signal is sensed when doorbell button 812 is pressed each day, and platform 200 may be operative to store such data in a suitable log by identifying different interactions on different days as being provided by the same visitor. Later, after the third day or so, the angry homeowner system user may be enabled by platform 200 to review that log and realize that this same visitor was the doorbell ringer at these offending times, and then "blacklist" that visitor. Notably, in one embodiment, the actual identity of the "blacklisted" may not be specifically established or revealed by platform 200 in the log, and such a visitor may simply be identified in the log as "Visitor A" or "Visitor whose Wi-Fi beacon is XYZ". However, in other embodiments, the actual identity of one or more visitors may be provided in such a log (e.g., through any suitable technique described herein, such as comparing any detected visitor signature data to one or more databases available to platform 200).

Such a log may be leveraged by platform 200 for any suitable purpose. For example, rather than identifying a particular visitor or a particular visitor interaction in the log for blacklisting that visitor or interaction for preventing future system user notifications in response thereto, platform 200 may be operative to assign a particular type of system user notification to a particular visitor or particular visitor interaction identified via a log or otherwise such that such a particular type of system user notification may be utilized by platform 200 in the future in response to detecting such a particular visitor or particular visitor interaction. For example, platform 200 may be operative to enable a certain audible message type (e.g., a particular "ringtones") to be provided by platform 200 as at least a portion of a system user notification in response to a future detection of a particular visitor or a particular visitor interaction (e.g., to associate a melodic version of the "shave and a haircut—two bits" riff with a particular rhythmic interaction by a visitor of that same "shave and a haircut—two bits" riff.

Figure 41:
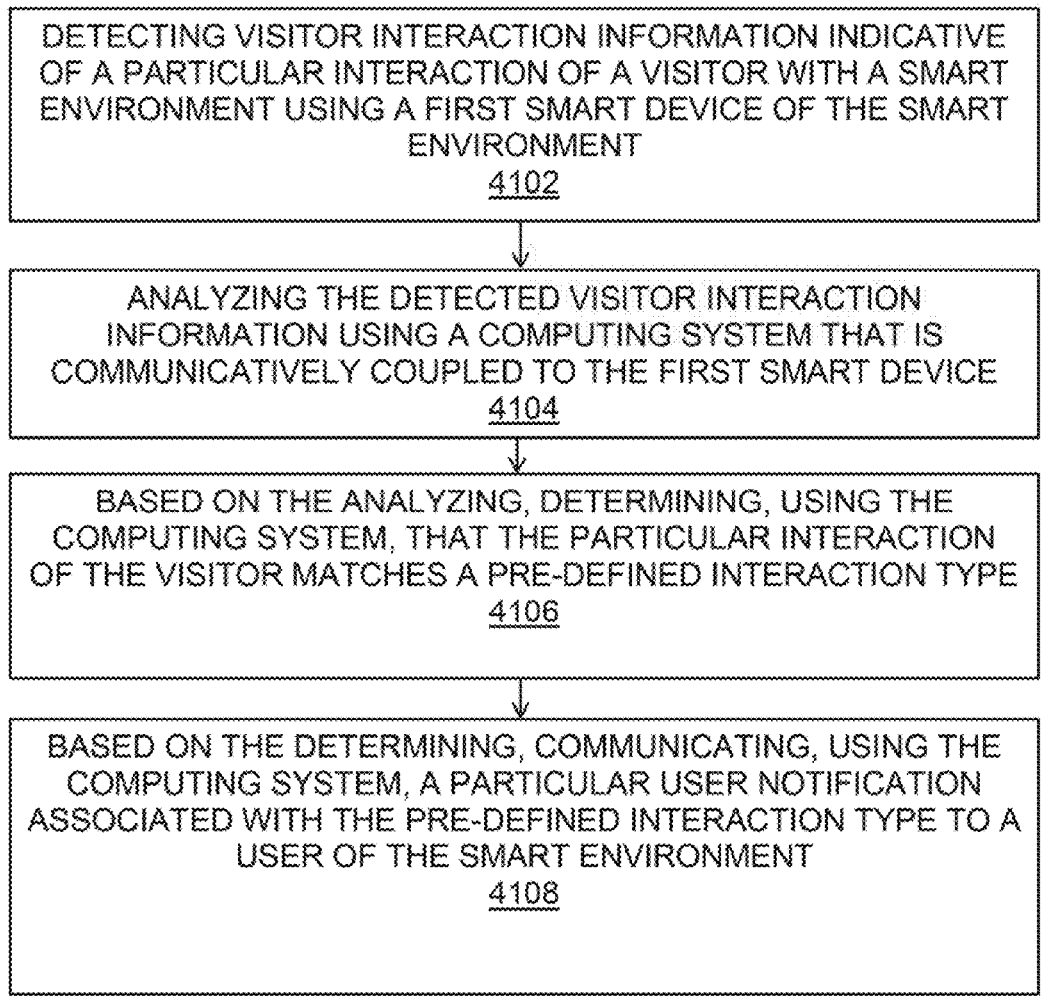
FIG. 41 provides an example process for handling a visitor at a smart environment, according to at least one embodiment.

FIG. 41 is a flowchart of an illustrative process 4100 for handling a visitor at a smart environment that includes a number of smart devices. At step 4102, process 4100 may include detecting visitor interaction information indicative of a particular interaction of the visitor with the smart environment using a first smart device of the smart devices. At step 4104, process 4100 may include analyzing the detected visitor interaction information using a computing system that is communicatively coupled to the first smart device. At step 4106, process 4100 may include, based on the analyzing, determining, using the computing system, that the particular interaction of the visitor matches a pre-defined interaction type. At step 4108, process 4100 may include, based on the determining, communicating, using the computing system, a particular user notification associated with the pre-defined interaction type to a user of the smart environment.

It is understood that the steps shown in process 4100 of FIG. 41 are merely illustrative and that existing steps may be modified or omitted, additional steps may be added, and the order of certain steps may be altered.

Platform 200 may be operative to provide any suitable feedback to a visitor in response to any suitable visitor interaction with environment 100, where such feedback provided to the visitor in response to the visitor interaction may or may not be similar to any communication attempt provided to a system user in response to the visitor interaction. In some embodiments, when no audible communication attempt is provided to a system user within environment 100 (e.g., when such a communication attempt is done electronically as a text message to a system user device or as a visual only blinking light communication attempt via a smart device within environment 100 (e.g., when the system user may be putting a baby down for a nap or is on a telephone call)) and/or when no communication attempt is provided within environment 100 whatsoever (e.g., when platform 200 has determined that there is no occupancy within environment 100 and/or each occupant is in a do-not-disturb mode), platform 200 may still be operative to generate audible feedback or any other suitable form of feedback to the visitor, which may provide the visitor with some sort of confidence that its interaction is being handled by environment 100. As just one example, if platform 200 determined that environment 100 is in a do-not-disturb mode whereby no audible communication attempt to a system user is generated in response to a visitor interaction (e.g., if platform 200 instead only generates a silent communication within environment 100 to a system user that may be attempting to put a baby down for a nap in response to a visitor interaction), platform 200 may still be operative to generate visitor feedback that may be audible by the visitor (e.g., external to structure 150 outside door 186) in response to a visitor interaction. Such visitor feedback may be sensed and interpreted by the visitor as if it is hearing the same audible output that is being provided to a system user within environment 100 (e.g., internal to structure 150), whether or not such an audible output is being provided to a system user within environment 100. For example, such an audible output may be provided by doorbell 106 (e.g., audio speaker 836) and/or by an audio speaker of another smart device that may be positioned within structure 150 just adjacent internal side 186i of door 186 (e.g., within a user handle portion 1409 of doorknob 122) where such an audible output may not disturb any system user within structure 150. As another example, an audible output may be generated by platform 200 that may be sensed and interpreted by the visitor as if a dog is barking from within environment 100 in response to the visitor interaction and any attempted user communication. For example, if a real dog may be present within environment 100, platform 200 may be operative to generate any suitable output that may instigate such a dog to bark (e.g., by generating a dog whistle high pitch sound that may not be detectable by any system user or the visitor but that may excite a dog to bark). Alternatively, a sound may be generated and output by any suitable device of environment 100 that may mimic a dog bark.

Platform 200 may be operative to provide different visitor feedback based on occupancy status and/or visitor type. For example, if platform 200 attempts to communicate with a system user local to or remote from environment 100 in response to a visitor interaction with environment 100, platform 200 may be operative to provide different feedback to the visitor dependent upon whether or not the visitor has been detected as a known or unknown visitor. If the visitor is currently unknown to platform 200 or is otherwise considered a stranger with respect to environment 100 or is otherwise to be treated with a heightened form of security, platform 200 may be operative to generate visitor feedback that may be sensed or otherwise interpreted by the visitor as indicative of some form of occupancy at environment 100 (e.g., turning on a light 118 within structure 150 or outdoor lighting 114 external to structure 150 or generating an audible dog bark or other suitable noise, etc.). By generating such visitor feedback in response to such an "unknown" visitor interacting with environment 100 (e.g., "ringing" doorbell button 812), platform 200 may be operative to increase the security of environment 100 by making environment 100 seem occupied in some way to the visitor, even if environment 100 may currently be unoccupied or in a do-not-disturb mode. As mentioned above, platform 200 may be operative to provide such security-enhancing feedback in response to any suitable visitor interaction with environment 100 and not just in response to a visitor interaction with a doorbell button of doorbell 106. For example, in some embodiments, platform 200 may be operative to turn on a light within or outside of structure 150 or adjust the functionality of any other suitable device of environment 100 for enhancing the security of environment 150 when any potential visitor (e.g., known or unknown) is at least initially detected at environment 100 (e.g., when environment is in a do-not-disturb mode or otherwise). Alternatively, such security-enhancing functionality of platform 200 may be carried out in response to a visitor being detected but then not actively interacting with environment 100 (e.g., when the presence of a visitor is detected but then that visitor does not provide requested information to doorbell 106 or otherwise interact with a user interface of doorbell 106), whereby platform 200 may be operative to deem such visitor non-interaction as suspicious. As another example, such security-enhancing functionality of platform 200 may be carried out in response to a visitor actively interacting with environment 100 in an unapproved manner (e.g., in response to a visitor attempting to open door 186 through interaction with doorknob 122 before platform 200 has granted such access), whereby platform 200 may be operative to deem such visitor interaction as suspicious.

However, if the visitor is currently known to platform 200 or otherwise meets any suitable trust threshold with respect to environment 100 or is otherwise not to be treated with a heightened form of security, platform 200 may be operative to generate visitor feedback that may be sensed or otherwise interpreted by the visitor as indicative of the fact that platform 200 is currently attempting to contact a system user without necessarily implying occupancy at environment 100 (e.g., by conveying a visitor feedback message like "please wait while user contact is attempted" or "please enjoy this hold music as a user is notified of your presence"). By generating such visitor feedback in response to such a "known" visitor interacting with environment 100 (e.g., "ringing" doorbell button 812), platform 200 may be operative to share with the visitor the actual current status of the attempted communication between platform 200 and a system user rather than generating a decoy feedback that may not fool a visitor familiar with environment 100 (e.g., whether or not environment 100 would include a barking dog).

FIG. 42 is a flowchart of an illustrative process 4200 for handling a visitor at a smart environment that includes a number of smart devices. At step 4202, process 4200 may include detecting visitor information associated with the visitor at the smart environment using a first smart device of the smart devices. At step 4204, process 4200 may include analyzing the detected visitor information using a computing system that is communicatively coupled to the first smart device. At step 4206, process 4200 may include, based on the analyzing, providing feedback from the computing system to the visitor via a second smart device of the smart devices, wherein the feedback includes a status message indicative of an occupant of the smart environment being notified of the visitor's presence at the smart environment.

It is understood that the steps shown in process 4200 of FIG. 42 are merely illustrative and that existing steps may be modified or omitted, additional steps may be added, and the order of certain steps may be altered.

Platform 200 may be operative to leverage any suitable data that may be sensed by any suitable smart device of environment 100 for enhancing the security or convenience of environment 100. Additionally or alternatively to sensing data that may be indicative of the physical presence, identity, and/or intent of a visitor and/or a smart invitation or package label at environment 100, one or more sensing components of one or more smart devices of environment 100 (e.g., doorbell 106) may be operative to sense any other suitable data that may be utilized by platform 200 in enhancing the security and/or convenience of system users of environment 100 in any suitable ways.

Doorbell 106 and/or any other smart device of environment 100 (e.g., outdoor lighting 114, gated entry 116, doorknob 122, safe appliance 113a, entry detectors 112, etc.) may include one or more sensing components that may be operative to measure one or more characteristics for determining the quality of the air or any other similar detectable entity of the external environment of environment 100 (e.g., external to structure 150). For example, one or more sensing components 828 of doorbell 106 positioned external to structure 150 may be similar to any suitable sensing component of a hazard detector device 104 positioned within structure 150 or otherwise for measuring air quality and/or detecting harmful VOCs and/or patent harmful gases, particulate, dust, pollen, mold, or the like of the environment external to structure 150. Such external environment data sensed by doorbell 106 or any other suitable smart device or by any other data source of platform 200 (e.g., a third party air quality business 228) may be leveraged by platform 200 in combination with any other suitable data for adjusting a platform functionality (e.g., a functionality of a smart device of environment 100 or for reporting to any suitable entity for analysis). For example, the detected air purity within a particular area or the entirety of structure 150 (e.g., as may be sensed by one or more hazard detector devices 104) may be compared by platform 200 (e.g., by system 164 or any suitable processing component local to environment 100) with the detected air purity outside of structure 150 (e.g., as may be sensed by doorbell 106 or otherwise) to control a functionality of a smart device of environment 100. As a particular example, if the outside air is purer than the inside air, then platform 200 may be operative to instruct a smart thermostat device 102 to open a vent to permit fresh air into structure 150, otherwise platform 200 may be operative to instruct a thermostat device 102 to recirculate air within structure 150 and to not draw in outside air. Additionally or alternatively, as another particular example, platform 200 may be operative to send detailed information about the air quality within and external to structure 150 to a mobile personal device user device 166 or other suitable smart device of a user, which may help the user identify which pollen or other air impurity may be the culprit of any allergies that the user may be experiencing. As one other example, platform 200 may be operative to send an alert to a system user when cigarette smoke is detected by any suitable external sensor (e.g., to catch a child attempting to sneak a cigarette outside front door 186). As another example, platform 200 may be operative to aggregate air quality data received from multiple environments in various geographic locations or other suitable groupings and to provide, for example, smog alerts, pollen warnings, etc. of those groupings to any suitable entity (e.g., weather reporting business entities 228). As another example, platform 200 may be operative to compare detected external and/or internal air quality of different areas of environment 100 with one another at a specific time or historically (e.g., by time of day, day of week, season of year, etc.) for identifying certain areas that may have issues to be addressed (e.g., a corner of structure 150 that is exposed to significantly more pollen than other portions of environment 100 during the Spring and may benefit from additional filtration or inspection of flora and fauna near that area at that time). As another example, platform 200 may be operative to compare detected external and/or internal air quality of environment 100 with other smart environments. Any one or more of such comparisons or data aggregations with respect to air quality of one or more internal or external areas of environment 100 may be stored for and/or shared with certain entities, such as prospective buyers of environment 100 (e.g., at real estate business entity 228), for determining whether such qualities of environment 100 are suitable. Additionally or alternatively, any other weather phenomena or characteristic of the air quality (e.g., temperature, humidity, wind levels (e.g., strength/speed of the movement of the air), wind direction (e.g., direction of the movement of the air), etc.) may be detected (e.g., by any sensing component(s) doorbell 106) at environment 100 (e.g., internal to and/or ambient of structure 150) and utilized similarly to any air purity levels described above. For example, the outside humidity and temperature data may be compared with or considered by a thermostat 102 when controlling the HVAC to best accomplish the occupants' desired comfort preferences. Further, for example, this information may be presented to the occupants through a number of user interfaces, such as a user interface associated with another one of the devices located inside of the home, the television, mobile and other computing devices, or audibly. In some instances, platform 200 (e.g., system 164) may collect such weather data from multiple smart environments across a plurality of geographic locations or other suitable groupings, and such aggregated weather data may be sold or otherwise provided to weather services (e.g., any suitable business entity 228) or may be used to provide weather data to smart home occupants or potential buyers.

Doorbell 106 and/or any other smart device of environment 100 (e.g., outdoor lighting 114, gated entry 116, doorknob 122, safe appliance 113*a*, entry detectors 112, etc.) may include one or more sensing components that may be operative to measure one or more characteristics for determining noise of the external environment of environment 100 (e.g., external to structure 150). For example, one or more sensing components 828 of doorbell 106 (e.g., microphone 844) may be positioned external to structure 150 for sensing any suitable noise external to structure 150. Such ambient noise data sensed by doorbell 106 or any other suitable smart device or by any other data source of platform 200 (e.g., a third party noise detection business 228) may be leveraged by platform 200 in combination with any other suitable data for adjusting a platform functionality (e.g., a functionality of a smart device of environment 100 or for reporting to any suitable entity for analysis). For example, the detected noise levels within a particular area or the entirety of structure 150 (e.g., as may be sensed by one or more hazard detectors 104) may be compared by platform 200 (e.g., by system 164 or any suitable processing component local to environment 100) with the noise levels outside of structure 150 (e.g., as may be sensed by doorbell 106 or otherwise) to control a functionality of a smart device of environment 100. As a particular example, if the noise level outside of structure 150 significantly spikes (e.g., due to a helicopter hovering overhead), then platform 200 may be operative to instruct a smart appliance 113 (e.g., a television) or smart hazard detector device 104 or any other suitable smart device to increase its volume output level to overcome or otherwise compensate for the additional ambient noise pollution (e.g., so a system user may still hear important warnings or other communications from such smart devices). As another example, platform 200 may be operative to analyze ambient noise detected at environment 100 (e.g., by doorbell 106) to determine that a street adjacent to structure 150 may meet a threshold level of traffic, where such a determination may result in one or more inferences being made by platform 200 about the safety of any children currently occupying environment 100 (e.g., Child 1722 playing outside of structure 150 at environment 100 of FIG. 17). For example, platform 200 may be operative to trigger any suitable alarm (e.g., at environment 100, such as with a hazard detector 104 within structure 150) in the event one or more of the children are detected by the occupancy sensing to be outside of the home during such a detected traffic event. Such an alert may enable a parent or other caretaker at environment 100 (e.g., Husband 1718 within structure 150) to quickly take action to protect the child from the detected traffic (of course, other suitable environment detectors, such as a camera and/or motion detector alone or in combination with such a noise sensor may also enable platform 200 to facilitate such a security feature). Additionally or alternatively, as another particular example, platform 200 may be operative to send detailed information about the noise levels within and external to structure 150 to a mobile personal device user device 166 or other suitable smart device of a user, which may help the user identify which areas of environment may be experiencing more problematic noise issues. As another example, platform 200 may be operative to aggregate noise data received from multiple environments in various geographic locations or other suitable groupings and to provide, for example, noise pollution reports of those groupings to any suitable entity (e.g., law enforcement entities 222). As another example, platform 200 may be operative to compare detected external and/or internal noise levels of different areas of environment 100 with one another at a specific time or historically (e.g., by time of day, day of week, season of year, etc.) for identifying certain areas that may have issues to be addressed (e.g., a corner of structure 150 that is exposed to significantly more noise than other portions of environment 100 at certain times of day and may benefit from additional sound proofing or noise filtration or other accommodations). As another example, platform 200 may be operative to compare detected external and/or noise levels of environment 100 with other smart environments. Any one or more of such comparisons or data aggregations with respect to noise levels of one or more internal or external areas of environment 100 may be stored for and/or shared with certain entities, such as prospective buyers of environment 100 (e.g., at a real estate agent business 228), for determining whether such qualities of environment 100 are suitable. Additionally or alternatively, any motion levels or other suitable activity may be detected (e.g., by any sensing component(s) doorbell 106) at environment 100 (e.g., internal to and ambient of structure 150) and utilized similarly to any noise levels described above (e.g., a combination of detected motion and noise levels may be leveraged to detect a traffic threshold for enabling platform 200 to initiate an alarm for protecting any children of environment 100, or motion levels may be detected to indicate a stranger casing environment 100 for potential theft or an animal wandering in the backyard, etc.). Additionally or alternatively, any ambient light levels or other suitable ambient conditions may be detected (e.g., by any sensing component(s) doorbell 106) at environment 100 (e.g., internal to and ambient of structure 150) and utilized similarly to any noise levels described above.

As described above (e.g., with respect to detected air quality), any suitable data indicative of any suitable characteristic or phenomena external to structure 150 (e.g., noise levels, activity levels, ambient light levels, weather, etc.) that may be detectable by doorbell 106 or any other suitable data source of platform 200 may be analyzed in any suitable manner (e.g., with respect to any other suitable data) for leveraging in any suitable way. As one particular example, any suitable detected ambient data of structure 150 may be compared with any suitable internal data of environment 100 or analyzed on its own or with respect to any other suitable data for adjusting a platform functionality, such as for adjusting a functionality of a smart device and/or for adjusting a mode or mode setting enabled or to be enabled (e.g., ambient detected noise (e.g., by a microphone sensing component 844 of doorbell 106) may be leveraged to adjust the volume level of audio output by a smart device within structure 150 (e.g., from a smart hazard detector device 104 or any suitable controllable device such as a stereo) for dynamically tuning such internal volume to overcome any ambient noise sources). Additionally or alternatively, as another particular example, platform 200 may be operative to send detailed information about the detected value of certain ambient conditions of environment 100 to a mobile personal device user device 166 or other suitable smart device of a user, which may help the user identify when and where certain noises are coming from. As another example, platform 200 may be operative to aggregate ambient data received from multiple environments in various geographic locations or other suitable groupings and to provide, for example, air pollution reports of those groupings to any suitable entity (e.g., law enforcement entities 222). As another example, platform 200 may be operative to compare detected external and/or internal phenomena from different areas of environment 100 with one another at a specific time or historically (e.g., by time of day, day of week, season of year, etc.) for identifying certain areas that may have issues to be addressed (e.g., a corner of structure 150 that is exposed to significantly more noise pollution than other portions of environment 100 at a specific time of day and may benefit from additional sound proofing). As another example, platform 200 may be operative to compare detected external and/or internal phenomena of environment 100 with other smart environments. Any one or more of such comparisons or data aggregations with respect to detected phenomena (e.g., air quality, noise levels, activity (e.g., motion) levels, ambient light levels, weather, etc.) of one or more internal or external areas of environment 100 may be stored for and/or shared with certain entities, such as prospective buyers of environment 100, for determining whether such qualities of environment 100 are suitable.

Figure 43:
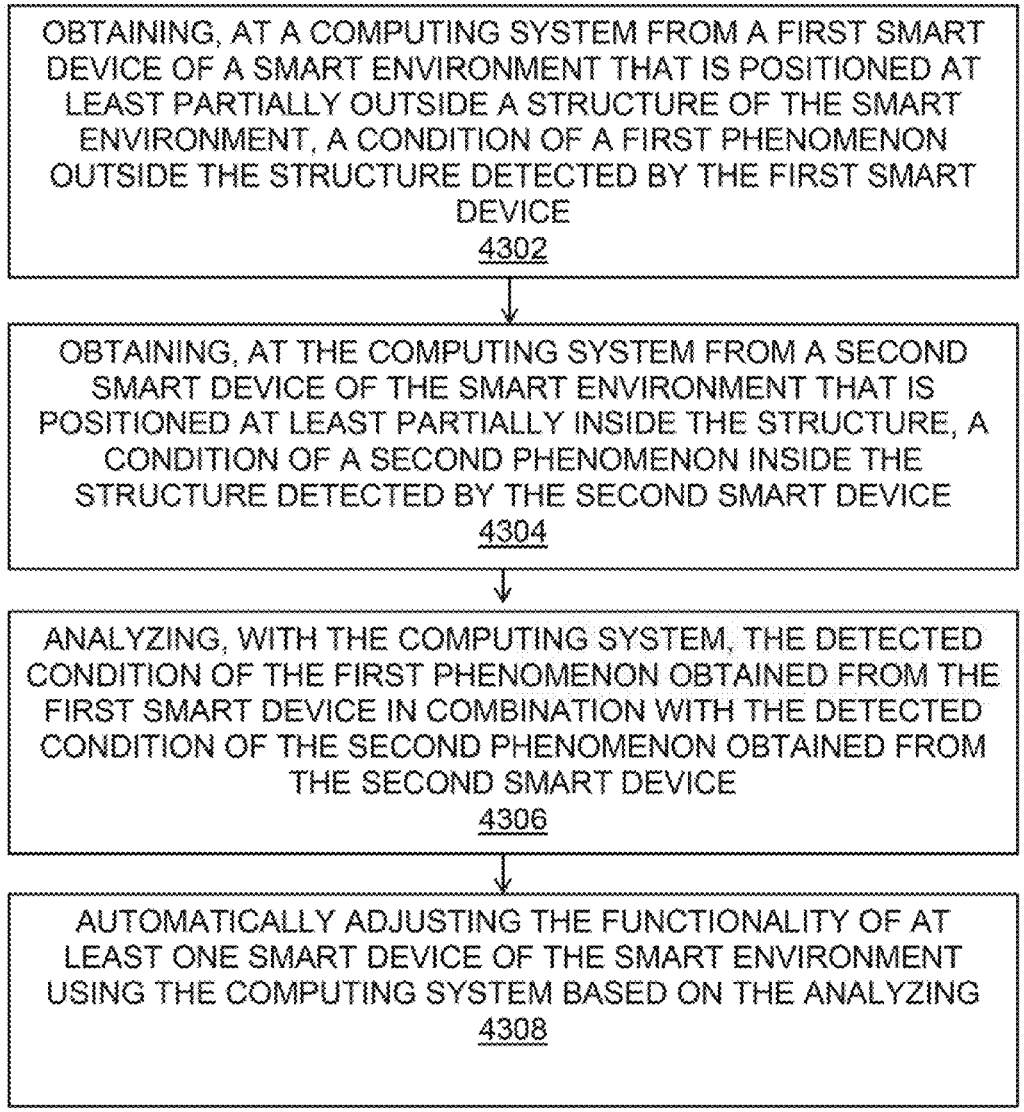
FIG. 43 provides an example process for controlling a smart environment, according to at least one embodiment.

FIG. 43 is a flowchart of an illustrative process 4300 for controlling a smart environment that includes a number of smart devices at a smart-home environment that includes a structure. At step 4302, process 4300 may include obtaining, at a computing system from a first smart device of the smart devices that is positioned at least partially outside the structure, a condition of a first phenomenon outside the structure detected by the first smart device. At step 4304, process 4300 may include obtaining, at the computing system from a second smart device of the smart devices that is positioned at least partially inside the structure, a condition of a second phenomenon inside the structure detected by the second smart device. At step 4306, process 4300 may include analyzing, with the computing system, the detected condition of the first phenomenon obtained from the first smart device in combination with the detected condition of the second phenomenon obtained from the second smart device. At step 4308, process 4300 may include automatically adjusting the functionality of at least one smart device of the smart devices using the computing system based on the analyzing.

It is understood that the steps shown in process 4300 of FIG. 43 are merely illustrative and that existing steps may be modified or omitted, additional steps may be added, and the order of certain steps may be altered.

Figure 44:
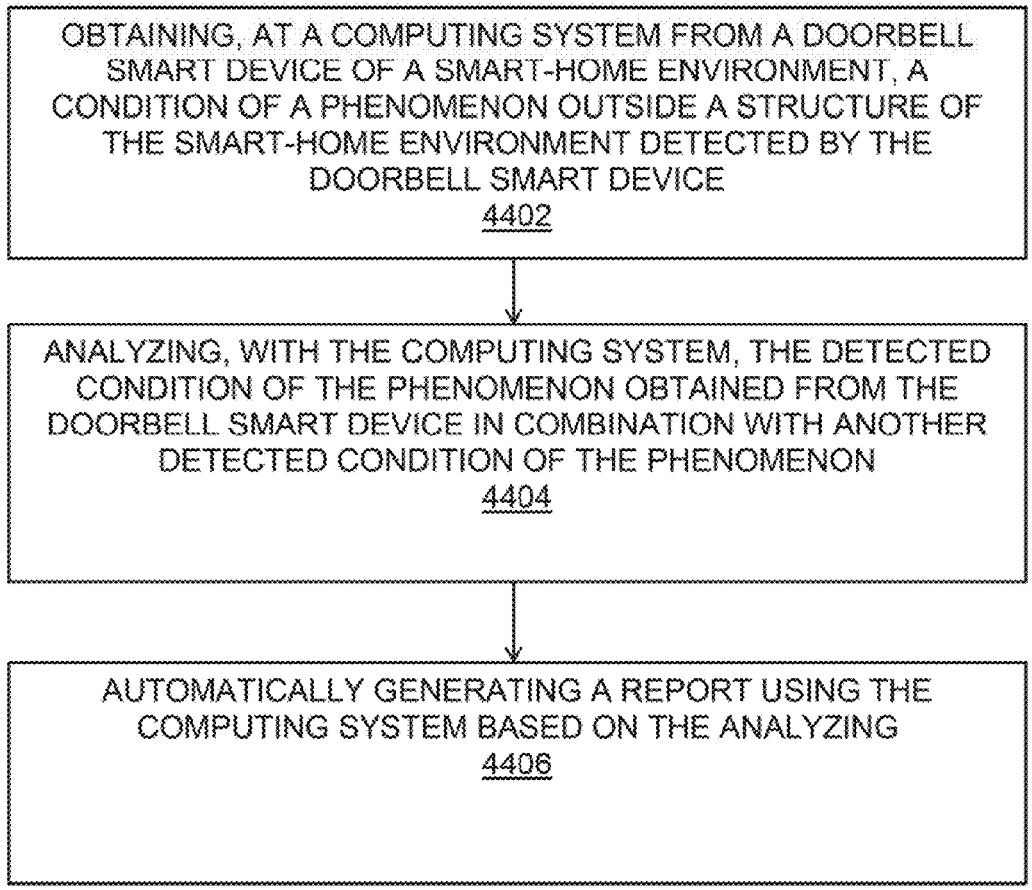
FIG. 44 provides an example process for use with respect to a smart-home environment, according to at least one embodiment.

FIG. 44 is a flowchart of an illustrative process 4400 for use with respect to a smart-home environment that includes a structure and a doorbell smart device positioned at least partially outside the structure. At step 4402, process 4400 may include obtaining, at a computing system from the doorbell smart device, a condition of a phenomenon outside the structure detected by the doorbell smart device. At step 4404, process 4400 may include analyzing, with the computing system, the detected condition of the phenomenon obtained from the doorbell smart device in combination with another detected condition of the phenomenon. At step 4406, process 4400 may include automatically generating a report using the computing system based on the analyzing.

It is understood that the steps shown in process 4400 of FIG. 44 are merely illustrative and that existing steps may be modified or omitted, additional steps may be added, and the order of certain steps may be altered.

A computing system or processing system or any other suitable data analysis component of platform 200 may be provided by any suitable element of platform 200 or any suitable combination of multiple elements of platform 200. One or more smart devices of environment 100 (e.g., doorbell smart device 106 and/or a hazard detector smart device 104, etc.) may each include a processor that may be operative to conduct any suitable processing, analyzing, or computing functions of platform 200. Additionally or alternatively, one or more dedicated computing devices may be provided at environment 100 for locally conducting any suitable processing, analyzing, or computing functions of platform 200 at environment 100. Additionally or alternatively, server/system 164 may be operative to conduct any suitable processing, analyzing, or computing functions of platform 200. System 164 may include or otherwise provide a computing system that may be similar to computing system 1500 and/or computing system 1600 for performing any suitable functionality described above, at least partially automatically. Alternatively or additionally, one, some, or all of entities 222-230 may include or otherwise provide a computing system that may be similar to computing system 1500 and/or computing system 1600 for performing any suitable functionality described above, at least partially automatically.

Any portion of platform 200 may be operative to store, generate, or otherwise define any suitable message, feedback, communication, music, video, and/or the like for any suitable purpose as described above. Any message, feedback, communication, music, video, or other informative mechanism to be output to a user or visitor may be at least partially automatically generated or compiled or pre-stored and retrieved for conveyance to such a user or visitor via any suitable output component of any suitable device by any suitable processing component or components of platform 200. Each smart device or user device described above may be configured to include any component of any smart device or user device described above. As just one particular example, any sensing component 828 of doorbell smart device 106 may also be provided as a sensing component of any other suitable smart device, such as a sensing component of a safe smart appliance 113*a*.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method of handling a visitor at a smart environment that comprises at least one smart device, the method comprising:
   acquiring, at a computing system, unique invitation identification information;
   defining, at the computing system, a mode setting that is associated with the acquired unique invitation identification information and the smart environment, wherein the defined mode setting comprises at least one platform action;
after the defining, receiving, at the computing system from the smart environment, invitation identification data detected by the at least one smart device from the visitor, wherein the received invitation identification data comprises the unique invitation identification information;
analyzing, using the computing system, the unique invitation identification information of the received invitation identification data from the smart environment to identify the defined mode setting associated with the unique invitation identification information and the smart environment; and
automatically carrying out, using the computing system, the at least one platform action of the identified defined mode setting based on the analyzing, wherein the carrying out the at least one platform action comprises:
presenting a plurality of options to the visitor via the at least one smart device;
receiving a selection of a particular option of the presented plurality of options;
conveying a message to a user of the smart environment based on the selection of the particular option; and
providing the visitor with physical accessibility to at least a portion of the smart environment when the message is conveyed.

2. The method of claim 1, wherein the unique invitation identification information comprises a password.

3. The method of claim 2, wherein:
the unique invitation identification information is operative to be detected by a sensing component of the at least one smart device; and
the sensing component comprises one of the following:
a microphone operative to detect the password when the password is orally spoken by the visitor in a sensing region of the microphone; and
a camera operative to detect the password when a print-out of the password is positioned by the visitor in a sensing region of the camera.

4. The method of claim 1, wherein the unique invitation identification information comprises a barcode.

5. The method of claim 4, wherein:
the unique invitation identification information is operative to be detected by a sensing component of the at least one smart device; and
the sensing component comprises a scanner operative to detect the barcode when the barcode is positioned by the visitor in a sensing region of the scanner.

6. The method of claim 1, wherein:
the unique invitation identification information is operative to be detected by a sensing component of the at least one smart device; and
the sensing component comprises a receiver operative to detect the unique invitation identification information using electromagnetic induction when an object on which the unique invitation identification information is electronically stored is positioned by the visitor in a sensing region of the receiver.

7. The method of claim 1, further comprising, prior to the receiving, sharing the unique invitation identification information with the visitor.

8. The method of claim 7, wherein:
the sharing comprises sharing a smart invitation with the visitor; and
the smart invitation comprises:
the unique invitation identification information; and
additional invitation information comprising at least one of the following:
information indicative of the location of the smart environment; and
information indicative of a condition that must be satisfied for the smart invitation to be useful.

9. The method of claim 8, wherein the sharing comprises e-mailing the smart invitation to the visitor.

10. The method of claim 7, wherein the sharing comprises sharing the acquired unique invitation identification information with the visitor using the computing system.

11. The method of claim 1, wherein the providing the visitor with physical accessibility to the at least a portion of the smart environment comprises providing the visitor with temporary accessibility to the at least a portion of the smart environment.

12. The method of claim 11, wherein:
the smart device comprises a smart doorknob device for a door to a secure area of the smart environment; and
the providing the visitor with temporary accessibility to the at least a portion of the smart environment comprises unlocking the door with the smart doorknob device.

13. The method of claim 1, wherein the carrying out the at least one platform action further comprises:
detecting the current location of the user; and
conveying another message based on the detected current location of the user to the visitor via the at least one smart device.

14. The method of claim 1, wherein the conveying the message to the user of the smart environment based on the selection of the particular option comprises conveying the message to multiple occupied portions of the smart environment via multiple other smart devices of the smart environment.

15. The method of claim 1, wherein:
the carrying out the at least one platform action further comprises, prior to the presenting, determining a plurality of songs currently queued in a playlist that is currently being played back by the smart environment;
the presenting comprises presenting information indicative of a first song of the determined plurality of songs as a first option of the plurality of presented options and presenting information indicative of a second song of the determined plurality of songs as a second option of the plurality of presented options;
the received selection comprises a selection of the first option; and
the conveying comprises the smart environment playing back the first song.

16. The method of claim 1, wherein the plurality of options comprises a plurality of songs in a queued playlist of the smart environment.

17. The method of claim 1, wherein:
the defining comprises defining at least one condition associated with the at least one platform action;
the method further comprises, after the receiving but prior to the carrying out, determining, using the computing system, that the at least one condition is satisfied; and
the carrying out comprises carrying out the at least one platform action of the identified defined mode setting based on the analyzing and based on the determining.

18. The method of claim 1, wherein:
the at least one smart device comprises a smart doorbell device positioned proximate to a door at an entry point to a portion of the smart environment; and
the smart doorbell device comprises:
- a doorbell component operative to be interacted with by a user for generating a request to contact an occupant of the smart environment; and
- at least one sensing component operative to detect the invitation identification data.

19. A system for handling a visitor at a smart environment, the system comprising:
a plurality of smart devices at the smart environment; and
a computing system operative to:
- acquire unique invitation identification information;
- define a mode setting that is associated with the acquired unique invitation identification information and the smart environment and that comprises at least one platform action and at least one condition associated with the at least one platform action;
- after the mode setting is defined, receive invitation identification data from at least one sensing component of a first smart device of the plurality of smart devices that is operative to detect the invitation identification data from the visitor, wherein the received invitation identification data comprises the unique invitation identification information;
- analyze the unique invitation identification information of the received invitation identification data from the smart environment to identify the defined mode setting associated with the unique invitation identification information and the smart environment;
- determine that the at least one condition of the identified defined mode setting is satisfied by receiving visitor identification data that is indicative of the visitor from at least one sensing component of a second smart device of the plurality of smart devices that is operative to detect the visitor identification data from the visitor and by identifying a particular characteristic of the at least one condition in the received visitor identification data, wherein the particular characteristic is a general physical characteristic obtainable by multiple potential visitors; and
- automatically carry out the at least one platform action of the identified defined mode setting based on the analysis and the determination by adjusting a functionality of a third smart device of the plurality of smart devices at the smart environment.

20. The system of claim 19, wherein the first smart device comprises an entryway interface smart device.

21. The system of claim 20, wherein the entryway interface smart device comprises:
- the at least one sensing component operative to detect the invitation identification data; and
- a doorbell component operative to be touched by a user for generating a request to contact an occupant of the smart environment.

22. The system of claim 21, wherein:
the unique invitation identification information comprises a password;
the at least one sensing component of the entryway interface smart device comprises one of the following:
- a microphone operative to detect the password when the password is orally spoken by the visitor in a sensing region of the microphone; and
- a camera operative to detect the password when a print-out of the password is positioned by the visitor in a sensing region of the camera.

23. The system of claim 21, wherein:
the unique invitation identification information comprises a barcode; and
the at least one sensing component of the entryway interface smart device comprises a scanner operative to detect the barcode when the barcode is positioned by the visitor in a sensing region of the scanner.

24. The system of claim 21, wherein the at least one sensing component of the entryway interface smart device comprises a receiver operative to detect the unique invitation identification information using electromagnetic induction when an object on which the unique invitation identification information is electronically stored is positioned by the visitor in a sensing region of the receiver.

25. The system of claim 20, wherein the second smart device comprises the entryway interface smart device.

26. The system of claim 25, wherein the functionality adjustment comprises conveying a message to the visitor via an output component of the entryway interface smart device.

27. The system of claim 19, wherein the functionality adjustment provides to the visitor temporary accessibility to a portion of the smart environment.

28. The system of claim 19, wherein:
the second smart device comprises a smart doorknob device for a door to a secure area of the smart environment; and
the functionality adjustment unlocks the door using the smart doorknob device.

29. The system of claim 19, wherein the general physical characteristic is the satisfaction of a dress code.

30. The system of claim 19, wherein the general physical characteristic is the existence of clothing of a particular color.

* * * * *